US008873813B2

(12) United States Patent
Tadayon et al.

(10) Patent No.: US 8,873,813 B2
(45) Date of Patent: Oct. 28, 2014

(54) APPLICATION OF Z-WEBS AND Z-FACTORS TO ANALYTICS, SEARCH ENGINE, LEARNING, RECOGNITION, NATURAL LANGUAGE, AND OTHER UTILITIES

(71) Applicants: Saied Tadayon, Potomac, MD (US); Bijan Tadayon, Potomac, MD (US)

(72) Inventors: Saied Tadayon, Potomac, MD (US); Bijan Tadayon, Potomac, MD (US)

(73) Assignee: Z Advanced Computing, Inc., Potomac, MD (US)

( * ) Notice: Subject to any disclaimer, the term of this patent is extended or adjusted under 35 U.S.C. 154(b) by 140 days.

(21) Appl. No.: 13/781,303

(22) Filed: Feb. 28, 2013

(65) Prior Publication Data

US 2014/0079297 A1     Mar. 20, 2014

Related U.S. Application Data

(60) Provisional application No. 61/701,789, filed on Sep. 17, 2012.

(51) Int. Cl.
*G06K 9/00*     (2006.01)
*G06K 9/40*     (2006.01)

(52) U.S. Cl.
CPC .................... *G06K 9/00288* (2013.01); *G06K 9/00* (2013.01)
USPC .............. 382/118; 382/181; 382/263; 706/52

(58) Field of Classification Search
CPC ..... G06K 9/00; G06K 9/00288; G06N 7/005; G06N 7/00
USPC ......... 382/115, 118, 305, 224, 278, 103, 176, 382/190, 195, 209, 218, 219, 282, 307, 275, 382/226, 227, 254, 181, 263; 340/5.81, 340/5.83; 707/E17.022, E17.026, E17.023, 707/736, 758, 999.107; 706/52; 715/825; 902/3; 348/239, 370
See application file for complete search history.

(56) References Cited

U.S. PATENT DOCUMENTS 5,295,228 A     3/1994    Koda et al.
5,329,611 A     7/1994    Pechanek et al.
(Continued)

OTHER PUBLICATIONS

Ali Sanayei, titled "Towards a complexity theory: Theoratical foundations and practical applications", submitted to Satellite Meeting Unravelling and Controlling Discrete Dynamical Systems, on Jun. 17, 2011. No page number, volume number, or publisher's location mentioned. (Paper dedicated to Professor Lotfi A. Zadeh, et al., by the author.).

(Continued)

*Primary Examiner* — Sheela Chawan
(74) *Attorney, Agent, or Firm* — Saied Tadayon; Bijan Tadayon

(57) ABSTRACT

Here, we introduce Z-webs, including Z-factors and Z-nodes, for the understanding of relationships between objects, subjects, abstract ideas, concepts, or the like, including face, car, images, people, emotions, mood, text, natural language, voice, music, video, locations, formulas, facts, historical data, landmarks, personalities, ownership, family, friends, love, happiness, social behavior, voting behavior, and the like, to be used for many applications in our life, including on the search engine, analytics, Big Data processing, natural language processing, economy forecasting, face recognition, dealing with reliability and certainty, medical diagnosis, pattern recognition, object recognition, biometrics, security analysis, risk analysis, fraud detection, satellite image analysis, machine generated data analysis, machine learning, training samples, extracting data or patterns (from the video, images, and the like), editing video or images, and the like. Z-factors include reliability factor, confidence factor, expertise factor, bias factor, and the like, which is associated with each Z-node in the Z-web.

20 Claims, 81 Drawing Sheets

(56) References Cited

U.S. PATENT DOCUMENTS

| | | | |
|---|---|---|---|
| 5,517,596 A | 5/1996 | Pechanek et al. | |
| 6,157,921 A | 12/2000 | Barnhill | |
| 7,542,947 B2 | 6/2009 | Guyon et al. | |
| 7,664,962 B2 * | 2/2010 | Kuhlman | 713/186 |
| 7,689,529 B2 | 3/2010 | Fung et al. | |
| 7,697,761 B2 | 4/2010 | Napper | |
| 7,698,236 B2 | 4/2010 | Cox et al. | |
| 7,721,336 B1 | 5/2010 | Adjaoute | |
| 7,734,400 B2 | 6/2010 | Gayme et al. | |
| 7,734,451 B2 | 6/2010 | MacArthur et al. | |
| 7,739,337 B1 | 6/2010 | Jensen | |
| 7,742,103 B1 | 6/2010 | He et al. | |
| 7,761,742 B2 | 7/2010 | Di Palma et al. | |
| 7,769,512 B2 | 8/2010 | Norris et al. | |
| 7,783,580 B2 | 8/2010 | Huang et al. | |
| 7,784,295 B2 | 8/2010 | McCormick et al. | |
| 7,792,746 B2 | 9/2010 | Del Callar et al. | |
| 7,792,750 B2 | 9/2010 | Moeller | |
| 7,797,268 B2 | 9/2010 | Bigus et al. | |
| 7,801,840 B2 | 9/2010 | Repasi et al. | |
| 7,805,396 B2 | 9/2010 | Wagner et al. | |
| 7,805,397 B2 | 9/2010 | Kurian et al. | |
| 7,805,984 B2 | 10/2010 | McLain et al. | |
| 7,817,854 B2 | 10/2010 | Taylor | |
| 7,832,511 B2 | 11/2010 | Syed et al. | |
| 7,836,496 B2 | 11/2010 | Chesla et al. | |
| 7,840,500 B2 | 11/2010 | Khanbaghi | |
| 7,844,564 B2 | 11/2010 | Donohue et al. | |
| 7,853,538 B2 | 12/2010 | Hildebrand | |
| 7,856,356 B2 | 12/2010 | Chung et al. | |
| 7,857,976 B2 | 12/2010 | Bissler et al. | |
| 7,864,552 B2 | 1/2011 | Heber et al. | |
| 7,869,989 B1 | 1/2011 | Harvey et al. | |
| 7,895,135 B2 | 2/2011 | Norris et al. | |
| 7,921,068 B2 | 4/2011 | Guyon et al. | |
| 7,925,874 B1 | 4/2011 | Zaitsev | |
| 7,929,771 B2 | 4/2011 | Ko et al. | |
| 7,930,265 B2 | 4/2011 | Akelbein et al. | |
| 7,934,499 B2 | 5/2011 | Berthon-Jones | |
| 7,936,906 B2 | 5/2011 | Hua et al. | |
| 7,941,350 B2 | 5/2011 | Ginsburg et al. | |
| 7,966,061 B2 | 6/2011 | Al-Abed et al. | |
| 7,974,455 B2 | 7/2011 | Peters et al. | |
| 7,991,754 B2 | 8/2011 | Maizel et al. | |
| 7,999,857 B2 | 8/2011 | Bunn et al. | |
| 8,004,544 B1 | 8/2011 | Zhang et al. | |
| 8,015,196 B2 | 9/2011 | Taranenko et al. | |
| 8,016,319 B2 | 9/2011 | Winkler et al. | |
| 8,023,974 B1 | 9/2011 | Diao et al. | |
| 8,054,592 B2 | 11/2011 | Rivers, Jr. | |
| 8,060,456 B2 | 11/2011 | Gao et al. | |
| 8,063,889 B2 | 11/2011 | Anderson | |
| 8,077,983 B2 | 12/2011 | Qiu et al. | |
| 8,081,844 B2 | 12/2011 | Steinberg et al. | |
| 8,095,483 B2 | 1/2012 | Weston et al. | |
| 8,108,207 B1 | 1/2012 | Harvey et al. | |
| 8,108,324 B2 | 1/2012 | Krupka et al. | |
| 8,116,534 B2 | 2/2012 | Nishiyama et al. | |
| 8,150,109 B2 | 4/2012 | Sung et al. | |
| 8,165,354 B1 | 4/2012 | Zhao | |
| 8,199,203 B2 | 6/2012 | Sugimoto | |
| 8,199,242 B2 | 6/2012 | Sugihara | |
| 8,199,979 B2 | 6/2012 | Steinberg et al. | |
| 8,204,310 B2 | 6/2012 | Zou et al. | |
| 8,208,764 B2 | 6/2012 | Guckenberger | |
| 8,209,179 B2 | 6/2012 | Aoyama et al. | |
| 8,213,737 B2 * | 7/2012 | Steinberg et al. | 382/275 |
| 8,224,040 B2 | 7/2012 | Li | |
| 8,224,042 B2 | 7/2012 | Wang | |
| 8,233,676 B2 | 7/2012 | Ngan et al. | |
| 8,244,040 B2 | 8/2012 | Imagawa | |
| 8,249,313 B2 | 8/2012 | Yanagi | |
| 8,254,691 B2 | 8/2012 | Kaneda et al. | |
| 8,259,168 B2 | 9/2012 | Wu et al. | |
| 8,260,009 B2 * | 9/2012 | Du et al. | 382/117 |
| 8,265,399 B2 | 9/2012 | Steinberg et al. | |
| 8,265,474 B2 | 9/2012 | Kanayama | |
| 8,275,175 B2 | 9/2012 | Baltatu et al. | |
| 8,285,006 B2 | 10/2012 | Tang | |
| 8,289,546 B2 | 10/2012 | Hayasaki | |
| 8,295,558 B2 | 10/2012 | Su et al. | |
| 8,300,898 B2 | 10/2012 | Bak et al. | |
| 8,300,900 B2 | 10/2012 | Lai et al. | |
| 8,306,279 B2 | 11/2012 | Hanna | |
| 8,316,436 B2 | 11/2012 | Shirai et al. | |
| 8,320,682 B2 | 11/2012 | Froeba et al. | |
| 8,325,999 B2 | 12/2012 | Kapoor et al. | |
| 8,326,001 B2 | 12/2012 | Free | |
| 8,330,831 B2 * | 12/2012 | Steinberg et al. | 348/231.3 |
| 8,331,632 B1 | 12/2012 | Mohanty et al. | |
| 8,332,422 B2 | 12/2012 | Chang et al. | |
| 8,340,366 B2 | 12/2012 | Masuda et al. | |
| 8,352,467 B1 | 1/2013 | Guha | |
| 8,359,611 B2 | 1/2013 | Johnson et al. | |
| 8,370,352 B2 | 2/2013 | Lita et al. | |
| 8,374,405 B2 | 2/2013 | Lee et al. | |
| 8,379,074 B2 | 2/2013 | Currivan et al. | |
| 8,379,920 B2 | 2/2013 | Yang et al. | |
| 8,379,940 B2 | 2/2013 | Wechsler et al. | |
| 8,386,446 B1 | 2/2013 | Pasupathy et al. | |
| 8,503,800 B2 * | 8/2013 | Blonk et al. | 382/226 |
| 8,593,542 B2 * | 11/2013 | Steinberg et al. | 348/239 |
| 8,670,597 B2 * | 3/2014 | Petrou et al. | 382/116 |
| 8,682,097 B2 * | 3/2014 | Steinberg et al. | 382/275 |
| 2010/0172550 A1 * | 7/2010 | Gilley et al. | 382/118 |

OTHER PUBLICATIONS

Ronald Yager, titled "On Z-valuations using Zadeh's Z-numbers", International Journal of Intelligent Systems, vol. 27, Issue 3, pp. 259-278, Mar. 2012, Wiley Periodicals, Inc. The online version first published on Jan 20, 2012. No publisher's location mentioned.

* cited by examiner

And type hierarchy continues

Data, e.g., sparse units approximating low res. thumbnail

Data, e.g., sparse V units fed from thumbnail — Thumbnail pixel

Data, e.g., thumbnail wide pixels on V units

APPLICATION OF Z-WEBS AND Z-FACTORS TO ANALYTICS, SEARCH ENGINE, LEARNING, RECOGNITION, NATURAL LANGUAGE, AND OTHER UTILITIES

RELATED APPLICATIONS

This application claims the benefit of the following application, with the same inventors: The U.S. provisional application No. 61/701,789, filed Sep. 17, 2012, by Tadayon et. al, titled "Method and system for approximate Z-number evaluation based on categorical sets of probability distributions". The current application incorporates by reference all of the teachings of the provisional application, including all of its appendices and attachments. It also claims benefits of the earlier (provisional) application.

BACKGROUND OF THE INVENTION

There are a lot of research going on today, focusing on the search engine, analytics, Big Data processing, natural language processing, economy forecasting, dealing with reliability and certainty, medical diagnosis, pattern recognition, object recognition, biometrics, security analysis, risk analysis, fraud detection, satellite image analysis, machine generated data, machine learning, training samples, and the like.

For example, see the article by Technology Review, published by MIT, "Digging deeper in search web", Jan. 29, 2009, by Kate Greene, or search engine by GOOGLE®, MICROSOFT® (BINGO), or YAHOO®, or APPLE® SIRI, or WOLFRAM® ALPHA computational knowledge engine, or AMAZON engine, or FACEBOOK® engine, or ORACLE® database, or YANDEX® search engine in Russia, or PICASA® (GOOGLE®) web albums, or YOUTUBE® (GOOGLE®) engine, or ALIBABA (Chinese supplier connection), or SPLUNK® (for Big Data), or MICROSTRATEGY® (for business intelligence), or QUID (or KAGGLE, ZESTFINANCE, APIXIO, DATAMEER, BLUEKAI, GNIP, RETAILNEXT, or RECOMMIND) (for Big Data), or paper by Viola-Jones, Viola et al., at Conference on Computer Vision and Pattern Recognition, 2001, titled "Rapid object detection using a boosted cascade of simple features", from Mitsubishi and Compaq research labs, or paper by Alex Pentland et al., February 2000, at Computer, IEEE, titled "Face recognition for smart environments", or GOOGLE® official blog publication, May 16, 2012, titled "Introducing the knowledge graph: things, not strings", or the article by Technology Review, published by MIT, "The future of search", Jul. 16, 2007, by Kate Greene, or the article by Technology Review, published by MIT, "Microsoft searches for group advantage", Jan. 30, 2009, by Robert Lemos, or the article by Technology Review, published by MIT, "WOLFRAM ALPHA and GOOGLE face off", May 5, 2009, by David Talbot, or the paper by Devarakonda et al., at International Journal of Software Engineering (IJSE), Vol. 2, Issue 1, 2011, titled "Next generation search engines for information retrieval", or paper by Nair-Hinton, titled "Implicit mixtures of restricted Boltzmann machines", NIPS, pp. 1145-1152, 2009, or paper by Nair, V. and Hinton, G. E., titled "3-D Object recognition with deep belief nets", published in Advances in Neural Information Processing Systems 22, (Y. Bengio, D. Schuurmans, J. lafferty, C. K. I. Williams, and A. Culotta (Eds.)), pp 1339-1347.

One of such research and recent advances is done by Prof Lotfi Zadeh, of UC Berkeley, "the Father of Fuzzy Logic", who recently came up with the concept of Z-numbers, plus related topics and related technologies. In the following section, we discuss the Z-numbers, taught by the U.S. Pat. No. 8,311,973, by Zadeh (issued recently).

Z-Numbers:

This section about Z-numbers is obtained from the patent by Zadeh, namely, the U.S. Pat. No. 8,311,973, which addresses Z-numbers and its applications, as well as other concepts.

A Z-number is an ordered pair of fuzzy numbers, (A,B). For simplicity, in one embodiment, A and B are assumed to be trapezoidal fuzzy numbers. A Z-number is associated with a real-valued uncertain variable, X, with the first component, A, playing the role of a fuzzy restriction, R(X), on the values which X can take, written as X is A, where A is a fuzzy set. What should be noted is that, strictly speaking, the concept of a restriction has greater generality than the concept of a constraint. A probability distribution is a restriction but is not a constraint (see L. A. Zadeh, Calculus of fuzzy restrictions, In: L. A. Zadeh, K. S. Fu, K. Tanaka, and M. Shimura (Eds.), Fuzzy sets and Their Applications to Cognitive and Decision Processes, Academic Press, New York, 1975, pp. 1-39). A restriction may be viewed as a generalized constraint (see L. A. Zadeh, Generalized theory of uncertainty (GTU)—principal concepts and ideas, Computational Statistics & Data Analysis 51, (2006) 15-46). In this embodiment only, the terms restriction and constraint are used interchangeably.

The restriction $$R(X):X \text{ is } A,$$

is referred to as a possibilistic restriction (constraint), with A playing the role of the possibility distribution of X. More specifically, $$R(X):X \text{ is } A \rightarrow \text{Poss}(X=u)\mu_A(u)$$

where $\mu_A$ is the membership function of A, and u is a generic value of X. $\mu_A$ may be viewed as a constraint which is associated with R(X), meaning that $\mu_A(u)$ is the degree to which u satisfies the constraint.

When X is a random variable, the probability distribution of X plays the role of a probabilistic restriction on X. A probabilistic restriction is expressed as:

$$R(X):X \text{ isp } p$$

where p is the probability density function of X. In this case, $$R(X):X \text{ isp } p \rightarrow \text{Prob}(u \leq X \leq u+du) = p(u)du$$

Note. Generally, the term "restriction" applies to X is R. Occasionally, "restriction" applies to R. Context serves to disambiguate the meaning of "restriction."

The ordered triple (X,A,B) is referred to as a Z-valuation. A Z-valuation is equivalent to an assignment statement, X is (A,B). X is an uncertain variable if A is not a singleton. In a related way, uncertain computation is a system of computation in which the objects of computation are not values of variables but restrictions on values of variables. In this embodiment/section, unless stated to the contrary, X is assumed to be a random variable. For convenience, A is referred to as a value of X, with the understanding that, strictly speaking, A is not a value of X but a restriction on the values which X can take. The second component, B, is referred to as certainty. Certainty concept is related to other concepts, such as sureness, confidence, reliability, strength of belief, probability, possibility, etc. However, there are some differences between these concepts.

In one embodiment, when X is a random variable, certainty may be equated to probability. Informally, B may be interpreted as a response to the question: How sure are you that X is A? Typically, A and B are perception-based and are described in a natural language. Example: (about 45 minutes, usually.) A collection of Z-valuations is referred to as Z-information. It should be noted that much of everyday reasoning and decision-making is based, in effect, on Z-information. For purposes of computation, when A and B are described in a natural language, the meaning of A and B is precisiated (graduated) through association with membership functions, $\mu_A$ and $\mu_B$, respectively, FIG. 1.

The membership function of A, $\mu_A$, may be elicited by asking a succession of questions of the form: To what degree does the number, a, fit your perception of A? Example: To what degree does 50 minutes fit your perception of about 45 minutes? The same applies to B. The fuzzy set, A, may be interpreted as the possibility distribution of X. The concept of a Z-number may be generalized in various ways. In particular, X may be assumed to take values in $R^n$, in which case A is a Cartesian product of fuzzy numbers. Simple examples of Z-valuations are:

(anticipated budget deficit, close to 2 million dollars, very likely)
(population of Spain, about 45 million, quite sure)
(degree of Robert's honesty, very high, absolutely)
(degree of Robert's honesty, high, not sure)
(travel time by car from Berkeley to San Francisco, about 30 minutes, usually)
(price of oil in the near future, significantly over 100 dollars/barrel, very likely)

It is important to note that many propositions in a natural language are expressible as Z-valuations. Example: The proposition, p, p: Usually, it takes Robert about an hour to get home from work, is expressible as a Z-valuation:

(Robert's travel time from office to home, about one hour, usually)

If X is a random variable, then X is A represents a fuzzy event in R, the real line. The probability of this event, p, may be expressed as (see L. A. Zadeh, Probability measures of fuzzy events, Journal of Mathematical Analysis and Applications 23 (2), (1968) 421-427.):

$$p = \int_R \mu_A(u) p_X(u) du,$$

where $p_X$ is the underlying (hidden) probability density of X. In effect, the Z-valuation (X,A,B) may be viewed as a restriction (generalized constraint) on X defined by:

Prob(X is A) is B.

What should be underscored is that in a Z-number, (A,B), the underlying probability distribution, $p_X$, is not known. What is known is a restriction on $p_X$ which may be expressed as:

$$\int_R \mu_A(u) p_X(u) du \text{ is } B$$

Note: In this embodiment only, the term "probability distribution" is not used in its strict technical sense.

In effect, a Z-number may be viewed as a summary of $p_X$. It is important to note that in everyday decision-making, most decisions are based on summaries of information. Viewing a Z-number as a summary is consistent with this reality. In applications to decision analysis, a basic problem which arises relates to ranking of Z-numbers. Example: Is (approximately 100, likely) greater than (approximately 90, very likely)? Is this a meaningful question? We are going to address these questions below.

An immediate consequence of the relation between $p_X$ and B is the following. If Z=(A,B) then Z'=(A',1−B), where A' is the complement of A and Z' plays the role of the complement of Z. 1−B is the antonym of B (see, e.g., E. Trillas, C. Moraga, S. Guadarrama, S. Cubillo and E. Castiñeira, Computing with Antonyms, In: M. Nikravesh, J. Kacprzyk and L. A. Zadeh (Eds.), Forging New Frontiers: Fuzzy Pioneers I, Studies in Fuzziness and Soft Computing Vol 217, Springer-Verlag, Berlin Heidelberg 2007, pp. 133-153.).

An important qualitative attribute of a Z-number is informativeness. Generally, but not always, a Z-number is informative if its value has high specificity, that is, is tightly constrained (see, for example, R. R. Yager, On measures of specificity, In: O. Kaynak, L. A. Zadeh, B. Turksen, I. J. Rudas (Eds.), Computational Intelligence: Soft Computing and Fuzzy-Neuro Integration with Applications, Springer-Verlag, Berlin, 1998, pp. 94-113.), and its certainty is high. Informativeness is a desideratum when a Z-number is a basis for a decision. It is important to know that if the informativeness of a Z-number is sufficient to serve as a basis for an intelligent decision.

The concept of a Z-number is after the concept of a fuzzy granule (see, for example, L. A. Zadeh, Fuzzy sets and information granularity, In: M. Gupta, R. Ragade, R. Yager (Eds.), Advances in Fuzzy Set Theory and Applications, North-Holland Publishing Co., Amsterdam, 1979, pp. 3-18. Also, see L. A. Zadeh, Possibility theory and soft data analysis, In: L. Cobb, R. M. Thrall (Eds.), Mathematical Frontiers of the Social and Policy Sciences, Westview Press, Boulder, Colo., 1981, pp. 69-129. Also, see L. A. Zadeh, Generalized theory of uncertainty (GTU)—principal concepts and ideas, Computational Statistics & Data Analysis 51, (2006) 15-46.). It should be noted that the concept of a Z-number is much more general than the concept of confidence interval in probability theory. There are some links between the concept of a Z-number, the concept of a fuzzy random number and the concept of a fuzzy random variable (see, e.g., J. J. Buckley, J. J. Leonard, Chapter 4: Random fuzzy numbers and vectors, In: Monte Carlo Methods in Fuzzy Optimization, Studies in Fuzziness and Soft Computing 222, Springer-Verlag, Heidelberg, Germany, 2008. Also, see A. Kaufman, M. M. Gupta, Introduction to Fuzzy Arithmetic: Theory and Applications, Van Nostrand Reinhold Company, New York, 1985. Also, see C. V. Negoita, D. A. Ralescu, Applications of Fuzzy Sets to Systems Analysis, Wiley, New York, 1975.).

A concept which is closely related to the concept of a Z-number is the concept of a $Z^+$-number. Basically, a $Z^+$-number, Z is a combination of a fuzzy number, A, and a random number, R, written as an ordered pair $Z^+=(A,R)$. In this pair, A plays the same role as it does in a Z-number, and R is the probability distribution of a random number. Equivalently, R may be viewed as the underlying probability distribution of X in the Z-valuation (X,A,B). Alternatively, a $Z^+$-number may be expressed as $(A,p_X)$ or $(\mu_A,p_X)$, where $\mu_A$ is the membership function of A. A $Z^+$-valuation is expressed as $(X,A,p_X)$ or, equivalently, as $(X,\mu_A,p_X)$, where $p_X$ is the probability distribution (density) of X. A $Z^+$-number is associated with what is referred to as a bimodal distribution, that is, a distribution which combines the possibility and probability distributions of X. Informally, these distributions are compatible if the centroids of $\mu_A$ and $p_X$ are coincident, that is, $$\int_R u \cdot p_X(u) \cdot du = \frac{\int_R u \cdot \mu_A(u) \cdot du}{\int_R \mu_A(u) \cdot du}$$

The scalar product of $\mu_A$ and $p_X$, $\mu_A \cdot p_X$, is the probability measure, $P_A$, of A. More concretely, $$\mu_A \cdot p_X = P_A = \int_R \mu_A(u) p_X(u) du$$

It is this relation that links the concept of a Z-number to that of a $Z^+$-number. More concretely, $Z(A,B)=Z^+(A,\mu_A \cdot p_X \text{ is } B)$ What should be underscored is that in the case of a Z-number what is known is not $p_X$ but a restriction on $p_X$ expressed as: $\mu L_A \cdot p_X$ is B. By definition, a $Z^+$-number carries more information than a Z-number. This is the reason why it is labeled a $Z^+$-number. Computation with $Z^+$-numbers is a portal to computation with Z-numbers.

The concept of a bimodal distribution is of interest in its own right. Let X be a real-valued variable taking values in U. For our purposes, it is convenient to assume that U is a finite set, $U=\{u_1, \ldots, u_n\}$. We can associate with X a possibility distribution, $\mu$, and a probability distribution, p, expressed as:

$\mu = \mu_1/u_1 + \ldots + \mu_n/u_n$ $p = p_1 \backslash u_1 + \ldots + p_n \backslash u_n$ in which $\mu_i/u_i$ means that $\mu_i$, $i=1, \ldots n$, is the possibility that $X=u_i$. Similarly, $p_i \backslash u_i$ means that $p_i$ is the probability that $X=u_i$.

The possibility distribution, $\mu$, may be combined with the probability distribution, p, through what is referred to as confluence. More concretely, $\mu:p=(\mu_1,p_1)/u_1+\ldots+(\mu_n,p_n)/u_n$ As was noted earlier, the scalar product, expressed as $\mu \cdot p$, is the probability measure of A. In terms of the bimodal distribution, the $Z^+$-valuation and the Z-valuation associated with X may be expressed as:

$(X,A,p_X)$ $(X,A,B), \mu_A \cdot p_X \text{ is } B$, respectively, with the understanding that B is a possibilistic restriction on $\mu_A \cdot p_X$.

Both Z and $Z^+$ may be viewed as restrictions on the values which X may take, written as: X is Z and X is $Z^+$, respectively. Viewing Z and $Z^+$ as restrictions on X adds important concepts to representation of information and characterization of dependencies. In this connection, what should be noted is that the concept of a fuzzy if-then rule plays a pivotal role in most applications of fuzzy logic. What follows is a very brief discussion of what are referred to as Z-rules—if-then rules in which the antecedents and/or consequents involve Z-numbers or $Z^+$-numbers.

A basic fuzzy if-then rule may be expressed as: if X is A then Y is B, where A and B are fuzzy numbers. The meaning of such a rule is defined as:

if X is A then Y is B $\rightarrow$ (X,Y) is A×B where A×B is the Cartesian product of A and B. It is convenient to express a generalization of the basic if-then rule to Z-numbers in terms of Z-valuations. More concretely, if $(X,A_X,B_X)$ then $(Y,A_Y,B_Y)$ Examples if (anticipated budget deficit, about two million dollars, very likely) then (reduction in staff, about ten percent, very likely)

if (degree of Robert's honesty, high, not sure) then (offer a position, not, sure)

if (X, small) then (Y, large, usually.)

An important question relates to the meaning of Z-rules and $Z^+$-rules. The meaning of a $Z^+$-rule may be expressed as:

if $(X,A_X,p_X)$ then $(Y,A_Y,p_Y) \rightarrow (X,Y)$ is $(A_X \times A_Y, p_X p_Y)$ where $A_X \times A_Y$ is the Cartesian product $A_X$ and $A_Y$ Z-rules have the important applications in decision analysis and modeling of complex systems, especially in the realm of economics (for example, stock market and specific stocks) and medicine (e.g. diagnosis and analysis).

A problem which plays a key role in many applications of fuzzy logic, especially in the realm of fuzzy control, is that of interpolation. More concretely, the problem of interpolation may be formulated as follows. Consider a collection of fuzzy if-then rules of the form:

if X is $A_i$ then Y is $B_i$, $i=1, \ldots, n$ where the $A_i$ and $B_i$ are fuzzy sets with specified membership functions. If X is A, where A is not one of the $A_i$, then what is the restriction on Y?

The problem of interpolation may be generalized in various ways. A generalization to Z-numbers may be described as follows. Consider a collection Z-rules of the form:

if X is $A_i$ then usually(Y is $B_i$), $i=1, \ldots, n$ where the $A_i$ and $B_i$ are fuzzy sets. Let A be a fuzzy set which is not one of the A. What is the restriction on Y expressed as a Z-number? An answer to this question would add a useful formalism to the analysis of complex systems and decision processes.

Representation of Z-numbers can be facilitated through the use of what is called a Z-mouse. Basically, a Z-mouse is a visual means of entry and retrieval of fuzzy data.

The cursor of a Z-mouse is a circular fuzzy mark, called an f-mark, with a trapezoidal distribution of light intensity. This distribution is interpreted as a trapezoidal membership function of a fuzzy set. The parameters of the trapezoid are controlled by the user. A fuzzy number such as "approximately 3" is represented as an f-mark on a scale, with 3 being the centroid of the f-mark (FIG. 2a). The size of the f-mark is a measure of the user's uncertainty about the value of the number. As was noted already, the Z-mouse interprets an f-mark as the membership function of a trapezoidal fuzzy set. This membership function serves as an object of computation. A Z-mouse can be used to draw curves and plot functions.

A key idea which underlies the concept of a Z-mouse is that visual interpretation of uncertainty is much more natural than its description in natural language or as a membership function of a fuzzy set. This idea is closely related to the remarkable human capability to precisiate (graduate) perceptions, that is, to associate perceptions with degrees. As an illustration, if I am asked "What is the probability that Obama will be reelected?" I would find it easy to put an f-mark on a scale from 0 to 1. Similarly, I could put an f-mark on a scale from 0 to 1 if I were asked to indicate the degree to which I like my job. It is of interest to note that a Z-mouse could be used as an informative means of polling, making it possible to indicate one's strength of feeling about an issue. Conventional polling techniques do not assess strength of feeling.

Using a Z-mouse, a Z-number is represented as two f-marks on two different scales (FIG. 2b). The trapezoidal fuzzy sets which are associated with the f-marks serve as objects of computation.

Computation with Z-Numbers:

What is meant by computation with Z-numbers? Here is a simple example. Suppose that I intend to drive from Berkeley to San Jose via Palo Alto. The perception-based information which I have may be expressed as Z-valuations: (travel time from Berkeley to Palo Alto, about an hour, usually) and (travel time from Palo Alto to San Jose, about twenty-five minutes, usually.) How long will it take me to drive from Berkeley to San Jose? In this case, we are dealing with the sum of two Z-numbers (about an hour, usually) and (about twenty-five minutes, usually.) Another example: What is the square root of (A,B)? Computation with Z-numbers falls within the province of Computing with Words (CW or CWW). Example: What is the square root of a Z-number?

Computation with $Z^+$-numbers is much simpler than computation with Z-numbers. Assume that * is a binary operation whose operands are $Z^+$-numbers, $Z^+_X=(A_X,R_X)$ and $Z^+_Y=(A_Y,R_Y)$. By definition, $$Z^+_X * Z^+_Y = (A_X * A_Y, R_X * R_Y)$$

with the understanding that the meaning of * in $R_X * R_Y$ is not the same as the meaning of * in $A_X * A_Y$. In this expression, the operands of * in $A_X * A_Y$ are fuzzy numbers; the operands of * in $R_X * R_Y$ are probability distributions.

Example: Assume that * is sum. In this case, $A_X + A_Y$ is defined by:

$$\mu_{(A_X + A_Y)}(v) = sup_u(\mu_{A_X}(u) \wedge \mu_{A_Y}(v-u)), \wedge = \min$$

Similarly, assuming that $R_X$ and $R_Y$ are independent, the probability density function of $R_X * R_Y$ is the convolution, O, of the probability density functions of $R_X$ and $R_Y$. Denoting these probability density functions as $p_{R_X}$ and $p_{R_Y}$, respectively, we have:

$$p_{R_X + R_Y}(v) = \int_R p_{R_X}(u) p_{R_Y}(v-u) du$$

Thus, $$Z^+_X + Z^+_Y = (A_X + A_Y, p_{R_X} o p_{R_Y})$$

It should be noted that the assumption that $R_X$ and $R_Y$ are independent implies worst case analysis.

More generally, to compute $Z_X * Z_Y$ what is needed is the extension principle of fuzzy logic (see, e.g., L. A. Zadeh, Probability measures of fuzzy events, Journal of Mathematical Analysis and Applications 23 (2), (1968) 421-427.). Basically, the extension principle is a rule for evaluating a function when what are known are not the values of arguments but restrictions on the values of arguments. In other words, the rule involves evaluation of the value of a function under less than complete information about the values of arguments.

Note. Originally, the term "extension principle" was employed to describe a rule which serves to extend the domain of definition of a function from numbers to fuzzy numbers. In this disclosure, the term "extension principle" has a more general meaning which is stated in terms of restrictions. What should be noted is that, more generally, incompleteness of information about the values of arguments applies also to incompleteness of information about functions, in particular, about functions which are described as collections of if-then rules.

There are many versions of the extension principle. A basic version was given in the article: (L. A. Zadeh, Fuzzy sets, Information and Control 8, (1965) 338-353.). In this version, the extension principle may be described as:

$$Y = f(X)$$

$$\frac{R(X): \ X \text{ is } A \ (\text{constraint on u is } \mu_A(u))}{R(Y): \ \mu_Y(v) = sup_u \mu_A(u) \ (f(A) = R(Y))}$$

subject to $$v = f(u)$$

where A is a fuzzy set, $\mu_A$ is the membership function of A, $\mu_Y$ is the membership function of Y, and u and v are generic values of X and Y, respectively.

A discrete version of this rule is:

$$Y = f(X)$$

$$\frac{R(X): \ X \text{ is } (\mu_1/u_1 + \ldots + \mu_n/u_n)}{R(Y): \ \mu_Y(v) = sup_{u_1, \ldots, u_n} \mu_i}$$

subject to $$v = f(u_i)$$

In a more general version, we have $$Y = f(X)$$

$$\frac{R(X): \ g(X) \text{ is } A \ (\text{constraint on u is } \mu_A(g(u)))}{R(Y): \ \mu_Y(v) = sup_u \mu_A(g(u))}$$

subject to $$v = f(u)$$

For a function with two arguments, the extension principle reads:

$$Z = f(X, Y)$$

$$R(X): \ g(X) \text{ is } A \ (\text{constraint on u is } \mu_A(g(u)))$$

$$\frac{R(Y): \ h(Y) \text{ is } B \ (\text{constraint on u is } \mu_B(h(u)))}{R(Z): \ \mu_Z(w) = sup_{u,v}(\mu_X(g(u)) \wedge \mu_Y(h(v))),}$$

Wherein: $\wedge = \min$ subject to $$w = f(u, v)$$

In application to probabilistic restrictions, the extension principle leads to results which coincide with standard results which relate to functions of probability distributions. Specifically, for discrete probability distributions, we have:

$$Y = f(X)$$

$$\frac{R(X): \ X \ isp \ p, \ p = p_1 \backslash u_1 + \ldots \ p_n \backslash u_n}{R(Y): \ p_Y(v) = \Sigma_i p_i \ (f(p) = R(Y))}$$

subject to $$v = f(u_i)$$

For functions with two arguments, we have:

$$Z = f(X, Y)$$

$$R(X): X \ isp \ p, \ p = p_1 \backslash u_1 + \ldots \ p_m \backslash u_m$$

$$\frac{R(Y): Y \ isp \ q, \ q = q_1 \backslash v_1 + \ldots \ q_n \backslash v_n}{R(Z): p_Z(w) = \Sigma_{i,j} p_i q_i \ (f(p,q) = R(Z))}$$

subject to $$w = f(u_i, v_j)$$

For the case where the restrictions are $Z^+$-numbers, the extension principle reads:

$$Z = f(X, Y)$$

$$\frac{R(X): \ X \ is \ (A_X, p_X)}{R(Y): \ Y \ is \ (A_Y, p_Y)}$$
$$\overline{R(Z): \ Z \ is \ (f(A_X, A_Y), f(p_X, p_Y))}$$

It is this version of the extension principle that is the basis for computation with Z-numbers. Now, one may want to know if $f(p_X, p_Y)$ is compatible with $f(A_X, A_Y)$.

Turning to computation with Z-numbers, assume for simplicity that *=sum. Assume that $Z_X = (A_X, B_X)$ and $Z_Y = (A_Y, B_Y)$. Our problem is to compute the sum $Z = X + Y$. Assume that the associated Z-valuations are $(X, A_X, B_X)$, $(Y, A_Y, B_Y)$ and $(Z, A_Z, B_Z)$.

The first step involves computation of $p_Z$. To begin with, let us assume that $p_X$ and $p_Y$ are known, and let us proceed as we did in computing the sum of $Z^+$-numbers. Then $$p_Z = p_X \circ p_Y$$

or more concretely, $$p_Z(v) = \int_R p_X(u) \, p_Y(v-u) du$$

In the case of Z-numbers what we know are not $p_X$ and $p_Y$ but restrictions on $p_X$ and $p_Y$ $$\int_R \mu_{A_X}(u) \, p_X(u) du \text{ is } B_X$$

$$\int_R \mu_{A_Y}(u) \, p_Y(u) du \text{ is } B_Y$$

In terms of the membership functions of $B_X$ and $B_Y$, these restrictions may be expressed as:

$$\mu_{B_X}\left(\int_R \mu_{A_X}(u) \, p_X(u) du\right)$$

$$\mu_{B_Y}\left(\int_R \mu_{A_Y}(u) \, p_Y(u) du\right)$$

Additional restrictions on $p_X$ and $p_Y$ are:

$$\int_R p_X(u) du = 1$$

$$\int_R p_Y(u) du = 1$$

$$\int_R u p_X(u) du = \frac{\int_R u \mu_{A_X}(u) du}{\int_R \mu_{A_X}(u) du} \quad \text{(compatibility)}$$

$$\int_R u p_Y(u) du = \frac{\int_R u \mu_{A_Y}(u) du}{\int_R \mu_{A_Y}(u) du} \quad \text{(compatibility)}$$

Applying the extension principle, the membership function of $p_Z$ may be expressed as:

$$\mu_{p_Z}(p_Z) = \sup_{p_X, p_Y} \left( \mu_{B_X}\left(\int_R \mu_{A_X}(u) p_X(u) du\right) \wedge \mu_{B_Y}\left(\int_R \mu_{A_Y}(u) p_Y(u) du\right) \right)$$

subject to $$p_Z = p_X \circ p_Y$$

$$\int_R p_X(u) du = 1$$

$$\int_R p_Y(u) du = 1$$

$$\int_R u p_X(u) du = \frac{\int_R u \mu_{A_X}(u) du}{\int_R \mu_{A_X}(u) du}$$

$$\int_R u p_Y(u) du = \frac{\int_R u \mu_{A_Y}(u) du}{\int_R \mu_{A_Y}(u) du}$$

In this case, the combined restriction on the arguments is expressed as a conjunction of their restrictions, with $\wedge$ interpreted as min. In effect, application of the extension principle reduces computation of $p_Z$ to a problem in functional optimization. What is important to note is that the solution is not a value of $p_Z$ but a restriction on the values of $p_Z$, consistent with the restrictions on $p_X$ and $p_Y$.

At this point it is helpful to pause and summarize where we stand. Proceeding as if we are dealing with $Z^+$-numbers, we arrive at an expression for $p_Z$ as a function of $p_X$ and $p_Y$. Using this expression and applying the extension principle we can compute the restriction on $p_Z$ which is induced by the restrictions on $p_X$ and $p_Y$. The allowed values of $p_Z$ consist of those values of $p_Z$ which are consistent with the given information, with the understanding that consistency is a matter of degree.

The second step involves computation of the probability of the fuzzy event, Z is $A_Z$, given $p_Z$. As was noted earlier, in fuzzy logic the probability measure of the fuzzy event X is A, where A is a fuzzy set and X is a random variable with probability density $p_X$, is defined as:

$$\int_R \mu_A(u) p_X(u) du$$

Using this expression, the probability measure of $A_Z$ may be expressed as:

$$B_Z = \int_R \mu_{A_Z}(u) p_z(u) du,$$

where $$\mu_{A_Z}(u) = \sup_v(\mu_{A_X}(v) \wedge \mu_{A_Y}(u - v))$$

It should be noted that $B_Z$ is a number when $p_Z$ is a known probability density function. Since what we know about $p_Z$ is its possibility distribution, $\mu_{p_Z}(p_Z)$, $B_Z$ is a fuzzy set with membership function $\mu_{B_Z}$. Applying the extension principle, we arrive at an expression for $\mu_{B_Z}$. More specifically, $$\mu_{B_Z}(w) = \sup_{p_Z} \mu_{p_Z}(p_Z)$$

subject to $$w = \int_R \mu_{A_Z}(u) p_Z(u) du$$

where $\mu_{p_Z}(p_Z)$ is the result of the first step. In principle, this completes computation of the sum of Z-numbers, $Z_X$ and $Z_Y$.

In a similar way, we can compute various functions of Z-numbers. The basic idea which underlies these computations may be summarized as follows. Suppose that our problem is that of computing $f(Z_X, Z_Y)$, where $Z_X$ and $Z_Y$ are Z-numbers, $Z_X = (A_X, B_X)$ and $Z_Y = (A_Y, B_Y)$, respectively, and $f(Z_X, Z_Y) = (A_Z, B_Z)$. We begin by assuming that the underlying probability distributions $p_X$ and $p_Y$ are known. This assumption reduces the computation of $f(Z_X, Z_Y)$ to computation of $f(Z_X^+, Z_Y^+)$, which can be carried out through the use of the version of the extension principle which applies to restrictions which are $Z^+$-numbers. At this point, we recognize that what we know are not $p_X$ and $p_Y$ but restrictions on $p_X$ and $p_Y$. Applying the version of the extension principle which relates to probabilistic restrictions, we are led to $f(Z_X, Z_Y)$. We can compute the restriction, $B_Z$, of the scalar product of $f(A_X, A_Y)$ and $f(p_X, p_Y)$. Since $A_Z = f(A_X, A_Y)$, computation of $B_Z$ completes the computation of $f(Z_X, Z_Y)$.

It is helpful to express the summary as a version of the extension principle. More concretely, we can write:

$$Z = f(X, Y)$$
$$X \text{ is } (A_X, B_X) \text{ (restriction on } X)$$
$$Y \text{ is } (A_Y, B_Y) \text{ (restriction on } Y)$$
$$\underline{Z \text{ is } (A_Z, B_Z) \text{ (induced restriction on } Z)}$$
$$A_Z = f(A_X, A_Y) \text{ (application of}$$
$$\text{extension principle for fuzzy numbers)}$$
$$B_Z = \mu_{A_Z} \cdot f(p_X, p_Y)$$

where $p_X$ and $p_Y$ are constrained by:

$$\int_R \mu_{A_X}(u) p_X(u) du \text{ is } B_X$$

$$\int_R \mu_{A_Y}(u) p_Y(u) du \text{ is } B_Y$$

In terms of the membership functions of $B_X$ and $B_Y$, these restrictions may be expressed as:

$$\mu_{B_X}\left(\int_R \mu_{A_X}(u) p_X(u) du\right)$$

$$\mu_{B_Y}\left(\int_R \mu_{A_Y}(u) p_Y(u) du\right)$$

Additional restrictions on $p_X$ and $p_Y$ are:

$$\int_R p_X(u) du = 1$$

$$\int_R p_Y(u) du = 1$$

$$\int_R u p_X(u) du = \frac{\int_R u \mu_{A_X}(u) du}{\int_R \mu_{A_X}(u) du} \text{ (compatibility)}$$

$$\int_R u p_Y(u) du = \frac{\int_R u \mu_{A_Y}(u) du}{\int_R \mu_{A_Y}(u) du} \text{ (compatibility)}$$

Consequently, in agreement with earlier results we can write:

$$\mu_{p_Z}(p_Z) =$$
$$\sup_{p_X, p_Y}\left(\mu_{B_X}\left(\int_R \mu_{A_X}(u) p_X(u) du\right) \wedge \mu_{B_Y}\left(\int_R \mu_{A_Y}(u) p_Y(u) du\right)\right)$$

subject to $$p_Z = p_X \circ p_Y$$

$$\int_R p_X(u) du = 1$$

$$\int_R p_Y(u) du = 1$$

$$\int_R u p_X(u) du = \frac{\int_R u \mu_{A_X}(u) du}{\int_R \mu_{A_X}(u) du}$$

$$\int_R u p_Y(u) du = \frac{\int_R u \mu_{A_Y}(u) du}{\int_R \mu_{A_Y}(u) du}$$

What is important to keep in mind is that A and B are, for the most part, perception-based and hence intrinsically imprecise. Imprecision of A and B may be exploited by making simplifying assumptions about A and B—assumptions that are aimed at reduction of complexity of computation with Z-numbers and increasing the informativeness of results of computation. Two examples of such assumptions are sketched in the following.

Briefly, a realistic simplifying assumption is that $p_X$ and $p_Y$ are parametric distributions, in particular, Gaussian distributions with parameters $m_X$, $\sigma_X^2$ and $m_Y$, $\sigma_Y^2$, respectively. Compatibility conditions fix the values of $m_X$ and $m_Y$. Consequently, if $b_X$ and $b_Y$ are numerical measures of certainty, then $b_X$ and $b_Y$ determine $p_X$ and $p_Y$, respectively. Thus, the assumption that we know $b_X$ and $b_Y$ is equivalent to the assumption that we know $p_X$ and $p_Y$. Employing the rules governing computation of functions of $Z^+$-numbers, we can compute $B_Z$ as a function of $b_X$ and by. At this point, we recognize that $B_X$ and $B_Y$ are restrictions on $b_X$ and by, respectively. Employment of a general version of the extension principle leads to $B_Z$ and completes the process of computation. This may well be a very effective way of computing with Z-numbers. It should be noted that a Gaussian distribution may be viewed as a very special version of a Z-number.

Another effective way of exploiting the imprecision of A and B involves approximation of the trapezoidal membership function of A by an interval-valued membership function, $A^b$, where $A^b$ is the bandwidth of A (FIG. 3). Since A is a crisp set, we can write:

$$(A_X^b, B_X)*(A_Y^b, B_Y) = (A_X^b * A_Y^b, B_X \times B_Y)$$

where $B_X \times B_Y$ is the product of the fuzzy numbers $B_X$ and $B_Y$. Validity of this expression depends on how well an interval-valued membership function approximates to a trapezoidal membership function.

Clearly, the issue of reliability of information is of pivotal importance in planning, decision-making, formulation of algorithms and management of information. There are many important directions which are explored, especially in the realm of calculi of Z-rules and their application to decision analysis and modeling of complex systems.

Computation with Z-numbers may be viewed as a generalization of computation with numbers, intervals, fuzzy numbers and random numbers. More concretely, the levels of generality are: computation with numbers (ground level 1); computation with intervals (level 1); computation with fuzzy numbers (level 2); computation with random numbers (level 2); and computation with Z-numbers (level 3). The higher the level of generality, the greater is the capability to construct realistic models of real-world systems, especially in the realms of economics, decision analysis, risk assessment, planning, analysis of causality and biomedicine.

It should be noted that many numbers, especially in fields such as economics and decision analysis are in reality Z-numbers, but they are not currently treated as such. Basically, the concept of a Z-number is a step toward formalization of the remarkable human capability to make rational decisions in an environment of imprecision and uncertainty.

Now, in the next section, we discuss our inventions and embodiments, extending the concepts above, as well as other applications and examples, incorporating various other technologies, including new concepts, methods, systems, devices, processes, and technologies.

SUMMARY OF THE INVENTION

Here, we introduce Z-webs, including Z-factors and Z-nodes, for the understanding of relationships between objects, subjects, abstract ideas, concepts, or the like, including face, car, images, people, emotions, mood, text, natural language, voice, music, video, locations, formulas, facts, historical data, landmarks, personalities, ownership, family, friends, love, happiness, social behavior, voting behavior, and the like, to be used for many applications in our life, including on the search engine, analytics, Big Data processing, natural language processing, economy forecasting, face recognition, dealing with reliability and certainty, medical diagnosis, pattern recognition, object recognition, biometrics, security analysis, risk analysis, fraud detection, satellite image analysis, machine generated data analysis, machine learning, training samples, extracting data or patterns (from the video, images, text, or music, and the like), editing video or images, and the like. Z-factors include reliability factor, confidence factor, expertise factor, bias factor, truth factor, trust factor, validity factor, "trustworthiness of speaker", "sureness of speaker", "statement helpfulness", "expertise of speaker", "speaker's truthfulness", "perception of speaker (or source of information)", "apparent confidence of speaker", "broadness of statement", and the like, which is associated with each Z-node in the Z-web.

DETAILED DESCRIPTION OF THE EMBODIMENTS

Figure 1:
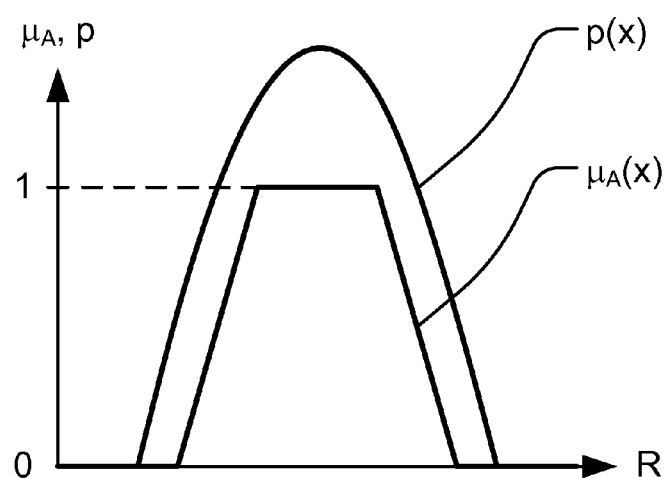
FIG. 1 shows a membership function and the probability density function of X, as an example.

Now, we discuss the various embodiments of our current invention:

Approximate Z-Number Evaluation:

In this section, we present a method for approximate evaluation of Z-Numbers, using category sets of probability distributions corresponding to similar certainty measures. All the figures are displayed in Appendix 1, as color images. This is also (partially) the subject of a paper (pages 476-483 of the conf. proceedings) and presentation given at an international Fuzzy conf. in Baku, Azerbaijan, on Dec. 3-5, 2012 ("The $2^{nd}$ World Conference on Soft Computing"), by the inventors. Appendix 1 is a copy of the paper at the Baku Conf. Appendix 3 is a copy of the VU graph PowerPoint presentation at the Baku Conf. Appendix 2 is a copy of the handwritten notes, in addition to the teachings of Appendices 1 and 3. All the Appendices 1-3 are the teachings of the current inventors, in support of the current disclosure, and are incorporated herein.

A Z-Number is denoted as an ordered pair (A,B), where A and B are fuzzy numbers (typically perception-based and described in natural language), in order to describe the level of certainty or reliability of a fuzzy restriction of a real-valued uncertain variable X in Z-valuation (X,A,B). (See L. A. Zadeh, "A note on Z-numbers," Inform. Sciences, vol 181, pp. 2923-2932, March 2011.) For example, the proposition "the price of ticket is usually high", may be expressed as a Z-valuation (price or ticket, high, usually). In Z-valuation, the certainty component B describes the reliability of the possibilistic restriction, R, for the random variable X, where $$R(X): X \text{ is } A \qquad (1)$$

with the reliability restriction given by $$\text{Prob}(X \text{ is } A) \text{ is } B \qquad (2)$$

In another words, the certainty component B, restricts the probability measure of A, denoted by v, $$v = \text{Prob}(X \text{ is } A) = \int_X \mu_A(x) \cdot p_x(x) \cdot dx \qquad (3)$$

where $\mu_A(x)$ is the membership function of x in fuzzy set A on X domain, and $p_X$ is the probability distribution of X. Therefore, the certainty component B indirectly restricts the possibilities of various (candidate) hidden probability distributions of X by: (eq. 4 below)

$$\mu_B(v) = \mu_B\left(\int_X \mu_A(x) \cdot p_x(x) \cdot dx\right),$$

where $\mu_B(v)$ is the membership function of the probability measure v in fuzzy set B.

Here, we show a method to approximate Z-valuation, based on categories (sets) of $p_X$'s with similar probability measures (or resulting in similar certainty measure), as an approach to reuse predetermined calculations of probability measures. First, we demonstrate an example of Z-valuation without such approach, and then, we present an approximate approach to Z-valuation via categorical sets of probability distributions.

A. Z-Valuation: Basics

The Z-valuation uses the mapping of the test scores given by (4) to each of hidden probability distribution candidates of X (See L. A. Zadeh, "A note on Z-numbers," Inform. Sciences, vol 181, pp. 2923-2932, March 2011. See also R. Yager, "On Z-valuations using Zadeh's Z-numbers," Int. J. Intell. Syst., Vol. 27, Issue 3, pp. 259-278, March 2012.), collectively referred to as Prob. Distrib. Candidates={$p_i$},  (5)

where i numerates different candidates. Fig. 1 of Appendix 1 conceptually illustrates the mapping, where each $p_i$ is first mapped to a probability measure of A, $v_i$, and then mapped to a test score determined by B, where $v_i = \mu_A \cdot p_i = \int_X \mu_A(x) \cdot p_i(x) \cdot dx,$  (6)

and $ts_i = \mu_B(v_i).$  (7)

Note that the dot symbol in ($\mu_A \cdot p_i$) in (6) is used as shorthand for the probability measure. Fig. 1 of Appendix 1 shows the test score mapping to hidden probability distribution candidates $p_i$ in X, for Z-valuation (X,A,B).

Figure 2A:
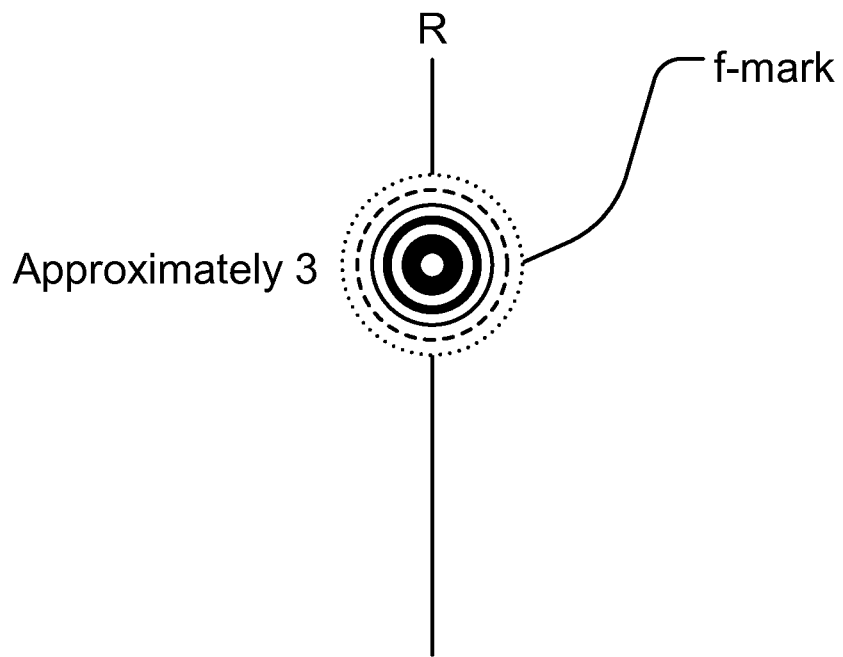
FIGS. 2a and 2b show various examples of f-mark.
Figure 2B:
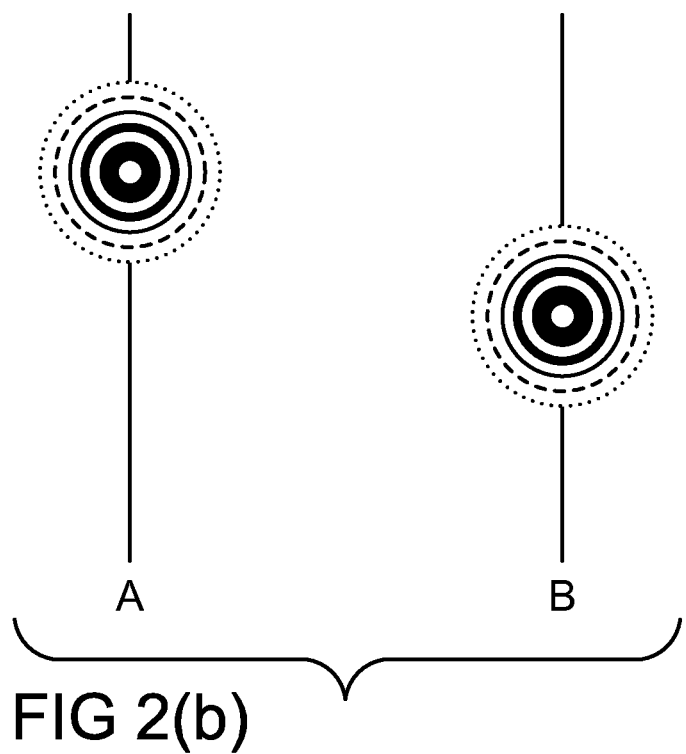

Via the extension principle, the application of the restriction (test scores) on $p_{x,i}(x)$ (i.e., probability distribution candidates in X domain) to other entities is illustrated. For example, the restriction on $p_{x,i}(x)$ can be extended to the possibilistic restriction on the corresponding probability distributions, $p_{y,i}(y)$, in Y domain, where $Y = f(X).$ In such a case, the restrictions can further be extended to the probability measures, $w_i$, of a fuzzy set $A_y$ in Y domain, based on $p_{y,i}(y)$. The aggregation of the best test scores for $w_i$ would determine the certainty component $B_Y$ in Z-valuation $(Y,A_Y,B_Y)$, based on the original Z-valuation $(X,A_X,B_X)$, as indicated in Fig. 2 of Appendix 1, which illustrates the extension of test scores to Y domain. Fig. 2 of Appendix 1 is a test score mapping from X domain to Y domain and aggregation of test scores on probability measures, w, for Z-valuation $(Y,A_Y,B_Y)$.

For simplicity, as shown in Fig. 2 of Appendix 1, three probability distribution candidates in X domain, $p_{x,1}$, $p_{x,2}$, and $p_{x,3}$, are assigned test scores $ts_1$ and $ts_2$, via certainty restriction on probability measures $v_1$ and $v_2$ (with $p_{x,2}$ and $p_{x,3}$ having the same probability measure $v_2$ for $A_X$). By applying f(X) to each probability distribution candidate in X domain, we can obtain a corresponding probability distribution in Y domain, denoted as $p_{y,i}$, which can be used to compute the corresponding probability measure of $A_Y$ (assume given), denoted as $w_i$. In this example, $p_{y,1}$ and $p_{y,2}$ (mapped from $p_{x,1}$ and $p_{x,2}$) result in the same probability measure $w_2$ (or aggregated w bin), while $p_{y,3}$ (mapped from $p_{x,3}$) maps into $w_1$. In this simple example, the aggregation of the best test scores for $p_{y,i}$, denoted as $ts(p_{y,i})$, in w domain (e.g., in each w bin) would result in the following membership function for $B_Y$:

$\mu_{B_Y}(w_1) = ts_2$ $\mu_{B_Y}(w_2) = \max(ts_1, ts_2).$

In other words, in this scenario, $\mu_{B_Y}(w) = \sup_{\forall p_{y,i}} ts(p_{y,i})$  (8)

subject to $w = \mu_{A_Y} \cdot p_{y,i}.$

In case of single variable dependency Y=f(X), the probability measure w can be evaluated by unpacking the probability distribution in Y as illustrated by (9) and transforming the integration over X domain as shown in (10), without explicitly evaluating $p_{y,i}$:

$$w_i = \mu_{A_Y} \cdot p_{y,i} \qquad (9)$$
$$= \int_Y \mu_{A_Y}(y) \cdot p_{y,i}(y) \cdot dy$$
$$= \int_Y \mu_{A_Y}(y) \cdot \sum_j \frac{p_{x,i}(x_j)}{|f'(x_j)|} \cdot dy$$

where j denotes the consecutive monotonic ranges of f(X) in X domain, and $x_j$ is the solution for $f^{-1}(y)$, if any, within the monotonic range j, for a given y. This takes into account that the probability ($p_{y,i} \cdot dy$) for an event within the infinitesimal interval of [y, y+dy] in Y domain, is the summation of the infinitesimal probabilities from various infinitesimal intervals [$x_j$, $x_j$+$dx_j$] (if applicable) in X domain, where for each j:

$dy = f'(x_j) \cdot dx_j$

Therefore, with repacking the integration (9) in X domain over the consecutive monotonic ranges of f(X), we obtain:

$w_i = \int_X \mu_{A_Y}(f(x)) \cdot p_{x,i}(x) \cdot dx$  (10)

Furthermore, if f(X) is monotonic (i.e., $f^{-1}(y)$ has only one solution in X, if any) AND $\mu_{A_Y}$ is obtained from $\mu_{A_X}$ via the extension principle by applying f(X) to $A_X$, then $w_i$ is guaranteed to be equal to $v_i$ for all candidate probability distributions $p_{x,i}$, because $\mu_{A_Y}(y) = \mu_{A_X}(x)$ for $\forall y = f(x)$ in such a case. This also means that in such a case, $B_Y$ becomes equal to $B_X$, and no additional computation would be necessary.

B. Z-Valuation: Example

To illustrate an example of Z-valuation, assume the following is given:

$X = (A_X, B_X),$ $Y = f(X) = (X+2)^2$, and $A_Y.$

Figure 3:
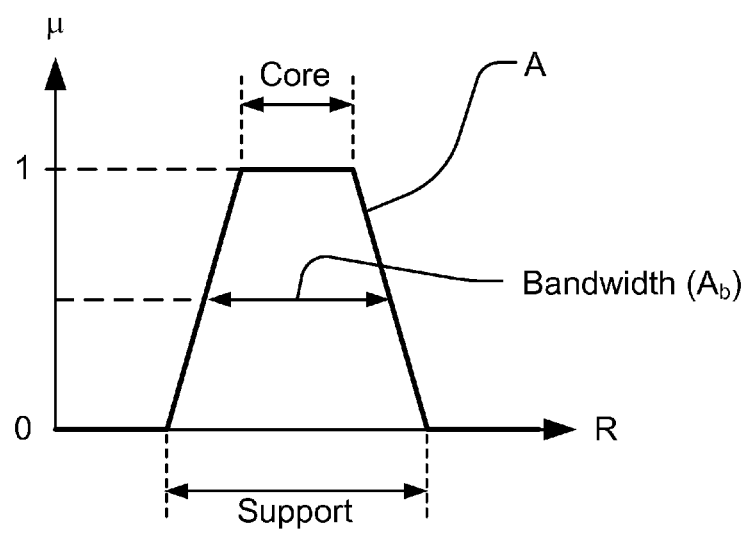
FIG. 3 shows the structure of a membership function, as an example.
Figure 4:
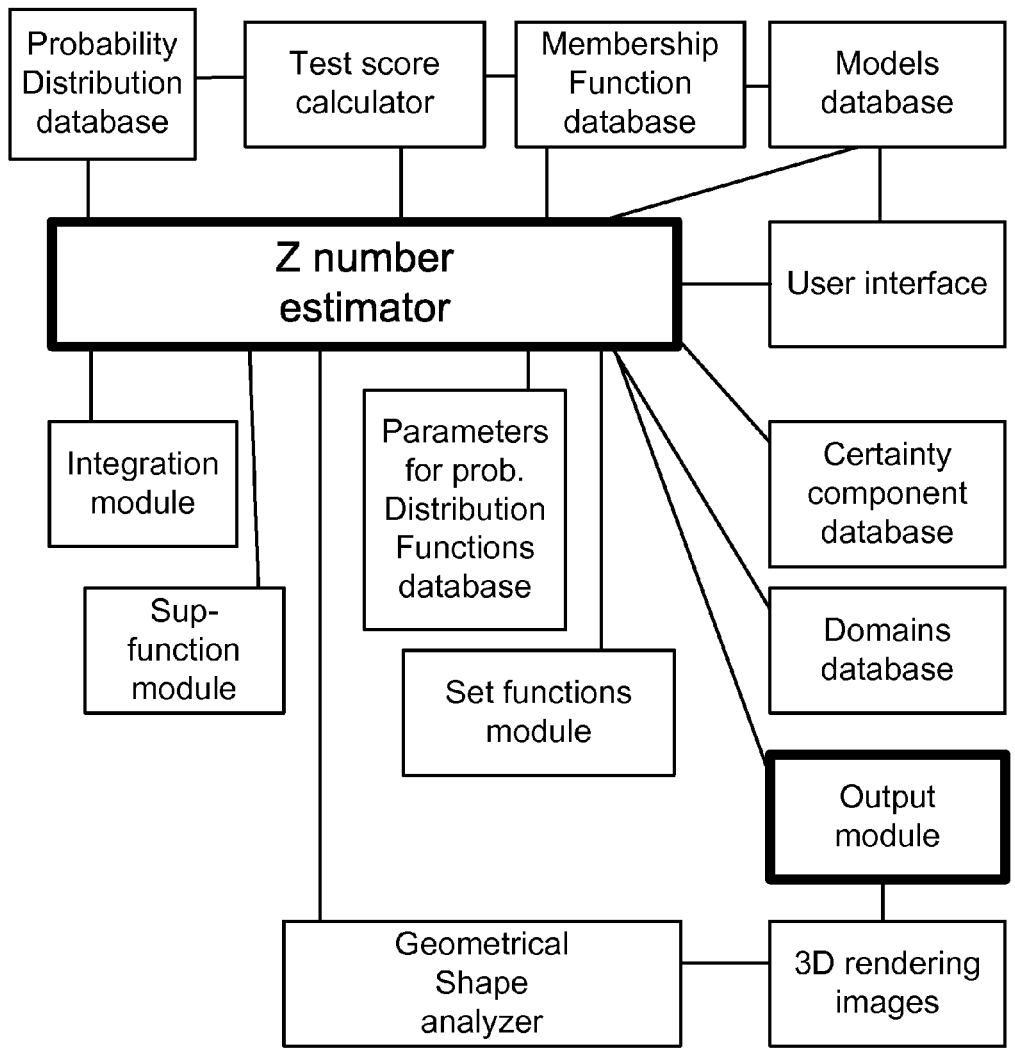
FIG. 4 shows one embodiment for the Z-number estimator or calculator device or system.
Figure 5:
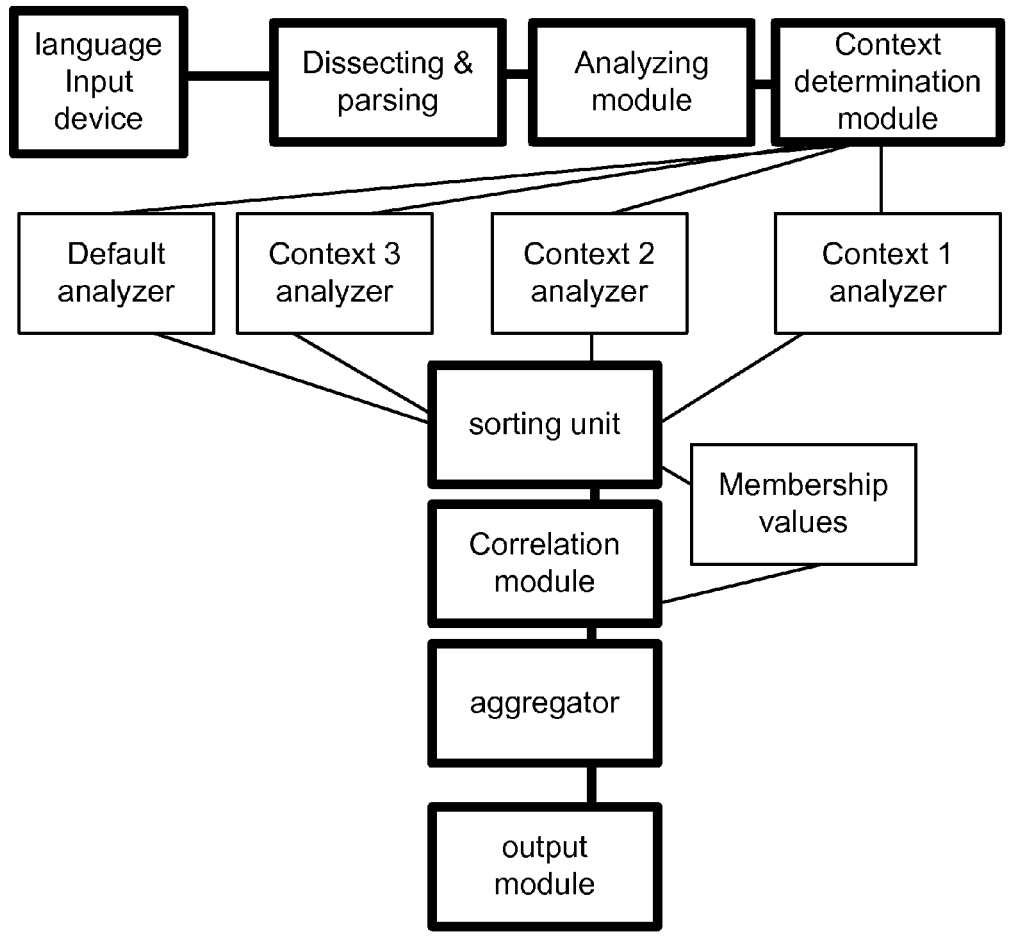
FIG. 5 shows one embodiment for context analyzer system.
Figure 6:
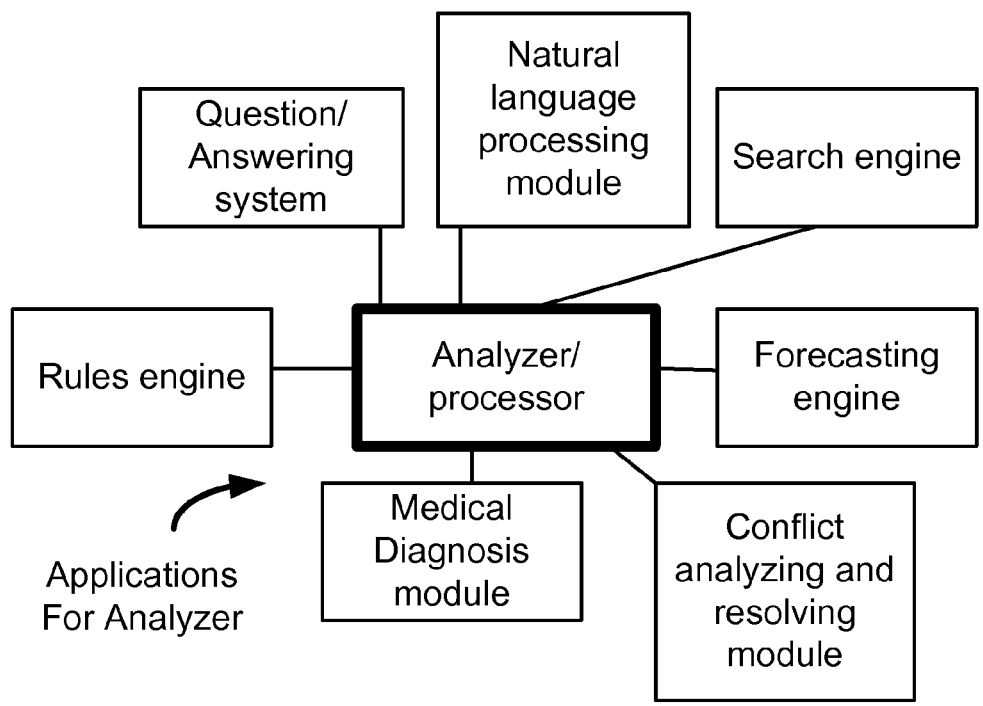
FIG. 6 shows one embodiment for analyzer system, with multiple applications.

The goal is to determine the certainty value $B_Y$ for the proposition that (Y is $A_Y$), i.e., the Z-valuation (Y, $A_Y$, $B_Y$). For purpose of this example, assume Figs. 3, 4, and 5 of Appendix 1 depict the membership functions for $A_X$, $B_X$, and $A_Y$, respectively. The function f(X) is also depicted in Fig. 6 of Appendix 1. Fig. 3 of Appendix 1 is the membership function of $A_X$, e.g., "X is around zero". Fig. 4 of Appendix 1 is the membership function of $B_X$, e.g., "Likely". Fig. 5 of Appendix 1 is the membership function of $A_Y$, e.g., "Y is about nine". Fig. 6 of Appendix 1 is a diagram depicting f(X).

Figure 7:
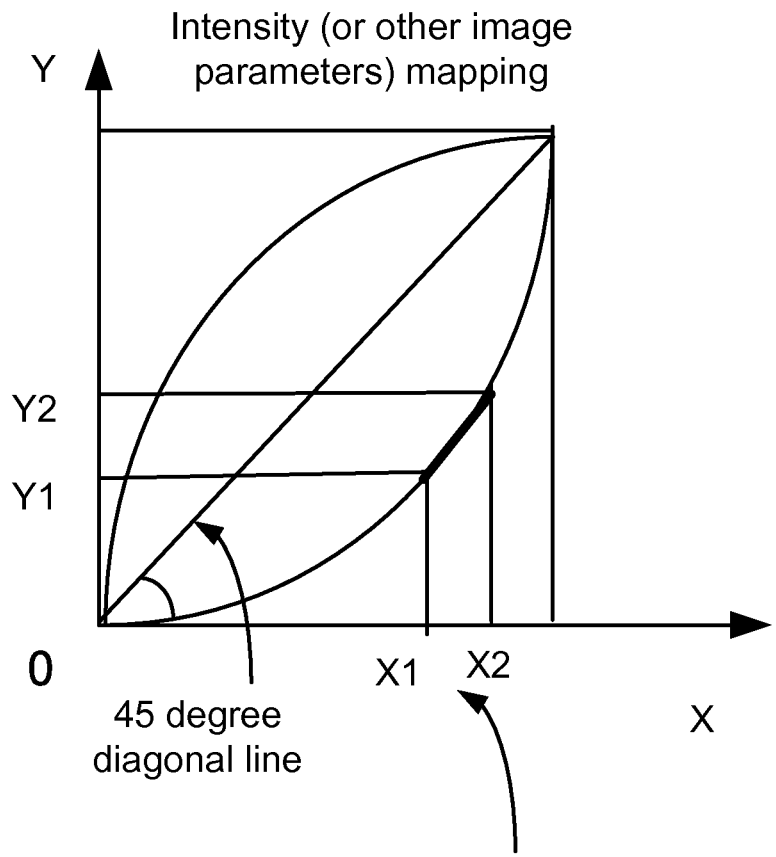
FIG. 7 shows one embodiment for intensity correction, editing, or mapping.
Figure 8:
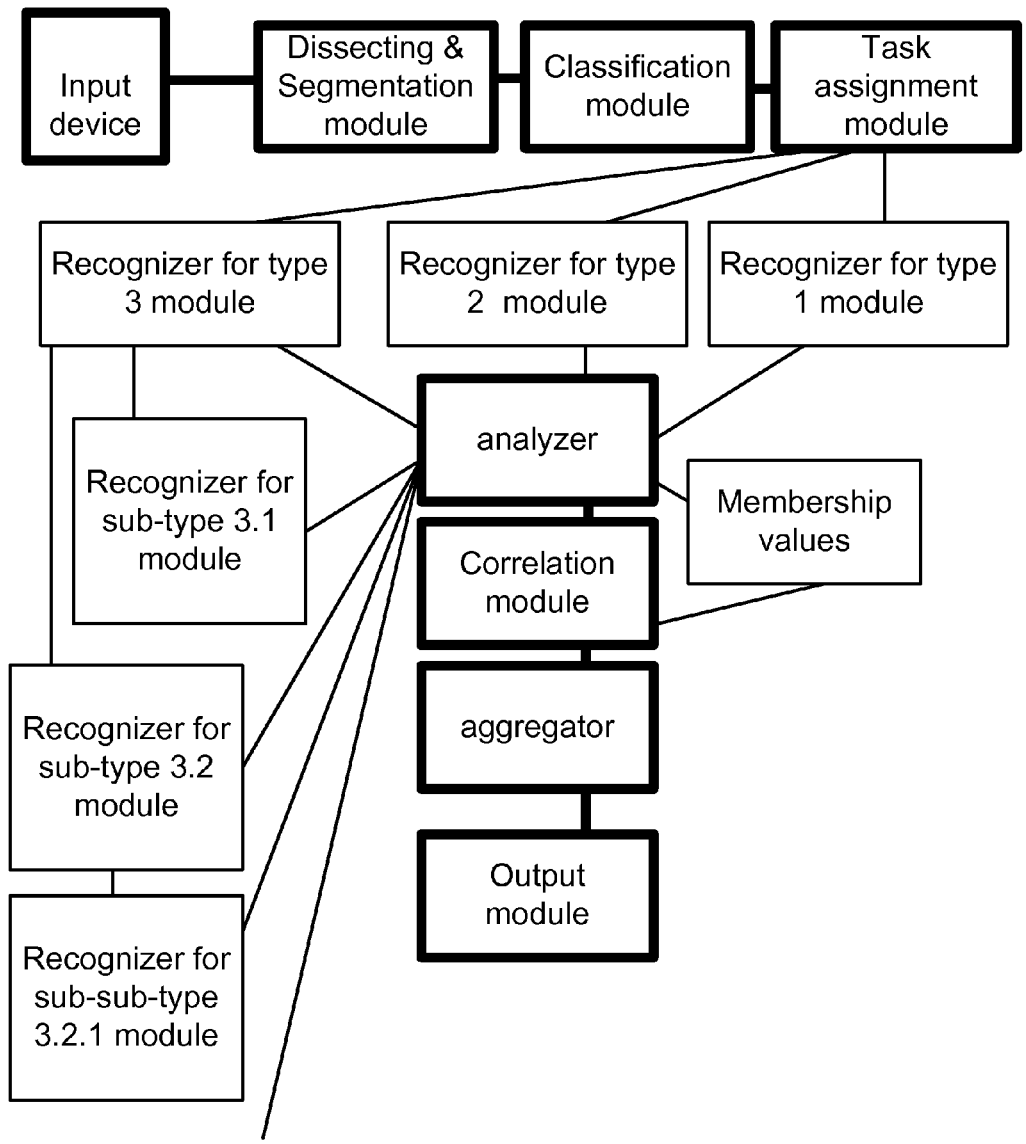
FIG. 8 shows one embodiment for multiple recognizers.
Figure 9:
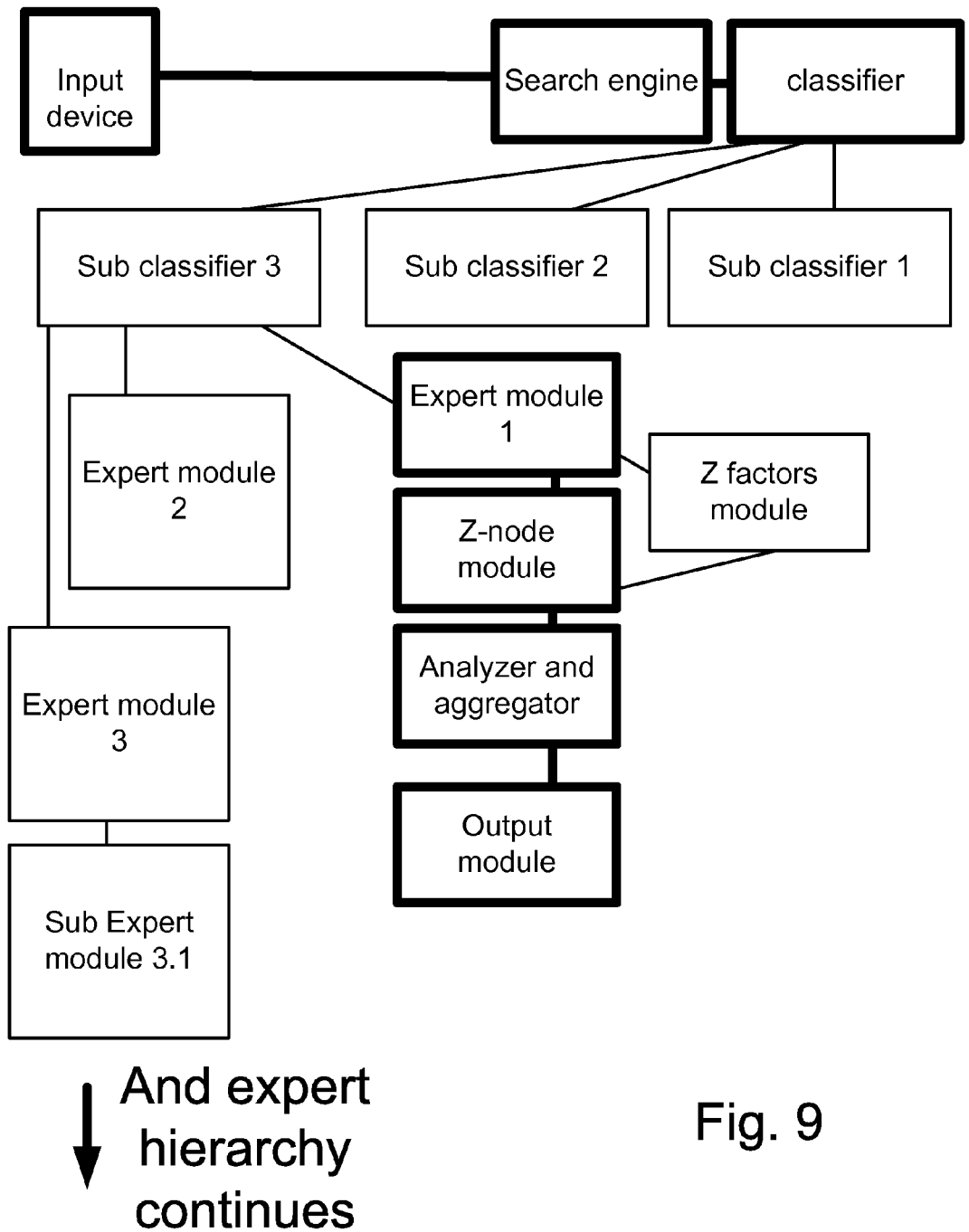
FIG. 9 shows one embodiment for multiple sub-classifiers and experts.
Figure 10:
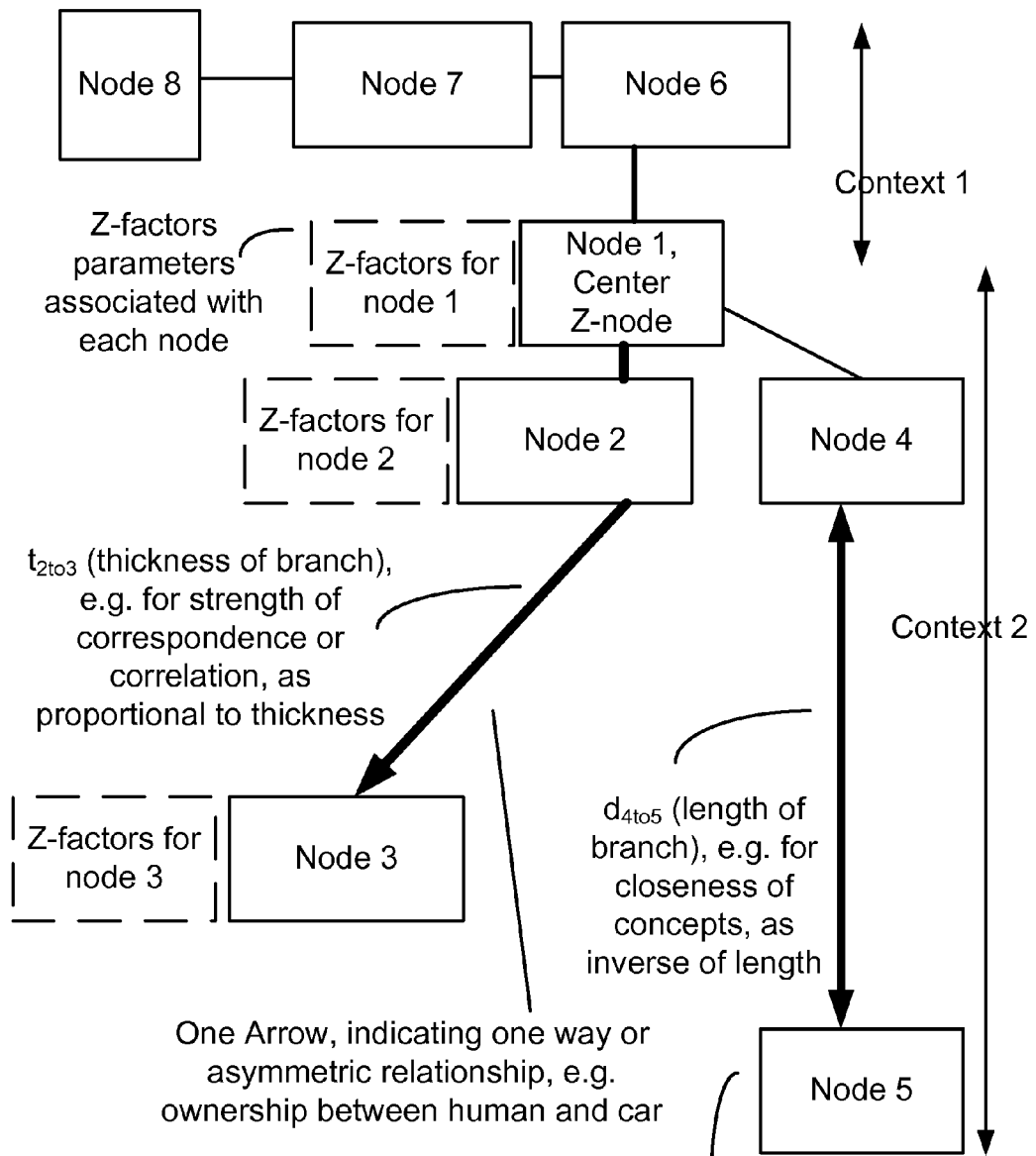
FIG. 10 shows one embodiment for Z-web, its components, and multiple contexts associated with it.

In this example, the set of candidate probability distribution for X was constructed using Normal distributions with mean ($m_x$) ranging from −2 to 2 and standard deviation ($\sigma_x$) ranging from $0^+$ (close to Dirac delta function) to 1.2. Figs. 7 and 8 of Appendix 1 depict the probability measure of $A_X$, denoted as v, based on (3) and each of these probability distribution candidates represented by a point on ($m_x$, $\sigma_x$) plane. These also illustrate the contour maps of constant probability measures. Figs. 9 and 10 of Appendix 1 depict the test scores (denoted as ts) for each probability distribution candidate, based on the application of certainty component $B_X$ to each probability measure, v, via (4). Given that $B_X$ imposes a test score on each v, the probability distribution candidates that form a contour (on ($m_x$, $\sigma_x$) plane) for constant v, also form a contour for the corresponding test score. However, given that a range of v values may result in the same test score (e.g., for v less than 0.5 or above 0.75, in this example), some test score contours on ($m_x$, $\sigma_x$) plane collapse to flat ranges (e.g., for test scores 0 and 1, in this example), as depicted on Figs. 9 and 10 of Appendix 1.

By applying (10), we can then determine the probability measure of $A_Y$ (in Y domain), denoted as w, based on the probability distribution candidates in X domain (i.e., bypassing the direct calculation of the corresponding probability distributions in Y domain). The probability measure w is depicted in Figs. 11 and 12 of Appendix 1 for each probability distribution candidate in ($m_x$, $\sigma_x$) plane.

Figure 12:
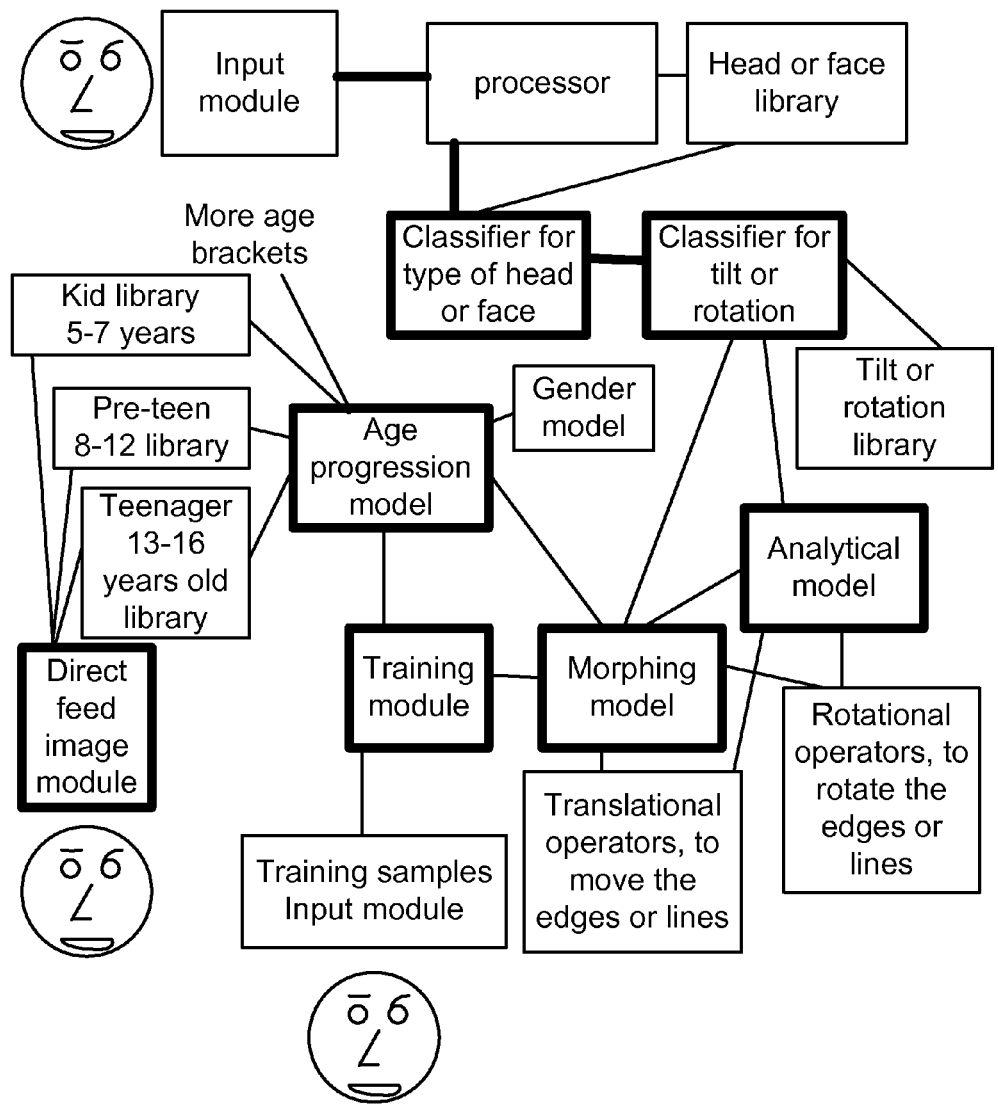
FIG. 12 shows one embodiment for classifier for head or face, with age and rotation parameters.

Given that each probability distribution candidate is associated with a possibility restriction test score (as shown for example in Fig. 10 of Appendix 1), such test score can be applied and correlated with the probability measure w (shown for example in Fig. 12 of Appendix 1). A given w (or a w bin) may be associated with multiple test scores as indicated by contours of constant w or regions of very close or similar w in Fig. 12 of Appendix 1.

Therefore, to assign a final test score to a given w (or w bin) based on (8), we can determine the maximum test score for all w's associated with the given w bin.

Figure 11:
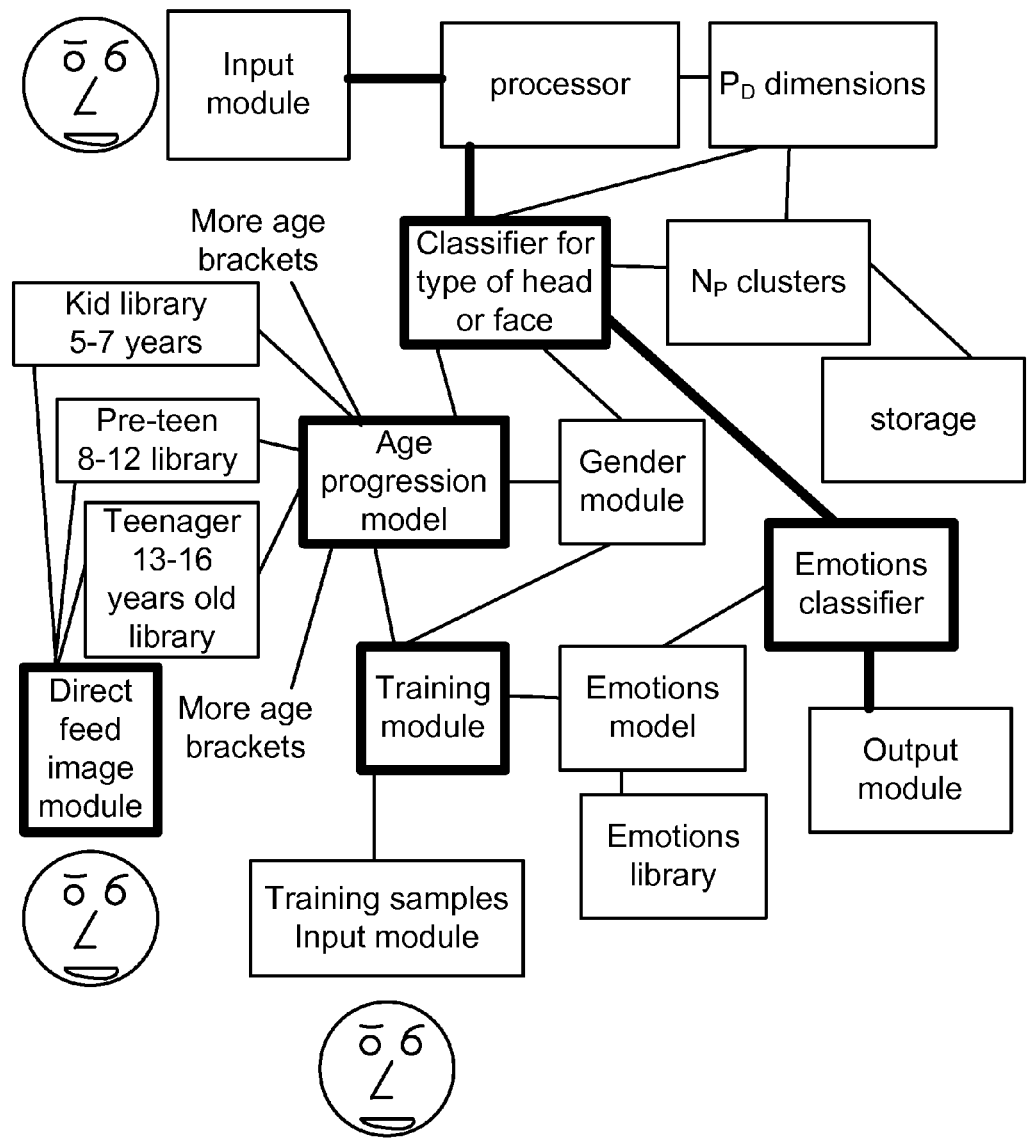
FIG. 11 shows one embodiment for classifier for head, face, and emotions.
Figure 13:
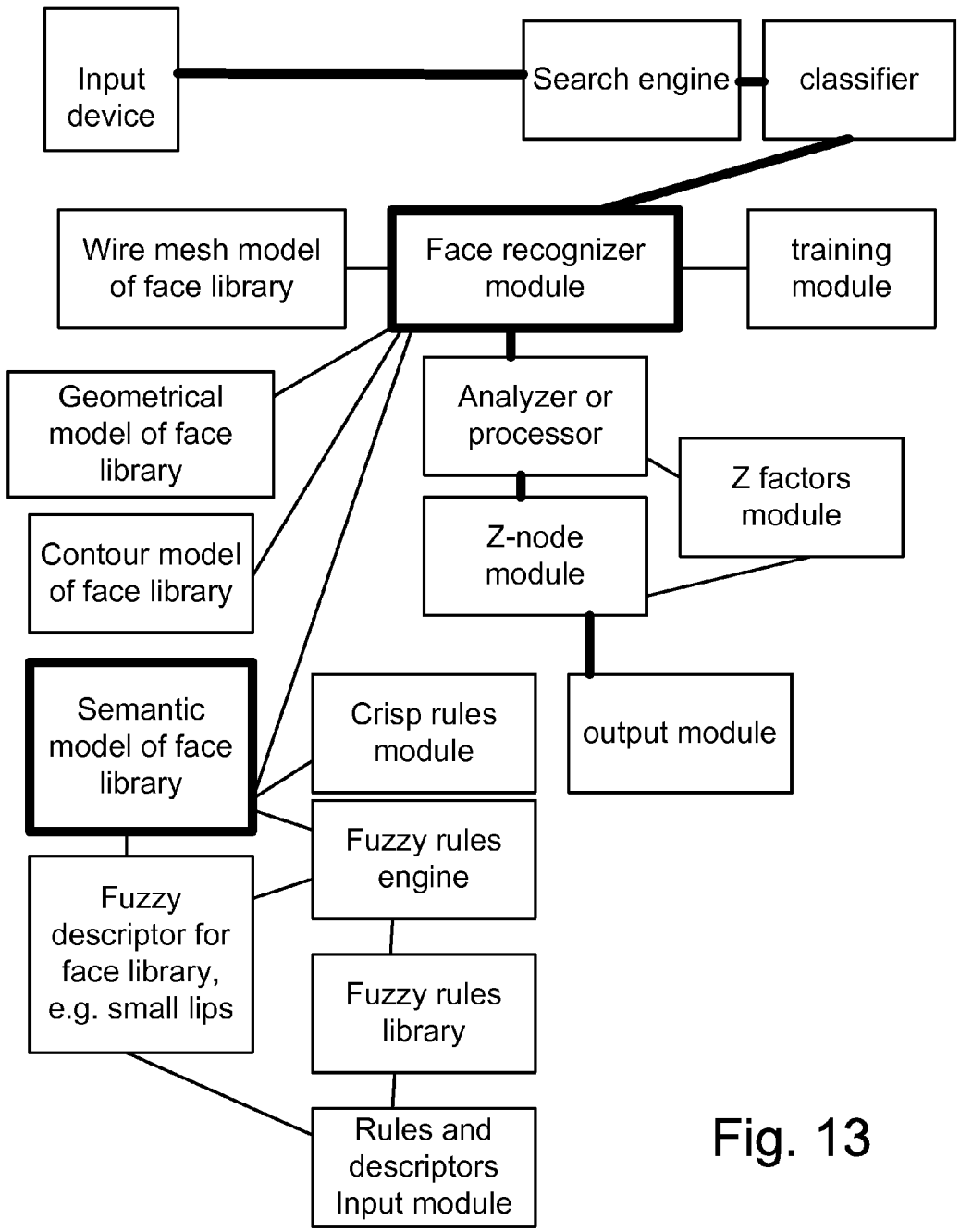
FIG. 13 shows one embodiment for face recognizer.

The result of an intermediate step for determining the maximum test score for correlated w's (i.e., falling in the same w bin) is illustrated in Fig. 13 of Appendix 1, on the ($m_x$, $\sigma_x$) plane (for illustrative comparison with Fig. 11 of Appendix 1).

Figure 14:
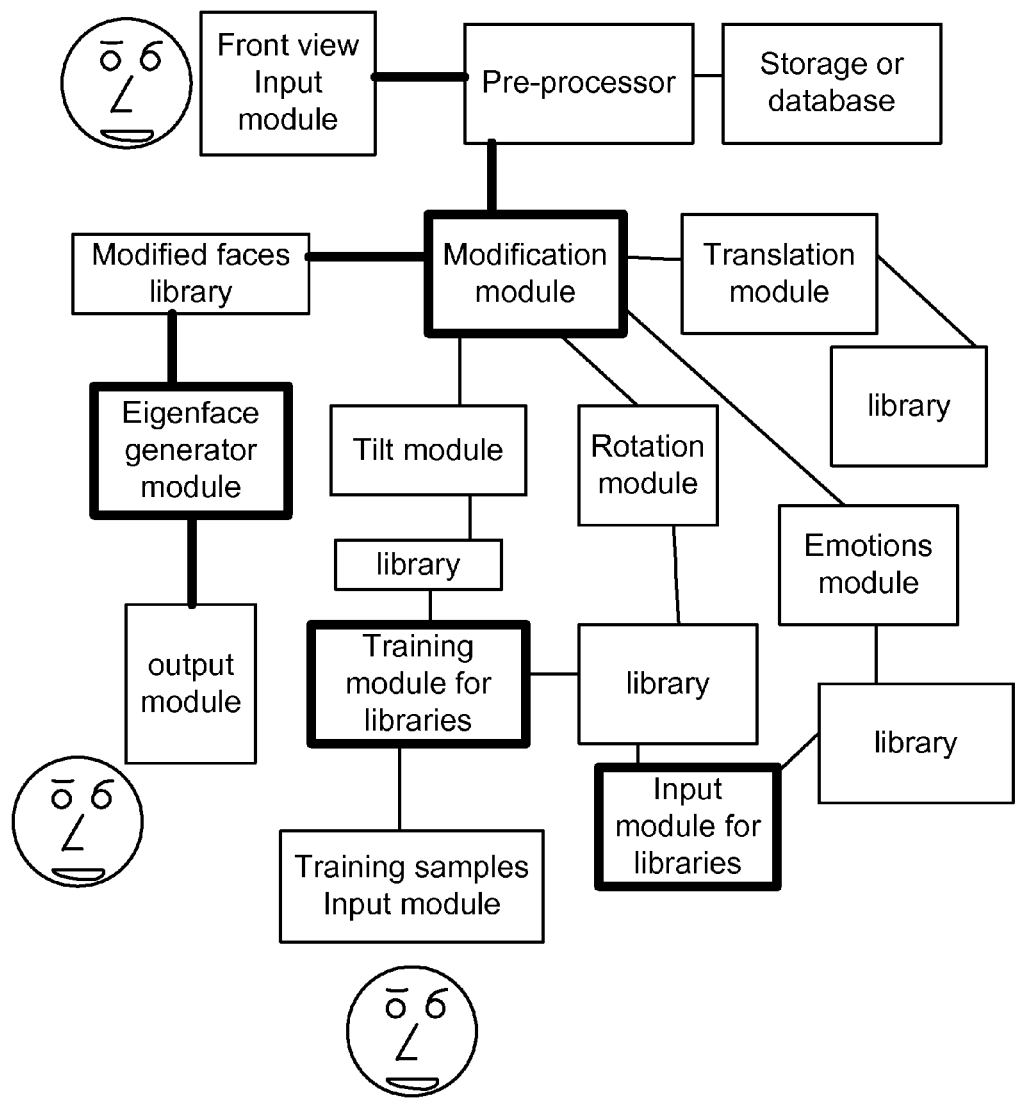
FIG. 14 shows one embodiment for modification module for faces and eigenface generator module.

The resulting maximum test score associated with a given w bin defines the membership function of w (or a value of w representing the w bin) in $B_Y$, as depicted for this example in Fig. 14 of Appendix 1. As shown in Figs. 11 and 13 of Appendix 1, where w is high, the maximum associated test score is low, resulting in $B_Y$ which represents "significantly less than 25%" for this example. Fig. 7 of Appendix 1 is the probability measure of $A_X$, v, per each (Normal) probability distribution candidate represented by ($m_X$, $\sigma_X$). Fig. 8 of Appendix 1 is the contours of the probability measure of $A_X$, v, per each (Normal) probability distribution candidate represented by ($m_X$, $\sigma_X$). Fig. 9 of Appendix 1 is the test score based on certainty measure $B_X$ for each (Normal) probability distribution candidate represented by ($m_X$, $\sigma_X$). Fig. 10 of Appendix 1 is the test score based on certainty measure $B_X$ for each (Normal) probability distribution candidate represented by ($m_X$, $\sigma_X$). Fig. 11 of Appendix 1 is the probability measure of $A_Y$, w, per each probability distribution (Normal) candidate represented by ($m_X$, $\sigma_X$).

Fig. 12 of Appendix 1 is the contours of the probability measure of $A_Y$, w, per each probability distribution (Normal) candidate represented by ($m_X$, $\sigma_X$). Fig. 13 of Appendix 1 is the maximum test score for a w-bin associated with each probability distribution (Normal) candidate represented by ($m_X$, $\sigma_X$). Fig. 14 of Appendix 1 is the maximum test scores for w-bins defining the membership function of w in fuzzy set $B_Y$, e.g., "significantly less than 25%".

II. Z-Valuation Using Granular Category Sets

Figure 15:
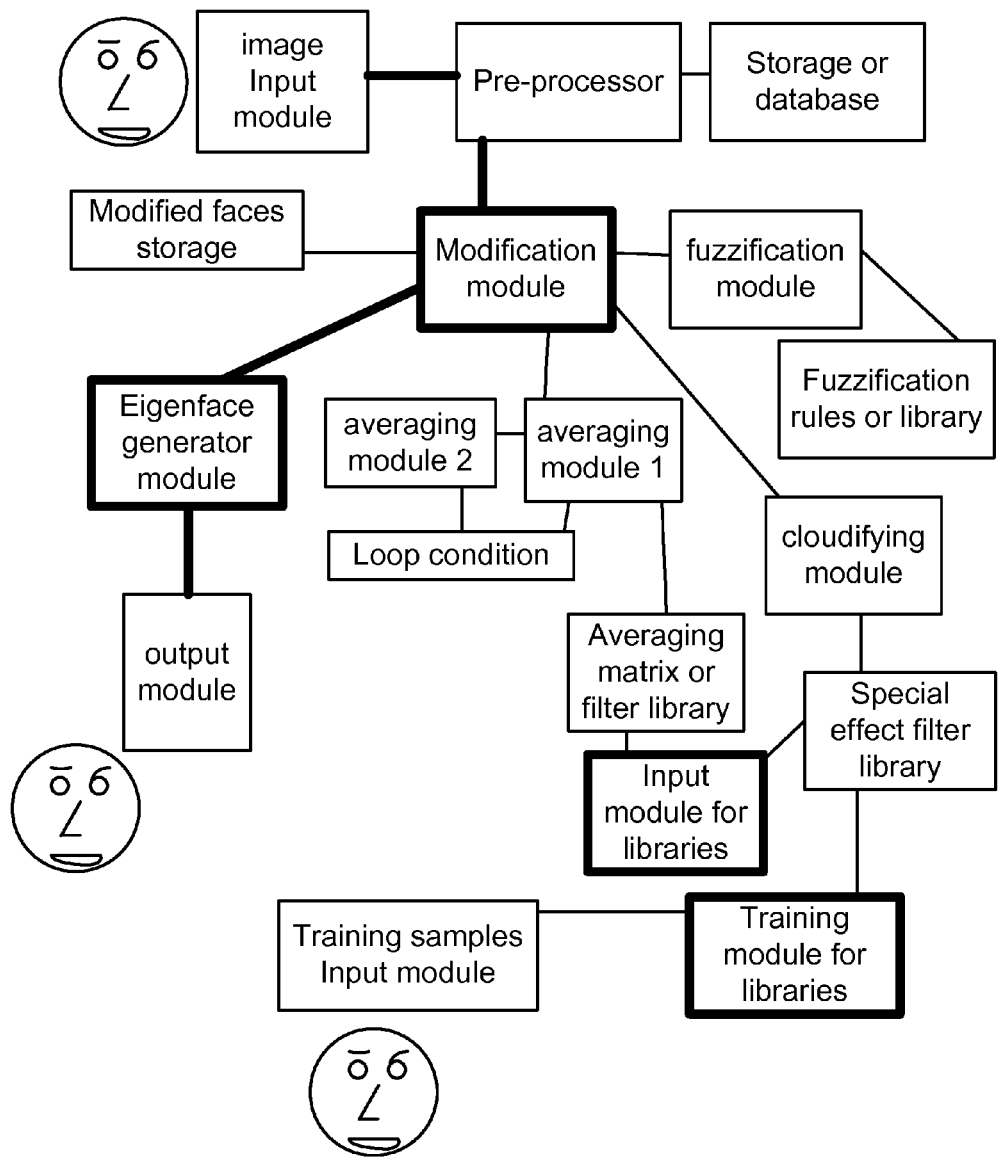
FIG. 15 shows one embodiment for modification module for faces and eigenface generator module.

A. Predetermined Category Sets: Test Scores, Probability Measures, and Probability Distributions The probability measure of $A_X$, denoted as v, may be predetermined and reused, given that the integration in (3) may be normalized based on the general shape of the membership function of $A_X$ and the class/parameters of probability distribution candidates. In normalized form, for example, a category of normalized membership function may be defined as symmetric trapezoid with its support at interval [−1,1] with a single parameter, β, indicating the ratio of its core to its support (as shown in Fig. 15 of Appendix 1). Examples of classes of probability distribution are Normal distribution and Poisson distribution, with their corresponding parameters normalized with respect to normalized $A_X$. For example, for Normal distribution, the parameters ($m_x$, $\sigma_x$) may be normalized with respect to half width of the support having the origin of the normalized coordinate translated to cross zero at the center of the support.

Furthermore, we may reduce the level and complexity of computation in approximating the Z-valuation by using a granular approach. For example, for a category of normalized $A_X$ (e.g., symmetric trapezoid with β of about 0.5, as shown in Fig. 15 of Appendix 1), we may predetermine relations/mapping (or a set of inference rules) between (fuzzy or crisp) subset of probability distribution candidates (of a given class such as Normal or Poisson distribution) and (fuzzy or crisp) subsets of probability measures, v's (as for example shown in Fig. 16 of Appendix 1).

Let $V_j$ denote a category/set of probability measures of $A_X$ (e.g., probability measure "High"), where j numerates such categories in v domain. Each $V_j$ corresponds to a range or (fuzzy or crisp) subset of probability distribution candidates, denoted by $C_j$ whose $p_i$ members are defined via the following membership function: (eq. 11, below)

$$\mu_{C_j}(p_i) = \mu_{V_j}(\mu_A \cdot p_i) = \mu_{V_j}\left(\int_X \mu_A(x) \cdot p_i(x) \cdot dx\right),$$

Therefore according to (11), we may predetermine $C_j$ via a similar method of applying test scores to the probability distribution candidates, $p_i$, (as for example shown in Fig. 9 of Appendix 1), by replacing $B_x$ with $V_j$. For example, the categories of probability measure $V_{Low}$ and $V_{High}$ (shown in Figs. 17 and 18 of Appendix 1, respectively), correspond to the (category) fuzzy sets of probability distribution candidates, denotes as $C_{Low}$ and $C_{High}$ (with labels used in place of j), with a membership function depicted in Figs. 19 and 20 of Appendix 1, respectively.

Figure 16:
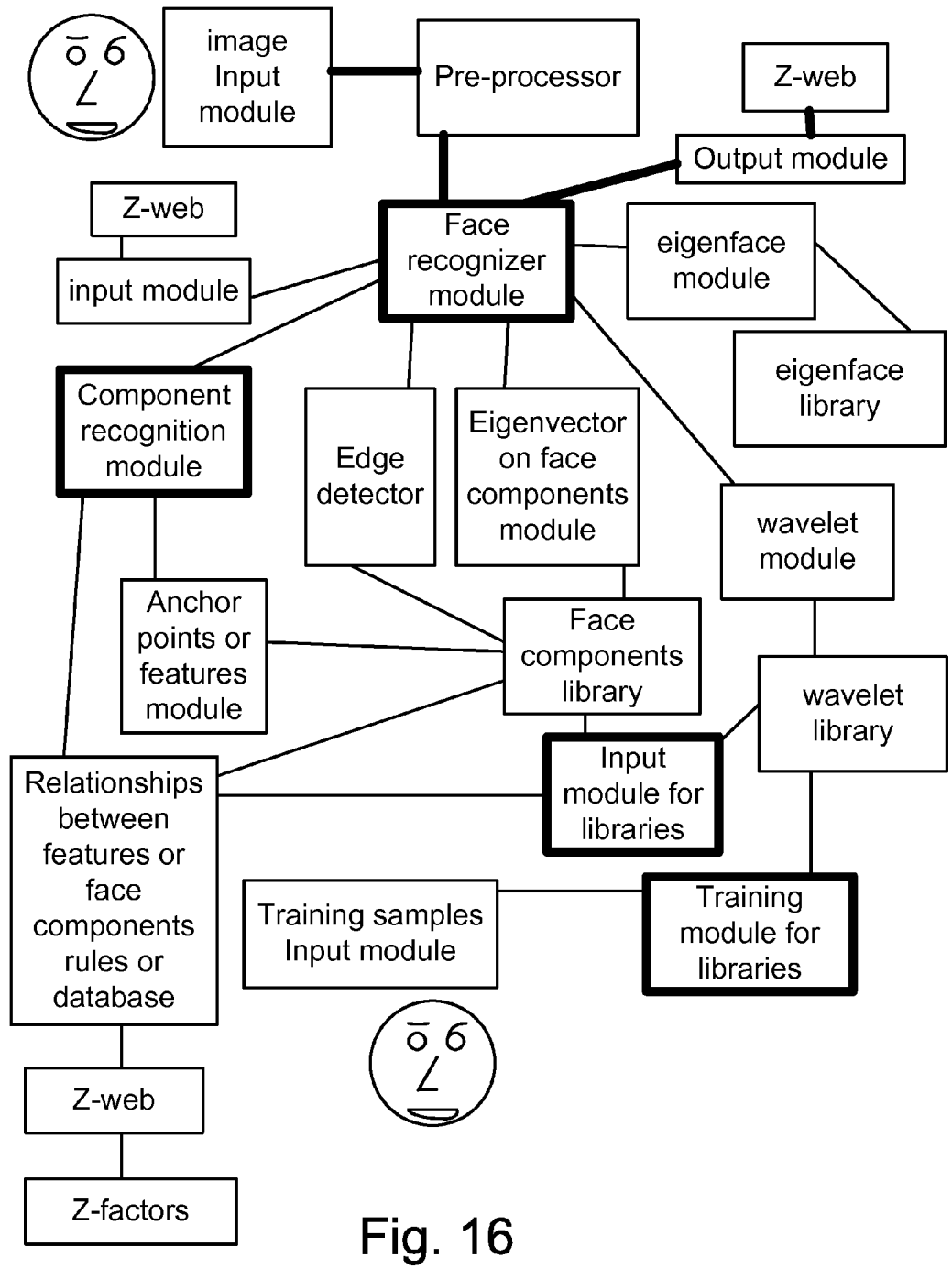
FIG. 16 shows one embodiment for face recognizer.

Furthermore, the certainty levels (test scores) may also be made into granular (fuzzy or crisp) sets $TS_k$, e.g., in order to reduce the complexity of calculation during the aggregation process of Z-valuation. Index k numerates these test score category sets. Fig. 16 of Appendix 1 may also serve as an example of such categorization (with test score replacing v).

Figure 21:
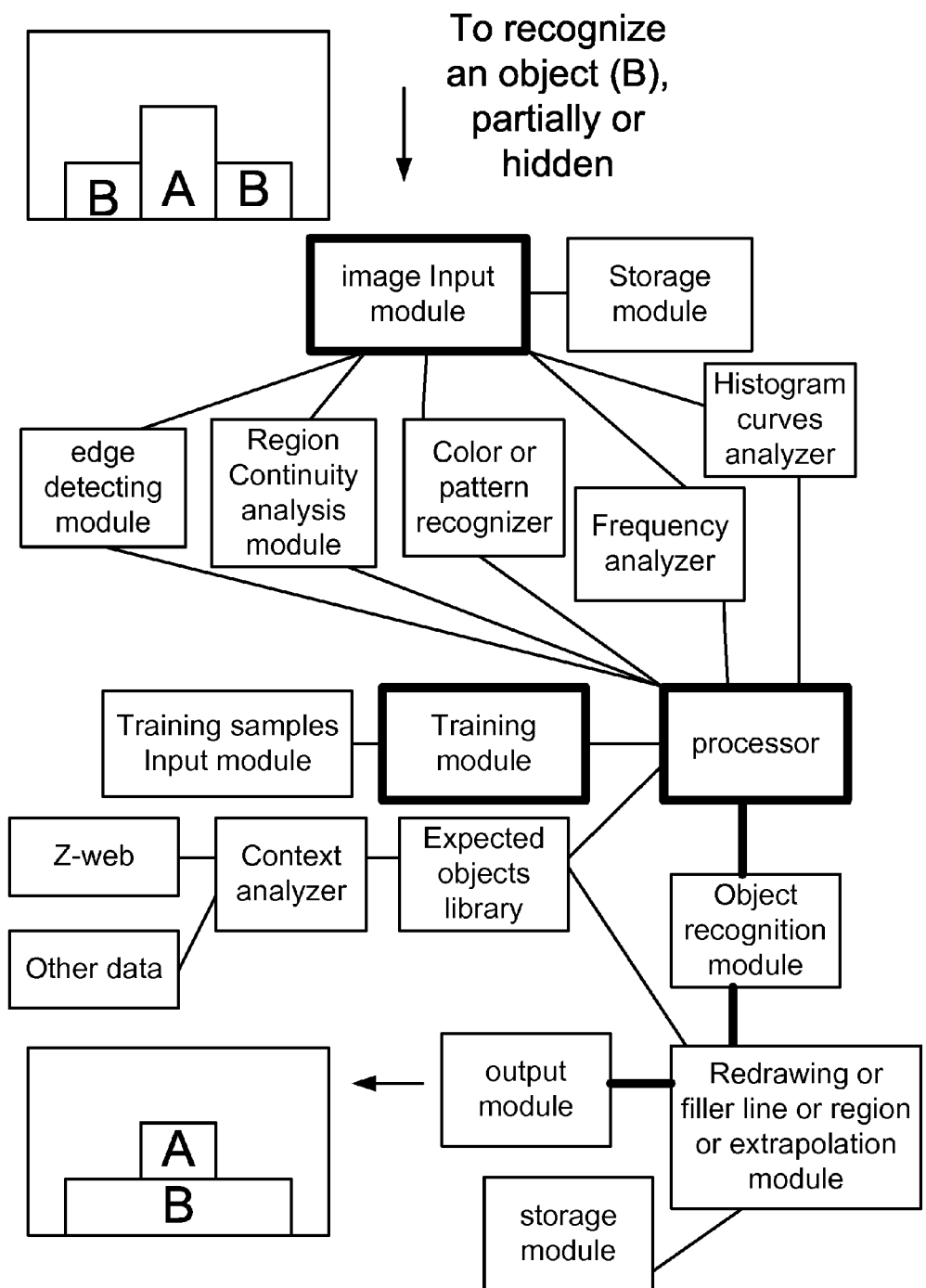
FIG. 21 shows one embodiment for recognizer for partially hidden objects.

In one approach, the certainty component $B_X$ is granularly decomposed or mapped (or approximately expressed) via pairs of probability measure and test score category sets, i.e., $(V_j, TS_k)$'s, as for example demonstrated in Fig. 21 of Appendix 1. In one approach, each relation pair may be further associated with a weight$_{j,k}$ that indicates the degree of mapping of $B_X$ among the pairs (e.g., when $TS_k$ is a predefined set). For example:

$$\text{weight}_{j,k} = \sup_{v \in [0,1]} (\mu_{V_j}(v) \wedge \mu_{TS_k}(\mu_{B_X}(v))).$$

In one scenario, the decomposition of $B_X$ may be expressed as series of tuples in the form $(V_j, TS_k, \text{weight}_{j,k})$ or simply as a matrix with weight$_{j,k}$ as its elements. Given the correspondence between $C_j$ and $V_j$, the granular test score sets $TS_k$'s are also associated with granular probability distribution candidate sets, $C_j$'s (with the same weight$_{j,k}$).

In another approach, a non-categorical test score (e.g., a fuzzy or crisp set) $TS_j$ is determined for each $V_j$ (and $C_j$), e.g., by using extension principle, based on mapping via $B_X$:

$$\mu_{TS_j}(ts) = \sup_{v' \in [0,1]} (\mu_{V_j}(v')), \quad (12)$$

subject to: $ts = \mu_{B_X}(v')$.

Figure 17:
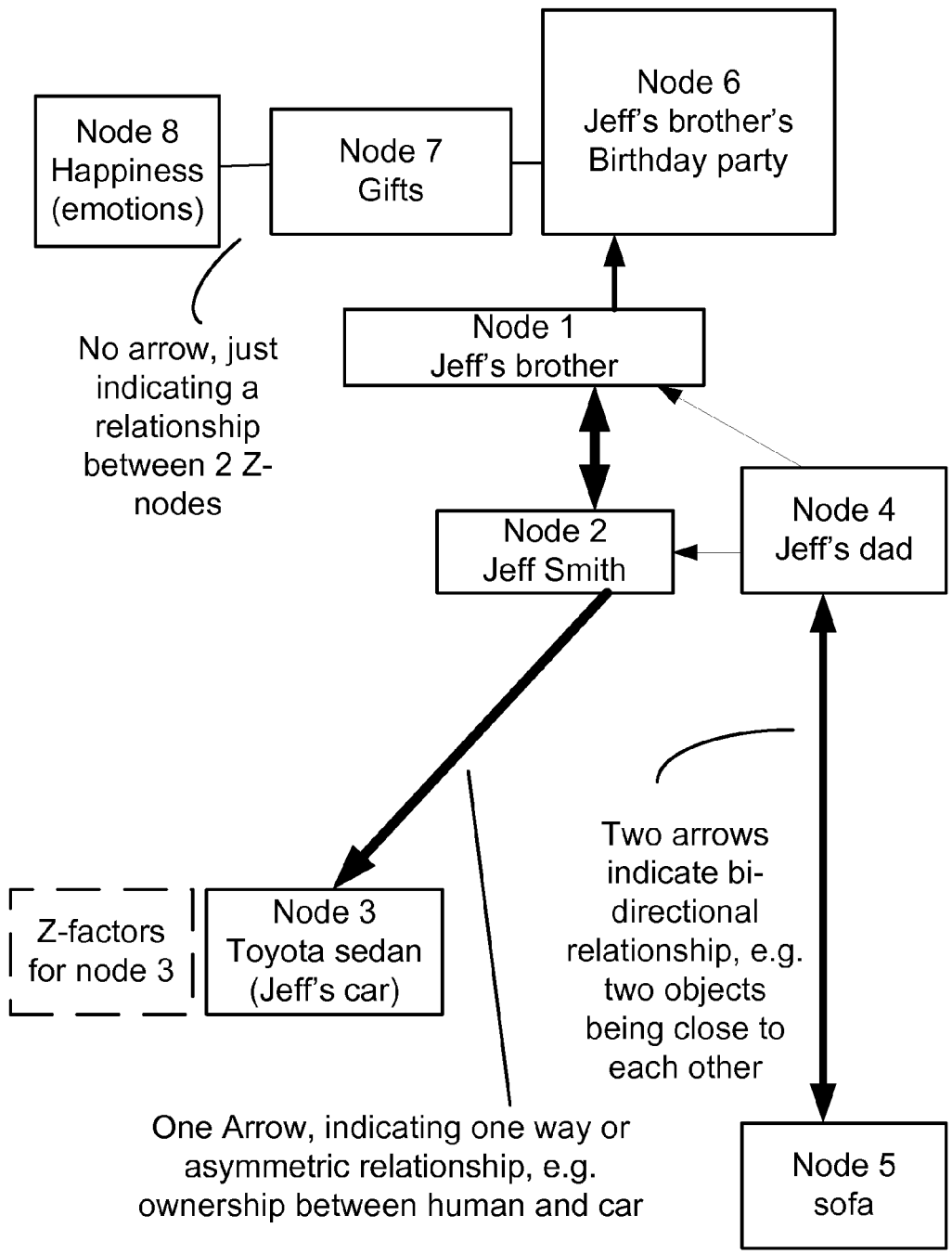
FIG. 17 shows one embodiment for Z-web.
Figure 18:
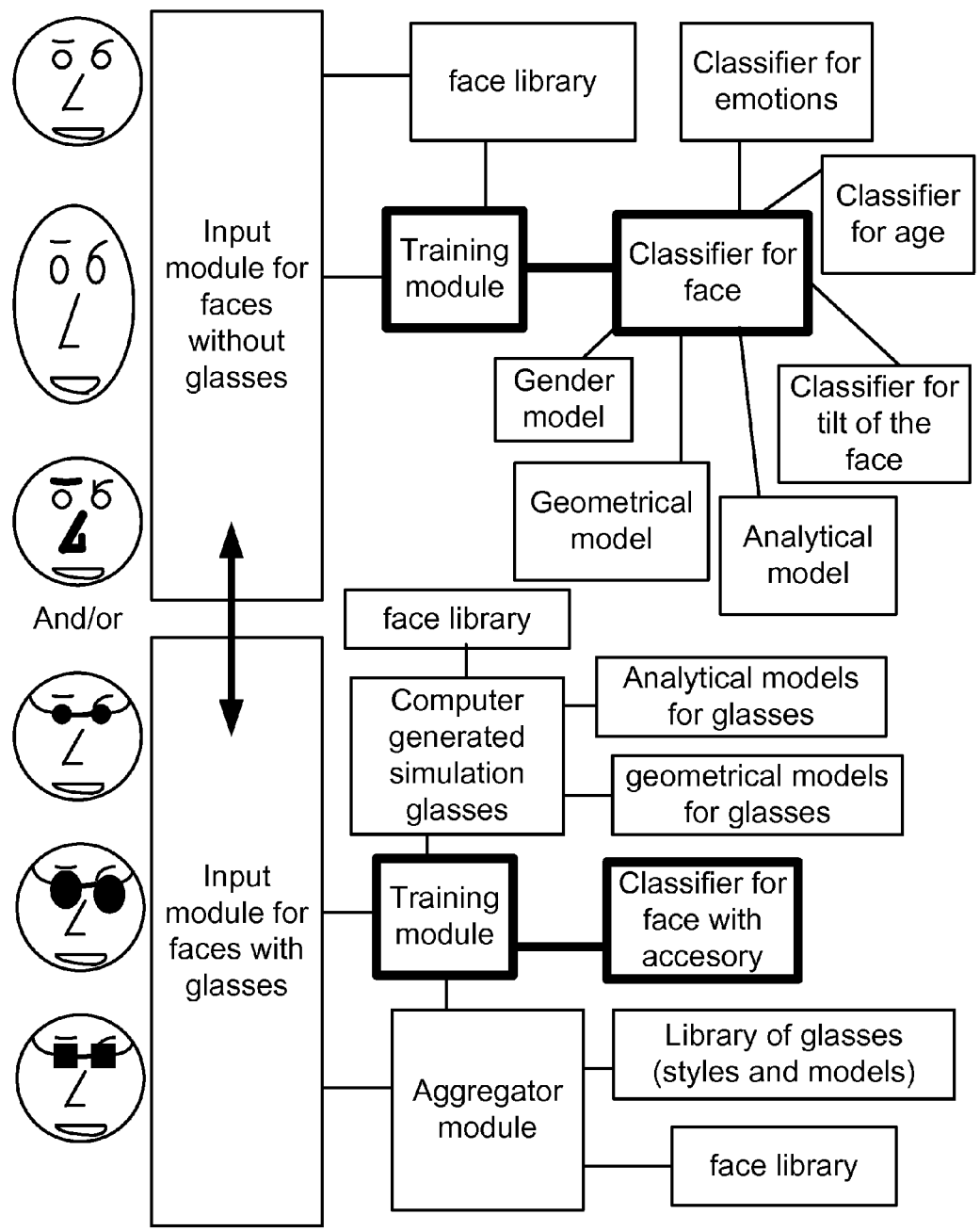
FIG. 18 shows one embodiment for classifier for accessories.
Figure 19:
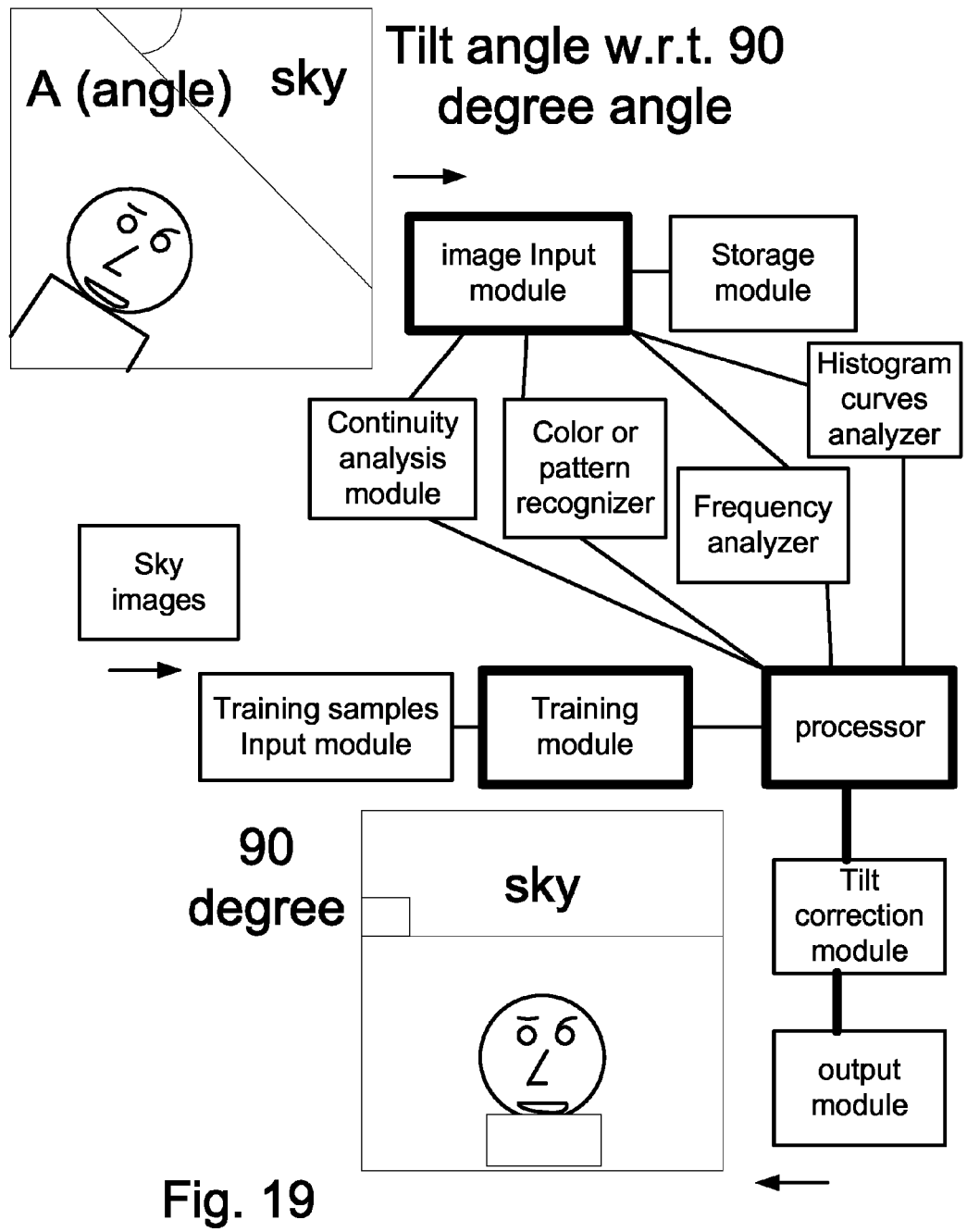
FIG. 19 shows one embodiment for tilt correction.
Figure 20:
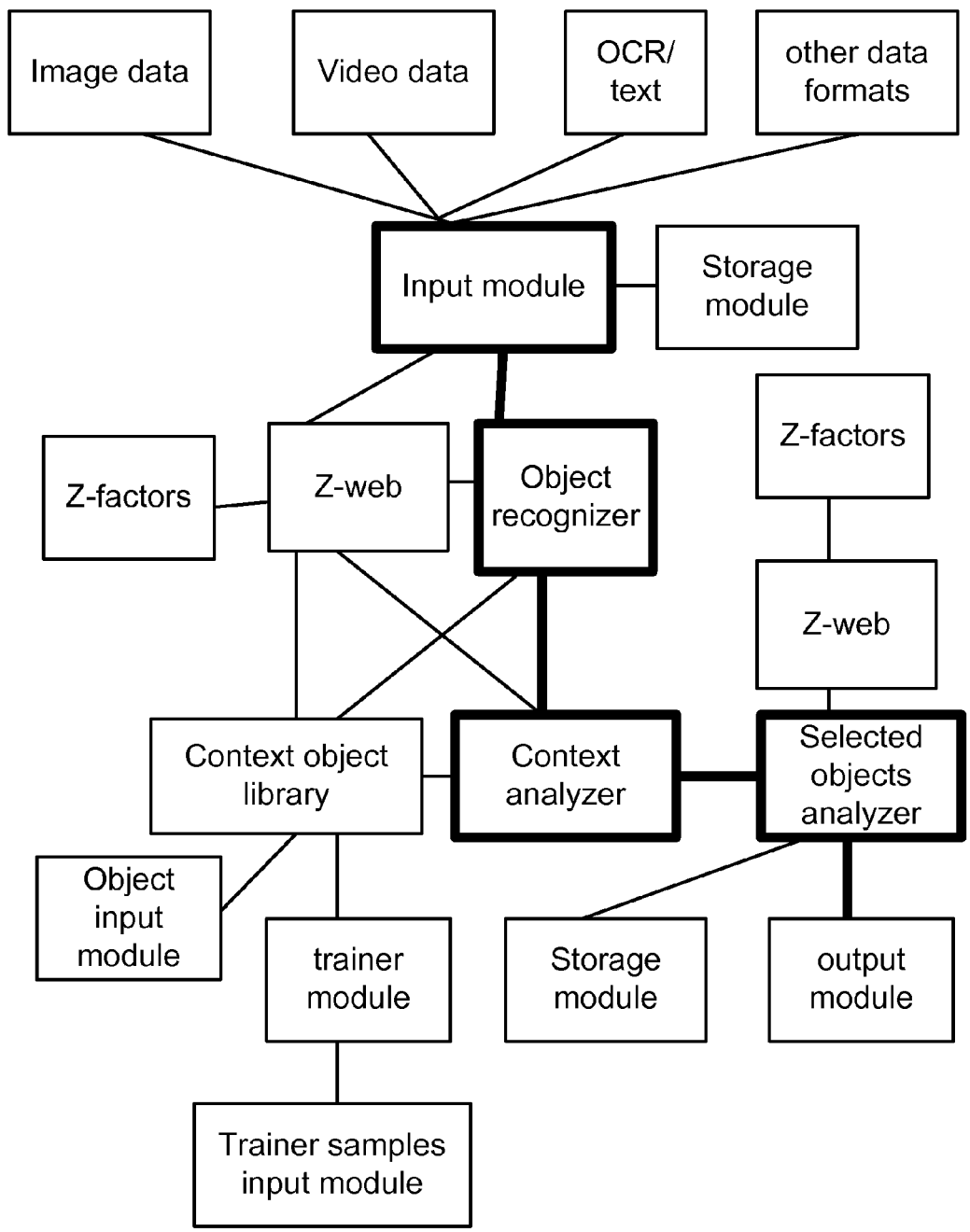
FIG. 20 shows one embodiment for context analyzer.

Fig. 15 of Appendix 1 is a membership function parameter $\beta$ (ratio of core to support), which adjusts the symmetric trapezoid shape from triangular with ($\beta=0$) to crisp with ($\beta=1$). Fig. 16 of Appendix 1 shows examples of various granular (fuzzy) sets of probability measures. Fig. 17 of Appendix 1 is membership function of $v$ in $V_{Low}$. Fig. 18 of Appendix 1 is membership function of $v$ in $V_{High}$. Fig. 19 of Appendix 1 is membership function of $p_i$ in $C_{Low}$ (with $p_i$ represented by its parameters $(m_X, \sigma_X)$). Fig. 20 of Appendix 1 is membership function of $p_i$ in $C_{High}$ (with $p_i$ represented by its parameters $(m_X, \sigma_X)$). Fig. 21 of Appendix 1 is an example of granularizing/mapping of $B_X$, via $(V_j, TS_k)$ pairs.

B. Computation and Aggregation Via Normalized Categories

One advantage of reusing the predetermined normalized categories is the reduction in number of calculations, such as the integration or summation in determining probability measures per individual probability distribution candidates in X domain or their corresponding probability distributions in Y domain, per (4) and (8). In addition, instead of propagating the test scores via an individual probability distribution candidate, the extension of the test scores may be done at a more granular level of the probability distribution candidate subsets, $C_j$, which are typically far fewer in number than the individual probability distribution candidates. However, the aggregation of test scores for Z-valuation, e.g., for $(Y, A_Y, B_Y)$, will involve additional overlap determination involving various normalized category sets, as described below.

The normalization of symmetrical trapezoid membership function $A_Y$, e.g., "Y is about nine," as shown in Fig. 5 of Appendix 1, involves shifting the origin by $-9$ and scaling the width by 0.5 (in Y domain) in order to match the position and width of the support to the normalized template depicted in Fig. 15 of Appendix 1 (with $\beta=0$ determined as the ratio of the core to support). Note that such normalization (translation and scaling) also impacts the location and scaling of associated $p_y$'s (e.g., mean and standard deviation) in order to preserve the probability measure of $A_Y$ per (8).

Figure 22:
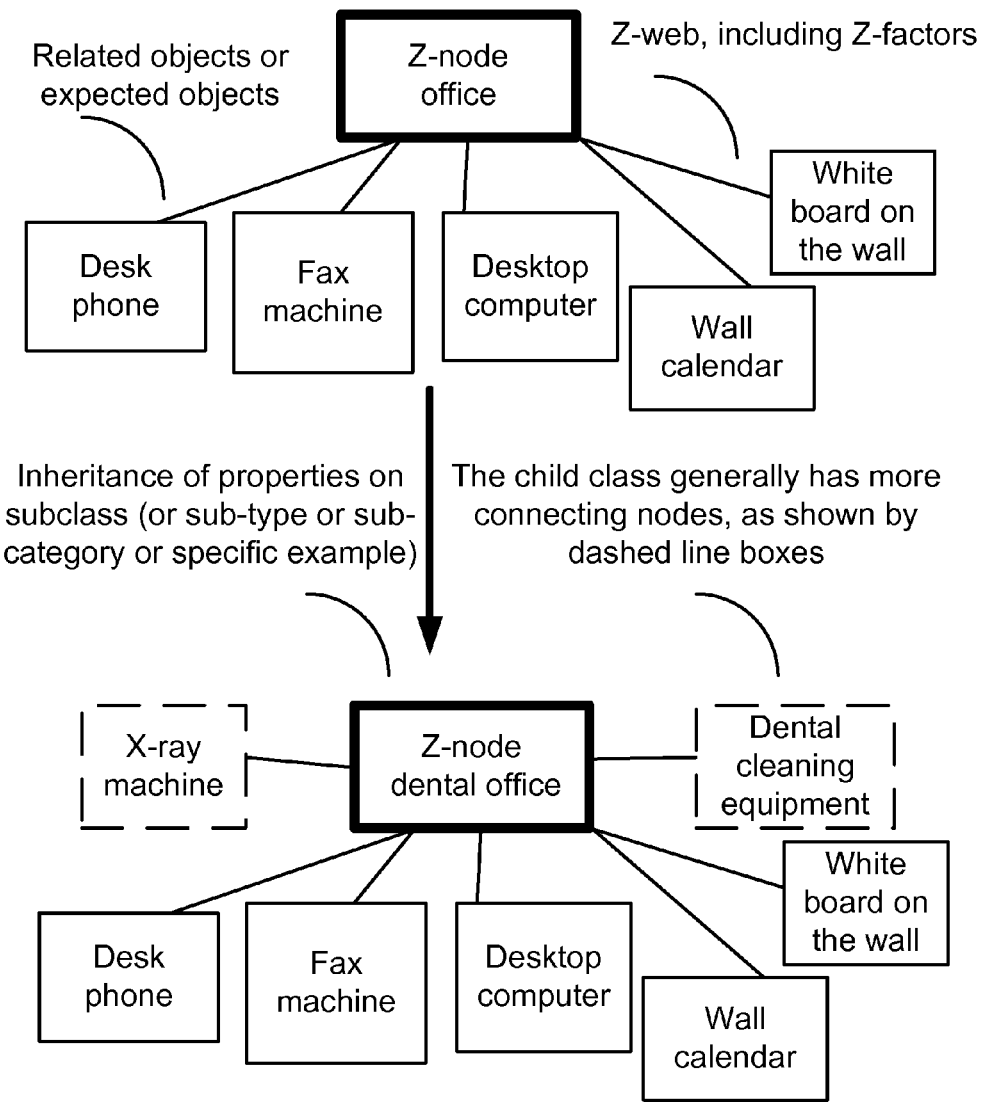
FIG. 22 shows one embodiment for Z-web.

Note that the predetermined categorical subset of probability distributions in Y domain, denoted as $C_{Y,j}$, that is associated with $V_j$, may be distinct from the corresponding one in X domain, denoted as $C_{X,j}$, e.g., due to parameters such as $\beta$ (or the class of the membership, such as trapezoid or ramp). For example, Fig. 22 of Appendix 1 illustrates the membership function of $C_{Y,High}$, for normalized $A_Y$ ($\beta=0$), for comparison with $C_{X,High}$, depicted in Fig. 20 of Appendix 1, for the same values of normalized probability distribution parameters. Fig. 22 of Appendix 1 is membership function of $p_y$ in $C_{Y,High}$ (with $p_y$ represented by its parameters $(m_Y, \sigma_Y)$).

i) Mapping in X Domain

Figure 23:
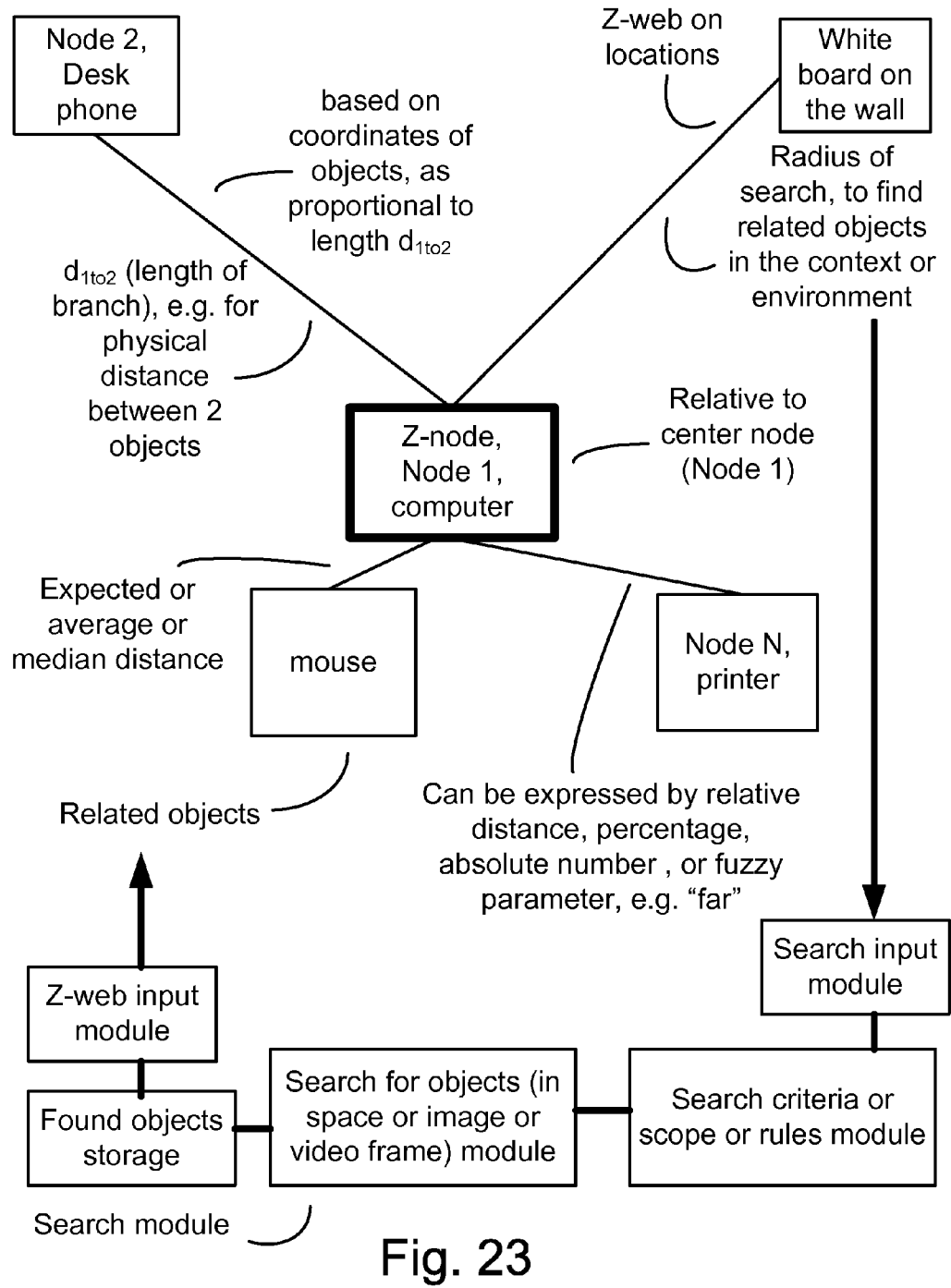
FIG. 23 shows one embodiment for Z-web.

In one approach to estimate (10), we may determine (or approximate) $\mu_{A_Y}(f(x))$ in X domain as for example depicted in Fig. 23 of Appendix 1, labeled $\mu_{A_{Y \to X}}(x)$. Then, we may proceed with mapping and normalization of the membership function to one or more normalized categories of membership functions (e.g., a symmetric trapezoid shape with ($\beta=0$)). Fig. 23 of Appendix 1 is membership function $\mu_{A_{Y \to X}}(x)$. In such an approach, the normalization effects on $A_X$ and $A_{Y \to X}$ are combined into a transformation operation, T, (e.g., translation and scaling) used to also transform the normalized probability distribution parameters (e.g., mean and standard deviation). Thus, T also transforms the predetermined subsets of probability distribution candidates, $C_{X,j}$, to $C_{X,j}{}^T$, e.g., via the extension principle, as follows:

$$\mu_{C_{X,j}^T}(p_{X,i}^T) = \sup_{\forall p_{X,i}} \mu_{C_{X,j}^T}(p_{X,i}), \quad (13)$$

subject to $$p_{X,i}^T = T(p_{X,i}),$$

where $p_{X,i}{}^T$ represents the transformed probability distribution candidate (in X domain) from $p_{X,i}$.

Since in our example, $\mu_{A_X}$ (depicted in Fig. 3 of Appendix 1) is already in a normalized form, we focus on the transformation due normalization of $\mu_{A_{Y \to X}}(x)$. Note that in Fig. 11 of Appendix 1, the outline of probability measure $w$ for $(\sigma_X = 0+)$ is the same as the membership function $\mu_{A_{Y \to X}}(x)$ prior to the normalization, as depicted in Fig. 23 of Appendix 1. To normalize $\mu_{A_{Y \to X}}(x)$, the membership function must be scaled by factor of about 3, denoted by $s$, and translated by the amount of $-3$ (or $-1$ before scaling), denoted by $t$. The ordered translation and scaling operations, denoted by $T_t$ and $T_s$ respectively, define the transformation operation which also transforms a probability distribution (13) by scaling and translating its parameters, for example:

$$p_{X,i}^T = T(p_{X,i}) = T_t \cdot T_s \cdot p_{X,i}, \quad (14)$$

with $$T_s \cdot p_{X,i} = T_s(m_{X,i}, \sigma_{X,i}) = (s \cdot m_{X,i}, s \cdot \sigma_{X,i}),$$

$$T_t \cdot p_{X,i} = T_t(m_{X,i}, \sigma_{X,i}) = (m_{X,i} + t, \sigma_{X,i}).$$

Figure 24:
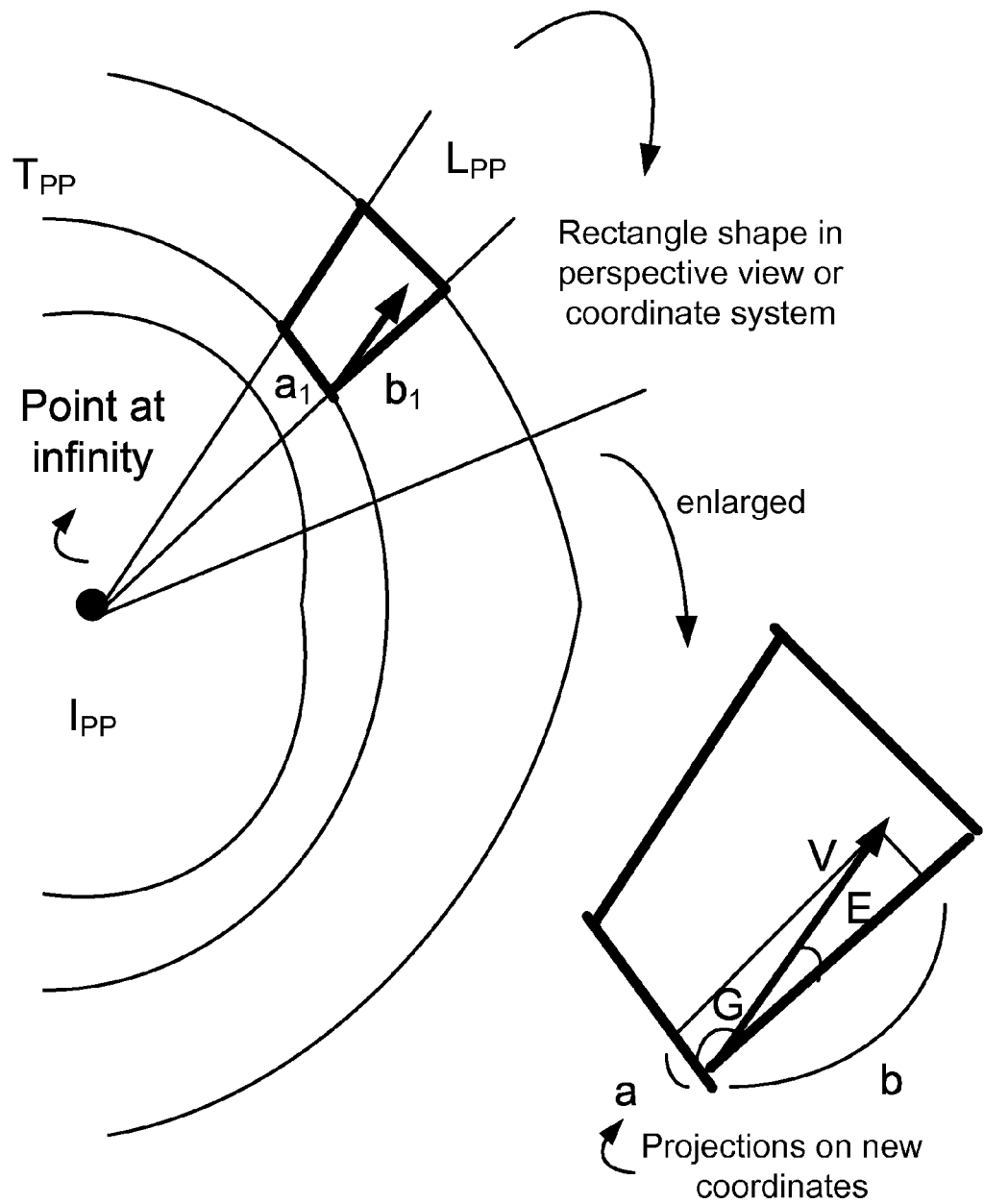
FIG. 24 shows one embodiment for perspective analysis.
Figure 25:
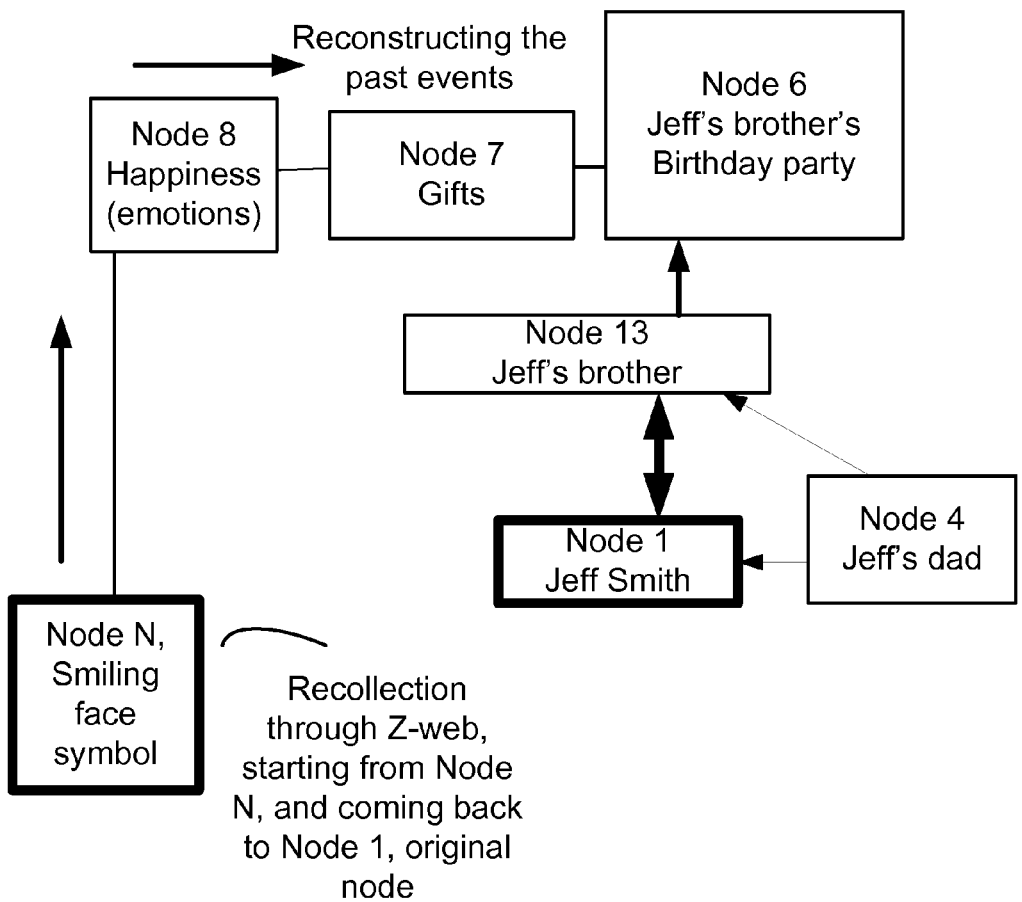
FIG. 25 shows one embodiment for Z-web, for recollection.
Figure 26:
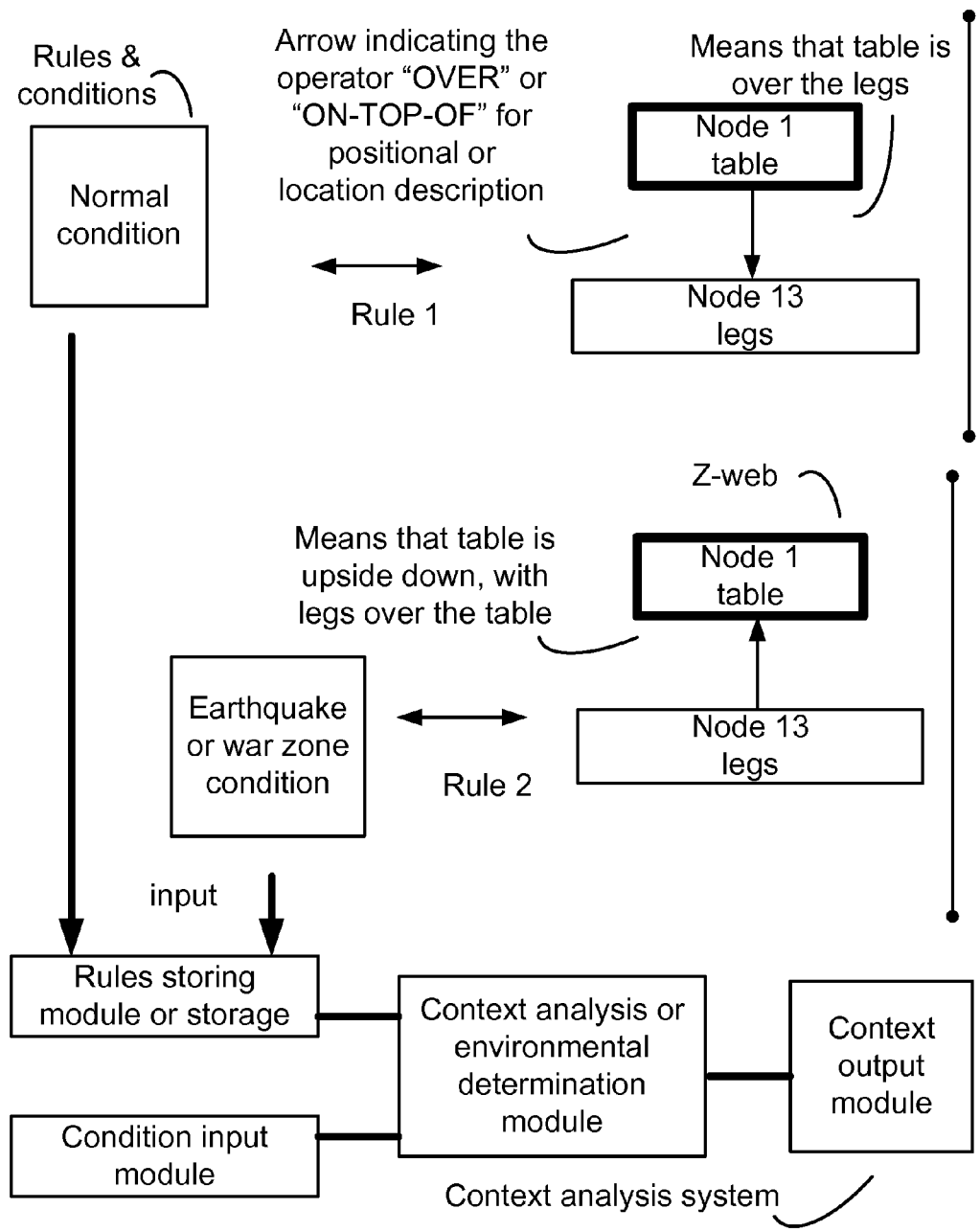
FIG. 26 shows one embodiment for Z-web and context analysis.

Once normalized, $\mu_{A_{Y \to X}}(x)$ is associated with a predetermined subset(s) of normalized probability distributions, $C_{Y,j}$'s (e.g., as shown in Figs. 22, 24 and 25 of Appendix 1 for j as "High," "Med," and "Med-Low" (or "ML"), respectively). To associate $C_{Y,j}$ with the test score value(s) (e.g., $TS_{X,n}$) assigned to $C_{X,n}$ (shown for example in Fig. 20 of Appendix 1 with n as "High"), the relative position and scaling of $C_{Y,j}$ and $C_{X,n}$ are adjusted by transforming $C_{X,n}$ to $C_{X,n}{}^T$ per (13), to determine the intersection between $C_{X,n}{}^T$ and $C_{Y,j}$, for example by:

$$I_{j,n} = \sup_{\forall p_{X,i}} T(\mu_{C_{X,n}}T(p_{X,i}^T) \wedge \mu_{C_{Y,j}}(p_{X,i}^T)), \quad (15)$$

where $I_{j,n}$ describes a grade for overlap between $C_{X,n}{}^T$ and $C_{Y,j}$. Fig. 26 of Appendix 1 schematically illustrates the (fuzzy) intersection of $C_{X,n}{}^T$ and $C_{Y,j}$, with n being "High"

and j being "ML", based on the predetermined category sets $C_{X,high}$ and $C_{Y,ML}$ from Figs. 20 and 25 of Appendix 1, respectively. Fig. 24 of Appendix 1 is membership function $C_{Y,Med}$. Fig. 25 of Appendix 1 is membership function $C_{Y,ML}$. Fig. 26 of Appendix 1 is illustrating the fuzzy intersection of $C_{Y,j}$ and $C^T_{X,n}$, where $C^T_{X,n}$ is transformed from $C_{X,n}$ via scaling and translation. For the predetermined category sets $C_{Y,j}$ and $C_{X,n}$, $C_{Y,ML}$ and $C_{X,High}$ are used from Figs. 25 and 20 of Appendix 1.

For example, as shown in Fig. 26 of Appendix 1, $C^T_{X,High}$ overlaps $C_{Y,ML}$ (to a degree), while it may not intersect $C_{Y,Med}$ (which is depicted in Fig. 24 of Appendix 1). If $I_{j,n}$ exceeds an (optional) overlap threshold value, then we may apply the category test score $TS_k$ associated with $C_{X,n}$, to $C_{Y,j}$. Note that the association with $TS_k$ was determined based on $B_X$, e.g., through mapping of $\mu_{Bx}$ to the relation pairs $(V_{X,n}, TS_{X,k})$. This means that the category set of probability measures $V_{Y,j}$ associated with $C_{Y,j}$ may get associated with category test score $TS_{X,k}$, as well. In general, $V_{X,n}$ and $V_{Y,j}$ may be sets of probability measures belonging to the same family of sets (i.e., without X or Y dependencies). The steps from $B_X$ to approximating $B_Y$ is conceptually summarized as:

$$\left.\begin{array}{l}B_X \xrightarrow{map} (V_{X,n}, TS_{X,k}) \\ B_X \to C_{X,n} \xrightarrow{T} C^T_{X,n} \\ A_Y \xrightarrow{f} A_{Y \to X} \to C_{Y,j}\end{array}\right\} \to I_{j,n} \right\} \to (V_{Y,j}, TS_{X,k}) \xrightarrow{approx.} B_Y.$$

The determination of the test scores for $V_{Y,j}$ may be implemented via a set of fuzzy rules linking $C_{X,n}$ and $C_{Y,j}$. For example, the antecedent of each rule is triggered if the corresponding $I_{j,n}$ is above an overlap threshold, and the consequent of the rule assigns $TS_{X,k}$'s (or an aggregate of $TS_{X,k}$'s based on weight$_{n,k}$ for a given n) to a variable $SC_{Y,j}$. A simpler test score assignment rule may use a non-categorical test score $TS_{X,n}$ which is determined for each $V_{X,n}$, e.g., via (12), based on the mapping through $B_X$:

$$\text{Rule}_{j,n}\text{:if } (I_{j,n}) \text{ then } (SC_{Y,j} \text{ is } TS_{X,n}) \quad (16)$$

However, in correlation/aggregation of assigned (fuzzy) test scores to variable $SC_{Y,j}$, we must consider the maximization of test score required by (8). For example, in aggregating the rules for $SC_{Y,j}$, we may use α-cuts to determine an aggregated (fuzzy) result, denoted as $AGSC_{Y,j}$, as follows: (Eq. 17 below)

$$AGSC_{Y,j} = \text{MAX}_n(Correl(I_{j,n}, TS_{X,n}))$$

where $Correl(I_{j,n}, TS_n)$ modifies the membership function of $TS_{X,n}$, by correlating it with the factor $I_{j,n}$, e.g., via scaling or truncation. Membership function of $B_Y$ is then approximated by a series of fuzzy relations $(V_{Y,j}, AGSC_{Y,j})$.

For a given w (probability measure of $A_Y$), $\mu_{B_Y}(w)$ may be approximated as a fuzzy number (or a defuzzified value), by further aggregation using fuzzy relations $(V_{Y,j}, AGSC_{Y,j})$, e.g.: (Eq. 18 below)

$$\mu_{B_Y}(w, ts) = \sup_j (\mu_{V_{Y,j}}(w) \wedge \mu_{AGSC_{Y,j}}(ts)).$$

ii) Overlap Approximation

An approach to approximate or render the overlap (15) between the category sets, such as $C_{X,n}$, may use α-cuts to present each crisp α-cuts of predetermined category set as a set of points in (m,σ) space. These sets of points may be modeled efficiently, e.g., based on graphical models, optimized for fast transformation and intersection operations. For example, the models that use peripheral description for the α-cuts allow robust and efficient determination of intersection and avoid the need to transform all the points within the set individually, in order to reduce the computation involved in (13).

iii) Estimation Using Contour Approach

In addition to predetermining $C_{X,n}$, based on $V_{X,n}$, for a normalized set $A_X$, we can predetermine various α-cuts of probability measures (e.g., depicted as contours of constant v in Figs. 7 and 8 of Appendix 1) or various α-cuts of associated test scores (e.g., depicted as contours of constant test scores, ts, in Figs. 9 and 10 of Appendix 1) for a set of predefined (e.g., most frequently used) $B_X$ components. These α-cuts that represent sets of probability distribution candidates in (m,σ) space (already associated with specific test scores) may be transformed per (13) and intersected with $C_{Y,j}$, in extending their test scores to $V_{Y,j}$. In essence, this is similar to the previous analysis except $V_{X,n}$ and $TS_{X,n}$ become singleton, and $C_{X,n}$ becomes a crisp set, while $C_{Y,j}$ and $V_{Y,j}$ are predetermined (crisp or fuzzy) set.

Another approach uses (e.g., piecewise) representation of $B_X$ (not predefined) where based on inspection or description, key values of v associated with key values of test scores may readily be ascertained (e.g., based on α-cuts), resulting in a set of $(v_i, ts_i)$ pairs. Then, the predetermine α-cuts of probability measures (e.g., depicted as contours of constant v in Figs. 7 and 8 of Appendix 1) are used to interpolate the contours of constant $ts_i$'s in (m,σ) space, based on the corresponding $v_i$ values. Again, these crisp contours of constant (crisp) $ts_i$'s, may be transformed and intersected with $C_{Y,j}$ to extend the test scores to $V_{Y,j}$ for estimating $B_Y$.

For quick estimation of $B_Y$ in an alternate approach, the predetermined α-cuts (i.e., w's) of probability measures for normalized $A_Y$ may be used (similar to those shown in Figs. 7 and 8 of Appendix 1 based on $A_X$), in essence, turning $V_{Y,j}$ to a singleton and $C_{Y,j}$ to a crisp set (contour) for carrying out the intersect determination. The estimates for $\mu_{B_Y}(w)$ may be determined via interpolation between the aggregated test score results obtained those w values associated with the α-cuts.

In one embodiment, for Z-number analysis, for probability distributions analysis, the predetermined categories of hidden probability distribution candidates and normalized Fuzzy membership functions facilitate the pre-calculation of probability measures and their associated reliability measures in Z evaluation or as Z-factors, for fast determination of the reliability levels of new propositions or conclusions. This approach opens the door to the extension of the reliability measures (e.g., via extension principle) to new propositions, based on graphical analysis of contours (α-cuts) of similar probability measures in the domain of parameters representing the probability distribution candidates. Basically, we will use the transformation and mapping of categorical set of the probability distribution candidates (represented as regions or α-cut contours) for extension of the reliability measures. This way, as we pre-calculate and store the shapes and results in our library or database for future use (as templates), the new analysis on any new data can be much faster, because we can readily match it with one of the templates, whose results are already calculated and stored, for immediate use.

Now, let's look at Appendix 2. In one embodiment, referring to the top Fig. and derivation on page 1 of Appendix 2, we have different values of $v_{\alpha,n}$, based on various $\alpha$-cuts (with (ts=$\alpha$)). Then, we match against category (singleton) $v_s$ (see the bottom Fig. on page 1 of Appendix 2). Then, on Fig. and derivation on page 2 of our Appendix 2, we get a series of the curves. We use the predetermined contours $C_{s,m}$ of probability measures $v_{s,m}$. Note that ($v_{s,m}=p_i\cdot\mu_{AX}^{normalized}$). Note that $p_i$'s define the contour(s) for $v_{s,m}$ (or regions of $p_i$'s) defining region(s) for $v_{s,m}$ (such as 0 or 1), to interpolate and determine contours (or regions) of constant denoted by $C_{\alpha,m}$. These $C_{\alpha,m}$'s are associated with test scores set by a, i.e. (ts=$\alpha$) for $C_{\alpha,m}$.

Then, on Fig. and derivation on page 3 of our Appendix 2, we transform or do other manipulations, according to extension rules (e.g. on normalized) for $\mu_{AY}$:

$$C_{\alpha,m}^T = T(C_{\alpha,m})$$

While maintaining the test score for $C_{\alpha,m}^T$ (as $\alpha$).

Based on categories of $w_{s,j}$ (similar to $v_{s,n}$ except for w), probability measure of $A_Y$ in Y-domain, where $w_{s,j}$ are singletons (predefined), have corresponding contours (or regions) $C_{s,j}$ (see the figure on the bottom of page 3 of our Appendix 2). Then, we find the intercepts between $C_{\alpha,m}^T$ and $C_{s,j}$, if any, i.e. $I_{\alpha,m,j}$.

Then, on Fig. and derivation on page 4 of our Appendix 2, based on the intercepts, we find the best test score for a given $C_{s,j}$ extended from $C_{\alpha,m}^T$, e.g.:

$$ts_{s,j} = \sup_{\forall \alpha'} \alpha'$$

where $I_{\alpha',m,j}$ exists.

(i.e., the best test score from intercept points to a given $C_{s,j}$.)

Now, we associate $ts_{s,j}$ to $w_{s,j}$ to construct ($\mu_{BY}(w)$), and interpolate for other w (see the figure on the bottom of page 4 of our Appendix 2). Since $ts_{i,j}$'s source is $\alpha$, $ts_{s,j}$'s appear as $\alpha$-cuts in $\mu_{BY}$, as well.

Then, on derivation on page 5 of our Appendix 2, we have: Where the scenario involves e.g. z=f(x,y), instead of y=f(x) (where the solution may be worked out in the X-domain), we can still use contours (or regions) of specific test scores (e.g. based on $\alpha$-cuts), and contours determined by interpolation of predefined or predetermined probability measure contours or regions. The manipulation, e.g. ($p_z=p_x O p_y$), can be implemented based on contours or regions of constant test scores (for X or Y), instead of individual $p_{x,i}$ and $p_{y,i}$ to reduce the number of combinations and calculation. The test scores can be extracted from X, Y domains to Z domain (in this example) and maximized based on the intercept points in $p_Z$ domain with predetermined contours of probability measures of (normalized) $A_Z$, to again calculate $\mu_{BZ}$.

FIG. 4 is a system for Z-number estimation and calculation, with all related modules and components shown in the Figure, with a processor or computing unit in the middle for controlling all the operations and commands (Z-number estimator).

Thus, in summary, the above section provides the methods for approximation or calculation or manipulation of Z-numbers, and related concepts. Now, we explain other components of our inventions, below.

Thumbnail Transformation

In one embodiment, the input data (e.g., image) is preprocessed. For example, the image is transformed into a smaller thumbnail that preserve the high level nature of the image content, while not necessarily preserving its unique characteristics. This may be achieved, for example, by down sampling or aggregation of neighboring pixels. Other methods may include reduction of the variable space by consolidating the colors into intensity (e.g., gray scale) and/or reducing the number of bits representing color or intensity. Such a transformation is denoted as thumbnail.

A thumbnail includes less resolution and data, and hence, it contains less overall detailed features. The purpose is to simplify the task of dealing with many pixels while still managing to detect the high level features associated with the images (or other type of data). For example, using a thumbnail, a recognition module quickly identifies the presence of a head or face (while not intended to necessarily determine the identity of the person or object).

One embodiment uses a preliminary search to detect main features in a thumbnail data/image for fast computation. In one embodiment, the limitation may be on the number of pixels on the visual layer (via preprocessing). In one embodiment, the limitation is imposed on the detection/classifier network (e.g., on hidden layers) itself. For example, the main features are learned and isolated (e.g., by units or neurons of higher hidden layers) or learned by targeted attempt (e.g., by keeping all other weights and letting the weight on certain units change when learning a certain feature.)

Feature Detection and Learning

In one embodiment, for example where labeled training samples may be difficult to prepare or scarce, the training is done with unlabeled samples to learn the features from the sample details. For example, a restricted Boltzmann machine (RBM) may be used to successively learn the features one layer at a time.

Figure 58:
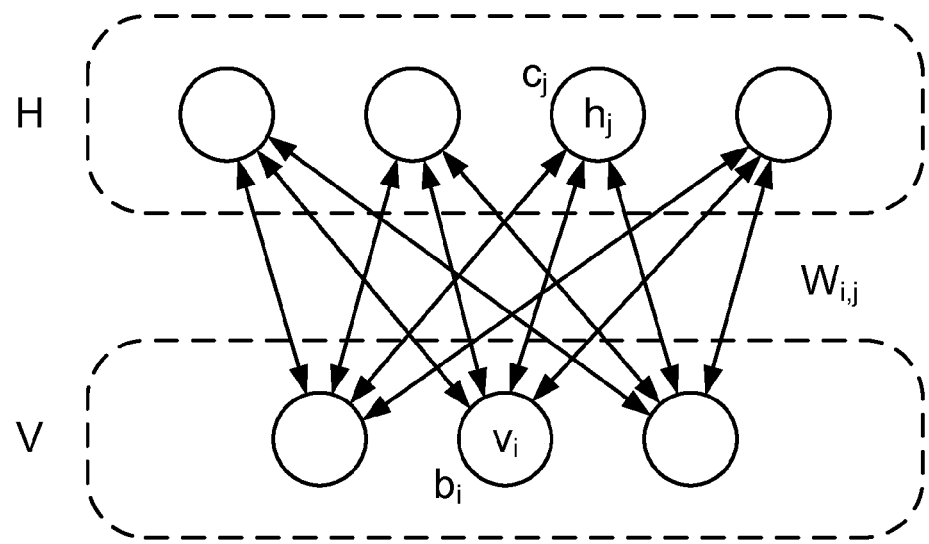
FIG. 58 shows one embodiment for an illustration of restricted Boltzmann machine.

A Boltzmann machine refers to a type of stochastic recurrent neural network, where the probability of the state is based on an energy function defined based on the weights/biases associated with the units and the state of such units. In a Boltzmann machine, some units are denoted visible where the state may be set/clamped or observed and others may be hidden (e.g., those used for determining features). In the Restricted Boltzmann machine (RBM), the weights between hidden units within the same layer are eliminated to simplify the learning process. The learning process tends modifies the weights and biases so that the energy state associated with the samples learned are lowered and the probability of such states is increased. In one embodiment, the state of hidden layers are presented by a stochastic binary variable (e.g., in [0, 1] range) based on a sigmoid such as logistic function. In one embodiment, the energy function is given as $$E = -\sum_{i,j} v_i \cdot h_j \cdot w_{i,j} - \sum_i v_i \cdot b_i - \sum_j h_j \cdot c_j$$

where $v_i$ and $h_j$ denote the state of the $i^{th}$ visible unit and the $j^{th}$ hidden unit (as for example depicted in FIG. 58), respectively, and $b_i$ and $c_j$ are bias or threshold associated to such units, respectively. $w_{i,j}$ is an undirected weight or connection strength linking such units. Per Boltzmann machine, the probability of the state $\alpha$ (for a given set of H and V states of the units) depends on the weights (including bias values) and the state of H and V:

$$P(\alpha) = P(V, H) = \frac{e^{\frac{-E_\alpha}{T}}}{\sum_\beta e^{\frac{-E_\beta}{T}}}$$

where $E_\alpha$ is the energy associated with state a; T denotes the "Temperature" of the system; the denominator denotes the "partition function", Z; and β denotes any state of the system. Since the energy of a state is proportional to negative log probability of the state, the probability that a binary stochastic unit j is at state 1 (or ON) in such RBM becomes the following logistic function:

$$p_{j\ is\ ON} = \frac{1}{1+e^{\frac{-\Delta E_j}{T}}}$$

where T controls relative width of the above logistic function, and $\Delta E_j$ (for example for a hidden unit) is given by:

$$\Delta E_j = \sum_i v_i \cdot w_{i,j} + c_j$$

Note that in an embodiment with T is set to zero, the stochastic nature of the binary units becomes deterministic, i.e., taking the value sigmoid function (zero or one), as in Hopfield Network.

In one embodiment, the training attempts to reduce the Kullback-Leibler divergence, G, between the distributions of V states based on the training sets and based on thermal equilibrium of the Boltzmann machine, by modifying weights and biases, e.g., via a gradient decent over G with respect to a given weight or bias. The aim of training is to determine weights/biases such that the training samples have high probability. In maximizing the average probability of a state V, P(V), with respect to weights, we have $$\left\langle \frac{\partial \log P(V)}{\partial w_{i,j}} \right\rangle_{data} = \langle v_i h_j \rangle_{data} - \langle v_i h_j \rangle_{model}$$

where the average over the data means average over the training data (i.e., when V units sample from the training sets and are clamped to a training sample while hidden units are updated repeatedly to reach equilibrium distribution), and the average over model means the average from Boltzmann machine sampling from its equilibrium distribution (at a given T). In one embodiment, learning algorithm uses a small learning rate with the above to perform gradient decent. Similarly, the following can be used in learning bias $c_j$:

$$\left\langle \frac{\partial \log P(V)}{\partial c_j} \right\rangle_{data} = \langle h_j \rangle_{data} - \langle h_j \rangle_{model}$$

In one embodiment, where the weights are absent between the hidden units, the updating of the hidden states, H, is done in parallel as the hidden units are conditionally independent for a given set of visible states, V. In one embodiment, sampling from model involves one or more iterations alternating between updating (in parallel) hidden and visible layers based on each other. In one embodiment, sampling for the model is substituted with sampling from reconstruction, which updates the hidden units (for example, in parallel) using the visible units clamped to a training set, then updates the visible units (e.g., in parallel) to get a reconstruction from the features in the hidden layers, followed by updating the hidden units based on the reconstruction. This approach approximates the gradient decent of contrastive divergence in an efficient and fast manner. In RBM learning, contrastive divergence can be used instead of maximum likelihood learning which is expensive. In one embodiment, T is lowered from a higher initial value to make low cost (energy) states more probable than high cost states, while the higher initial value of T allows for reaching and sampling equilibrium states quicker. In one embodiment, the stochastic nature of binary units allows escaping from local minima. In one embodiment, during the reconstruction, a subset of visible units are clamped to input data to reconstruct other visible units from the features including those affected or derived (e.g., stochastically) from the input data. The training in such a conditional Boltzmann machine tends to maximize the log probability of the observed visual units (now taken as output in reconstruction), given the input data.

In one embodiment, other non-binary discrete stochastic units may be used. In one embodiment, continuous value units may be used. In one embodiment, mean filed units are used having their state (in the range of [0, 1]) determined by the total input (e.g., a logistic function) and a noise (e.g., as a Gaussian). In one embodiment, other stochastic functions/distributions (e.g., binomial and Poisson) are used for the units. In one embodiment, where continuous data (including semi-continuous data with many levels as opposed to few discrete levels) is used for state of the visible units, the sampling from a probability distribution (e.g., Gaussian with a given variance, with the mean determined by the other signal and weights) keeps the stochastic nature, while making the signal in visible unit continuous (as opposed to discrete). The hidden layers may stay binary (stochastic). In one embodiment, stochastic visible units use continuous signal (e.g., in [0, 1] range) based on other signals and weights and a probability distribution (e.g., logistic function) for sampling or updating its signal.

Figure 59:
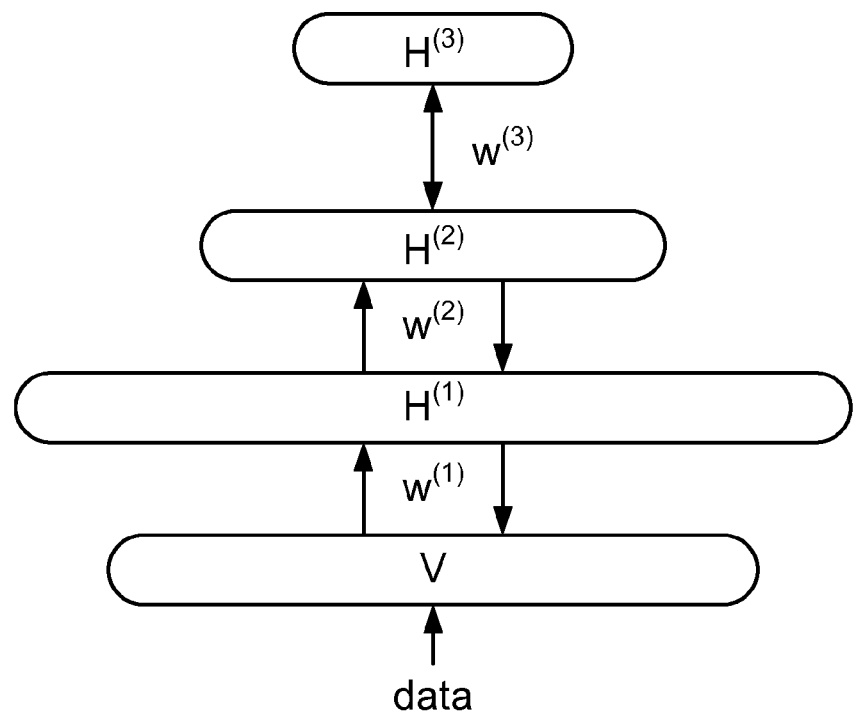
FIG. 59 shows one embodiment for three-level RBM.
Figure 60:
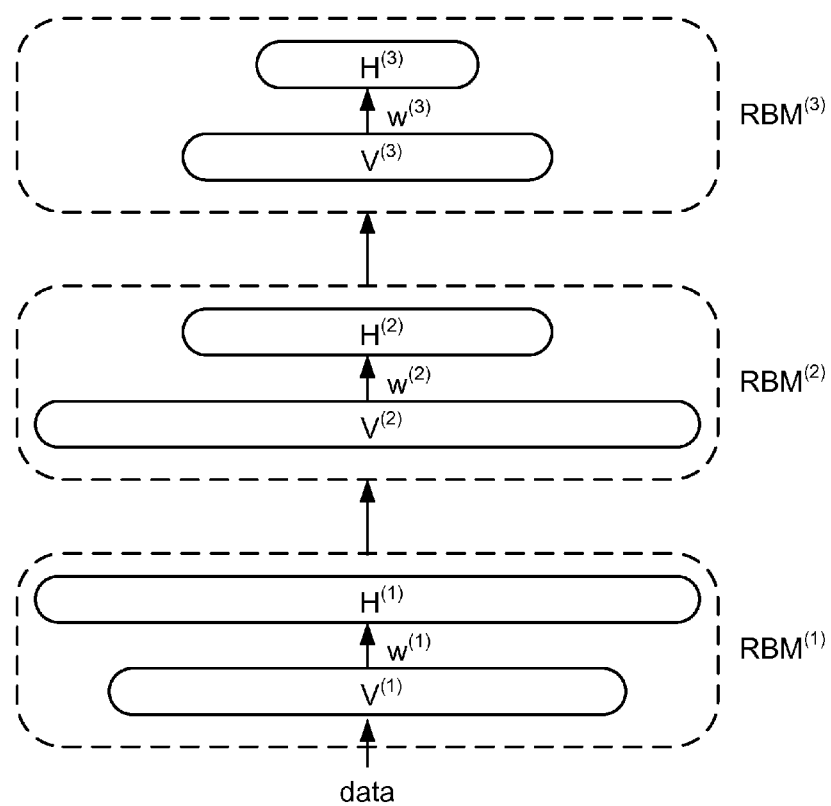
FIG. 60 shows one embodiment for stacked RBMs.

In one embodiment, following the training of one RBM, another hidden layer is added on top which employs the lower RBM's hidden layer as input to determine higher level features, and the training is done one layer at the time. For example, FIG. 59 illustrates 3 level RBM with 3 hidden layers $H^{(1)}$, $H^{(2)}$, and $H^{(3)}$. In one embodiment, in training the weights ($w^{(3)}$) for additional hidden layer ($H^{(3)}$), the weights for the trained lower layers are fixed. The fixed weights are used to pass data from bottom up to higher layer and to reconstruct from top down based on higher order features. In one embodiment, as for example depicted in FIG. 60, RBMs are stack on top of each other and training is done one layer at the time from bottom up. In one embodiment, the visible units have continuous value state (e.g., logistic units). In one embodiment, in training a higher level RBM (e.g., $RBM^{(3)}$), signals in its corresponding visible units (e.g., $V^{(3)}$) are set to the probability values associated with the corresponding hidden units (e.g., $H^{(2)}$) of the previous RBM, while the hidden units ($H^{(2)}$) themselves are binary stochastic units. In one embodiment, the top hidden layer (e.g., $H^{(3)}$) has continuous stochastic value, e.g., based on Gaussian probability distribution (e.g., with unit variance) having a mean based on the weights (e.g., $w^{(3)}$) and signals from its corresponding visible units, $V^{(3)}$ (e.g., logistic units). In one embodiment, the top hidden layer includes a relatively low number of units (e.g., for representing the high level features as low dimensional codes). In one embodiment, hidden units use continuous variables for to represent their features/dimensions, e.g., to facilitate classification based on high level features from the top hidden level (e.g., via training one or more correlation layers, or other methods such as SVM). In one embodiment, layer by layer training creates proper features detection in the hidden layers to enhance the back-propagation in discrimination. This allows for fine tuning by local search, e.g., via contrastive wake-sleep approach for better generation. In one embodiment, few labeled samples are used to fine tune the classification boundaries after the features have already been determined primarily based on the unlabeled data features.

Figure 61:
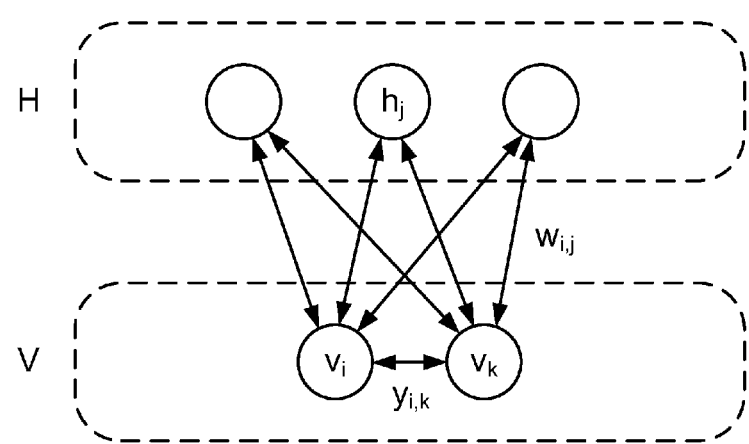
FIG. 61 shows one embodiment for added weights between visible units in an RBM.

In one embodiment, weights ($y_{i,k}$) are introduced in the visible layer while training the weights ($w_{i,j}$) between the visible layer and the hidden layer (e.g., as depicted in FIG. 61). In one embodiment, this approach is also used for higher level RBMs by introducing weights between hidden units of the lower RBM while training the weights for the higher RBM. In this sense, the RBM becomes a semi-restricted Boltzmann machine. In one embodiment, a gradient decent approach for modifying the weights follows the following update contrastive divergence method:

$$\Delta w_{i,j} = \epsilon \cdot (\langle v_i h_j \rangle^0 - \langle v_i h_j \rangle^1)$$

$$\Delta y_{i,k} = \epsilon' \cdot (\langle v_i v_k \rangle^0 - \langle v_i v_k \rangle^1)$$

where superscript 0 indicates the correlation after the initial update of hidden layer after clamping the training sample to the visual units, and superscript 1 indicates the correlation after the hidden layer is updated next time by the reconstruction at the visual layer. In one embodiment, to get to the reconstruction in the visible layer, the visible units are updated one or more times (e.g., iteratively in parallel) based on the current weights, the updated hidden units, and the state of the visible units (from the initial or prior iteration). In one embodiment, the update activity involves stochastic sampling from the probability distribution (e.g., logistic function). Note that $\epsilon$ and $\epsilon'$ correspond to the learning rate. In one embodiment, the hidden units are updated multiple times before the correlations are used to determine changes in weight. In one embodiment, visible units with continuous value state (e.g., mean field units) are updated in parallel based on the total input to the unit (e.g., based on a logistic function).

In one embodiment, intra-layer weights are introduced during the training of a higher hidden layer in order to establish tighter relationships among inter-layer units (e.g., neighboring visible units corresponding to neighboring pixels in an image/data). This enforces constraint during generation. In an embodiment, this facilitates the generation of the parts of a larger recognized object that would not fit each other due to loose relationships between corresponding sub-features. In one embodiment, more features (e.g., redundant) are used to tighten the relationships. In one embodiment, the interrelations between the features (e.g., constraints or rules) are used to limit the choices (i.e., placement of parts), and the placement of one feature helps determine the placement of the other features based on the interrelationship between those features.

Figure 62:
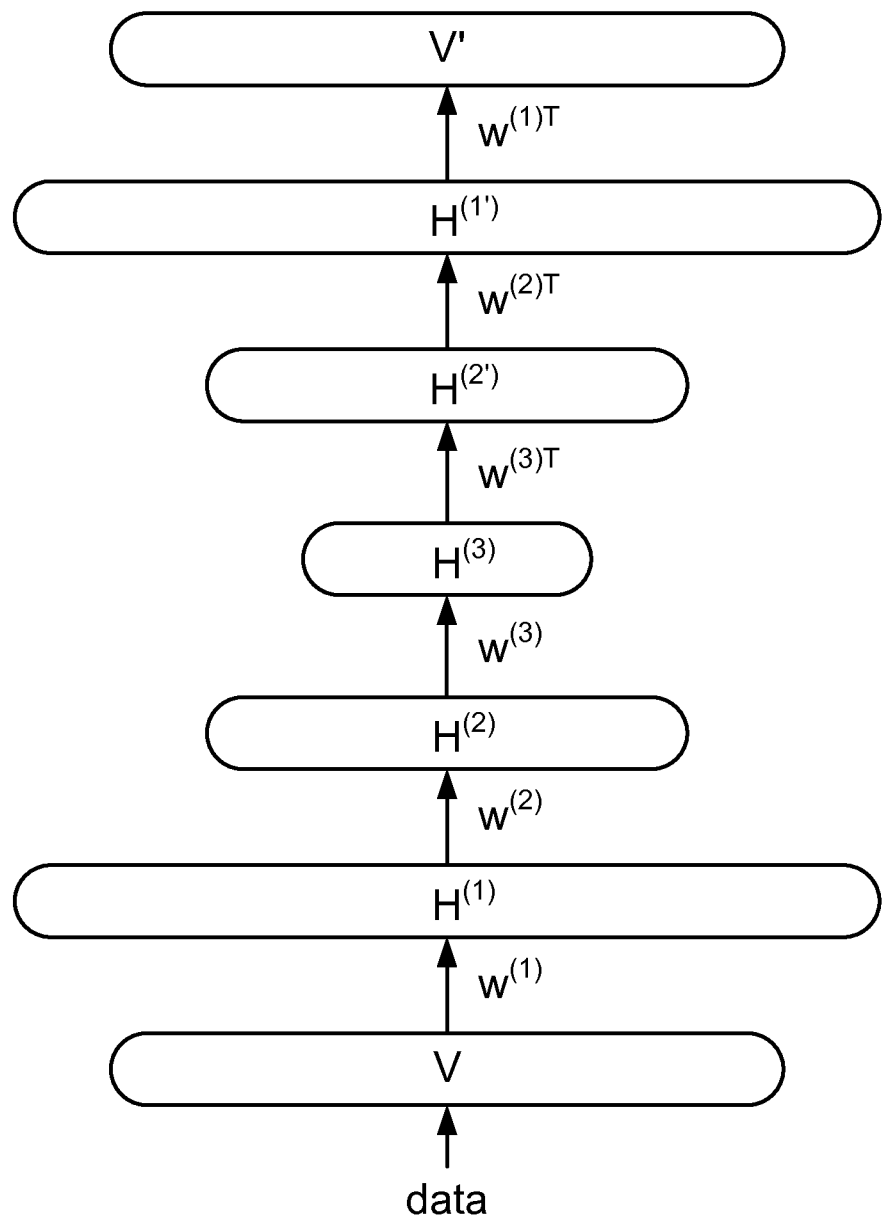
FIG. 62 shows one embodiment for a deep auto-encoder.

In one embodiment, as for example depicted in FIG. 62, an autoencoder, e.g., a deep autoencoder, is provided by stacking further hidden layers, in reverse order with respect to the lower layer, having the same size and the same corresponding interlayer weights as their corresponding lower layers. While the lower half layers (including the coding layer $H^{(3)}$) act as a decoder, the added top layers act as encoder to produce similar data in V' (output) based on the features learned/captured at the coding layer. The added weights in FIG. 62 are depicted with superscript T to indicate that these weights (initially) are represented by the transpose matrix representing the corresponding weights in the lower layers. In one embodiment, the weights of the autoencoder is fine tuned, e.g., by using a back propagation method based on gradient decent. Since the initial weights of autoencoder were determined by a greedy pre-training of lower RBMs, the back propagation will be efficient. In one embodiment, during the back propagation fine tuning, the stochastic binary units are assumed to be deterministic continuous value units adopting the probability value as their state value, to carry out the back propagation. In one embodiment, the objective function (error function) to optimize in back propagation, is the cross entropy error, $E_s$, between the data (e.g., image pixel intensity in V layer) and the reconstruction (e.g., the corresponding pixel intensities in V' output), for a given sample:

$$E_s = -\sum_i (v_i \cdot \log v_i' + (1 - v_i) \cdot \log(1 - v_i'))$$

where $v_i$ and $v_i'$ are the state of the $i^{th}$ units (or intensity of the image at given pixel corresponding to unit i) associated with V and V', respectively. In one embodiment, for the same number of parameters, deep autoencoders tend to produce less generalization errors compared to shallow ones.

In one embodiment, the dimensionality of the data is reduced via the coding presentation at the coding layer (e.g., $H^{(3)}$) having few units compared to the number of units in V.

In one embodiment, a noise signal is introduced in the top hidden layer units (e.g., $H^{(3)}$) during training (but the same for the corresponding training data sample used in V layer) to adjust the weights resulting in more bimodal probabilities in order to make the system more resilient against the noise in the data.

Figure 63:
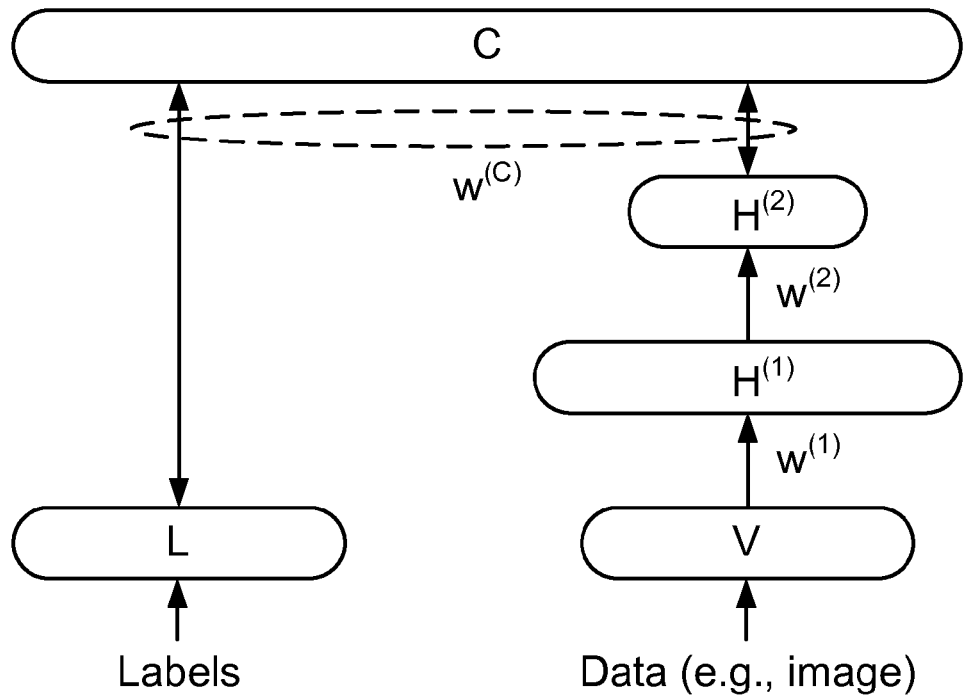
FIG. 63 shows one embodiment for correlation of labels with learned features.

In one embodiment, the features of the training samples are learned, e.g., via an unsupervised learning algorithm (e.g., by greedy learning by RBMs). Then, the features are correlated or associated with labels from a subset of training sample, as for example depicted in FIG. 63. Labels are clamped to a set of units (in L layer) during the training, while data (e.g., image pixels) are clamped to the V units. An RBM is added on top to learn the correlation or association between the data features and the labels. During the training, L layer and one or more hidden layers (e.g., $H^{(2)}$) provide data to C layer (which may be an RBM, as well). Labels may be binary, multi-valued discrete, or continuous. Similarly the weights (e.g., $W^{(C)}$) and biases related to the added layer are learned by feeding labels and corresponding Data at L and V layers, respectively.

Once the association between the labels and Data is learned, in one embodiment, data is input to V layer, and its corresponding label is ascertained at L layer, by having the units in C layer drive the units in L layer. In one embodiment, data samples corresponding to a label may be constructed by clamping unit(s) in L layer to derive units in C Layer, and followed by a top-down reconstruction in V layer. In one embodiment, a subset of units in V layer are clamped to input (e.g., to input a partial image or a portion of image) and the state of one or more labels are set in L layer by clamping to environment. Then, the other unclamped V units are used to determine the state of the other V units (given the clamped visible and label units), deterministically or stochastically (e.g., through iteration). In one embodiment, a larger image may be recovered from partial data (e.g., partial image) through reconstruction.

Reliability Measure

Figure 64:
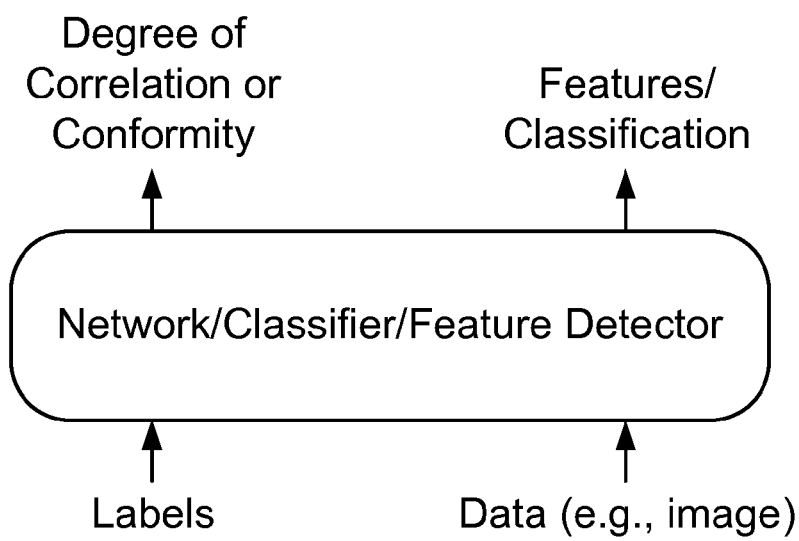
FIG. 64 shows one embodiment for degree of correlation or conformity from a network.

In one embodiment, the strength of the correlation between data and label or conformity of data to the system (e.g., a trained system) may be determined based on the energy of states given the clamped data (and label). In one embodiment, the strength of correlation or conformity is based on relative probability of various states. For example, the energy difference of two states in Boltzmann machine (in equilibrium) is proportional to the log of the ratio of their probabilities. In one embodiment, the relative strength of the correlation or conformity is based on the relative probability of two states. In one embodiment, a baseline for the probability of training samples is established during and/or after training. In one embodiment, the strength of correlation or conformity indicates how well the state(s) representing the data (and label) fit into the energy landscape of the system. In one embodiment, as depicted in FIG. 64, the strength of correlation or conformity of a dataset (including any associated label) is used to determine Z-factor associated with the associated features and/or classification of the data from the network.

In one embodiment, the quality of the search is evaluated based one or more approaches including for example, the probability, e.g., the total energy of RBM, or the difference between the regenerated data/image and the input, the frequency the recognized labels change while anchoring the visible units/neurons to the input/image.

Learning Based on Models

In one embodiment, the learning is achieved through simulation using a data (and label) sample generation based on one or more models. In one embodiment, a network trained based on model(s) is used to recognize and classify actual data which may not have been seen before. In one embodiment, the system is trained to infer the potential model(s) itself by recognizing the (e.g., observed) data conforming to a particular model and its associated labels/parameters.

Figure 65:
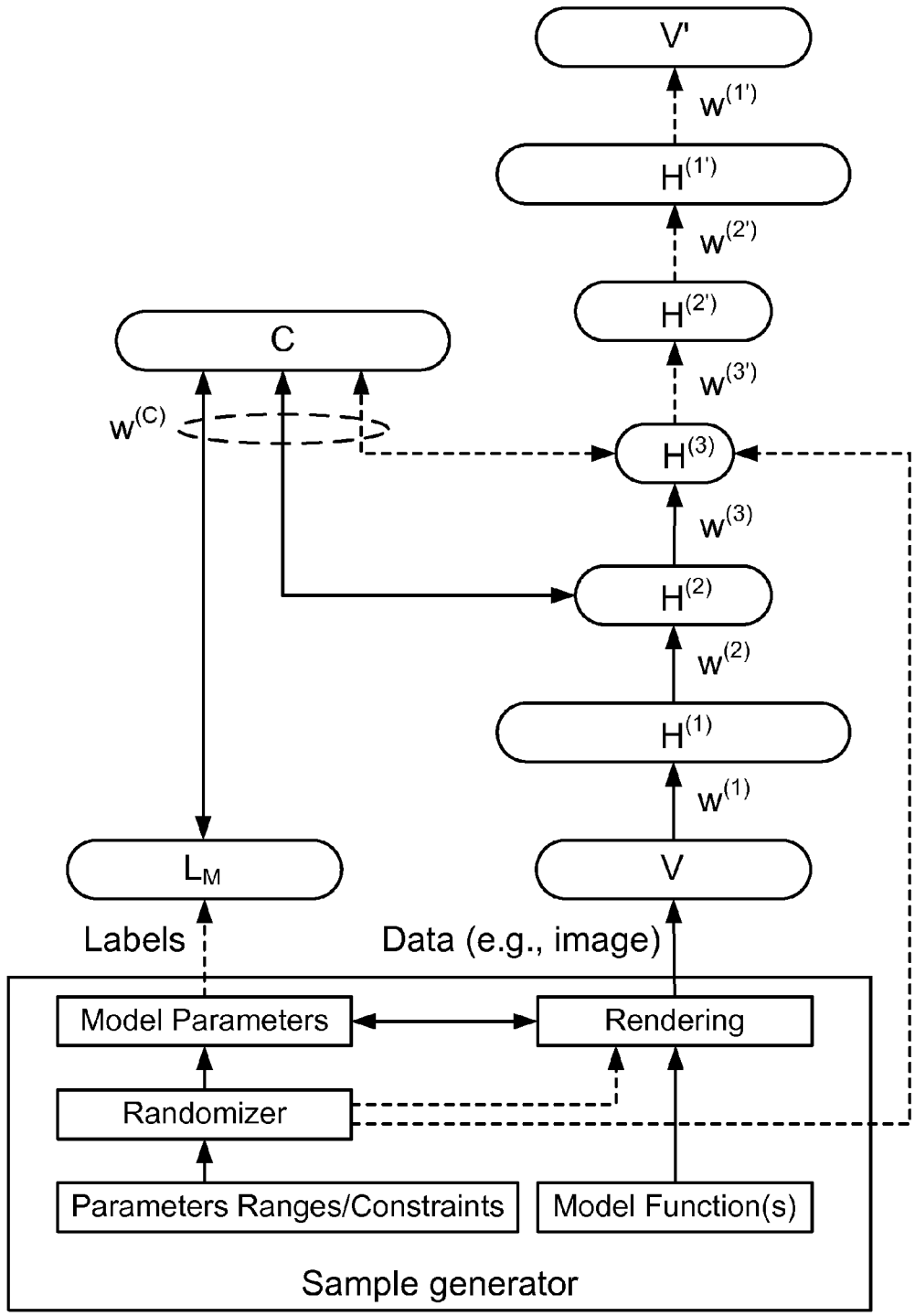
FIG. 65 shows one embodiment for sample/label generator from model, used for training
Figure 66:
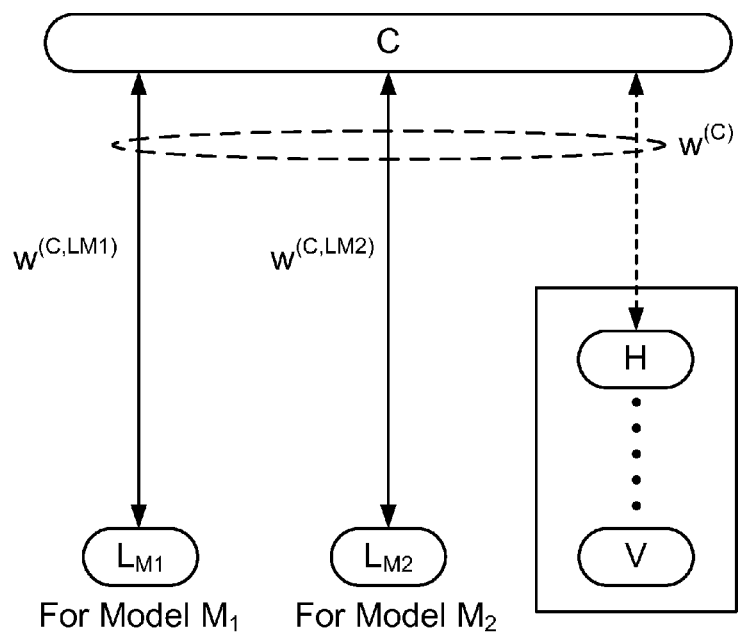
FIG. 66 shows one embodiment for classifier with multiple label layers for different models.

In one embodiment, as for example depicted in FIG. 65, a sample generator is used to provide data (e.g., images) for training. A rendering unit renders the data according to one or more models (e.g., functional, tabular, and/or heuristic) and the corresponding model parameters governing the instantiation of the model by the rendering unit. In one embodiment, at least a subset of model parameters are generated stochastically (or via a deterministic sequential algorithm) by a randomizer unit, which for example, uses applicable probability model(s) and/or model rules to generate the subset of model parameters within given ranges or constraints. In one embodiment, the training of the network (e.g., a deep belief network based on Boltzmann machines) is done repeatedly generating training data samples via the sample generator to feed to the V layer of a network being trained. In one embodiment, the training is done one hidden layer at the time (e.g., until $H^{(3)}$). In one embodiment, the training of hidden layers is done unsupervised (i.e., without supplying labeled training samples). In one embodiment, an autoencoder is setup (e.g., as shown in FIG. 65) and fine tuned using back propagation. In one embodiment, a correlation or associative layer is added to learn the correlation between the features of the data and the labels ($L_M$), where the labels are supplied by the sample generator (along with the rendered data). In one embodiment, for example as depicted in FIG. 66, multiple $L_M$ layers (e.g., in parallel) are used to represent various classes of (e.g., independent) models. In one embodiment, the relevant weights between C layer and an $L_M$ layer are fixed for one class of model(s) while training another class of model(s) through the same C layer. In one embodiment, the cross correlation between two models is determined, via cross correlation (e.g., through layer C) between the labels associates with both models. For example, by a subset of labels from $L_{M1}$ layer is clamped and sampled generated from top-down reconstruction from layer C to layer LM2 are used to determine such cross correlation. In one embodiment, states on layer C are stochastically run to derive the reconstruction in both $L_{M1}$ and $L_{M2}$ layers for determining a correlation between the reconstructions samples. In one embodiment, the units in layer C are derived (e.g., through inference) from V layer (by inputting data), and labels are reconstructed in layers $L_{M1}$ and $L_{M2}$. In one embodiment, the levels of conformity or correlation of data supplied to V units (or a subset of V units) with models(s) are obtained for each model based on relative probabilities and energy of states. In comparing on model to another, the weights associated with one model are not used in determining energy or probability associated with the other model (for such comparison).

In one embodiment, noise is incorporated into the rendering in order to make the network more resilient to noise. In one embodiment, a stochastic noise (e.g., Gaussian) is applied to the rendering, e.g., in illumination, intensity, texture, color, contrast, saturation, edges, scale, angles, perspective, projection, skew, rotation, or twist, across or for portion(s) of the image. In one embodiment, noise is added to a hidden layer in a reproducible manner, i.e., for a given data sample (or for a given model parameters), in order to adjust the weight to result in a more modal range of activities to increase tolerance for noise.

In one embodiment, elastic distortions (as well as affine transformations) are used to expand the size and variety of the training set, e.g., when the training set is produced from a model (such as a rendered data/image) or when the data/image is provided separately as part of a training set. In one embodiment, such a distortion is parameterized and rendered by the rendering unit. One embodiment used both affine (e.g., translation, scaling, reflection, rotation, homothety, shear mapping, and squeeze mapping) and distorting type transformations. In one embodiment, various transformations are rendered to generate training dataset to let the system learn features that are transformation invariant. In one embodiment, a shape model is generated with various parameters, such as various textures, colors, sizes and orientations, to let the system learn the invariant features such as the relative positions of the sub features of the modeled shape. In one embodiment, orthogonal matrixes, for example, are used to perform rotation and reflection transformation for rendering the image or on the provided data sample.

In one embodiment, the features of a high level model (with parameters) are learned by a system (such as RBM) through training (e.g., unsupervised). For example, in one embodiment, a 3D model generates various 2D images at different poses (including position, orientation, and scale) and expressions/emotions (or illumination), and the system would learn correlation between the images and their features (derived from the model). Then, the model parameters (and their probabilities) may be obtained for an image.

In one embodiment, various samples are generated/rendered from a 3D model, by varying relative location and angle of the viewer and the model object (e.g., polar coordinates (r, θ, φ)). These variation span various poses (based on θ and φ) and scaling (based on r), using other perspective parameters (e.g., derived from camera/viewer's view span).

In one embodiment, a 3D model rendering mapped to 2D images is based on the normal vectors at a given point of the 3D model, illumination parameters (e.g., location of light(s) and intensity), and reflectivity and texture model of the surface. In one embodiment, the location/presence of rigid points from the model improves the accuracy. In one embodiment, PIE (pose, illumination, expression) variations are used to generate training data/images (e.g., by rendering in 2D).

In one embodiment, multiple models can be learned in combination. E.g., the model for generating of texture of surfaces or colors can be learned in conjunction with a 3D model of head or body. In rendering a 3D model, the texture model may be incorporated to provide textures and colors for the rendered images used for training. The correlation between the model parameters and the rendered images is learned via training. In one embodiment, noise is added to prevent over fitting and regularize the weights to better generalize when used with out of sample data/images.

In one embodiment, getting a low level of conformity of a data/image (for example based in a conformity measure such as energy error or probabilities) with a trained system (e.g., based on a model) causes the data to be marked/tagged or included in a set of data to be recognized/classified by other expert systems/networks.

In one embodiment, the model comprises of rules governing the parameters, structure, and relationships between various components and sub-components of the model. In one embodiment, the rules engine is iteratively executed to generate sample data for training, by using a rules engine.

In one embodiment, the model includes a databases of background and foreground objects (with parameters) or images. In one embodiment, various data samples are created with various background and foreground models to train the system recognize high level features of foreground and background (e.g., wide uniform horizontal bands or regions of color/intensity). In one embodiment, generic labels are used to train the correlation between the labels and the features of the background or foreground scenes.

Correlating of Features and Locations of Interest within the Data (e.g., Image)

Figure 67:
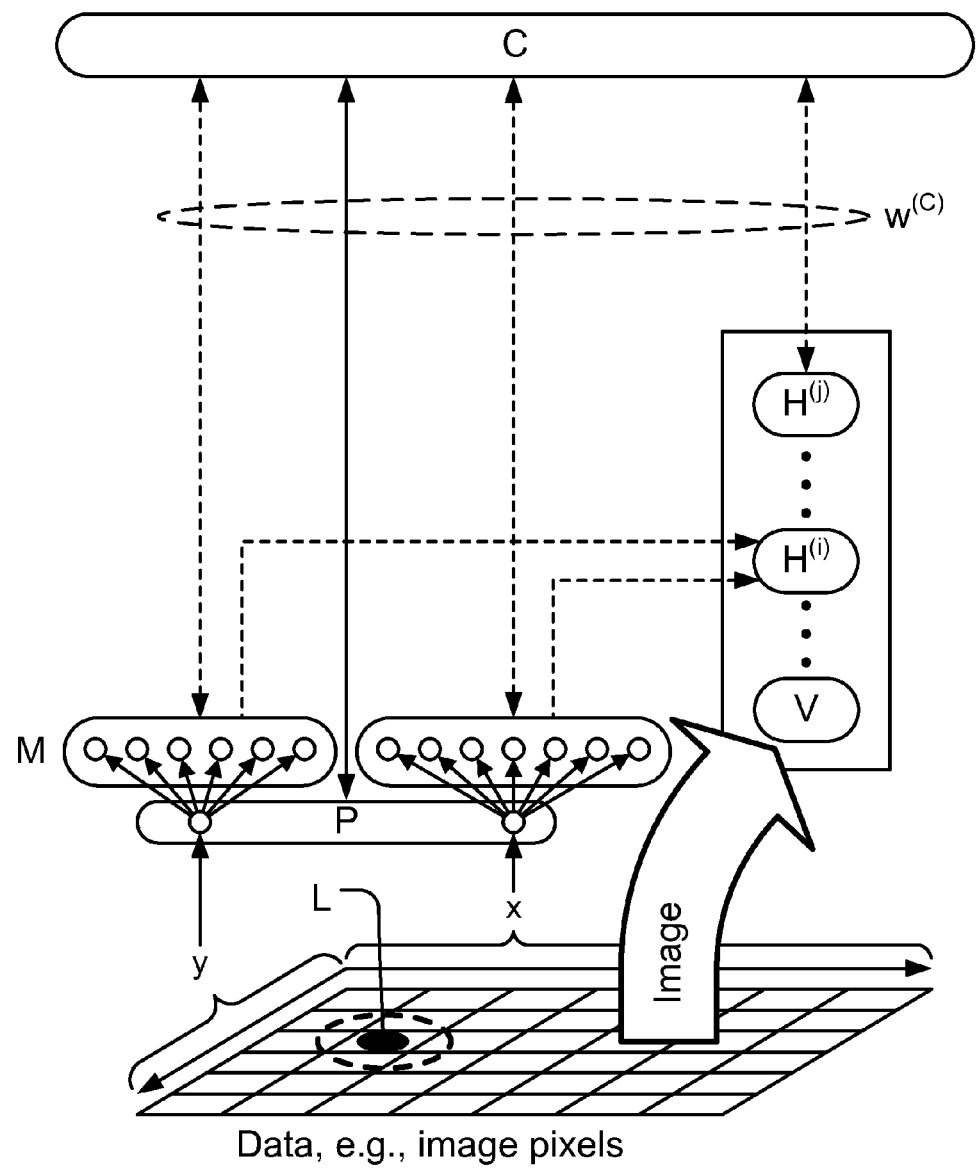
FIG. 67 shows one embodiment for correlation of position with features detected by the network.

In one embodiment, a location within the image is specified by a continuous value (e.g., in range of [0, 1] to indicate/identify the location or pixel along a direction (e.g., x or y direction) in the data/image) or a multi-discrete value (e.g., indicating/identifying a range of locations or pixels along a direction in the date/image). In one embodiment, as for example depicted in FIG. 67, a position L in the data (e.g., a pixel map), is represented by its (x, y) coordinate. In one embodiment, x or y may be fuzzy numbers (e.g., with membership functions such as triangular, trapezoidal, rectangular, or singular). In one embodiment, the state of a unit (e.g., neurons) is represented by fuzzy values. In one embodiment, information such as coordinates, width, height, orientation, type of shape, are presented by units in a parameter layer P. In one embodiment, M layer(s) are used to provide/approximate the membership function value of a parameter, such as coordinate of allocation. The units in M represent the values (or range of values) that a parameter may take. In one embodiment, a unit in M layer corresponds to a pixel (or a range of pixels) along a direction (e.g., x axis) within the image. In one embodiment, one or more units (e.g., continuous valued) in M layer are set to represent the membership function over the pixels (or range of pixels), for example in x axis, corresponding to the corresponding fuzzy parameter in P layer that, for example, represents the x coordinate of L. In one embodiment, units in M layer are used to train association of, for example, a location on the image and the features of the image. In one embodiment, weighted link are made from P or M units to a correlation layer C for training the association. In one embodiment, weighted links from M layer are made to hidden layers to associate parameters to features of the image. In one embodiment, M layer(s) includes a unit for every pixel (or a range of pixels) on the image, e.g., full coverage to specify any shape (or blob) in M layer for association with the image.

In one embodiment, where inter-layer links between units are not fully connected, the connection from M layers to units in lower hidden layer(s) are substantially arranged to spatially resemble or correspond to M units' corresponding pixels (or range of pixels) in the image viewed via V layer. In such a case, the links from V layer to higher hidden layers are also limited in number of connectivity, and for example, the few links follow a fan out pattern from a 2D layout of V layer to next hidden layer.

In one embodiment, blobs (of fuzzy blobs) are provided on M layer for association with the image during training. Fuzzy blob, for example, may have fractional membership function value at the blob's edge. In an embodiment, the membership function value in range of [0, 1] is represented by a logistic function in a unit.

In one embodiment, the location, area, or focus of interest is provided on M layer with the corresponding training sample in V layer, to train the correlation. In one embodiment, the representation of the focus of interest may be a (fuzzy or crisp) border or a region specified parametrically or per pixel.

In one embodiment, with a training sample having multiple focuses of interest, the training may be performed by submitting the same data (image) with individual focus of interests during the training. In one embodiment, the stochastic nature of C layer will cause reconstruction of focus of interest in M or P layers, given an input image (or a portion of image) in V layer. For example, in training face recognition, images including one or more faces are supplied to V layer while their corresponding focuses of interest (e.g., the location/size of the face) are supplied to M or P layers, to train the correlation. In one embodiment, the various focuses of interest are iteratively constructed in M or P layer by clamping data (e.g., an image) in V to, for example, derive stochastically the corresponding focuses of interest from C layer. In one embodiment, the reconstructed parameters are output in M or P layers based on their corresponding probability.

In one embodiment, the correlation of image/data to its locations of interest is performed during training by implementing a representation of such locations on a layer of units laid out to correspond to the image/data (e.g., by linking such units to a hidden layer above V layer). In one embodiment, the position parameters (e.g., location, width/height, type, orientation) and the coverage parameters (border type, fill type, fuzzy/crisp) are used to render representation of the location(s) of interest on the representation units, e.g., by using a value in range of [0, 1]. In one embodiment, the fuzzy type rendering helps avoid making false correlations with other irrelevant features in the image/data, by representing the features of the location of interest as coarse. Fill type rendering identifies a blob where the location of interest is in the image, so that if the features of the interest are in the middle of the location, the training would catch the correlation.

Limiting Number of Weights Based on 2D Fan Out Layout

Figure 68:
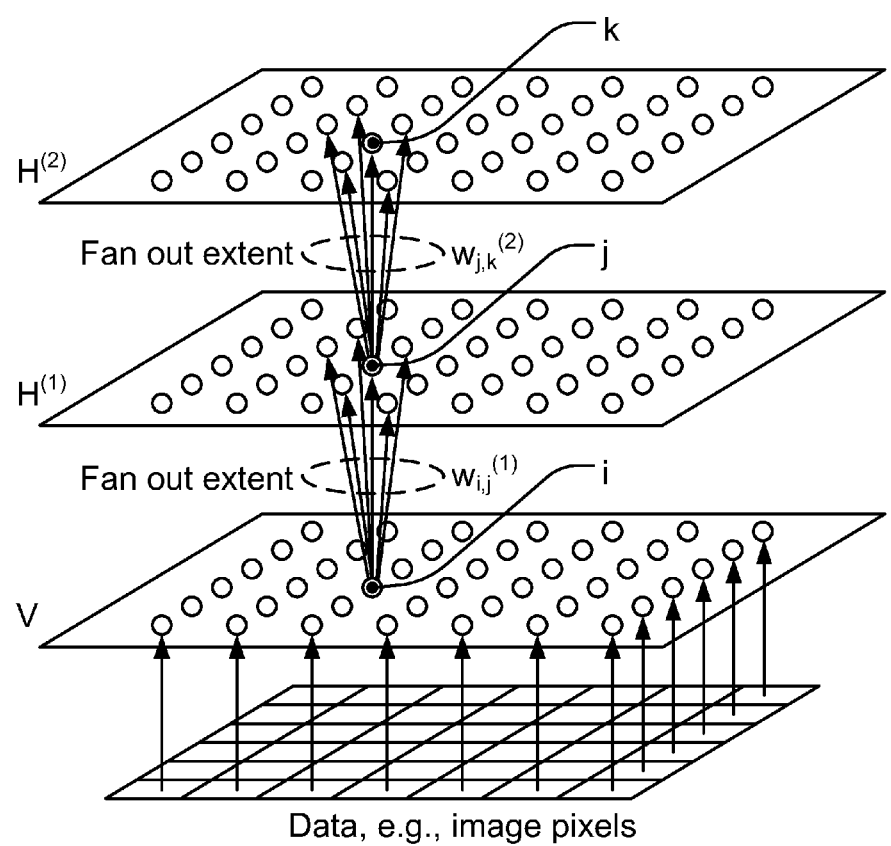
FIG. 68 shows one embodiment for inter-layer fan-out links.

In one embodiment, as for example depicted in FIG. 68, the extent of the inter-layer connections are limited for the lower layers (e.g., $H^{(1)}$ and/or $H^{(2)}$). In one embodiment, the number of inter-layer connections between the lower layers is substantially less than that of fully connected ones. For example, if the (average) number of fan out links per unit, f, is significantly smaller than the number of units in the higher layer, the number of inter-layer connections (or weights) are significantly reduced compared to the fully connected scheme. This scheme helps reduce the complexity of the structure, reduces the over fitting, and enhances generalization. Conversely, the number of fan out links (top-down, e.g., from $H^{(1)}$ to V units) are also limiting a until in the higher layer to relatively few units at the lower unit. Therefore, in one embodiment, for example, the number of fan out links from a unit in $H^{(1)}$ to V units may be about 3 to 10 pixel wide.

In one embodiment, there are multiple type of units in a hidden layer (e.g., $H^{(1)}$), with each type corresponding to different number (or range of number) of links to its lower layer units. In one embodiment, for example, type 1 units have about $f_1$ links (e.g., about 3-10 links), type 1 units have about $f_2$ links (e.g., about 20-30 links), and type 3 are fully connect. In one embodiment, there are more number of units (e.g., in $H^{(1)}$ layer) which have less number of connections to the lower layer units (e.g., in V layer), i.e., most units in $H^{(1)}$ have few connections to V layer units and few units in $H^{(1)}$ are fully connected to units in V layer.

Training with Samples of Varying Reliability

In one embodiment, a measure of reliability of training samples may be provided with the sample data. In one embodiment, a default value for the reliability is assumed if not provided for a particular sample.

In one embodiment, an error function (to be minimized by training) defined over the training sample space (e.g., in a batch processing of an epoch) accounts for data sample reliability by including sample reliability factor as a weight in the contribution of the data sample to the batch error function, e.g., in the summation of the errors contributed from individual data samples.

In one embodiment, for example, a stochastic approach is used (instead of full epoch batch) to sample one (or several) training data sample(s) while optimizing the sample error function, and the sample error function is weighted by the reliability factor of the data sample. In one embodiment, the learning rate (e.g., the factor associated with the step to take in modifying the weights during the training) is modified based on the reliability weight for a given data sample used during the learning (e.g., in stochastic sampling of the data samples).

In one embodiment, some key data samples may be marked as the key representative samples. In one embodiment, an elevated weight is assigned to such samples during the training, e.g., to simulate the training with multiple instances of such training sample.

Preprocessing Prior to Classification and Training

Figure 69:
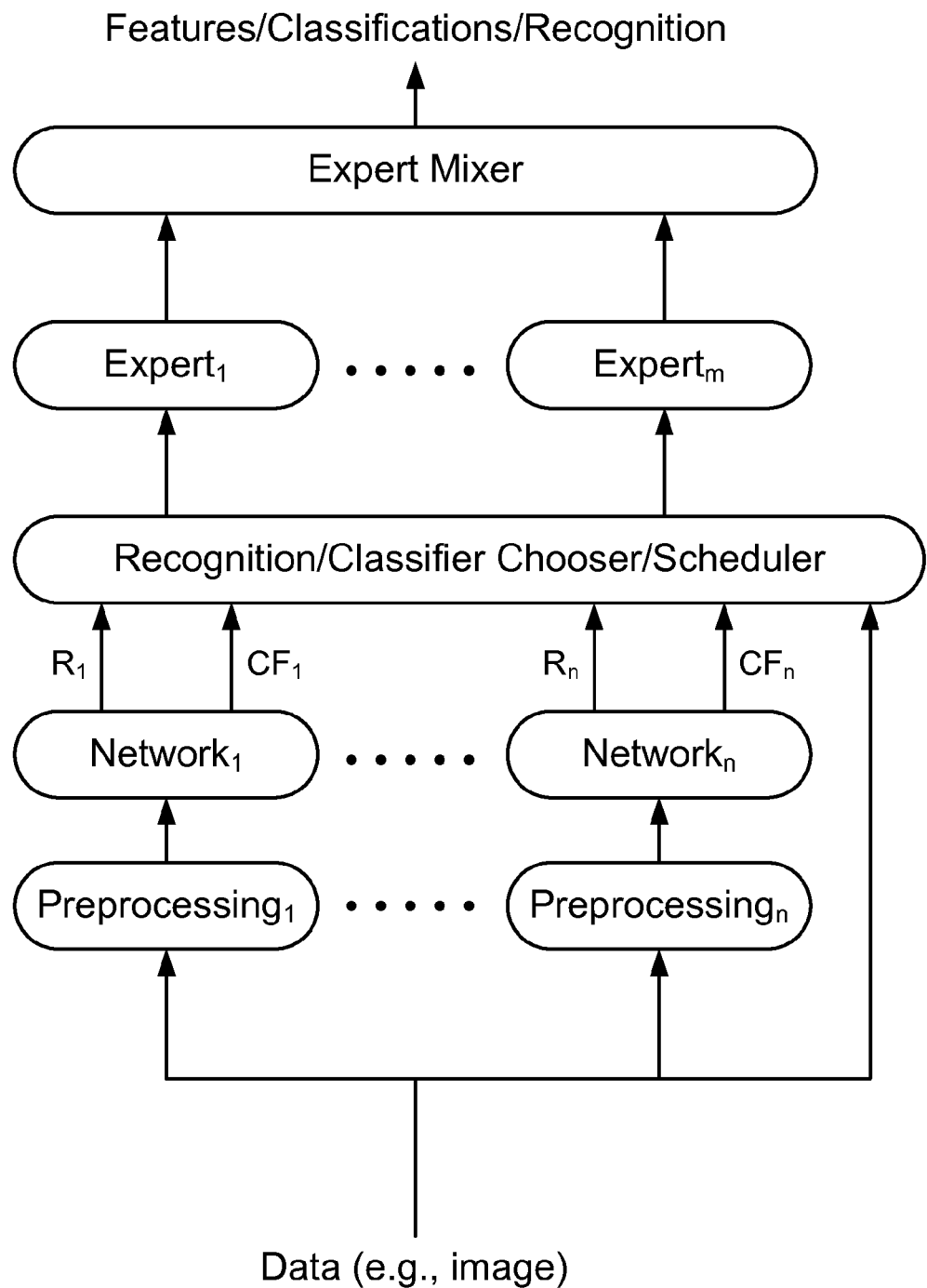
FIG. 69 shows one embodiment for selecting and mixing expert classifiers/feature detectors.

In one embodiment, one or more types of preprocessing is performed on the data (e.g., used for training or recognition) to focus on certain aspects of the data (e.g., image) in order to make the training and classification more efficient. In one embodiment, the preprocessing makes certain features to become more pronounced and easier to distinguish by the network (during and after training). For example, a filter such as Sabel filter is used in the preprocessing of an image to detect the line edges before feeding as training set for an RBM. In one embodiment, the preprocessing reduces features that may be less relevant in detection of pose and greatly simplify an initial step of choosing a more relevant expert system to further classify the image. In one embodiment, the preprocessing may actually introduce artifacts into the preprocessed image, e.g., a shadow on a face, may result in an edge across the face after an edge detector filter. In one embodiment, as for example depicted in FIG. 69, multiple preprocessing (e.g., edge detection, edge sharpening, contrast enhancement, intensity conversion (e.g., non-linear mapping), cosine transformation, and histogram) are performed, for example, in parallel, and the preprocessed image is fed into various networks, classifiers, or feature detectors for detection of classification(s) and feature(s) (e.g., denoted by $CF_1$ and $CF_n$). In one embodiment, the classification and/or feature detection is associated with one or more measures of reliability factor (e.g., denoted as $R_1$ and $R_n$). Based on the features/classes detected (and their corresponding reliability factors), in one embodiment, further feature detection or classification (e.g., more detailed detection/classification, expert system, or sub-classification used for example for identity recognition) are identified, chosen, and/or scheduled to be performed. In one embodiment, the outcome of further feature analysis/detection or classification are consolidated/mixed based on the reliability of the results (e.g., from classifiers or expert modules) as well as the reliability of parameter extraction based on the model (e.g., a front pose and side view images of a person's head present the aspects of facial features with different reliability due the image projection from 3D to 2D, as well as hidden/blocked features).

In one embodiment, the reliability of an expert module is trained by correlating the features indicating the domain of the expert module with the error encountered by the expert module.

Fuzzy Valued Feature/Label Output

In one embodiment, multiple units are used to present various labels corresponding to a class of object. In one embodiment, feature detection system is used to train document classification based on learned (e.g., unsupervised) features corresponding to documents based on terms contained in the document (such as statistics of several hundred or several thousand common words). In one embodiment, latent semantic analysis (LSA) is used to provide the correlation between the terms or documents based on document-term matrix, and decomposition using orthogonal matrices and a low dimensional diagonal matrix (to a low dimensional space), e.g., by using single value decomposition technique (SVD). In one embodiment, RBMs are used for learning features, e.g., by limiting to top hidden layer to low number of units (dimensions/features). In one embodiment, the similarity between documents is determined by comparing (e.g., by cosine similarity) of their features. In one embodiment, the features (e.g., continuous valued) are correlated/associated with provided labels/classification (e.g., in supervised training). For example, in one embodiment, the labels indicate the type of document, such as legal, historical, fiction, scientific, business, manufacturing, technical, etc. In one embodiment, the layers are supplied to label units and correlation/association is learned via a correlation layer, e.g., by using an RBM and using the features learned from unsupervised training. In one embodiment, more than one label may be provided during the training of a sample (e.g., a document). In one embodiment, the labels are binary (e.g., indicating whether the document is "technical" or not). In one embodiment, the labels are continuous valued (or multi-valued), e.g., having values in range [0, 1], to indicate the degree in which the document is classified by a label (or the membership function of the document in the label's class). In one embodiment, upon training the correlation/association, given an input data (e.g., a document), the reconstruction of labels (as output via, for example, correlation layer), presents the classification of the document based on those labels. In one embodiment, one or more labels are identified in the output, indicating that the document is determined to belong to both classes/types. In one embodiment, the output (multi-valued or continuous) indicates the degree in which the document is determined to be of the class/type. In one embodiment, the values output at the labels are thresholded (or further discretized) to simplify the presentation and further usage. For example, in one embodiment, an output less than 15% is zeroed, or an output more than 85% is turned to 100%.

In one embodiment, the membership function values presented by the output values in label units are consolidated to form a fuzzy number. For example, in one embodiment, the labels reconstructed from a handwriting recognition sample, show the membership function values in classes "1", "7", and "2". In one embodiment, the labels for expression (e.g., facial) can be represented by fuzzy concept, e.g., smiling, laughing, sad, angry, scared, nervous, sleepy, apprehensive, surprised, and tired. And each label may have a degree of membership (e.g., degree of smiling compared to neutral) for a sample data, used for training. The labels may also be correlated based on the training data.

In one embodiment, various labels (i.e., their membership degrees) get correlated/associated with the features (e.g., at the top hidden layer of RBM or deep belief network) via training through a correlation layer.

Adding New Features

In one embodiment, an already trained (e.g., unsupervised) feature detector (e.g., RBMs or a deep belief network) is used to provide additional feature(s). In one embodiment, one or more units are added at the top hidden layer. In one embodiment, the weights/biases related to the units already at the top (e.g., hidden) layer are fixed/frozen, and training (e.g., unsupervised) is performed to adjust the weights/biases related to the added units. In one embodiment, the added units represent a set of sub features that help enhance the reconstruction from top-down direction. In one embodiment, regularization techniques (e.g., limiting the weight amounts or weight decay techniques) or verification techniques (e.g., testing using reserved test datasets) are used to maintain or monitor generalization. In one embodiment, training samples with and without the features are provided to adjust the weights of the added units. In one embodiment, back propagation is used for fine tuning of the weights/biases. In one embodiment, the added units and the previous units are used to make association and/or correlation with labeled samples, e.g., during the supervised training.

In one embodiment, an expert classifier/detector is trained predominantly from one class to detect the distinguishing features of data within the class. In one embodiment, a set of feature nodes/units/neurons are added, e.g., to the top hidden layer of RBMs, for training to detect features of an additional class (for new expert). In one embodiment, the original expert classifier/detector is trained for a different class of objects (or expertise) to detect/determine the new features at the added units at the top layer. In one embodiment, the related weights/biases for the existing units at the top layer are fixed (i.e., prevented from changing) while training for the additional class. In one embodiment, redundant features (units) are eliminated (for example from the top layer) based on their strong correlation between those from the existing expert and the additional expert. In one embodiment, correlations between top redundant units are determined based on sampling from the data in the visible layer. In one embodiment, the correlation or covariance between top redundant units (e.g., at layer $H^{(3)}$) are determined based on their biases and weights to the lower layer units.

In one embodiment, additional units are provided in lower hidden layers (e.g., layer $H^{(2)}$) to allow more flexibility to handle more complex feature sets in a class of data/images. In one embodiment, the redundancy of such units are determined by strong correlation between the stochastic probability associated with such units, e.g., based on the value of logistic function of the total input to the unit. In one embodiment, in eliminating a unit due to redundancy, the weights linking the remaining unit to other units (e.g., in a higher layer) are updated by consolidating (e.g., algebraically) the corresponding weights from the existing and redundant units, in order to maintain the same total input to the top layer linked unit.

Focus of Interest with Variable Resolution

Figure 70A:
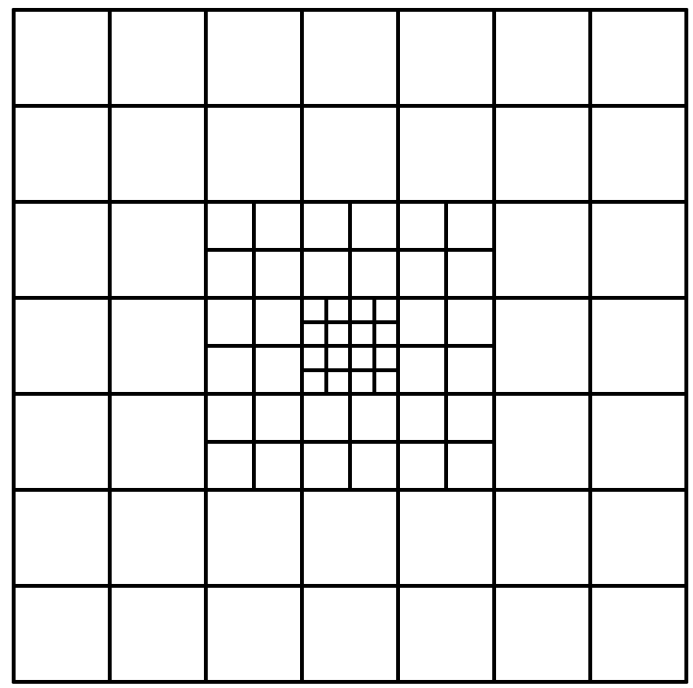
FIGS. 70 a-b show one embodiment for non-uniform segmentation of data.
Figure 70B:
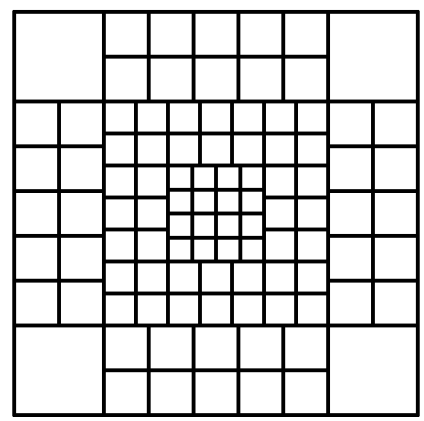

In one embodiment, as for example depicted in FIGS. 70(a)-(b), the data (e.g., image) is laid out using a set of non-uniform sections, with smaller size (higher resolution) sections at the center of the image, and larger (low resolution) sections further way from the center. For example, as shown in FIG. 70(a), the sections are rectangular (or squared) forming square bands with increasing size. In one embodiment, the consecutive segment sizes are multiple (e.g., 2) of the next smaller size (as for example depicted in FIG. 70(a)). In one embodiment, as depicted in FIG. 70(b), multiple segment sizes may be used in various bands around the center, for example, in diagonal positions compared to the center. In one embodiment, the relative size of the segments may be a rational number (fraction), as for example depicted in FIG. 70(b).

Figure 71A:
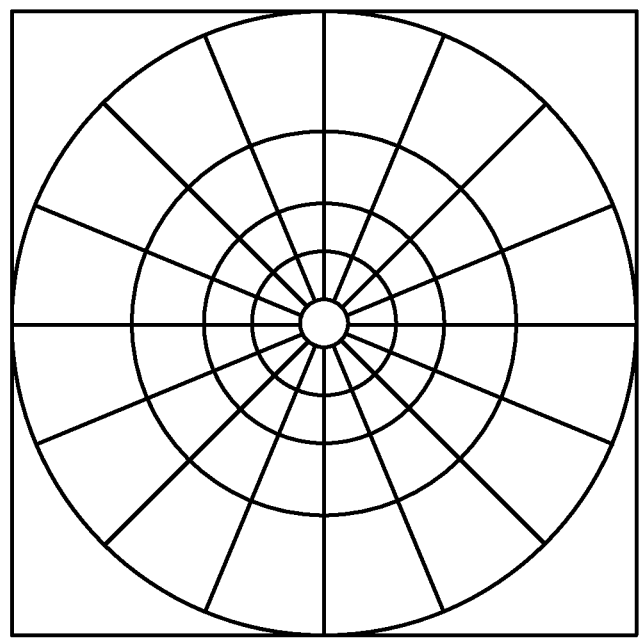
FIGS. 71 a-b show one embodiment for non-uniform radial segmentation of data.
Figure 71B:
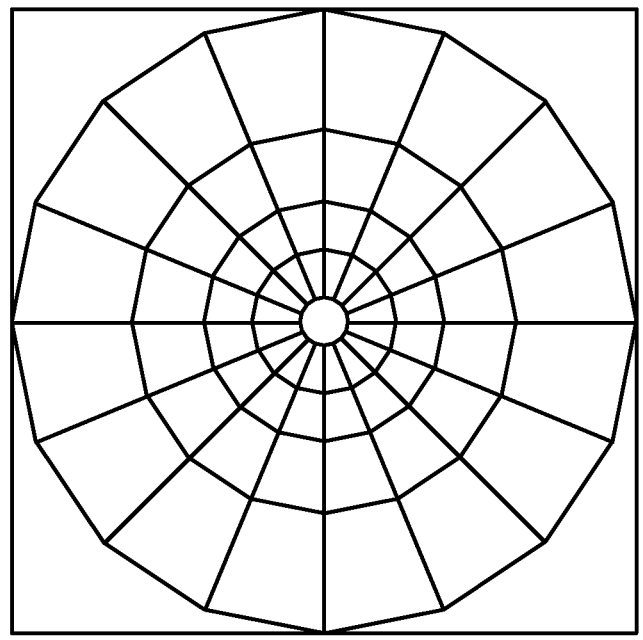

In one embodiment, as for example depicted in FIGS. 71(a)-(b), some of the segments are radially distributed from the center, having similar sizes but different orientation. In one embodiment, the segment radial boundaries are approximated by an arc (e.g., of a circle), as for example depicted in FIG. 71(a). In one embodiment, the segment boundaries are defined by a polygon, as for example depicted in FIG. 71(b).

Figure 72A:
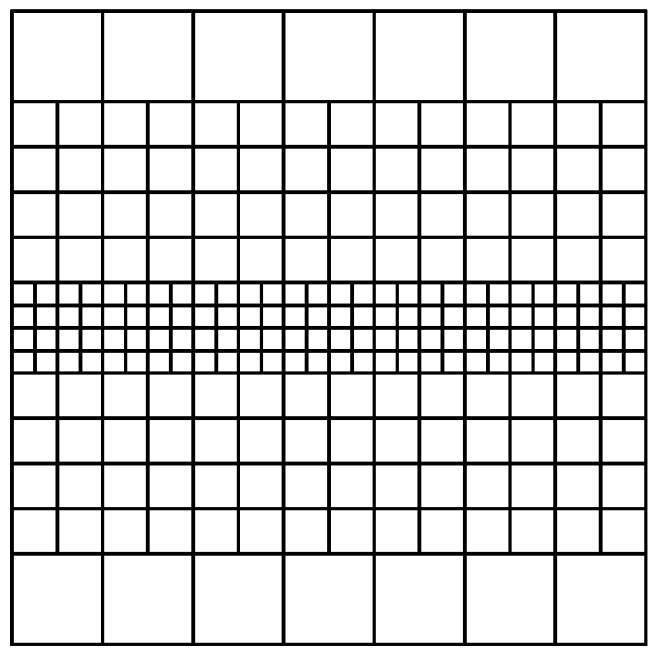
FIGS. 72 a-b show one embodiment for non-uniform segmentation in vertical and horizontal directions.
Figure 72B:
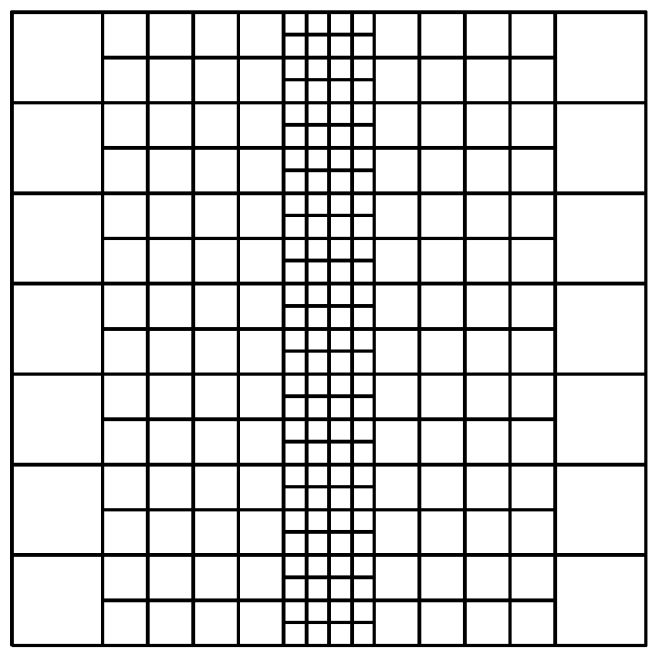

In one embodiment, the resolution/size of segments varies in vertical or horizontal direction, as for example depicted in FIGS. 72(a)-(b), respectively.

Figure 73A:
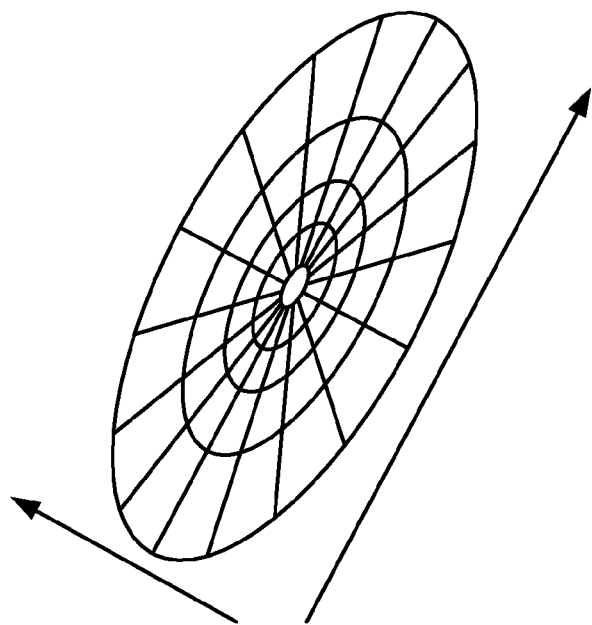
FIGS. 73 a-b show one embodiment for non-uniform transformed segmentation of data.
Figure 73B:
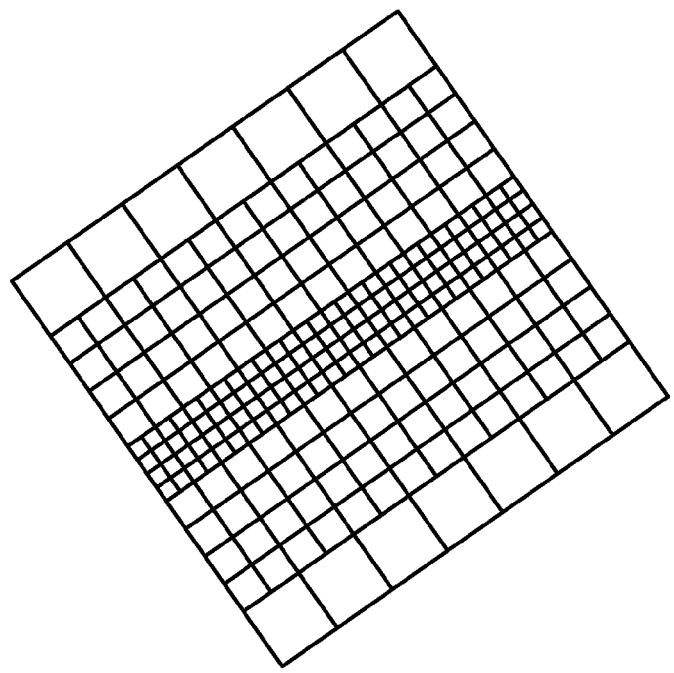

In one embodiment, as for example depicted in FIGS. 73(a)-(b), the segment layout follows a transformation(s) such as rotation, skew, perspective, scaling, or even distorting type transformation. In one embodiment, the details in an image is recognized (or trained) by mapping the image (or portion of the image) in such a transformed segment layout.

In one embodiment, features of an object (e.g., pose including rotation) is determined, and based on such features, features of sub-objects of other objects depicted in an image are extracted by preprocessing (e.g., mapping) a portion of an image into a segmented layout with variable resolution. Then, the mapped image (or portion thereof) is provided to a classifier or feature recognition system to determine the features from the mapped image. For example, in an embodiment, a frame depicted in an image is identified (e.g., a frame of a picture or a frame corresponding to a side of a building or a container). In one embodiment, based on the perspective/skew/projection of the frame (or other indicators), the image or a portion of image is mapped to a segmented layout for input to a network for further feature detection or classification.

In one embodiment, mapping of an image to a segment is done by averaging the intensity/color of the pixels falling into the segment. In one embodiment, summary information from the enclosed pixels of the image is attributed to the segment (e.g., texture, variance of intensity/color).

In one embodiment, a recognition/classification network or module (e.g., a deep belief network or RBMs) is trained using a variable segment layout associated with its visible/input layer.

In one embodiment, an image is mapped to a variable segment layout before inputting to a recognition/classification network or module (e.g., for training or for recognition).

In one embodiment, an expert module uses/selects a variable segment layout to use based on other features of data/image determined by other recognition module. For example, a text recognition module may use a layout such as those, for example, depicted in FIGS. 72(a)-(b) and 73(b).

Estimating/Predicting/Localizing the Focuses of Interests

In one embodiment, the locations of interest (e.g., the location of faces within an image) is determined by a scanning the image through a variable size window over an image at different location on the image, searching for example for particular features or signatures (e.g., head or face). In one embodiment, the locations of interest are determined, for example, by determining an enclosure (e.g., the smallest enclosure, such as rectangle or ellipse) around the object of interest, to localize the object within an image. In one embodiment, the type of object (e.g., face) and its location (including orientation, skew, etc.) and other parameters (e.g., pose or identity of the object) are extracted and associated with the image. Then, such image and the associated information are used to train a feature detector/classifier to learn or predict the focuses of interest, by correlating/associating the image features with the locations of interest. In one embodiment, the image and various positions of interest are iteratively inputted to the system during training. The stochastic nature of the correlation layer, stochastically reconstruct parameters associated with the location of interest as output, e.g., using an RBM.

In one embodiment, a feature recognizer/classifier uses a data/image to extract features from an initial location (e.g., from the center of the image through a window or through a variable segment mapping). In one embodiment, based in the features determined, a set of one or more focuses of interest is reconstructed from the correlation layer (e.g., iteratively and stochastically). Then, the image is used to extract additional features from those predicted locations, e.g., through a window or a variable segment mapping. For each exploring location, a set of a location of focuses of interest are further predicted. In one embodiment, such lists of focuses of interest are consolidated and checked against the locations already covered. In one embodiment, the process stops after a certain number of locations of interest explored (for a given type of image), a certain number of features found, predicted location of interests were exhausted, certain amount of resources (e.g., computing power expanded), or other rules.

Partial Image Training

In one embodiment, partial images, e.g., masked or blocked, are used for training a detection/classifier module. In one embodiment, image samples are prepared by masking out the portions omitted e.g., by hiding the portion of image using straight edges through the image. In one embodiment, a randomizer generated masking parameters (e.g., the location of the mask edge). In one embodiment, the rendering module applies the mask to the image before inputting the masked image to the recognition module. In one embodiment, the masked regions of the image are filled with random fill color or random texture/pattern.

Figure 74:
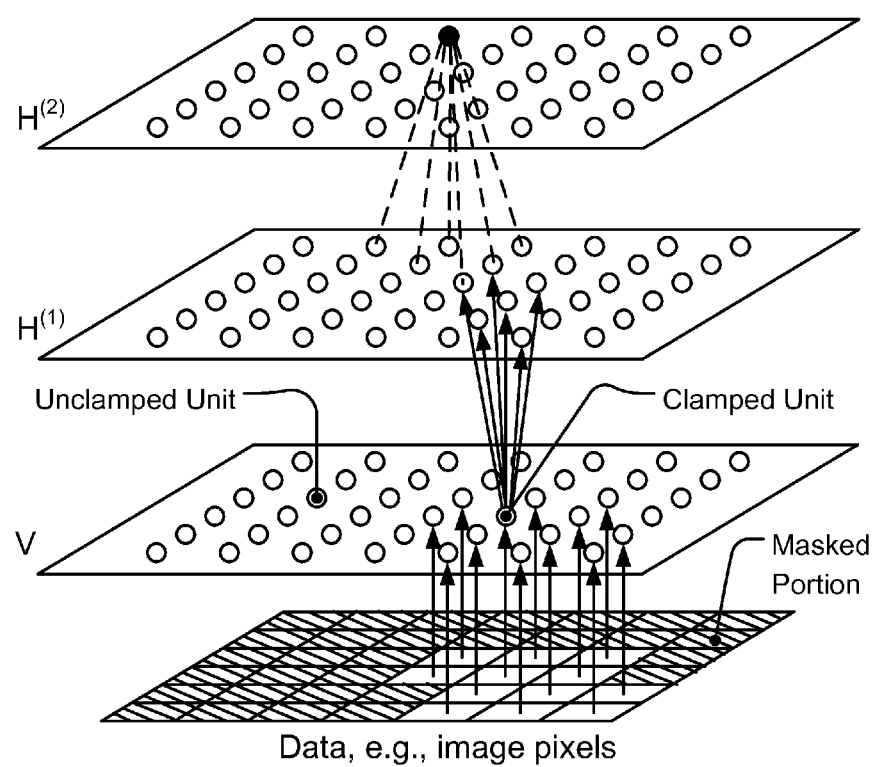
FIG. 74 shows one embodiment for clamping mask data to a network.

In one embodiment, as for example depicted in FIG. 74, the masked image is mapped/associated with the visible layer of a recognition/classifier module only at the units corresponding to the unmasked portion of the image. In one embodiment, during the training of an RMB, the visible units corresponding to masked portion of the image remain unclamped (i.e., their state stochastically adopt a value based on other units while the other visible units are clamped to sample data).

In one embodiment, during the training, the weights/biases associated with unclamped V units are not allowed to change due to the learning step involving the training with the corresponding partial image. In one embodiment, the contributions to the error function related to the unclamped visible units are ignored in the training step using the corresponding partial image/data.

In one embodiment, in the partial image training, the weight/bias adjustments for a learning step is modified by scaling the learning rate for a given unit (e.g., a hidden unit in $H^{(1)}$ layer) with the ratio of the number of its links traceable to the clamped visible units and the number of its links traceable to any visible unit. In one embodiment, similar adjustment to the learning rate is made with respect to a higher level hidden unit (e.g., in layer $H^{(2)}$) by, for example, determining such ratio (indirectly) by tracing through layer $H^{(1)}$, or simply by estimating the ratio based on similar average ratio from the traceable units in $H^{(1)}$ layer. For higher hidden layers where each unit is quite likely traceable to every visible unit, the ratio is estimated as number of clamped visible units to number of visible units. In one embodiment, by tempering the learning rate, the impact of the partial image on the weights is tempered as well. In one embodiment, by limiting the adjustment of weights, the impact of learning from phantom or residual data/images from the unclamped is also reduced.

Learning Higher Details Iteratively

Figure 75A:
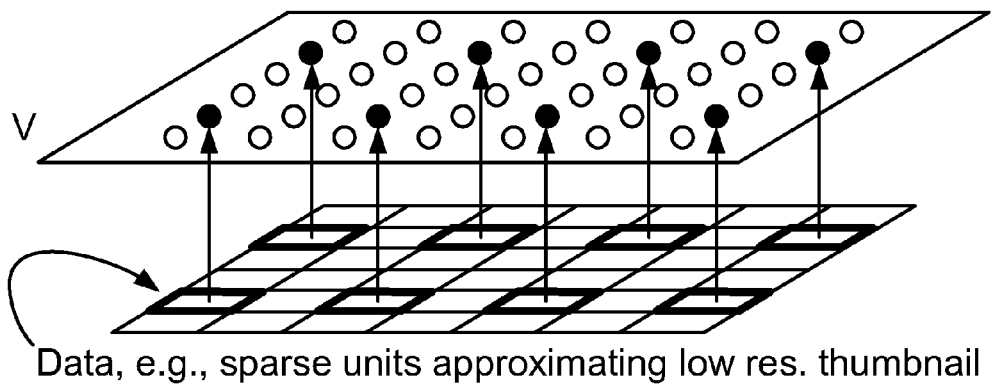
FIGS. 75 a, b, c show one embodiment for clamping thumbnail size data to network.

In one embodiment, an effective (approximate) thumbnail is input to a visible layer of a feature detector/classifier (during training or search) by blocking/masking the data from the original image, from being clamped to the corresponding units in the visible layer, except as to sparse visible units, as for example depicted in FIG. 75(a). For example, if the thumbnail has 8 times less resolution in both directions, then about 1 in 64 pixels from the data/image (i.e., 1 in 8 from each direction) is taken to approximate a thumbnail (e.g., without averaging with their neighboring pixels), and it is provided to the visible layer, e.g., to the corresponding unit that would have otherwise taken that pixel value when the V units are clamped with all of the data.

Figure 75B:
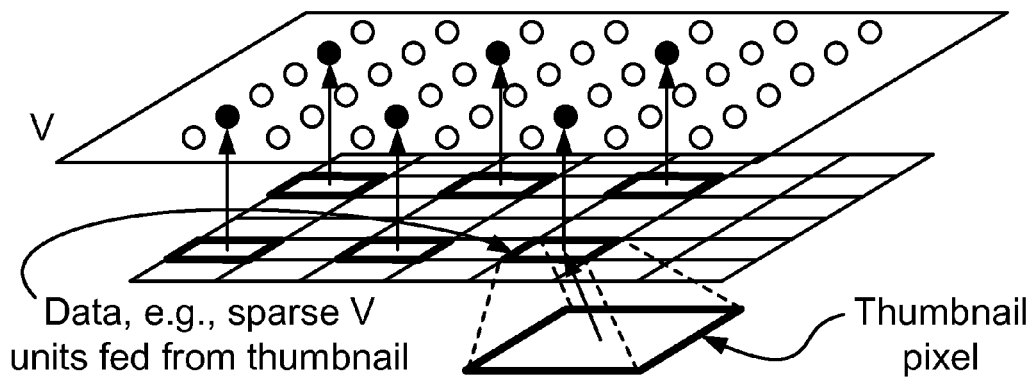

In one embodiment, the preprocessed thumbnail is applied to the visible layer, as for example depicted in FIG. 75(b), by clamping a thumbnail pixel value (e.g., obtained by averaging the data/image pixel values) to a corresponding (sparse) visible unit in V layer, according to the resolution reduction from the image/data to the thumbnail. For example, if the thumbnail has 8 times less resolution in both directions, then about 1 in 64 units in V layer are used to clamp to the corresponding thumbnail pixel values, e.g., by connecting 1 in 8 visible units in both directions.

Figure 75C:
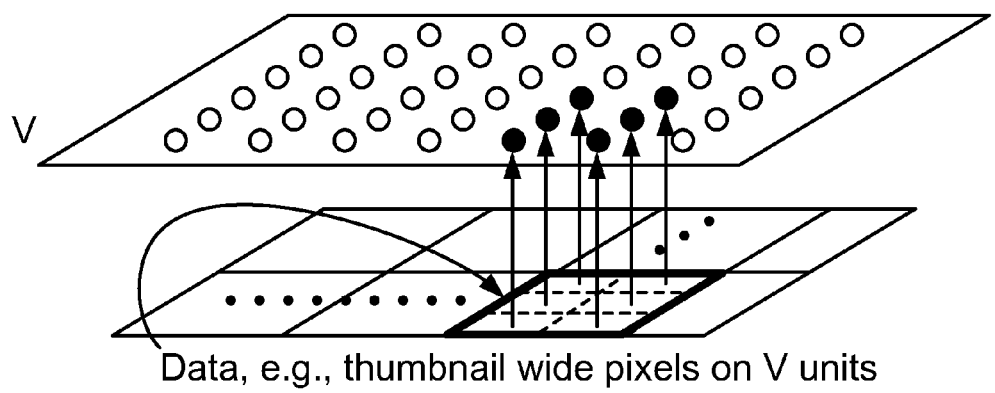

In one embodiment, the thumbnail pixel value is applied to multiple visible units, as for example depicted in FIG. 75(c), as if the thumbnail is expanded back to the image/data size with wide pixels covering multiple visible units. For example, if the thumbnail has 8 times less resolution in both directions, then each thumbnail pixel is clamped to about 64 units in V layer corresponding to image pixels, had the thumbnail were to expand to the image/data size.

In one embodiment, the learning of features is initially performed by using thumbnails. In one embodiment, e.g., as shown in FIGS. 75(a)-(b), the weights related to unclamped visible units not used to determine the error function and their related weights are not modified in the learning steps. In one embodiment, the learning of weights related to higher layers is performed using a learning rate, based on the number of traceable clamped visible units in V layer. In one embodiment, the second round of training uses higher resolution thumbnails, involving more visible units in the training. In one embodiment, during the second round of training, the learning rate for weights/biases related to the visible units involved in the first round of training starts lower than the learning rate for the visible units just used in the second round of training. In one embodiment, the learning rate is adjusted, so that before the end of the second round of training, the learning rate is substantially the same for all visible units involved in the second round of training.

In one embodiment, the stepwise learning of features from high level to more detailed takes advantage of the training weights established in earlier rounds of training.

Context Relationships

In one embodiment, the datasets (e.g., images) include (or associated with) various objects or concepts (e.g., face, body, book, computer, chair, car, plane, road, and building). In one embodiment, classifiers are trained to detect high level signatures/features of various objects/concepts, e.g., by training the classifiers with (labeled) training data sets, including those with and without object features. Some data sets may include multiple objects or concepts, and therefore, the occurrences of the objects/concepts overlap. In one embodiment, a classifier may classify multiple objects/concepts. In one embodiment, the correlations between the objects/concepts are determined as the result of classification of various datasets. In one embodiment, a data-concept matrix is setup based on the classification of the data sets, and further analyzed, for example, by decomposition using orthogonal matrices and a (e.g., low dimensional) diagonal matrix (e.g., to a low dimensional space), e.g., by using single value decomposition technique (SVD). In one embodiment, this dimensional space represents various contexts (e.g., family, sitting, coworkers, house, office, city, outdoor, and landscape) that support or relate to various object/concepts. In one embodiment, each context represents/contributes a set of weights representing the relationships between object/concepts.

In one embodiment, upon detection or classification of a feature of an object/concept in a data/image, the distance of the data to one or more clusters representing various contexts is determined. In one embodiment, the clusters (or contexts) that support the data are determined. In one embodiment, a set of other concepts/objects are identified based on the correlation with the classified object/concept from the image. In one embodiment, the image/data is further explored, e.g., by other classifiers or feature/object detectors), selected based on the set of predicted/suggested concepts/objects. For example, in one embodiment, a face and a computer is detected in an image. Then, it is determined that such a data is consistent with several contexts (e.g., office and home) ranked in order of distance or consistency level to such clusters, or it is determined that such data is correlated to other objects such as keyboard, table, screen, room, etc., with various correlation strengths. In one embodiment, the classifiers or expert modules tuned for such objects are used to further detect the presence of such objects in the data.

Figure 76:
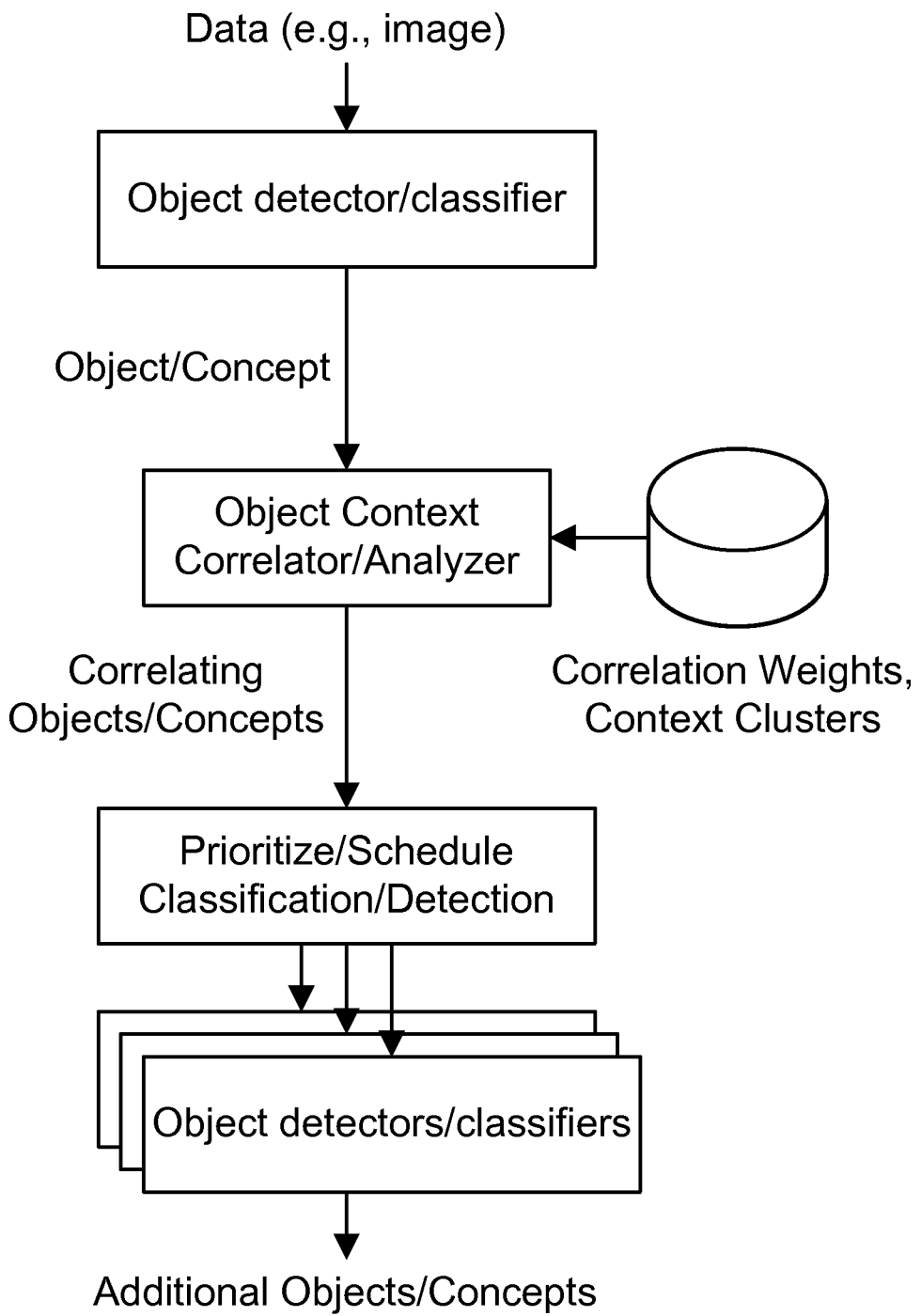
FIG. 76 shows one embodiment for search for correlating objects and concepts.

In one embodiment, the contextual relationship between objects/concepts is used to further detect other objects/concept in data/image, by prioritizing and selecting the corresponding feature detectors/classifiers, as for example depicted in FIG. 76.

Object Detection in Layers

In one embodiment, an object/feature detector/classifier detects an object in a data/image. In one embodiment, the detected object may be part of or component of another object or detected for example based on the recognition of a partial image. In one embodiment, the structure of the object (e.g., the periphery, blob, coverage projection, or support regions) is determined based on localization of the object within the image (e.g., through reconstruction). In one embodiment, the potential objects/concepts in the image are determined, e.g., based on the context of the image or correlation with the context(s) of the detected object. In one embodiment, the visible structure of the object is removed from the image, e.g., as part of the objects in the image foreground. In one embodiment, e.g., with RBMs or deep belief networks, partial clamping of the input (visible) data is done for regions in the image not removed. Based on the context or correlation with other types of objects, corresponding detectors, e.g., RBMs or deep belief networks, are used to detect objects (which may be partially visible). In one embodiment, through reconstruction at the visible layer, the hidden/blocked portion of such objects is estimated/predicted. For example, this facilitates reconstructing background (if learned) or the rest of the face of a person (if learned). This approach can be executed continuously or iteratively to gather correlated collections of objects or their degree of possibilities based on the reliability factors. In one embodiment, more specific context may be derived based on each correlated (and for example expanding) collection of objects, and further information or proposition may be inferred (with a reliability factor) based on the image, by feeding the relationships and the reliability factors in a knowledge web.

In one embodiment, face recognition is performed on a partially blocked face in an image using a feature detector/classifier and database of known signature (vectors) associated with identified faces. In one embodiment, the comparison of detected features provides a matching probability measure between the partial image and a subset of those known in the database. In one embodiment, the reconstructed image at, for example, unclamped visible units representing the blocked portion, may provide full a face candidate for comparison with those images in the database.

In one embodiment, the consistency/reliability of a potential match with images/features (whether known or not) in a database is associated with the measure of uniqueness among the matches. The uniqueness measure indicates how uniquely the input image/feature is matched among the other images in the database.

In one embodiment, based on the context, there is a correlation between the hidden/blocked objects and the blocking object. For example, a dark glass covering a person's eye region has a strong correlation with the eyes. By training with the similar data/images with and without glasses, the correlation between the features of two data samples, given other common features may be established. In one embodiment, a data/image is searched by a trained feature detector/classifier. The features/labels indicating "wearing dark glasses" are activated based on previous training/correlation/association. In one embodiment, the region of dark glasses is identified (having correlation with the feature/label). In one embodiment, the value of feature/label is modified (e.g., forced off) by clamping the feature/label to the forced value. In one embodiment, such change/modification related to a feature/label is sent to a correlator/analyzer to determine the region on the data/image affected by the change, e.g., by reconstruction mechanism and comparison. In one embodiment, a threshold is used to limit the affected region on the image/data, e.g., based on relative changes in color, contrast, or intensity, size of region/sub-region. In one embodiment, the visible units corresponding to the thresholded region on the image/data are unclamped, while the other regions are kept clamped to the corresponding image/data pixel/portion. In one embodiment, a reconstruction in V layer, based on the forced value of the label/feature is used to recover one or more candidates for the blocked image within the unclamped visible units. In one embodiment, a two step process to uncover the blocked images, uses the rest of the (unblocked) image as prior condition in predicting a likely covered image, as opposed to a top-down pass to reconstruct the whole image which may create more variety in the visible layer. In one embodiment, multiple pass from bottom up (inference) and top-down (reconstruction) is performed to obtain more candidate or likely candidates under the constraint of clamping the visible layer to the unblocked portion of the image.

Figure 80:
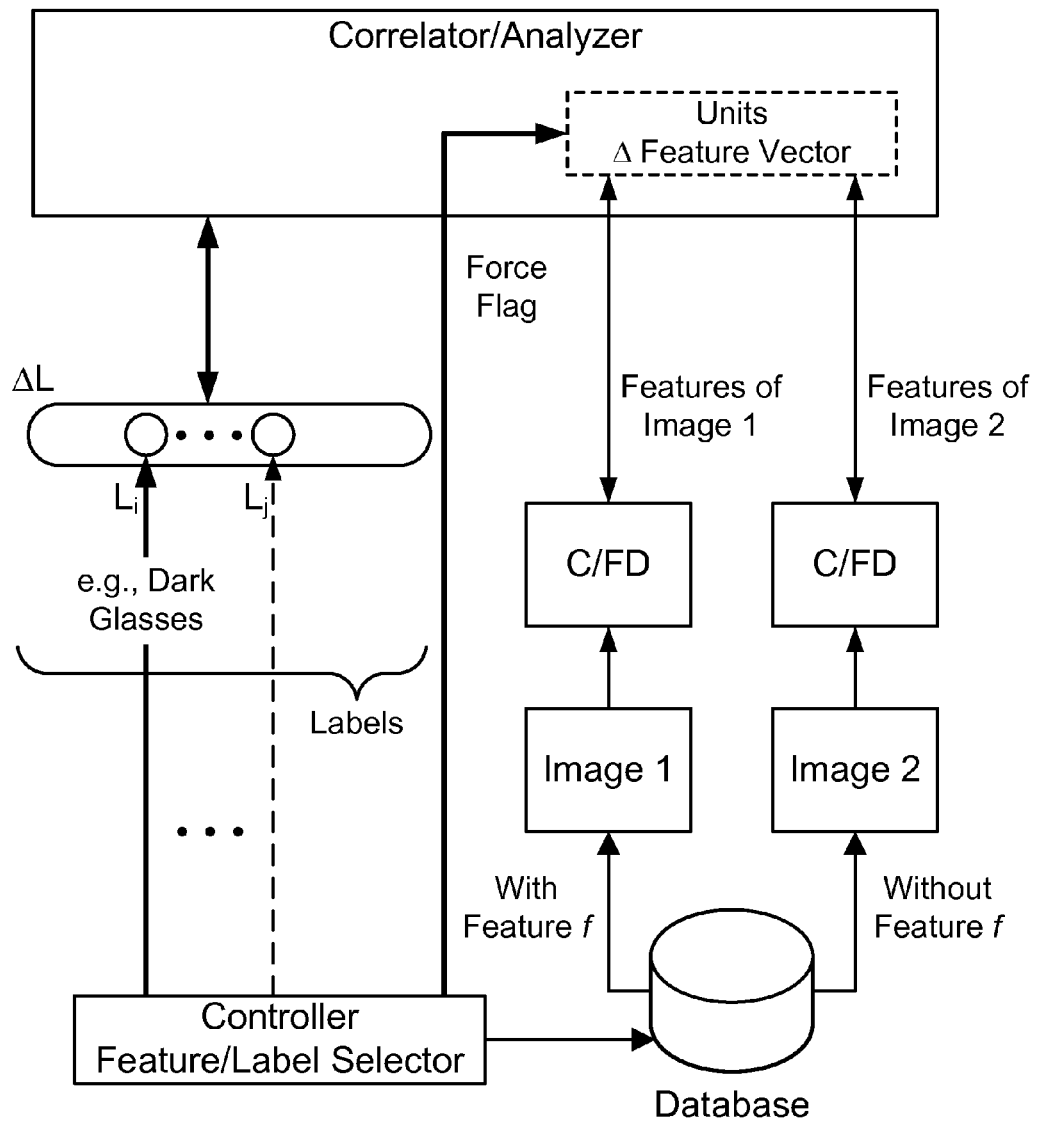
FIG. 80 shows one embodiment for correlation between blocking and blocked features, using labels.

In one embodiment, the correlation between the blocked object (e.g., eyes) and the blocking object (e.g., dark glasses) is learned by sequential learning or by using two instances of the classifier/feature detector (denoted as "C/FD"), as for example depicted in FIG. 80. In one embodiment, a controller module selects a feature (or label) (such as "Dark Glasses") and supply it to the label layer (e.g., by clamping the corresponding label unit to the label value (e.g., in range of [0,1]). In one embodiment, the controller module provides the selection to a database (e.g., of images) to select a pair of images identical within the class of images but for the feature selected (e.g., two images of the same person with or without dark glasses, in similar pose and expression). The images are provided to the same (trained) classifier/feature detector (e.g., to two instances in parallel or using the same instance sequentially). The features of both images (and in particular the differences between their features) are correlated using a correlator/analyzer module (e.g., having unit/neurons) with the label/feature difference identified in the label layer (e.g., $L_i$). In one embodiment, the L layer represents the labels indicated the feature differences between the images (denoted by $\Delta L$). In one embodiment, more than one label is selected by the controller (indicating the differences between the features of the images selected from the database for training the correlation). In one embodiment, during the search process (i.e., for detecting objects in data/image), for uncovering the blocked feature (e.g., eyes region), a force flag selector is used to let the units representing the change in image features contribute to the state of the image features for top-down reconstruction of the image in the visible layer, while the controller maintains the corresponding label unit in $\Delta L$ layer to (e.g., stochastically) invoke the state of the units representing the change in image features. In one embodiment, the units are not separately set aside in the correlator/analyzer for determining the image feature difference/distance/vector between the two images. In one embodiment, the weights related to the units in the correlator/analyzer are trained to detect the feature differences by a stochastic or batch learning algorithm.

Measure of Scale in Context

In one embodiment, upon recognizing an object by a feature/object detector/classifier, the size of the detected object relative within the image and the relevant context(s) are used to correlate to size of other objects potentially in the image. In one embodiment, such estimates for the sizes of other objects are used to locate potential areas in the image and the sizes to search for such potential objects. In one embodiment, this approach facilitates discovery of other objects in the image more efficiently given the location and size of window for searching for such objects have higher probability to yield detection of such objects.

In one embodiment, one or more pose detection modules (e.g., based on edge detection or color region/shape) are used to determine the pose of a face within an image/data. The scaling determined from the pose detection(s) is used to make more efficient detailed feature detection, for example, by scaling the portion of image containing the pose based on the size in a preprocessing step prior to inputting the preprocessed image to an expert feature detector.

Variable Field of Focus with Limited Data/Pixel Points

Figure 77A:
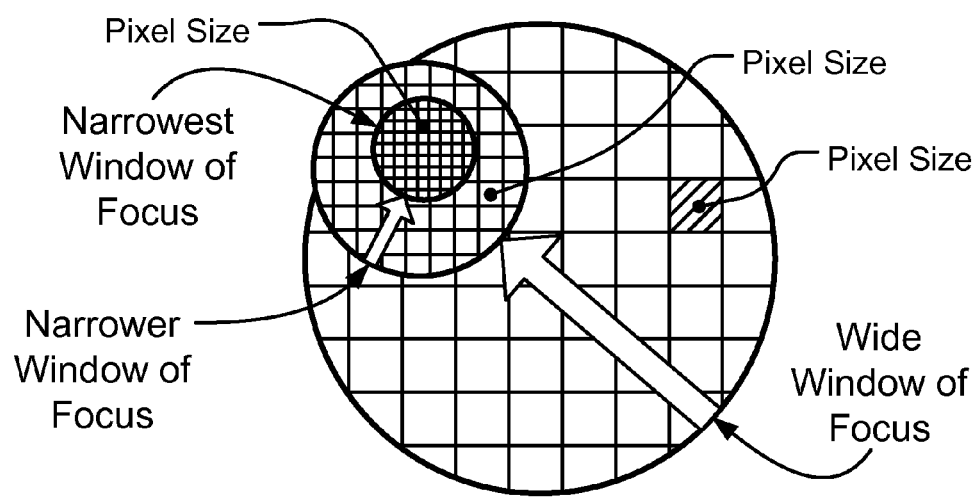
FIGS. 77 a-b show one embodiment for variable field of focus, with varying resolution.

In one embodiment, as for example depicted in FIG. 77(a), the recognition of object in data/image employs a wide widow (e.g., rectangular, circular, elliptical) of focus on the image, but with a limited number of pixels (i.e., with low resolution). In one embodiment, the image within the window of focus is mapped to the specified number of pixel (e.g., in mapping/creating a thumbnail image). In one embodiment, the high level features and objects (or classes of objects, such as people and faces) are detected/located within this wide focus of the image. Then, in one embodiment, a narrower window of focus, containing similar number of pixels (i.e., higher resolution), is used to explore the object(s) located during the previous detection. In one embodiment, such process is done iteratively until reaching a maximum focus (or narrowest window of focus), maximum resolution of the original image, full identification of object, or satisfaction of a search criterion or constraint (e.g., based on a rule or policy). In one embodiment, with wide window of focus, small details, such as texture that require higher resolution, may not detected. In one embodiment, an expert feature detector/classifier is used with a narrower window of focus to efficiently determine features of an object in image/data, after the class of object is determined at a high level by a prior feature detector using a wider window of focus.

Figure 77B:
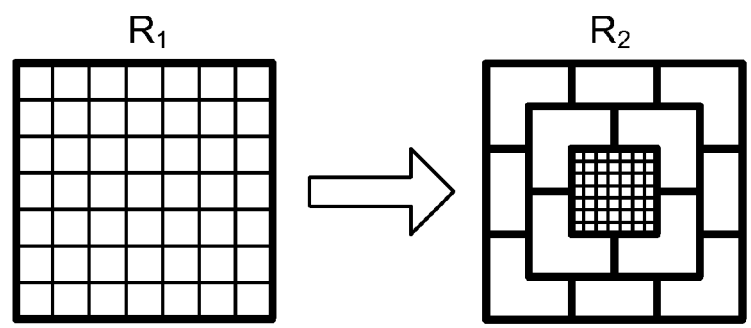

In one embodiment, a quick scan recognition approach is used, based on resolution level of the focus widow. In one embodiment, at a given resolution level (e.g., $R_1$ or $R_2$, as for example depicted in FIG. 77(b)), a portion of image is picked based on (e.g., predefined) windows associated with the resolution level (e.g., 1 window for $R_1$, and 13 overlapping windows for $R_2$, as for example depicted in FIG. 77(b)). In one embodiment, a thumbnail or portion of the image at the picked window for the given resolution is prepared. A feature recognition/classifier is used to locate/recognize objects within the window (e.g., in the thumbnail). In one embodiment, if an object or a class of object is found in a resolution level (e.g., $R_2$), the search is continued for more objects of similar class in other windows at the same level of resolution. In one embodiment, if the detected object or class of object is not reliably matched/classified by the classifier/feature detector, then the search proceeds to the next higher resolution for more detailed recognition or for increasing the reliability of recognition/classification of the object, or to eliminate or reduce the potential for a false positive. In one embodiment, the approach for searching within the same resolution or gearing up to higher resolution is stopped upon reaching a resolution limit or a threshold for computing resources. In one embodiment, the determination of which window to pick next is based on an order associated with the context of the image. For example in a photo of standing people, the search proceeds horizontally to identify people (e.g., from faces). In one embodiment, the windows closer to the center of the image are ranked higher to be picked for search. In one embodiment, the next window to pick is determined based on the likelihood of finding features/objects within similar images (e.g., based on training).

In one embodiment, the sizes of the windows for a given resolution are the same (e.g., for a given context). In one embodiment, the sizes of the windows for a given resolution are different depending on the location within the image (e.g., based on the context).

In one embodiment, the location of the windows are picked, determined, or adjusted based on the location of the object(s) detected in another windows, the context, the proximity and relative positions of the objects and/or the scale/size of the objects.

Learning High Level Features by Limiting Learning Space

As mentioned in this specification, one approach to learn the high level (e.g., class of object such as presence of face, as opposed to for example the identity of the person based on detailed detection of facial features) is to detect the object/class of object based on a thumbnail (e.g., via preprocessing) of the data/image. In one embodiment, the training for a high level feature detection focuses on the structure of the neurons or units used in a classifier/feature detector. In one embodiment, the resulting feature units at top layer are limited to few features, while the training is used with data/images that may include thumbnail and high resolution data/images, including those with and without the targeted features. In one embodiment, a correlation layer is used to established the features correlation with labels by feeding the labels (e.g., via a label layer) to a correlation layer, or use a supervised training to train a classifier based on the labeled samples (e.g., using SVM).

Learning Via Partially Labeled or Mixed Labeled Training Set

Figure 78:
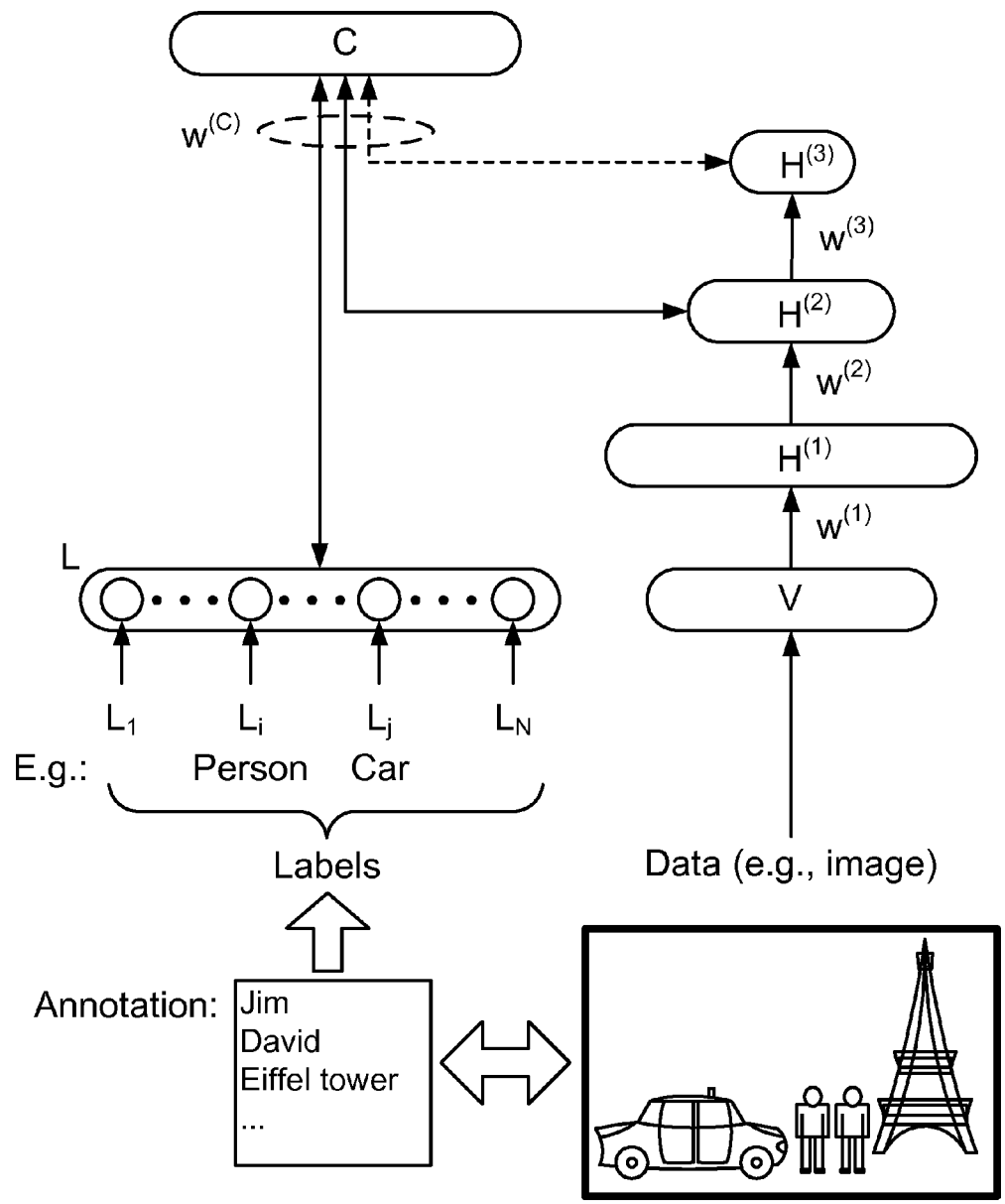
FIG. 78 shows one embodiment for learning via partially or mixed labeled training sets.

In one embodiment, the labels for supervised training or for making association with object features (e.g., already trained in RBMs or deep belief networks), may not reflect all the applicable properties of the sample training set. For example, a data/image containing a person and a chair may only be labeled as person. In one embodiment, as for example shown in FIG. 78, a sample training data/image may depict two people (e.g., David and Jim, based on for example the annotation associated with the image), Eiffel tower (in the distance) and a taxi. The labels may be drawn from the annotations based on correlation/conversion to generic labels, such as Person and Car, through a semantic web or through a latent semantic analyzer. In one embodiment, the associated labels (whether drawn automatically or assigned manually) are fed to corresponding units in L (label) layer for training the association/correlation to the features learned by feature detectors/classifiers such as RBMs or deep belief networks. In an example, the annotation is missing "Taxi", and the label may not include the generic label "Car" or "Vehicle" (or even "Taxi"). In one embodiment, the unused labels associated with a training data is unclamped, and even though the relevant features (e.g., indicating a car in the image) exist, the correlation is not punished (i.e., skewed) for not having the correlation with the missing label. In another word, in one embodiment, the missing label is prevented to skew the correlation and mislead the learning as if the label was set incorrectly. In one embodiment, the unclamped labels do not contribute to the error function, and their related weights are prevented to change during the learning step (e.g., by setting the corresponding learning rate to zero for the related weights and biases). In one embodiment, the labels provided for the training are associated with corresponding reliability factors. In one embodiment, such reliability factors (e.g., in range of [0,1]) are used to scale the learning step related to weights and biases of such unit. In one embodiment, the state of unclamped label units are allowed to vary stochastically based on links form other units. In one embodiment, some labels are used as positive (e.g., with a reliability factor) indicators of the features to discriminate, and their absence are not used to indicate the absence of features. In one embodiment, the absence of some labels are used to indicate the absence of the feature from the data/image (e.g., with a reliability factor). In such a case, for example, the state of the corresponding label unit is clamped to indicate absence of feature.

In one embodiment, specific annotations that repeat often (e.g., "Eiffel Tower") (e.g., in a collection of images/data or a series of related images/data or within a large collection of data/images from various sources and various reliability) is taken as label for training association by adding an additional label unit (e.g., a binary unit) representing the added label.

Figure 79:
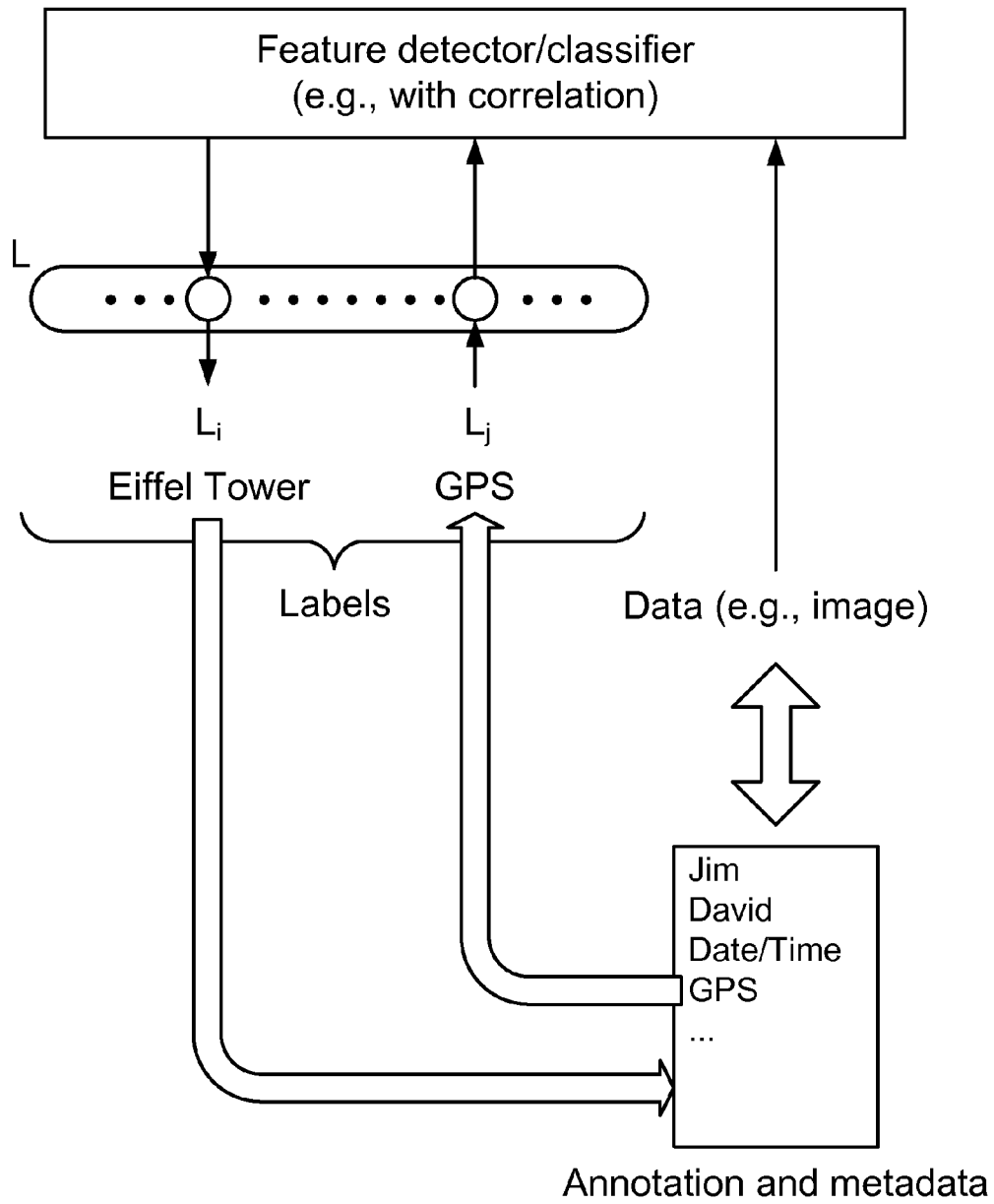
FIG. 79 shows one embodiment for learning correlations between labels for auto-annotation.

In one embodiment, meta data such as the GPS data (or for example other accompanying metadata captured with images taken from mobile devices such as smart phones) are used as labels (e.g., continuous valued). In one embodiment, as for example depicted in FIG. 79, the correlation can also be established between the labels. For example, suppose an image/photo is missing the associated label "Eiffel Tower", but based on the correlation with the GPS data given the image/data, the label "Eiffel Tower" is reconstructed in the corresponding unclamped label unit when searching for the features of the photo/image by a feature detector/classifier. In one embodiment, the reconstructed label is imported into the annotations associated with the image/data with a relevant certainty factor (e.g., based on the correlation). In one embodiment, based on the reconstruction of the labels, relevant (e.g., expert) detectors/classifiers associated with such labels/concepts are used to further validate the match. In one embodiment, such recognition of labels (e.g., the identity of people) is extended to recognition of people in various images (e.g., with no annotation or partial annotation) in order to implement auto-annotation of the images, based on recognition/identification of individuals in other images. In one embodiment, the existing annotations associated with a data/image are compared with the constructed/predicted label for conflict or redundancy, based on the correlation between the terms of annotation. In one embodiment, a subset of annotations associated with a data/image is used (e.g., selected in random) to determine the reliability of their correlation to the image/data based on a feature detector/classifier. In one embodiment, potentially unreliable annotations (e.g., a subset) are determined based on low reliability of correlation of the image/data with corresponding labels. In one embodiment, the unreliable annotations are tagged as such (e.g., with reliability factor). In one embodiment, the reliability factor is associated/inferred to the annotator (e.g., a person) by contributing to the annotator's reliability of annotations for a given context.

Search and Indexing

Figure 81:
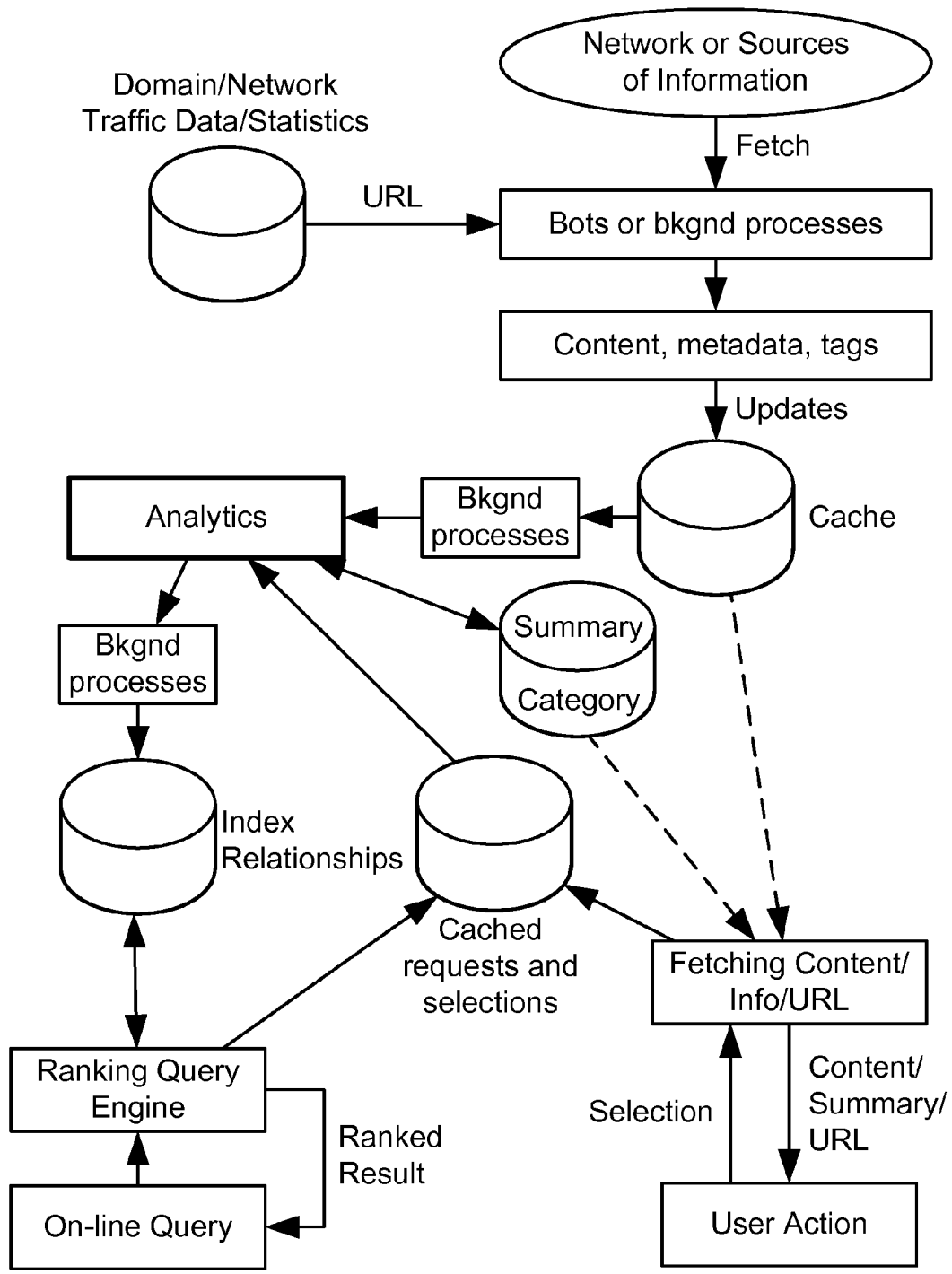
FIG. 81 shows one embodiment for indexing on search system.

FIG. 81 depicts an example of an embodiment for indexing and search. In one embodiment, a network and/or sources of information are used to fetch various content, tags, and metadata, via bots or background processes. A cache is updated with the changes in the information gathered. In one embodiment, the background processes use the information from the network traffic or domain name servers to fetch resources. Via background processing, analytics engines organize, categorize, recognize, and correlate various cached content, and an index/relationship database is updated to facilitate (e.g., a real time) online query. Upon such query, a ranking query engine uses the query to return ranked result using the index/relationship database. In one embodiment, the online query is cached and analyzed for patterns of queries and to facilitate ranking and caching. In one embodiment, the user selects a result of the query and the user selection is also cached to correlate with the query and/or the user by analytics engines. Content, summary, or URL related to the selection is fetched from caches and returned to the user.

In one embodiment, map reduce technique is used to handle "Big Data" processing across distributed file system and systems. The task, such as distributed search (among the machines) use small portion of the data (e.g., one chunk at the time) and provide the result to a central machine(s) for collection. An instance of search task/job keeps the information about the search and identifies the result accordingly, so the result may be available or extended time. The result may get updated and available for use in real time.

Facial Expressions and Emotions

In one embodiment, the weights on features that are affected largely by various emotional states or ranges are reduced in an attempt to distinguish the invariant features that would help identify an individual among a database of individuals associated with a set of features (e.g., invariant features). However, in one embodiment, the reduction of weight on the affected features will also impact (reduce) the distinctive features between individual labels.

In one embodiment, the expressions and emotional states are learned as features captured in the images. For example, in one embodiment, RBMs or deep belief networks regenerate or construct unseen images with new emotions, by setting the correlated label (for an emotion/expression) and letting the reconstruction provide an image in a visible layer.

Time Series and Video

In one embodiment, multiple images are compared together to detect or infer transformation, e.g., translation, rotation, scaling of objects or features between the images. In one embodiment, the frames (images) from a time series collection (e.g., a video segment) is used to extract different poses of an object (e.g., a person's head), different expressions (emotions). In one embodiment, speaker recognition module, based on the analysis of sound track of audio/video tracks, identifies/distinguishes speakers and associates those entities to time segments in the audio/video tracks. An image extractor module uses the time segments to extract potential images at different poses of that speaker from the video track (in synch with audio).

In one embodiment, the feature detector is trained on various poses and expressions with many unlabeled samples before training with labeled samples to make association of features with labels (e.g., pose parameters, expression parameters, emotion states/degrees).

Figure 82A:
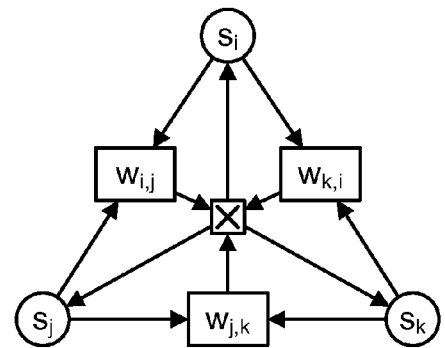
FIGS. 82 a-b show one embodiment for (a) factored weights in higher order Boltzmann machine, and (b) CRBM for detection and learning from data series.

In one embodiment, the image transformation is modeled via a higher order Boltzmann machine, which links more than two units via a weight. A factored higher order Boltzmann machine reduces the complexity or the number of parameters (compared to non-factored version), where the weight (e.g., between 3 units i, j, and k) is factored into 3 mutual weights corresponding to each pair of units, in a multiplicative way: ($w_{i,j} \cdot w_{j,k} \cdot w_{k,i} \cdot s_i \cdot s_j \cdot s_k$), as schematically shown in FIG. 82(a). In one embodiment, one signal, e.g., $s_k$, acts as a binary controller, i.e., when value of zero, the interaction between units i and j reverts to low order Boltzmann machine.

Figure 82B:
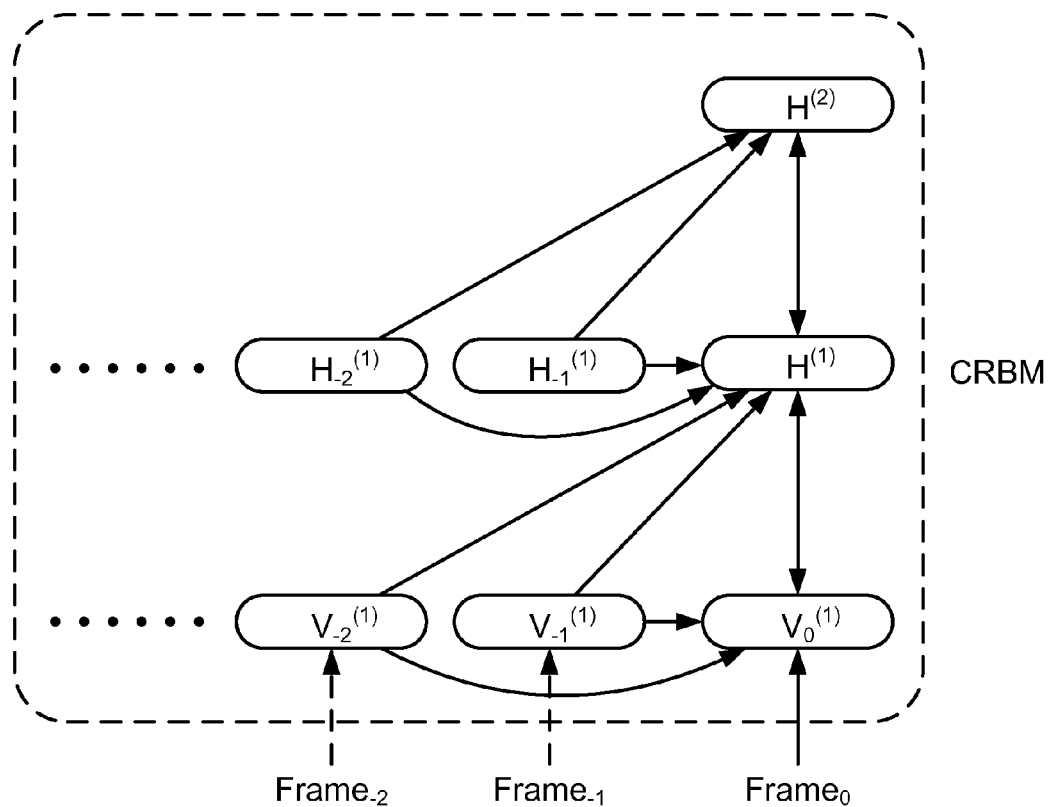

In one embodiment, as for example depicted in FIG. 82(b), short range temporal data (e.g., image) is modeled by providing a number of (e.g., consecutive) frames (e.g., 2 to 5 for large number of visible units per frame of data, or about 100 for few visible units, e.g., representing the parameters of motion instead of pixel images) from earlier times/series. In one embodiment, the data from these frames are provided to visible and hidden layers of RBM. CRBM denotes conditional RBM due to dependency of the hidden units on the previous states of visible units. In one embodiment, such a temporal module is stacked after training features on the lower layer. In one embodiment, the units representing previous frames are initialized (or their swapped) based on the units representing then current frames. In one embodiment, the same number of visible units (or hidden units) is used for each frame (representing current or previous frames). In one embodiment, the energy state of CRBM includes terms based on quadratic offset of the visible units' states from their corresponding dynamic mean (e.g., a linear combination of their previous states). In one embodiment, the bias for a hidden unit is based on its dynamic mean. In one embodiment, the weights for the linear combinations to get dynamic mean for a hidden or visible unit are autoregressive weights. In one embodiment, the contrastive divergence method is used in learning the weights and biases, by for example sampling the hidden units based on the visible units (current and previous), and reconstructing the visible units based on the sampled hidden units. The visible (or hidden units) corresponding to previous frames are not updated in this approach. In one embodiment, the hidden units are sampled based on logistic function. In one embodiment, the visible units are reconstructed using a Gaussian distribution (e.g., with unit variance) and a mean based on the weighted links from the hidden layer and the visible units' dynamic mean. In one embodiment, during the learning process, the learning rate in order of 0.001 is used for the weights between the visible and hidden layers. In one embodiment, during the learning process, the learning rate in order of 0.0001 is used for the autoregressive weights.

Figure 83A:
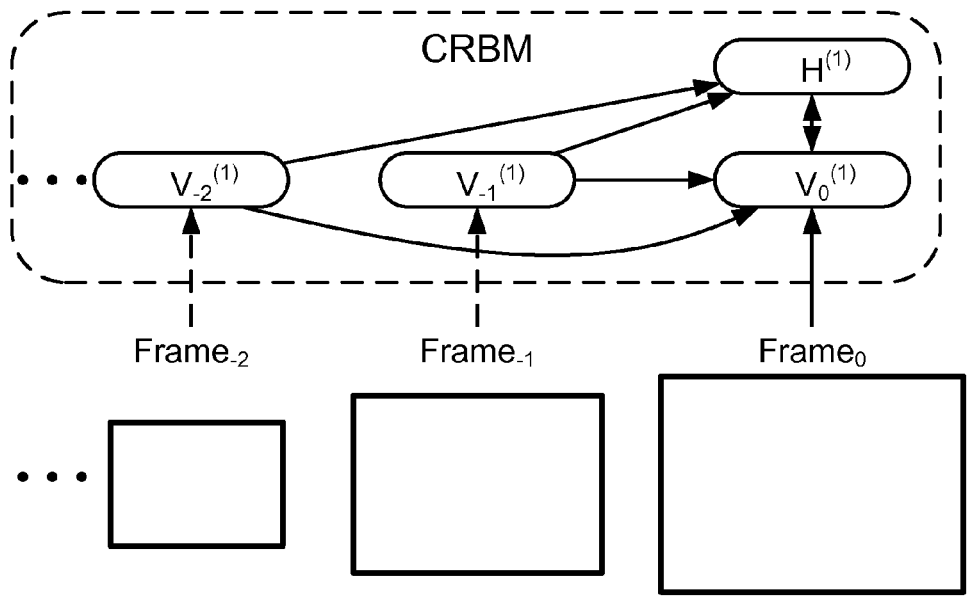
FIGS. 83 a, b, c show one embodiment for (a) variable frame size with CRBM, (b) mapping to a previous frame, and (c) mapping from a previous frame to a dynamic mean.
Figure 83B:
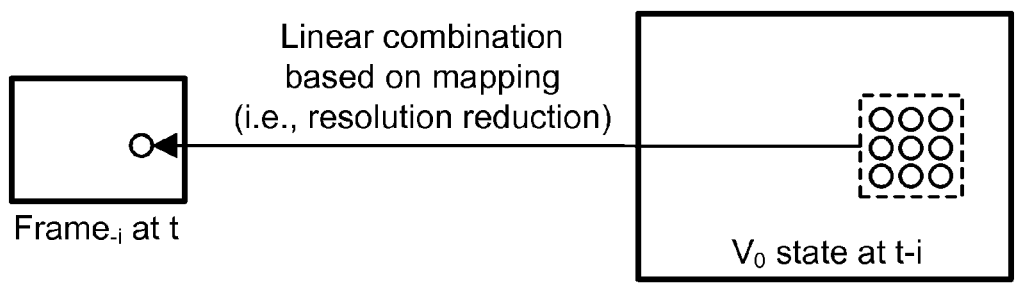
Figure 83C:
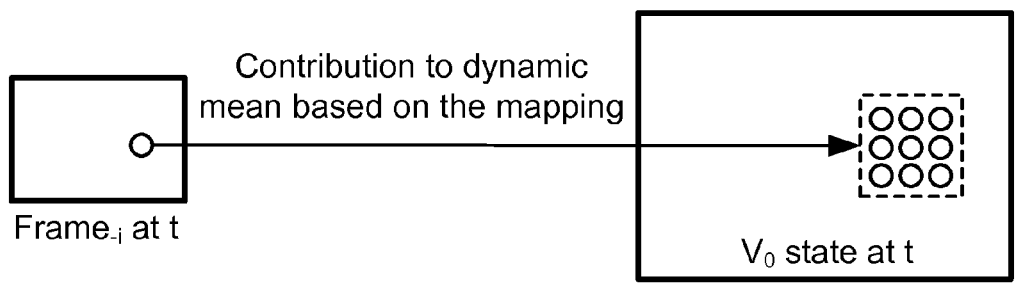

In one embodiment, as for example depicted in FIG. 83(a), the older frames use less number of visible units, e.g., by lowering the resolution/size of the frame as it gets older. In one embodiment, the longer lasting coarse features of motion are learned/detected based on the decreasing resolution for older frames. In one embodiment, the value/state of the visible units associated with previous frames are based on a linear combination (e.g., average) of the states of visible units from when the frame was current, as for example depicted in FIG. 83(b). In one embodiment, such linear combination is based on the reduction of resolution from the original frame to that of previous frame. For example, if a previous frame is 3 times smaller in each dimension compared to the original frame, then the state of a visible unit associated with the previous frame is based on (e.g., average of 3×3 visible units from the time the previous frame was current). Conversely, in one embodiment, fewer units from the previous frames contribute to the dynamic mean of the current units (in visible or hidden layers), as for example depicted in FIG. 83(c). In one embodiment, a snap shot of the visible units are taken for scaling according to resolution reduction for previous frames.

In one embodiment, the features recognized from previous analysis of the older frames are used with a predictive model such as Kalman filter to estimate the localization of the features in the current or upcoming frames. In one embodiment, for example based on such estimates/prediction, the analysis of frame (e.g., the current frame) is initially limited to a portion of the frame containing the estimated localization of the tracked features. In one embodiment, an area of focus of interest is used to analyze the portion of the data/image.

In one embodiment, stochastic sampling at hidden layers (e.g., based on an initial condition in visible layer) and the reconstruction in the visible layer reconstructs learned motion (in sequence), based on the learned weights, including autoregressive weights. In one embodiment, the learned (features) of the motion is correlated with a label via a correlation layer or other classifiers. In one embodiment, using one or more labels, the motion is reconstructed in sequence in visible layer via top-down regeneration. In one embodiment, a mix of motions are reconstructed based on a combination of labels (e.g., with varying degree).

In one embodiment, Long-short-term-memory (LSTM) which a recurrent type neural network is used to model the data in time series. In one embodiment, LSTM block includes sigmoid units (e.g., based on logistic function) to allow access to the block and control its functions (e.g., input, memorize, forget, and recall). It also uses product type units (with no weight) and summation units to direct the data through the block. In one embodiment, an LSTM module is trained via back propagation through time with iterative gradient decent algorithm.

Classifier and Complexities

In one embodiment, linear models, such as perceptron, linear regression, and/or logistic regression are used. For example, perceptron is used for classification, e.g., in or out, accept or deny, and is trained by perceptron learning algorithm including a pocket version. The linear regression is for example used to determine (continuous valued or real valued) amount, based on squared error function and pseudo-inverse algorithm. The logistic regression is used for example in determining probability, based on cross entropy error, using a gradient decent algorithm. Noise and error in input data makes the nature of the training data probabilistic. The VC (Vapnik-Chervonenkis) dimension for a Hypothesis set (i.e., he most points that can be shuttered by the hypothesis set) is related to hypothesis set's growth function, and in one embodiment, the VC inequality (in terms of growth function and number of training samples) provides a rule of experience for the number of points needed for training (e.g., >10×VC dimension). The VC inequality places an upper bound on the probability of the out-of-sample error (i.e., the generalization error) is within the in-sample error by a given error margin and a given number of in-sample (training) data. In one embodiment, a maximizing likelihood approach is used to select a hypothesis from the hypothesis set that results in maximum likelihood of getting the data given the hypothesis. In one embodiment, the learning with logistic regression uses a cross-entropy error $\log(1+\exp(-y_n W^T x_n))$ with $(x_n, y_n)$ representing the labeled data point and W is the weight matrix to be optimized. In one embodiment, the optimization uses a gradient decent approach by using variable size step (large to small). In one embodiment, the step size is proportional to the gradient which fixes learning rate (appearing as a multiplier for the learning step). One embodiment uses an adaptive learning rate. In one embodiment, the default learning rate is 0.1. In one embodiment, the number of iterations of epoch is limited to a maximum (early stopping), in order to avoid over fitting the noise/error and deteriorate generalization by increasing the out of sample error. In one embodiment, in order to tackle the problem of local minimum, the optimization starts at different initial values of weights (e.g., based on heuristic). In one embodiment, the "temperature" is used to escape local minimum, e.g., in RBM learning, the optimization starts at a high temperature, to allow escaping the local minimum. In one embodiment, a stochastic gradient decent is used by taking one data sample at the time, resulting in generally a simple, cheap, and random approach to optimization in comparison to batch optimization where all data sets are used in each step of optimization. In one embodiment, a binary search method is used to explore along the direction of error gradient. In one embodiment, a conjugate gradient is used to estimate the second order error from previous data points. In one embodiment, a multiclass classification is approached based on binary decision, i.e., 1 vs. all, 2 from the rest, etc. In one embodiment, non-linear transformation is used to optimize based on a feature in a transformed space. In one embodiment, the VC dimension of the neural network is approximately the number of weights and biases. In one embodiment, a regularization approach is used to kill some weights (e.g., in random) to enhance generalization (and reduce over fitting). In one embodiment, a genetic optimization is approach is used. In one embodiment, a regularization approach is used to limit the choice and ranges. In one embodiment, a validation is used to test the generalization, by dividing the sample data for fitting and cross comparing the error. In one embodiment, kernel methods are used for small labeled data and top features to model the classification. For example, one embodiment uses thousands of unlabeled training set with various orientations to learn features (including the orientation), and it uses few hundred labeled training sets to discriminate orientation (with regression for angle). In RBM training, the number of training cases may be less than number of weights as long as the number of pixels is much more than weights, because there are a lot of features that can be extracted from pixels. In one embodiment, the discriminative training (e.g., based on labels) quickly fits the data, and it is stopped quickly to avoid over fitting. In one embodiment, a weight decay technique is used to implement regularization in learning. In one embodiment, about 20% of the data samples are reserved for validation (and not training). In one embodiment, cross validation is used to conserve the number of data sample for fitting. In one embodiment, the probabilities indicating the certainty of inferences based on the correlated training sets are tracked, for example, to infer one pose from a different pose.

Feature Extraction:

In one embodiment, we note that people of same ethnicity or region (or members of the same species of animals) generally recognize each other better. For example, all tigers look the same to an average human, but tigers themselves can recognize each other very easily and efficiently. Or, a Middle Eastern person can distinguish other Middle Eastern people more accurately and efficiently, than what a Chinese person can, among the same set of people from the Middle Eastern origin (or the same set of pictures of people from the Middle Eastern origin), assuming that the Chinese person never lived among Middle Eastern people or lived in that region of the world.

The same is also true (for example) for the case of the identical triplets in humans, which can be distinguished easier by themselves. In addition, their parents can distinguish them easier than the rest of the general public can. The reason is that an average human can see a tiger as an animal with 4 legs and stripes, similar to a big domesticated cat, as the dominant features, however, the tigers see or focus on some other features or more details of stripes, to distinguish themselves or as they see themselves. Since a tiger's eyes and brain are trained by looking at a lot of other tigers for many years, their distinguishing features are all set accordingly, to focus and look for the right features or sub-features, to make the distinction. For example, they may look at the ratio of 2 lengths on 2 specific stripes, or width of a stripe near the nose, as the focused or re-focused features, to find or classify or distinguish the other tigers or objects or subjects. Such specific features may be transparent to the human eye and brain, as they do not know what to look for in a huge volume of information received by the eye or brain. It is also consistent with the fact that a zoo keeper (dealing with tigers for years) can distinguish them much easier than an average human, as the zoo keeper has seen many tigers, and thus, her brain and eyes are trained for those features and characteristics.

So, sub-sampling the input from all universe (for humans, for example), or $U_H$, is very critical for training purposes, to train appropriately, for a given task. Filtering or focusing or zooming in a few features ($F_F$), out of, e.g., billions of patterns or features available ($F_U$), on the sensory basis or recorded or obtained, when selected appropriately for the task at hand ($T_A$), reduces the training time and cost, and increases efficiency and accuracy of recognition and classification and appropriate response. Mathematically, we have:

$$T_A \rightarrow F_F$$

Wherein $F_F \subset F_U$

Wherein $U_H \rightarrow F_U$

Wherein "arrow" symbol indicates that the right hand side item is obtained from the left side item.

Large or Voluminous Input Data:

The same is true for an infant (e.g. 5-month old, at the early age) listening to all the noise and voices around herself, e.g., possibly spoken in English and French by bilingual parents or nanny, and the noise from highway outside in the background, as well as the very noisy and loud fan on the ceiling, or the voice of her grandfather and grandmother, with the TV announcer or anchor in the background shouting about a recent news or an advertisement about a car. She receives a large amount of voice and noise data by her ears (or internally from vibration on the ground or floor), but in the first few months, she gets all of the data with the same weight and importance. Overwhelmed by the large incoming data, she mostly ignores most of the input data, even the voices of her parents, that are supposed to be important to her well-being. After a while, though, she will understand that her parents' voice are more important than the noise of the cars outside or fan on the ceiling, even if they are very loud or louder. So, she will tune and filter or put more weights for those features or voices, as she gets trained on distinguishing between the voice, noise, music, warnings, background noise, dangerous signs or screech/scream, or angry tones. The same is true for vocabulary and grammar in a language.

It is the readjusting, reassigning, or rearranging the orders or weights or features, which focuses or re-focuses the learning subject on new or different features at the different stages of learning process, including distinguishing features or pattern recognitions. Thus, the learning process is dynamic and self-adjusting or adjusted by a trigger or test against a threshold or from an outside input. It evolves, as it gets more sophisticated, for more capabilities.

For example, in one embodiment, as the time passes, a subset of input features ($F_I(\ldots)$) are selected at a given time ($t_N$), compared to the previous time ($t_{N-1}$), until the subset becomes the same as the set itself from the previous time. Then, there is no need to sub-select anymore, to reduce the set of features. Thus, the optimization process stops at that point, and the final sub-set is selected and obtained. Mathematically, we have:

$$F_I(t_N) \subset F_I(t_{N-1})$$

For $\forall t_i$

Until we have: $F_I(t_M) = F_I(t_{M-1})$

In machine learning, in one embodiment, we initially teach the machine the language or other things or subjects without any rule or grammar, just by training samples, and usually by sheer number of training samples. Then, on the second phase, we teach or input the machine some basic rules, e.g. Fuzzy rules or rules engine. Then, on the $3^{rd}$ phase, we train the machine with more training samples, simultaneous with more rules being input, to have some order to the training and samples, which is a very powerful way of learning rules and getting trained very efficiently.

In one embodiment, the machine learns one language (or concept) by training samples only. Then, we teach the $2^{nd}$ or $3^{rd}$ language by mapping and templates, based on the first language, especially with grammar or rules, for more efficient learning.

In one embodiment, the machine learns the OCR or recognition of the text based on strokes or basic curves which in combination make up the letters. For example, for letter "t", we have the shape "1" plus the shape "-", with their relative positions with respect to each other. So, we have 2 basic strokes in our dictionary, so far, namely, "1" and "-". Once we do this for all letters and marks on keyboard or in language, we get a lot of basic strokes in common in our dictionary, which we can re-use for others.

In one embodiment, the machine learns based upon the strokes, first. Then, it learns based on the shape of letters, e.g. "t". Then, it learns based on the words, e.g. "tall". Then, it learns based on the phrases, e.g. "tall building". So, in multiple stages, it graduates from basics to more complex structures, and reads phrase by phrase to understand the text, similar to an experienced human speed reader, who can read the articles in a specific subject of her specialty very fast, faster than an average person, in which she scans, reads, and understands the text by chunks bigger than simple letters or words.

In one embodiment, instead of the machine learning in different stages, the $1^{st}$ machine learns the strokes, and feeds to the $2^{nd}$ machine, which learns the letters, and feeds to the $3^{rd}$ machine, which learns the words, and feeds to the 4th machine, which learns the phrases, and so on.

In one embodiment, we have a neural network, with multiple hidden layers, each layer representing a more complex structure, for learning process, e.g. the first one for strokes, the second one for letters, the third one for words, the fourth one for phrases, and so on. In one embodiment, we have enough processing elements (PE) in each hidden layer for our learning machine, with artificial neural network (ANN) structure, so that it can accommodate a language with all its strokes, letters, words, and phrases. For example, for English language, for the second layer, we have 26 PEs, if we only deal with the 26 English letters of alphabet, and only with lower case, and only in one type and format, as our universe of possibilities, for recognition purposes. In one embodiment, with enough training and samples, with all the weights and PEs set, we set all the recognition for letter-level recognition in the language at the second hidden layer.

Figure 49:
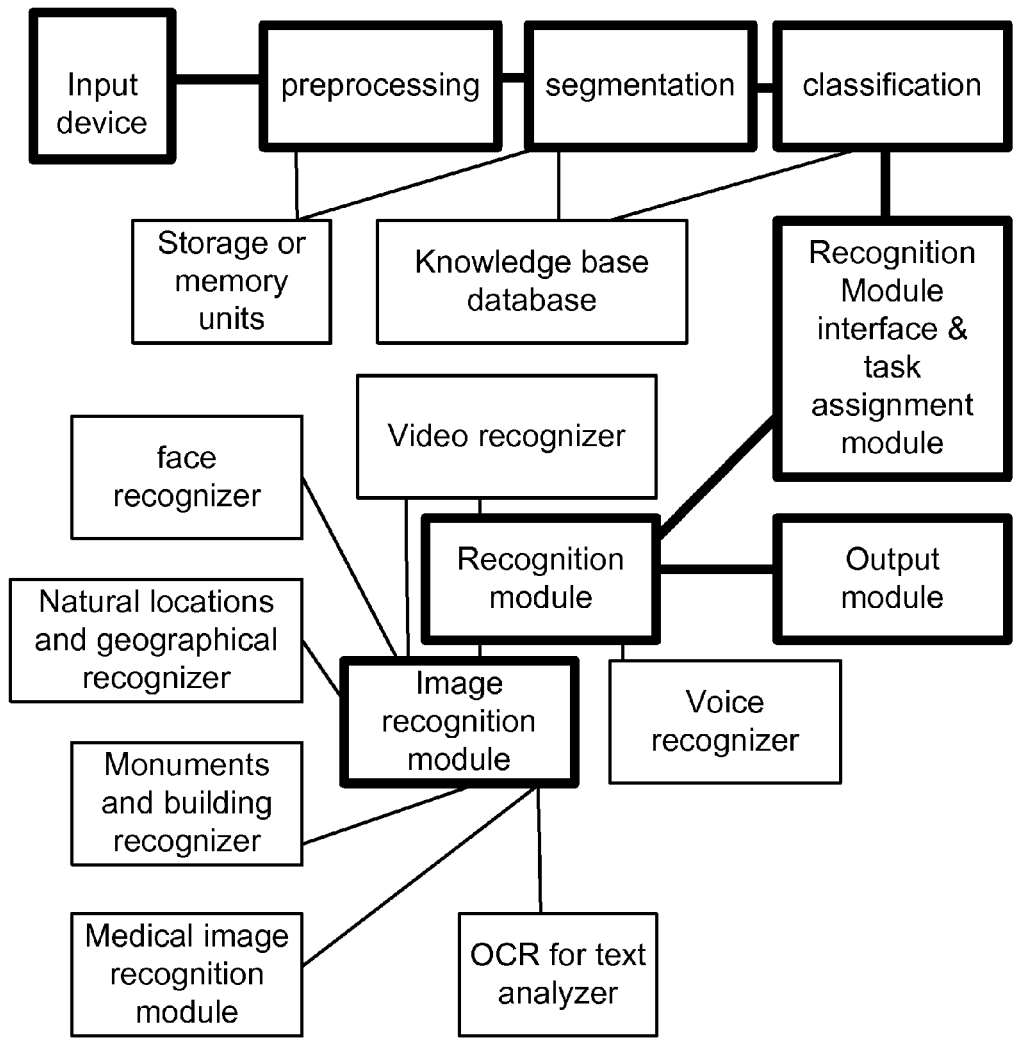
FIG. 49 shows one embodiment for a recognition system.

Data Segmentation or Classification, for Data Processing or Recognition:

In another word, in our daily life, we routinely receive a large amount of data, in which a first subset of that data may be useful for the first task, and a second subset of that data is useful for the second task (analysis, recognition, or distinction). So, for the first task, if we get rid of the rest of the original data that is not used, as useless data, to save storage space or increase recovery or retrieval speed, then, later, for the second task, we do not have the proper data for the second subset of the data, to complete the second task properly. However, if we have enough space to keep all or most of the original data, at least temporarily, to keep most or all of the second subset, or to keep all of the original data intact, then our second task can be accomplished successfully or relatively more successfully. One example is when we get voice data and image data from the same source at the same time, and the first task is to understand the voice data, and the second task is to understand the image data, which (in turn) comprises text images and pictures, which corresponds to subtask of text recognition (e.g. OCR) and subtask of picture recognition (e.g. face recognition). FIG. 49 is an example of such a system.

Data Segmentation or Classification, for Separate Optimization:

Another situation is when, for example, we have a compound image, which includes the combination of thin sharp line drawings and color photos. If one tries to optimize or improve the quality of one region or one type, e.g., the color photos, the other regions or types can be defocused or smudged, e.g. un-sharpening the lines, which destroys the crisp and sharpness or continuity of the thin line drawings, effectively destroying the black/white line drawings (or the text part) of the image. That is, we degrade the second part of the image, by improving the first part or section or type or region of the image.

Thus, we may want to classify and segment the original data, so that each part or section or type is optimized or improved separately, as the optimization is not universal for all parts of the image or data. For example, to read the text better/improve the text quality, the rest of the image (e.g. the color pictures) may get degraded at the same time. Thus, in one example, it is better to segment and classify first, and then do the optimization per region or type, or per task, as needed, e.g. to optimize the text only, and leave the rest of the image intact.

Figure 54:
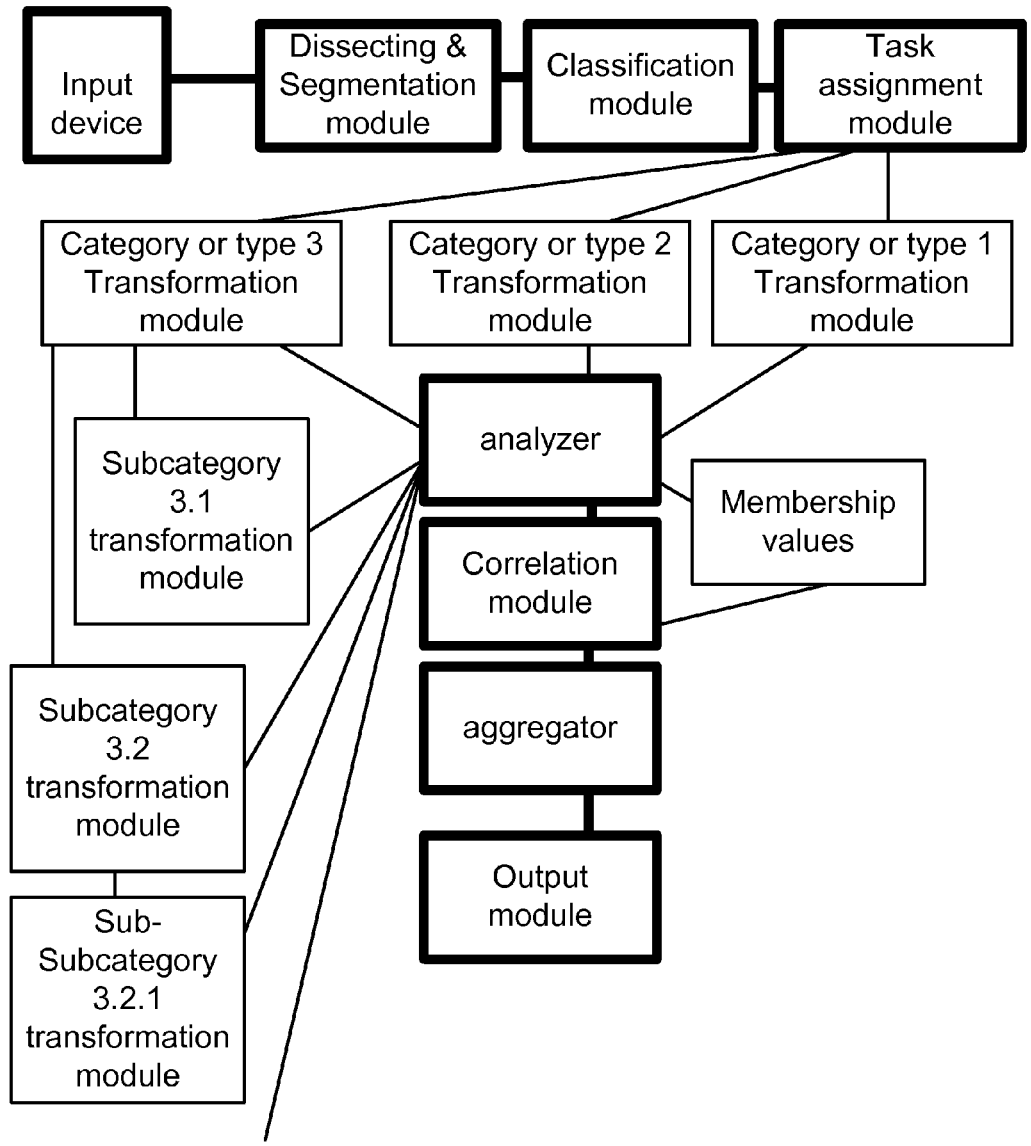
FIG. 54 shows one embodiment for multiple type transformation.

Separate optimizations with different degrees of optimization or filtering or transformation can be applied to different regions of an image, as shown in an example in FIGS. 7 and 54 (for the general system). So, for example, for intensity, for some part of the image, we emphasize, and in another part of the image, we deemphasize, to bring out some features for examination and recognition, optimized for that range of intensity. Thus, we map the intensity off-diagonal for a range, for different regions of image, as shown in FIG. 7. Then, we union all of the regions together to get the whole picture at the end. Or, alternatively, in one example, one can change everything along with the text optimization, altogether, which possibly degrades the other parts of the image, as the result. That is, the text is improved, at the expense of everything else in the image, e.g., for the situations which we do not care about the non-text data.

Optimization:

Note that the optimization is not universal. For example, we take a picture at night with a camera using a flash light, from a metal surface, with high reflection of light, which overwhelms the resulting image, with a big blob of high intensity light reflected and captured in the image, and the text underneath is not visible at all, at the first glance. However, if one plays with and adjusts contrast and intensity/other image parameters, at one point the text on the image from the metal surface becomes visible, of course, at the expense of the rest of the image (as it becomes degraded). That is, the optimization is usually localized and for specific purpose. That is, generally, the optimization is not universal, or not for all-purposes, or not for all types of data, or not for all regions of image.

Scope of Search:

In one embodiment, we start from task or goal, to limit or set the scope of search or result or filtering. Thus, the question (or task or goal or what we are asked for or looking for) ultimately determines how to optimize (or view or filter or twist or modify or convert or transform) the data or image. That is, the assigned task gives the proper context or scope, so that we can focus to search or filter or optimize for the corresponding answer or result. That is, there is no single answer or filtering for all tasks or goals. Each task demands and corresponds to its own filter or transformation or result. That is, the scope of the transformation or filtering is determined or limited by the task (or assigned goal at hand), itself. Another way to look at it is that once we define the "noise", as what the noise is in that context or environment, then we can define the filter that reduces that noise, which sets the goals or tasks for our optimization.

Relationship Possibilities:

Note that there are extremely large amount of relationship possibilities from a very limited finite set of data. For example, let's look at the tiger example again. The tigers may have only about 20 different stripes, as an example, as a finite and very limited set of data, e.g., expressed by a set of pixel data representing an image, e.g., with specific 256 color resolutions for each component of color RGB data and at 600×600 dpi pixel resolution in 2-D orthogonal axes/directions.

However, we can define much bigger number of relationships (e.g. hundreds of billions (although some are not independent of others, and can be derived from others)) between these 20 stripes, e.g. ratio between width and length of each stripe or between stripes, or angles or curvatures of each stripe or multiple stripes, as different combinations of ratios of these features, which by far dwarfs the number or size of the original data corresponding to 20 different stripes. However, from among all these ratios (e.g. billions), maybe, there are only a handful, say e.g., 3 stripes behind the nose and ear for each tiger, with their corresponding lengths or their ratios, that produce only 6 numbers, as an example, that are the determining parameters to distinguish any tiger in the set. So, only 6 numbers are needed for our recognition process. However, this is not readily apparent, when we look at the original 600×600 image, or when we look at the billions of calculated ratios or relationships or lengths.

Thus, one has to know what to look for, which is usually a subset of the original data or relationships or features, to make the recognition in the universe of the objects, to recognize all or most of the members of that universe. To zoom and focus on those 6 numbers (as an example), one can reduce the calculation and memory needed to do the task of the recognition, the same way a tiger recognizing her own family and siblings in a fast and efficient way, with much less analysis than an average human would do, to recognize the same tigers, if it is possible at all.

In one embodiment, we do not know what we are looking for, e.g. in a "big data" analytics. In those situations, we guess at some pattern or feature, as candidate(s), from our history or experience or library or other user's experience or using expert's opinion in other or similar situations, to test the hypothesis, to see if the first candidate yields anything in search or recognition. If not, then the system moves to the second candidate, and so on, to exhaust the list of candidates. If any candidate yields anything, then we continue the analysis on that candidate and follow that pattern or feature. In principal, we may end up using multiple candidates and find all the corresponding patterns or features.

The candidates can also be picked up randomly from our universe of possibilities or library, in some situations, e.g. where there is no preference in mind, or no experience or history on file. For example, for images received, we may want to see if we can find any face in the images, or find any text, or car, or any function with sinusoidal behavior (e.g. periodic), e.g. with intensity of pixels going up and down periodically, e.g. in a bar-code image with parallel stripes with some periodicity (T) or frequency (f).

Multiple Recognizers or Classifiers:

Let's look at the human/face recognizer engine or module or software. If a recognizer is trained for pictures or images of people from Middle East to distinguish among them (first module), and another one is trained from Chinese or oriental people or training samples or images (second module), then we do not want to re-train one module to change its weights, e.g. neural network weights, to convert or optimize first module to become second module. Thus, we want to keep both as-is, as each module is optimized on a subset of samples. So, in a first level, we figure out and sort based on the regions of the world, on a coarse and quick basis, and on the second level of analysis, we send the result(s) or images for analysis to the first module and the second module, and so on, which are optimized based on a subset or region of the world or population, to do an accurate recognition in that subset, only. This hierarchical model can expand to many layers, to go to subsets of a subset, for further analysis. So, in this embodiment, to be efficient, not all recognitions are done in one level or one recognizer or one neural network, as an example. See e.g. FIG. 8 for such a system.

In one embodiment, we use our search engine as multiple expert systems, e.g. it has a section for English language, a section for French language, a section for car engine, a section for food and wine, and the like. See e.g. FIG. 9 for such a system. By splitting the queries or searches according to classes or topics, and then splitting into subtopics and sub-subtopics and so on, we can get the context right, to go to the appropriate Z-web. For example, an abbreviation or word used in food industry has no meaning or different meaning than that of the car industry. So, for efficiency and for accuracy, we need to get the context or environment right as soon as possible, and classify and process accordingly.

FIG. 5 shows a system for context determination, with language input device, which feeds dissecting and parsing modules to get the components or parts of the sentence, which feeds the analyzing module (which e.g. may include memory units and processor units or CPU or computing module), which is connected to the context determination module, which is connected to the default analyzer module and multiple other context analyzer modules, each with different expertise or level of analysis or depth or subject matter (e.g. scientific expertise, or chemical expertise or knowledge), which are all connected to the sorting module, which is connected to both fuzzy membership values module (or alternatively, crisp scoring value or weight module) and correlation module (to sort and correlate the results), which is connected to the aggregator module to aggregate the results from above, which is connected to output module, e.g. printout or computer monitor or display or any graphic or table or list generator, for the user to use or see, or for other systems to use, e.g. as an input (e.g. without any human intervention or input or review).

In one embodiment, the context is hard to guess from one sentence ($S_{text}$). So, we usually need a large sampling or history or third entity input. However, in one example, Z-web itself can also help set the context right. For example, if we have 2 context candidates in mind to try, namely Context-1 and Context-2, then the corresponding Z-webs can be examined, namely Z-web-1 and Z-web-2, respectively. Then, if e.g. we have more nodes (or higher weights or reliability factors) related to our $S_{text}$ from Z-web-1 than that of Z-web-2, then we can conclude that between the two contexts, Z-web-1 or Context-1 is probably a more relevant context. So, between the 2 choices, we choose Context-1 as our context. See e.g. FIG. 10 for such a structure or system.

In one embodiment, we have multiple recognizers or classifiers, with different degrees of complexity (and overhead and cost and accuracy and depth analysis and focus). We cascade or chain them as from simple to more complex ones in series, one feeding the other, so that if the answer is NO for one level, it does not have to try the next level classifier any more, and stops the process at that point, with exit from the loop. If the answer is YES, then it tries the next level classifier, which goes more in depth, to find more about the object, or classify more specifically, based on the result of the previous classifier (which had a broader scope of inspection). For example, first, we find it is a text document, then, we will find out it is a book, and then, we will find out it is a novel. Obviously, if it were not a "text" determination at the first level of classification, we did not have to activate or feed it into the "book classifier" or "novel classifier" in the next steps, as they would have been useless, as their expertise or focus would not be needed at all. Thus, the system is more efficient and more compartmentalized and more expert-oriented and more depth analysis and deeper classification or recognition, now.

To combine classifiers, in one embodiment, for classifiers which only return the selected class or rejection, we can use the following methods to combine the classifiers: maximizing posterior probabilities, voting method, or Dempster-Shafer theory. To combine classifiers, in one embodiment, for classifiers which return a ranked list of classes or categories, we can use the following methods to combine the classifiers: Borda counts or logistic regression method. To combine classifiers, in one embodiment, for classifiers which return a ranked list of classes or categories, together with the classifiers which return a measurement associated with each class, we can use the following methods to combine the classifiers: weighted sum, ruled based, fuzzy integral model for classifier fusion, associative switch, or trained perceptron. To combine classifiers, in one embodiment, for all classifiers of any type, we can use the hierarchical decision making method. To combine classifiers, in one embodiment, we use and add the complementary classifier, to improve the performance of the combination. To combine classifiers, in one embodiment, we use unanimous voting or majority voting scheme for combination.

Classifiers:

In one embodiment, we have the nearest neighbor rule for training samples and the closest prototype, for assigning the corresponding class, to optimize the classification. In one embodiment, we get a binarized image. Then, it is thinned to get the skeleton image. Then, the system extracts a set of features to classify (as a separate class for recognition).

In one embodiment, we use a Markov chain-based classifier, with state transition probability depending only on the current state. For example, for Markov chain, we can represent an object with its boundaries or border or edge line, which is represented by a collection of points connected together using short straight lines, which can be represented by a chain of points, going from one to next, based on a direction and distance values, to set or get to the next point. So, starting from point one, we can complete the loop and find the boundaries or border of an object, and each point depends on the prior point in the chain, which is based on Markov model.

In one embodiment, for classification, we use "Fuzzy c-Means Clustering Method", with a fuzzy pseudopartition or fuzzy c-partition of our set (where c is the number of fuzzy classes in partition), in terms of cluster centers, and using inner product induced norm in our space (representing distances in that space). The performance metrics measures the weighted sum of distances between cluster centers and elements in those clusters. We want to minimize such a function. First, we choose an initial pseudopartition. Then, we calculate the c-cluster centers in the form of:

$$S_i = (\Sigma_k [P_i(x_k)]^n x_k) / \Sigma_k [P_i(x_k)]^n)$$

for the initial pseudopartition and a specific n, wherein $\{P_1, P_2, \ldots, P_c\}$ represents a fuzzy pseudopartition, $x_k$ represents a set of given data, and $S_i$ represents the partition (with association being strong within clusters, but weak between clusters).

Then, we update the values, for (t+1) instance: If the distance measure $\|x_k - S_{i(t)}\|^2 > 0$, then we have:

$$P_i^{(t+1)}(x_k) = (\Sigma_j ((\|x_k - S_{i(t)}\|^2) / (\|x_k - S_{j(t)}\|^2))^{(1/n-1)})^{-1}$$

wherein j runs from 1 to c. If $\|x_k - S_{i(t)}\|^2 = 0$, then we have: $(\Sigma_i P_i^{(t+1)}(x_k) = 1)$, for (i∈I). Otherwise, we have: $(P_i^{(t+1)}(x_k) = 0)$.

Then, we compare the values for instances t and (t+1). If the difference (or the distance in our space) is less than a predetermined threshold, then the system stops the process (and exits the loop). Otherwise, the system (or controller or processor) increases the counter t by 1, and repeats the loop again, as shown above (until it exits the loop at one point in the future).

In one embodiment, in the manipulation of Z-web, for any fuzzy clustering, we use the method detailed above, for clustering and recognition purposes.

In one embodiment, for pattern recognition or classification, we use clustering tree, e.g. with Euclidean distance or Hamming distance, or use Fuzzy Membership Roster Method. In one embodiment, for fuzzy pattern recognition, we use the degree of membership of an object to associate the object to a class or multiple classes (in contrast to the conventional or classical classification goal or method). That gives us more flexibility for classification. In one embodiment, we use a minimum threshold, for min. value for the membership, below which the membership is set to zero.

In one embodiment, we use fuzzy syntactic method for language(s) and its respective grammar, which governs the rules for string of symbols that makes up the language (or replaces the language or makes a template or encodes the language or summarizes the language). In one embodiment, we use fuzzy grammar, which is not crisp, and is based on overlap and partial relationship, with membership function or value expressing such a relationship, relaxing the strict requirement by crisp or conventional grammar, making it more compatible with natural language processing and human language. In one embodiment, we use multi-level hierarchical classification method, for class, subclass, and so on, at different levels.

Minimum Number of Objects Needed:

For the minimum number of objects needed for defining or describing a situation or relationship, let's look at one example. Let's assume a mother is teaching her new-born son how to speak English. If in that universe, there is no radio, TV, CD, or book available, and there is nobody else available to talk to them, then the distinction between "I" and "You" would be very hard for the son to understand, as he may think that "You" is his first name, at least at the beginning, because there is no third person to talk to, or other interactions with a third party, or a video to watch with a third person talking in it, that can set the meaning of "You" properly for the son. So, it would, at least initially, be very confusing for the son. So, for any given situation, one needs a minimum number of objects, or a "minimum" arrangement or setup, to define the situation properly and define the relationship between those objects properly.

Minimum Vocabulary Needed:

In addition, in a universe with 2 people only, there is no need to have a third person referral, e.g., "he", "she", "him", or "hers", in the language, because there is no use for it at all, and it may not make any sense to have an extra baggage or term or name or reference in the language for a non-existence concept or object. So, in one embodiment, we can reduce and simplify the minimum vocabulary set needed to operate or communicate in that universe, by eliminating the excess baggage or words or terms.

Age Progression Model for Pictures:

For all human races, genders, and face shapes, one finds $N_P$ clusters, based on $P_D$ dimensions or number of parameters extracted from each sample. For each type of face, from $N_P$ possible types, one defines or designs a set of $S_A$ age progression templates for different ages of the person, which can be morphed in a series, as the person gets old. This can be done analytical or mathematical based on coordinates and curves defined for each face. This can also be done by using a series of pictures from a real person at different ages, to fit the model, or for learning using a neural network, or use as template for that type of face. Of course, the larger the number of examples or number of people, $M_P$, the better the template will be for the fit. So, we need a lot of pictures of many people of different face shapes, at different ages. See e.g. FIG. 11 for such a system.

To be efficient, we use a subset of those images, as the ones from similar ages do not help any further. For example, the image of a person between 41 and 42 years of age does not generally change much. So, it is not much helpful to store both. But, image of a person, for every 6 months, between the ages 2-3, changes a lot, and so, it should be stored more often/frequent at younger ages, as an example. So, in a series of age progression images, one can mark the major changes as the main ages or images to keep, as a good sampling set or collection. So, we define the difference between 2 images, e.g. at pixel level, as difference between pixels, divided by the value of the original pixel, as the normalized value, to compare the relative changes in images at different ages, to find the largest jumps and changes at different ages.

So, we can find the major changes from real images. Alternatively, we can find the major changes based on prior knowledge from many thousands of images of other people, to categorize the age brackets, and find the break points, or alternatively, from medical database, indicating the expected changes for an average human, for various major changes in shape, height, face, or features, e.g. beard or hair loss, versus age brackets or break points in time axis, e.g. for the people from Middle East, as a subset of population, with expected values.

Note that if the scales or angles of view of the faces are not the same, in 2 images, then, before comparison, we have to adjust or normalize to one size or direction, so that we can compare them meaningfully. To adjust the size, one measures e.g. the length or width or diagonal of the face or nose, as the calibration metrics or normalization factor, to scale one with respect to the second one. To adjust the angle, one has to look at the symmetry or direction of the nose with respect to the oval of the face or position of ears or eyes, as an example, to estimate the direction and angle of rotation, to adjust the direction of the face, or normalize the direction. For angle adjustment, we use models we have for rotation of the face as templates, to morph one to the other direction. The models are based on $N_P$ possible types of the head or face in our database, described above, to get a better result. After rotation of the face, we compare it to the second image, which has about the same orientation. Then, it is a fair comparison. In one embodiment, all faces are turned to the same direction for comparisons, e.g. front view, only. See e.g. FIG. 12 for such a system.

In one embodiment, instead of rotating the image, we look for an image of the same person corresponding to the same rotated view or angle, from the same age category, if it is available in the database. Then, no rotation is needed, and less computation power is used.

To do the morphing from the first angle to the second angle, for the image of the face, we model the face or head as a mesh with contours, with points on it, as a template for each angle (or direction or view). Moving from one point from the first angle template to the next corresponding point on the second angle template is equivalent to moving the contours or meshes slightly around its current position. We choose the morphing in small increments for angles so that the differences are manageable by slight movements of contours or meshes. We can model the slight movements by vectors and translations and rotations of vectors, or a combination of them, in a series of instructions to morph properly, for piecewise regions of mesh or contour on the face.

Another way to do this vector modeling is by modeling and fitting a real picture or image of a person at different angles point by point (by coordinate in 3-D), then connecting the neighboring points to get contours, and from the series of contours get the mesh, modeling the face. Then, we have this repeated for different angles for the same person. Then, store the data for that person, representing one of the $N_P$ possible types, that corresponds to that type of head or face, in a database, for future referral and comparison.

During this process, for a given first point on the mesh, we find a corresponding second point on the template for a second angle or view. Then, on the coordinate of the 3-D model, with 3 components (x, y, z), we find how much the first point (x1, y1, z1) moved (to the second point (x2, y2, z2)), which is:

(x2-x1) in x-direction
(y2-y1) in y-direction
(z2-z1) in z-direction

We can repeat/get this calculated for multiple points, and then model all of those changes in coordinates in 3-D for those multiple points, using translation, scaling, and rotation, or a combination of the above. That would be our final recipe or series of instructions or steps for morphing process.

Please note that the translation is based on (x2-x1) in x-direction, (y2-y1) in y-direction, and (z2-z1) in z-direction. The scaling is based on (A x1) in x-direction, (B y1) in y-direction, and (C z1) in z-direction. The rotation is based on matrix of rotation, e.g. in 2-D expressed as a 2×2 matrix ($M_{2 \times 2}$), with the following 4 entries ($M_{ij}$), for a clockwise rotation by angle α on a 2-D plane, as one example:

$M_{11}$=cos α; $M_{12}$=−sin α; $M_{21}$=sin α; $M_{22}$=cos α

In one embodiment, we use 3 types of templates for face model in 3-D (dimensional) for face recognition, or after scanning the face (with a light, scanner, or by a 2D image or multiple 2-D images), or for storage, library, or comparison, alone or in combination: (1) wire mesh using thousands of points on the face, (2) contours of face for topography and geometry, e.g. cheek bone curves and structure, and (3) semantic model, which models the face based on the general semantics and description of the face, e.g. "big nose" or "small lips", which are Fuzzy descriptions, with corresponding library of descriptors and shapes, plus rules engine or database, defining those beforehand, so that we can store or reconstruct or combine Fuzzy features e.g. "big nose" and "small lips", and e.g. make up a face from descriptors later, or compare 2 faces just using descriptors without reconstructing the faces at all, which is very fast and cheap, for a Fuzzy match or closeness degree. In one embodiment, we use many small steps between Fuzzy descriptors on the scale or axis, to have differentiation between objects more easily and have a good coverage for all samples in the defined set or universe, e.g. for "height" property, we will have: "short", "very short", "very very short", "extremely short", "unbelievably short", and so on. See e.g. FIG. 13 for such a system.

The method of recognition mentioned above is helpful as one of the parameters for face recognition, or validation for identity of a person, using pictures of different years or ages, to find a person. Identity recognition, in turn, is a factor for determination of the relationships between objects and humans (or other subjects), and to build such a web of relationships or Z-web from all these determinations, like a tree structure, with nodes and branches, with strength of relationship and reliability of the determination e.g. symbolized with the thickness and inverse length of the branches (respectively), connecting the concepts as nodes, for example, for display purposes, for visual examination by the user (which we call Z-web).

In one embodiment, we have a picture, or multiple pictures of a same person, possibly from different angles, and then we feed that to the system, and then from library, based on shape comparison (e.g. features and parameters of the head in N-dimensional feature space), the system chooses the most possible type of head, out of say e.g. 105 types it has, to suggest that as a model. Once we have the model, we fit those one or more pictures into that model, and construct point by point or mesh structure or contour map of the face. The model has some parameters as variables, which can be adjusted in 3D using those 2D images as input, which gives elasticity to the form of the face and head in the 3D format, for minor adjustments to the 3D model in computer (which can be displayed for the user, as well, as an option). In addition, the same 3D model can be input to a 3D printer, or 2D rendering image printer, or laser induced bubble printer (in plastic or glass), to construct the same head in the solid format, e.g. in glass or plastic or polymer.

In one embodiment, we have e.g. front view of a person, e.g. in a picture or image. Then, we use slanting or some deforming lens or filter or translational transform(s) to change the shape of the face slightly, and store them as the basis for the rotating or moving head slightly, from the front view position (from its original position, with small perturbation or movements), in the library. So, we can use them as eigenfaces for frontal or near frontal sideway faces, for the future face modeling, face replacement, face recognition, face storage, as linear combination of eigenfaces, face approximation, efficient storing of faces, coding the face, and comparison of faces. See e.g. FIG. 14 for such a system.

In one embodiment, we have orthogonal or orthonormal eigenfaces as basis. In one embodiment, we have non-orthogonal or non-orthonormal eigenfaces as basis, e.g. some being as linear combination of others, which is less efficient for recognition (and being too redundant), but easier to generate the basis functions, due to less constraints on basis functions. In one embodiment, we obtain eigenfaces from thousands of samples, by cloudifying or fuzzifying or averaging pixels in large neighborhood regions for the samples, in the first step. Then, optionally, we can stop there, and use the result of the first step as our final answer, as eigenfaces. Or, we go one more step, in another embodiment, and we average the first step results together, to get even more "cloudy" images, as our final result, for our basis, for eigenfaces. Or, we go one more step, in a loop, recursively, in another embodiment, and we average the averages again, until it is cloudy enough or we reach N loop count, and we stop at that point, yielding our eigenfaces. Then, any given face is a linear combination of our eigenfaces. See e.g. FIG. 15 for such a system.

To remove redundant eigenfaces from our basis functions, e.g. to have an orthogonal set, we try or choose one eigenface, and if we can write it in terms of linear combination of others, then that chosen eigenface is redundant (and not needed) and can be removed from the set. In one embodiment, to make some image fuzzified, we can use fuzzy parameters, rather than crisp ones, or use dirty or oily lens for image, or use defocused lens or out-of-focus lens for images, as a filter or transformation or operator, to get the cloudy or average effect between pixels.

In one embodiment, for face recognition, or eyes or any other object, we have Sobel operator or filter or matrix or convolution, based on gradient or derivative, so that the operator finds the gradient of the image intensity at each pixel, e.g. the direction of the largest increase for pixel intensity (with the rate) or contrast, as an indication of abruptness of changes in the image, to find the edges or boundaries, to find the objects or recognize them. In one embodiment, other filter kernels, e.g. Scharr operators, can be used for edge detection or gradient analysis.

In one embodiment, for face recognition, we use edge detection or other object recognition methods to find eyes (or nose), first, as an anchor point or feature. Then, from the eyes' positions, we know relatively where other parts may be located, if it is a real face, based on expected values or distances based on face models in library, e.g. as a probability distribution or expected value or average value or median value, for distances. See e.g. FIG. 16 for such a system. Or, in one embodiment, based on the eyes' positions, we can normalize the face size or other components or the image, for faster comparison. In one embodiment, for face recognition, we find the edges, first. In one embodiment, for face recognition, we find the separate components, e.g. eyes and nose and mouth, first. In one embodiment, for face recognition, we find the whole face, as a whole, first, using e.g. eigenfaces. In one embodiment, we combine the 3 methods mentioned above, for different parts or components or stages of image or object or recognition process, for higher efficiency. In one embodiment, we generate the eigenfaces based on a large number of samples or pictures of many people, e.g. from front view or from side view, for different sets of corresponding eigenfaces, for front or side view, respectively, e.g. using averaging or weighted averaging on pictures, or using a training module.

Z-Web Representation and Manipulation:

The graphic representation of Z-web makes it easier to visually understand the strength of relationship and reliability factor, among other factors embedded in the Z-web, as explained in other parts of the current specification. The graphical representation also mirrors fuzzy parameters, as the human visual perception is not crisp, but it is fuzzy, similar to natural language processing and expression.

To get an object, one searches for nodes on the Z-web (e.g. using an index on a database or listing, using a query), and once the node is determined or found, the connectors and branches coming to or from that node are examined for determination of the reliability and other factors mentioned in this disclosure, from the numbers or sizes or dimensions associated with the connectors and branches, e.g. the thickness or length of the branch between 2 nodes. The "circle of influence" is based on (in different embodiments): the neighboring nodes, or N-th neighboring nodes, or nodes within radius $R_{node}$, centered at that original node, as a hyper-sphere, in the m-dimensional Z-web space, with m coordinates. The circle of influence gives us the guidance as to where and how far we should go for related nodes or concepts or objects, in the branches, to find other objects or recognize objects or find the reliabilities or confirm the objects. Sometimes, the influence of the circle of influence dies off gradually, and not abruptly, using a fuzzy parameter to model that behavior. In other embodiments, the influence of the circle of influence dies off abruptly, which is an easier model to handle and calculate for.

The user interface or GUI is based on a region or section of Z-web displayed in 3-dimensional or 2-dimensional space or coordinate, in one example. The storage of the Z-web is done in relational databases, in one example, to store node parameters and branch parameters and values, which can be fuzzy or crisp or based on natural language, e.g. "small", e.g., to describe the length of the branch.

To insert some nodes, in between 2 nodes, e.g., one can break the branch connecting the 2 nodes, and insert the piece or node in between, and add 2 new branches to the beginning and end of the added piece, to connect to the rest of the Z-web to expand the Z-web, if needed. The reverse process is applicable, for elimination of a node, if the concept or object is not applicable anymore (e.g. a species of an animal is extinct in year 2020, and the node relating or describing the current live species on planet Earth described in the Z-web has to be updated and eliminated).

Two (or more) Z-webs can be combined, as well. For example, if they do not have any common nodes, the combination is just the simple union of both, with not much adjustment. However, if they have some common nodes (e.g. object "animal" being present in both Z-webs, as a common node), the common nodes can be overlapped together, as a single node, and the branches for a common node can be added from one Z-web into another Z-web. After that, any other node or branch automatically follows the old connections they had from the original 2 Z-webs. However, in one embodiment, we make an adjustment on the values for nodes and branches for the overlapped common nodes to make them compatible. For example, all values can be normalized based on the value of one node on the first Z-web, with respect to the corresponding value of the same node on the second Z-web (mirror node), or ratio of those two values applied to all the values on the second Z-web, to "normalize" the second Z-web, with respect to the first Z-web, to make them compatible.

In one embodiment, we make the adjustment on the node, based on the reliability factor, or other factors mentioned in this disclosure. For example, the value of the first node on the first Z-web is changed towards (or changed to) its mirror node on the second Z-web, if the second Z-web has more reliability factor corresponding to that node. The change can be straight and exact assignment of the value of the mirror node, or can be gradual or partial adjustment towards that value, which could be a fuzzy concept by itself, for example, "almost the value of mirror node" or "90 percent of the value of mirror node".

In one embodiment, one party makes a first Z-web, and then combines it with N other parties producing N other Z-webs, as described above, to increase the knowledge base and relationship base, including reliability, credibility, truth value, and other factors mentioned elsewhere in this disclosure. This also takes care of the contradictions and inconsistent results, to fix or find anomalies or biases or other parameters described in this disclosure.

As time passes, the size of the super-Z-web increases, and its value grows, as more people or entities contribute to that super-Z-web, which includes more concepts and objects. If all branches associated with a node is broken, the node becomes irrelevant, and can be eliminated from the Z-web. If a node is accessed a lot, its "popularity" value goes up, making it harder to break the branches later. If a value is confirmed or approximately confirmed, in a fuzzy sense, then the reliability of that value increases.

The branches between nodes are not-directional, in one embodiment, so that the relationship is e.g. bi-directional or symmetric. For example, if object A is close to, or located close to, B, in terms of Euclidean distance or meter or length, then B is also close to A. Thus, relationship between A and B is symmetric in that respect. However, in another example, the relationship of "ownership" is not symmetric between a "car" and a "person", because a person owns a car, but not vice versa. Thus, "ownership" is a directional relationship or branch, between 2 nodes. See e.g. FIG. 17 for such a system.

In one embodiment, we have hunches or random guesses, or using guided templates, to follow some scenarios, to guess and validate some relationships between the objects. The rules are used for validation of the hunch or guess, e.g. using game theory. For example, one relationship between 2 people in a picture is father-son relationship, as a guess, which can be suggested and followed up to validate that guess, if it is true. If the parameters are non-crisp, then we use Fuzzy logic and sets and boundaries and values. If the assumption or guess ends up with contradiction, we back track, to invalidate the original assumption, and try another guess.

Of course, if later on, we have an input from social network (e.g. FACEBOOK® or LINKEDIN®) or family picture or family album web site or matching family names (or maiden name) or ancestry-type web site, that 2 people may be related, then we do not need to try the guess scheme, and the discovery goes much faster.

In one embodiment, to update a first object, which is based on one or more second object(s), the system tags the second object(s) or node(s) in the Z-web, so that if there is any changes on the second object (e.g. above a threshold, or any changes whatsoever), then as a trigger event, it would trigger the Z-web to ask the calculation module or the processor module to recalculate the first node and all its properties, including all its Z-factors, and optionally let the user know about the update event, for the user to extract data from the first node again, if desired. In one embodiment, it also propagates the update to the other nodes in the Z-web, or other related Z-webs. In one embodiment, this is used for incremental or small changes, or for fast update, or parallel updates in various regions of the Z-web (regionally or in small scale e.g. around one node only). In one embodiment, we have a Z-web with multiple nodes connected to each other, based on the relationships and functions, with different strengths or closeness for each branch connecting the nodes, each having its own Z-factor, including reliability factor and other factors discussed in this disclosure, with each node representing an object, concept, emotion, status, mood, mode, state, subject, number, human, animal, car, table, face, name, birth date, event, or the like.

Accessory Models:

Now, let's look at the accessory models for humans, animals, objects, faces, eyes, or other body parts, for image recognition. For example, for a human, the person may wear or carry a pair of glasses, hair piece, hat, beard (real or fake), moustache (grow or wear, fake or real, e.g. with different styles or sizes or forms or shapes), ski mask, eye patch, sun glasses, scarf, big loose rain coat, turtleneck clothing, body or face covers, umbrella, other accessories, and the like. These alter, modify, cover partially or fully, or hide the features (e.g. curvatures or contours or markers) of the body, face, human, or animal, in a way to make it harder or difficult to make proper or correct recognitions or classifications.

To overcome this problem, we can do multiple solutions. First method is to extrapolate or interpolate the regions, colors, texture, or lines in the image, to fill up the gaps or missing or covered part(s). There are multiple ways to do this. One is to filter or un-sharpen the image or lines to fill the small gaps. Another way is to distinguish the regions or open regions or connected regions, to copy the texture or color from one and paste and extend the patches or small copied regions into the neighboring connected regions, to fill up the gaps with correct color and texture, as much as possible.

Another method is to first add (for example) a pair of glasses to the picture of a specific/same person, by superimposing the picture/image of a pair of glasses on top of the person's face/person's image, and then to compare the resulting image to the images with pair of glasses, for proper recognition or verification for the face or person.

Another way is to compare only the visible parts with corresponding parts of the target images, to find the matches or degree of matches, and treat the invisible parts or hidden regions as "DONOT CARE" regions or "NEUTRAL" regions, which do not contribute to the match analysis.

Another way is to first use a template or generic face with glasses or a model with glasses or an accessory model (e.g. using real image of mannequin, or computer generated model or mesh or 3D surface, or averaging the normalized coordinates of thousands of images of the face), to modify or morph the first image, to compare the modified image to the second image, for match analysis and recognition.

Another way is to use neural networks for training purpose, with a large set of faces with eye glasses (for example), so that the neural network is trained (with weights set) to distinguish a person with glasses, or distinguish a specific person with glasses (e.g. with any style or type of glasses, or even when the person not wearing the glasses). In that case, a person with many types of glasses can be photographed for input to the training module, for training the neural network. See e.g. FIG. 18 for such a system.

In one embodiment, one can model different glasses as a 2-D (2-dimensional) object, and superimpose on the first image/picture. In one embodiment, one can model different glasses as a 3-D object, and superimpose on the first image/picture. The 3-D model is more computing power intensive, but has the advantage of better perspective and more realistic views from different angles. In general, any accessory on human, face, animal, automobile, or other objects can be modeled in 2-D or 3-D model, and stored in one or more databases, for usage, superimposing, editing, replacing, morphing, converting, or adding to the image or model of another object, e.g., human, face, animal, automobile, or other objects.

In one embodiment, one models different glasses separately and models different faces separately, and then superimpose them together. In one embodiment, one models different glasses and different faces together, as one object. In one embodiment, one models the objects using a real faces and real glasses (e.g. pictures or images from real objects), by classifying them, using many training samples, and having at least one of each classification stored for future referral. For example, if we have $N_f$ different types of faces and $N_g$ different types of glasses, then we will have $(N_f N_g)$ different types of combination of faces and glasses. Similarly, for M objects, we will have $(N_1 N_2 \ldots N_M)$ different types of combination of those M objects, stored in the database.

In one embodiment, one models the objects using a real faces and computer generated glasses types. In one embodiment, one models the objects using a computer generated face types and real glasses. In one embodiment, one models the objects using a computer generated face types and computer generated glasses types.

In one embodiment, the computer generated types are based on real images of real objects, as well, which are classified as different types by the computer, and an average or typical sample is stored as an example of that specific type in the database. In one embodiment, the storage of the example is either analytical, e.g. mathematical formulation of curves and meshes, to mimic the surfaces in 3-D, or brute force storage as a point-by-point storage of coordinates of data points, in 3-D (x, y, z) coordinates.

Features in Images (or Other Subjects) are Recognized in Different Orders:

Let's assume we are showing a picture of a red 2-door convertible Ford car to multiple recognizer units or modules. In the first order or step, they all may recognize the car in the image. Then, in the second order or step, they may recognize red color, or 2-door, or convertible, or Ford brand. Thus, based on the background or experience or training of the recognizer units or modules, the next step may be very different for the recognition process. Eventually, all or most of the features may be obtained by most or all the recognizer modules, but in very different orders. So, there is no universal classification or universal correctness in recognition or absolute classifier or single answer or single recognition method or formula or procedure. Having said that, however, one can still get to the same answer from different routes, e.g., saying or recognizing or resulting in: "a red 2-door convertible Ford car", or the combination of the following features:

CAR→+RED+(TWO-DOOR)+CONVERTIBLE+
(FORD BRAND)

The principle mentioned above is applicable for any other recognition or any other subject or object, e.g. voice recognition or music recognition.

Recognition Method in an Image, for Background and Foreground:

First, for example, we find the background in the image, such as sky or water. That also determines the direction and angle or tilt adjustment for the image. See e.g. FIG. 19 for such a system. For example, the sky is usually on the top, and the horizon line, separating land/water/ocean and sky, is horizontally oriented, to correct the tilt of the image. For example, the sky is recognized by the specific color or range of colors or patterns (such as cloudy sky or bright sky), and/or the continuity of the region with minor or no features or variations (such as patches of clouds in the sky, or stars in the black or dark sky at night), or using histograms for pixel intensity and variations (or colors) (or peaks and valleys and plateaus and shapes) as signatures for sky (compared to trained samples or many stored in library or database), or using Fourier or DCT analysis (for frequency domain analysis and coefficients, for comparisons or signature or feature detection, for recognition).

In one example, once we know the background, all other objects blocking the background, e.g. ocean or sky, will be foreground objects, e.g. boat or airplane, located or positioned in the ocean or sky, respectively. The foreground objects can be recognized from the database of objects, using object recognition module or device, as boat or airplane, and tagged accordingly after recognition process. The recognition can be based on silhouette or shape or shadow or profile or boundaries of an object with respect to the samples of the database, as the percentage of match, between the normalized objects, for faster and better comparisons, using a vector or chain piecewise comparison, or pixel-by-pixel comparison for the silhouette or shape or shadow or profile or boundaries of an object.

In one example, we remove the foreground, and we end up with patches or regions of background objects. For example, once we distinguish a man on the foreground as foreground object, we can remove the man from the image (ending up with a blank region), and end up with the 2 pieces of sofa that the man was sitting on, on the left and right sides of the image. From the texture and color, or continuity of the border lines or extension/direction of the border lines, of the 2 sides, we recognize that they belong, or most likely belong, to the same object. So, we fill up the blank region behind the man's position in the image with the same texture or color from either or both sides of the image (or use an average or mixture of the texture or color from both sides of the image). So, now, we end up with a whole sofa, which is much easier to recognize as one piece, or single region object.

Also, the fact that we know we are in a home environment or context helps us to narrow down to about 200 objects, for example, in our database, related to possible objects in the house, or belong to a specific person living in Canada (based on the conventional furniture for that part of the world, e.g. a sofa, or e.g., knowing a specific person originally from Middle East, with big traditional pillows on the sofa, as possible choices to search or compare for, from the possible-choice-databases, available or compiled by us, beforehand). See e.g. FIG. 20 for such a system.

In one embodiment, we can recognize the two sides of sofa as a single object, i.e. sofa, without filling up the gap or blank region(s) with color or textual patches using copy/paste routine explained above for small unit regions or patches or tiles, which can be square, rectangle, circular, or non-geometrical shapes, repeated until the whole blank region is scanned or filled up or painted. For example, we extend the boundaries or border lines from both sides to connect or complete the whole sofa border line, or approximately find or complete the border line, to find the final shape of the sofa, to recognize the object as possible sofa. The approximate line can be connected and recognized as one single line, when the line is thickened with a thickness of 2 to 10 points, or more points, to produce a continuous line (thick jagged line). See e.g. FIG. 21 for such a system.

In one embodiment, we assign a value of "I DO NOT KNOW" to the invisible part of the sofa, in which we try to find the fitting objects based on the visible parts of the sofa, from our library of possible objects, common for a setting, with the condition that on the back (where it is hidden), it can be anything. So, we calculate the reliabilities based on this scenario, and we use fuzzy values to describe this, in one embodiment. In one embodiment, we use Z-web for this purpose, with all corresponding Z-factors.

Adjusting the Tilt or Orientation:

The orientation of an image, such as from horizon line, or water or ocean line far away, or tower in background, which indicate horizontal line or vertical line in the perspective view or expectation of humans, indicate how much an image should be rotated or tilted to get into the right orientation. For example, that normalizes the head or face of a human to be in the right angle or direction or orientation, to pre-process, before the actual recognition of the face or head by the face recognition module. That increases the accuracy of the recognition at the end, for the objects at the foreground.

To Find a Continuous Line:

To find a continuous line, one searches for the next point in the line, e.g. black pixel or dot or similar color pixel, in left, right, diagonal left up, up, down, diagonal left down, diagonal right up, and diagonal right down, i.e., in all eight neighboring directions or pixels, to find any match, which produces continuity in the line, point-by-point, to extend the line.

For small discontinuity e.g. due to bad image quality or a copied image by old copy machine multiple times, the bridge gap of 1-2 pixels can be forgiven or filled up. Thus, the search is beyond the immediate neighboring pixels, going e.g. to the $3^{rd}$ neighboring pixels, to find a match of pixel, to assume continuity for the line, and filling up the gaps with the same pixel or dot, to get a final continuous line. Or, one can defocus or widen the lines, using a filter to reduce the contrast for the edges, to bridge the gap of 1-2 pixels with filled pixels or dots, to get a final continuous line.

To find a narrow boundary or border, from the thick jagged line mentioned above, one can get the average coordinates or select the middle points of the thick jagged line, as the final fine boundary, which defines the object, e.g. sofa, very well, with sharp boundaries, for easier detection or recognition, versus the object with thick boundaries, which is harder to detect, when the small features are hidden or overshadowed by thickness of the line, itself.

Another way is to use skeleton or bare bone shape, to simplify the shapes fast and efficiently, as the first-cut/coarse search and comparison, from database of skeletons or shapes, to name the objects or tag them, which accompanies the objects as comments or tags data from now on, after tagging.

Another way to find or recognize a sofa is to use DONOT CARE or NEUTRAL region assignments for the blank region, for partial matching with test images as targets, to find the similarities between the object and targets based on the visible parts, and treating the invisible parts as having any values possible (or ignore them, as having no or negligible weights), for comparison or recognition purposes. The final match score or probability is only or mostly based on the visible parts, with respect to target or possible-object databases.

Use Images from Different Angles or Perspectives:

To model an object, from a 3-D perspective, one models the object using images taken by a real camera, from different angles. For example, for the recognition of a face or person, one looks at the face from multiple directions, e.g. from side view left, front view, half-side view right, and back side. Thus, we store the multiple views from different camera positions or angles, for the same person, for later recognition of the person, to find an exact match or a match between two or more of these snap shots or images (i.e. using limited numbers of images, as discrete sampling, for continuous matching positions, later on), as interpolation or extrapolation of one or more images, or some weighted average of them, or some average of them.

Use Computer Models of Objects:

Also, one can use a computer generated model for N possible shape of heads for men, women, and children at different ages, for various ethnicities and races, based on the images of shapes of head taken and input them to the model (e.g. artificially rendered or calculated or constructed by a computer), to cluster and classify all possible head shapes on the planet (where N is usually a manageable number, say, e.g. 100). So, starting from a 2-D image of a new person's face or side-view (person P), it can trigger or match approximately the image of one of those N shapes from the head shape library, and thus, call up the corresponding model for the selected head shape from the library or database.

Now, in one embodiment, we have a correction that can make the model more accurate. We change the parameters of the head on the model slightly, to match the image of the face or head for person P exactly, from the 2-D image, using manual adjustments, or computer control or automatic adjustment, e.g. fuzzy rule based adjustment, to morph one to another, so that the contours and/or points on the mesh representing the face or nose or head match exactly with the model. The morphing mechanism details are described elsewhere in this disclosure.

In one embodiment, we have a correction that uses two or more of those N shapes (say, e.g. T number of those N shapes) from the head shape library, and then combine them to get an approximate match, e.g. using a linear combination of them, or weighted average of them, or take an average of them. Then, in one embodiment, we have a further correction, similar to above, to change the parameters of the head on the model slightly, to match the image of the face or head for person P exactly, from the 2-D image, using manual adjustments, or computer control or automatic adjustment, e.g. fuzzy rule based adjustment, to morph one to another, so that the contours and/or points on the mesh representing the face or nose or head match exactly with the model. The morphing mechanism details are described elsewhere in this disclosure.

In one embodiment, we have some or all of the N shapes sub-divided into $Q_1$ to $Q_N$ shapes, respectively, as subcategories, for minor differences between head shapes. Then, we have better matches based on subcategories. However, the overhead for storage and computation is much higher, since we are dealing with much higher number of shapes now. That is, we have now: $(Q_1+Q_2+ \ldots +Q_N)$ shapes, rather than N shapes.

In one embodiment, we adjust the mesh or points or contours representing the face or head, as an example, using the parameters that change the coordinate of points, or change the formulas for curves or family of contours, in the computer model, and changing those parameters by a small percentage or small relative deviation. Then, we observe the result: If the difference (e.g. sum of square of differences, or sum of absolute value of the differences, as error function) on the match for all points or contours or meshes with respect to the model for the selected shape gets larger (gets worse), then we should change in the other direction or change other parameters. If the difference on the match for all points or contours or meshes with respect to the model for the selected shape gets smaller (gets better), then we are on the right track, and we can continue on the same direction, until we get worse off. Then, we stop at that point for that parameter. Then, we try other parameters, one by one, or in a batch, or bunch together, to optimize for complete match with the model. That is, we use a feedback to adjust the parameters, for complete match, as much as possible.

In one embodiment, to adjust the difference value mentioned above, we may be in a local minima region of the optimization curve for the difference value(s) function mentioned above, and small adjustments may get us only into a local minima. However, to get into an absolute minima of the optimization curve for the difference value(s) function mentioned above, one has to get out of the local minima region. To do so, we need a random adjustment on the parameter(s) or big adjustment on the parameter(s), to land in another part of the optimization curve for the difference value(s) function mentioned above. That will increase the chances of getting out of the trap of being in a local minima region for all optimization adjustments at all times.

Of course, even if we get to local minima, rather than absolute minima, for optimization, we still may have a good result for match process, to stop further search and optimization or adjustments, as mentioned above. That can be checked using a relative or absolute value as threshold, or an incremental improvement analysis, to stop beyond a threshold, for the optimization process, as optimization any further would not worth the cost of more computation power spent on such incremental improvements, if any.

Look for Expected Objects:

For example, in an office environment, one has a list associated with a typical office or law firm office or dental office, which are stored as possible objects in the office, in a web of related objects, or databases, related to an OFFICE or DENTAL OFFICE. So, an object behind a person in an office on the table may be a fax machine, which is a possible target candidate for examination and image recognition comparison, obtained from the corresponding list of related objects for the OFFICE. That increases the reliability, speed, focus, and accuracy of the recognition process.

One can also re-use the related objects from one into another one. For example, an "office" is superset of a "dental office", for most cases. Thus, all properties of "office" are a subset of (and included in) those of a "dental office", including e.g., related objects or expected objects or owned objects or property objects. That is, they inherit each other's properties automatically. See e.g. FIG. 22 for such a system.

Of course, in one embodiment, these concepts above are all fuzzy concepts and sets, with no hard or crisp boundaries, and with qualifications e.g. "for most cases" or "usually". Please see the discussions elsewhere in this disclosure, regarding the handling and processing of these concepts, values, and parameters.

OCR, as Textual Information, to Help Build the Relationship Web Between Objects:

In the next step, as one example, we look for a text as an object in the image, to recognize, for example, the brand, model number, and the type of the object, e.g. HP printer Model Number 100, written on the object, as text. So, we invoke an OCR (optical character recognition) module to read the text, to find and search for more relationships between the objects in the image. The text in the image can be vertical, slanted, wavy, morphed, or curved, as in a book in a bookshelf, or as in a newspaper on a table at an angle to the camera or frame of the picture or image, or as in a word written as a motto or slogan on a flying flag with the wind power behind it, or as a reflection of some big poster on the side the building or highway reflecting the text image on a wavy water or pool or pond nearby, or as a security word for user authentication (against sniffing search bots) with a slanted or twisted image of a text, usually with no meaning, on the screen or monitor of a computer.

List of manufacturer and model numbers or the like are also listed in separate files or databases for search and matching or recognition or validation, to further limit or focus or specify the identification of the object, such as printer or fax machine in the example above, using the OCR as a tool or as one of the linking methods between the objects.

On the related objects, e.g., once a computer is determined as an object in the image, we can expect a possible mouse or monitor (with some degrees of certainty corresponding to each device), or with some membership function or value associated with a fuzzy membership for mouse as an accessory to a computer, and hence, expecting a mouse as an expected object nearby in the image, and thus, look for it as a target object around a given computer, from a database or list of possible objects in the neighborhood.

The Distance or Size as a Factor:

In one embodiment, the distance to the object is also taken into account, for example, G meter or feet, for estimation, for proximity or location analysis, as the search radius and location estimator, e.g. based on the center of the object, e.g. based on the estimated scale of the object or picture, or relative to the size of the neighboring objects, or typical size of the objects. For example, the mouse's length is about 20 percent, or 20 plus/minus 5 percent, or exactly 20 percent, of a length of a laptop, or a specific laptop, or typical laptop, or an average laptop, or for a range of laptops, obtained from our database for relationships between the related objects, e.g. laptop and expected nearby possible mouse, with its corresponding membership value and reliability value and expectation value, relating the 2 objects, from A to B, as 2 nodes, in the network or web or relationships, e.g. for distances or sizes. Another example is the typical distance between a laptop and a mouse is 1-5 feet, for possible search location possibilities, for the center or the edge of the object, e.g. mouse. See e.g. FIG. 23 for such a system.

For some examples, for fuzzy ranges or fuzzy values for distances, we use unfocused or fuzzy lines or fuzzy geometry lines, with fuzzy distances and fuzzy endings and fuzzy thickness, for geometrical representation in Z-web. For some examples, for crisp ranges of distances (or uncertain distances with error values), we use dotted lines around the average value or around the minimum value, for geometrical representation in Z-web. For some examples, for geometrical representation in Z-web, we can draw spheres or circles, for radius of search of a target object, with respect to two or more given objects, and from their intersections of the regions or overlaps of areas, we can further pinpoint the location or distance of the target object.

Note that the size of the object is estimated or determined by comparing to relative size or distances of other objects in the image or video frame, as typical values in the library, or as a value we already know for a specific object, e.g. Fred Jackson's height is 6 feet. It can be based on Fuzzy parameters and values, as well, e.g. Fred Jackson is very tall. The perspective or depth in the image can be estimated using rectangular objects, such as table, having merging boundary lines for parallel sides, by extending the border lines to the back of the image, so that they cross at an imaginary perspective point $I_{PP}$ in the background of the image, which indicates the perspective for the image with a point located at infinity, very far away. Note that $I_{PP}$ can generally be more than one point or a line, representing infinity, or far away, in the image, at the horizon. Then, from that, the relative size or distances or angles can be obtained, using simple geometry relationships, e.g. mapping the distances or other lines as a projection on the imaginary lines connection to $I_{PP}$ (called $L_{PP}$), or as a projection on lines perpendicular to those $L_{PP}$ lines (called $T_{PP}$), which are generally curved or circular shaped lines or family of lines with the center at $I_{PP}$, in the perspective coordinate system of the image. For example, we divide the image into family of $L_{PP}$ and $T_{PP}$ lines (or curved lines), with some distance between each of 2 neighboring family members, to cover the image like a tilted "floor tile" scheme, and then for each dimension in the image, we try to do the comparison with the dimensions in the same neighborhood with known sizes, e.g. from known objects, e.g. we know that Mark is 6 ft tall, and that gives a reference size for objects in his neighborhood in the image.

See e.g. FIG. 24 for such a system. In one embodiment, from FIG. 24, we can get the length of an object, e.g. vector V (with real length $L_V$, and apparent length V), as follows:

$$b = V \cos(E)$$

$$a = V \cos(G)$$

Now, we want the ratios, to some known values or objects, e.g. as shown on the highlighted rectangle in FIG. 24, with apparent side lengths $a_1$ and $b_1$, and the real side lengths $a_{real}$ and $b_{real}$, respectively. Then, we have:

$$a_{calculated} = (a/a_1) a_{real}$$

$$b_{calculated} = (b/b_1) b_{real}$$

$$L_V = \sqrt{(a_{calculated}^2 + b_{calculated}^2)}$$

In another embodiment, note that for $T_{PP}$, we have to find the distances on the curved lines, e.g. a piece of a circle with a radius on $L_{PP}$, originating from $I_{PP}$, and ending at the point of interest (at the intersection of those specific $L_{PP}$ and $T_{PP}$).

In another embodiment, the projection of a line $S_{PP}$ with a length $G_{PP}$ on the $L_{PP}$ line is mathematically given as, $P_{PP}$:

$$P_{PP} = G_{PP} \cdot \cos(A_{PP})$$

Wherein $A_{PP}$ is the angle between that specific line $S_{PP}$ and a neighboring $L_{PP}$ line, to project on the $L_{PP}$ line. Once we have the projected lengths on those specific $L_{PP}$ and $T_{PP}$, we can compare that with other projected lengths from known objects with known sizes in that neighborhood, as projected on the same nearest specific $L_{PP}$ and $T_{PP}$, to get a relative distance or size, or ratio, to get the size of the unknown object (approximately).

In another embodiment, instead of using projection values, as shown above, one simply compares the size of the line piece from the unknown object with the size of the line piece from a known object, in the same neighborhood, to get the ratio, and then, get the size of the unknown object (estimated). Of course, the smaller the meshes associated with $L_{PP}$ and $T_{PP}$, on the image, the more accurate this estimate will be.

Note that in the general case, going from A to B may be not the same as, or reversible, with respect to going from B to A, e.g. between mouse and laptop as 2 related objects in the relationship web, with respect to the values of membership value and reliability value and expectation value. Thus, we can show that by two arrows going from A to B, and from B to A, with different strength or thickness or width or length or size, signifying the various valuations of membership value and reliability value and expectation value, in different directions. For example, in some embodiments, the expected value of finding a mouse in a specific region or radius or coordinate in the image (given a laptop is found nearby, as an assumption) is different from its reverse situation, i.e., it is different from the expected value of finding a laptop (given a mouse is found nearby, as an assumption). See e.g. FIGS. 25, 10, and 17 for such a system.

In FIG. 25, as an example, we show a recollection of past event using Z-web, as a memory storage function, with Z-factors, including the reliability factor. The Node N is a trigger node, and the events are reconstructed or relationships are traversed backward to Node 1, our original node.

In other embodiments, the two directions are reversible and have the same values for both directions, e.g. for membership value and reliability value and expectation value, between 2 objects, e.g. mouse and laptop.

Now, having specification or range of expectations, for possibilities and probabilities, for example, for distances and sizes, one can search more accurately for the secondary object, e.g. mouse, around a given laptop in the image, or in the universe around us, as the primary object. For example, given a distance between centers of 2 objects, as 0-5 feet, we can design a circle around the primary object, with that radius of 5 feet, to define a region for possible existence of the secondary object, e.g. mouse. That would reduce or limit the search time and criteria, or increase accuracy for a given time and computing power.

The radius can be defined in 2-D or in 3-D space in the image, depending on the fact that the second object has or may have any support for standing in space outside the planes defined by the first object, e.g. having a tripod or legs or support for a camera or mouse. In the 3-D space, it becomes a sphere, with radius R (instead of a circle or projected circle), which has a cross sectional projection or view on the image as an ellipse or oval or curved region, depending on the point of view or perspective view of the camera or image or user. The region defined by circle or sphere, or their projections on the 2-D original image under study, signifies the possible locations allowed for the center for the second object, e.g. for its coordinate(s) or center of mass or corner(s).

Position is also a factor for building relationships between objects, as for example, the 4 legs of a table, with respect to the table, which are usually presumed to be located and also attached at the bottom of the table (unless the table is reversed or broken, e.g. in a fight scene or war scene, as an example, depending on the context or history or assumptions, beforehand, which can change some relationships drastically, as in the case of the image of a war scene or hurricane scene disaster). The position or relative locations are defined using directions or distances, e.g. up, down, diagonal up, 45 degree up left, 5 ft, top, bottom, side, corner, and the like. Note that most of these concepts are fuzzy concepts, useful for membership values, e.g. side of a laptop, or corner of a laptop.

As mentioned above, the context is also very important. Given an image of a war scene or hurricane scene disaster, one may expect to find a table reversed or with broken legs, opposite or contrary to any normal expectation or relationship between normal objects in a normal environment. Thus, the relationship web is very different for those situations, with respect to normal situation. In addition, that is one way to confirm that an image is possibly from a war zone, based on tables with broken legs or houses with no roofs on the top. See e.g. FIG. 26 for such a system. This can go both ways. That is, from rules and conditions, we get the context. Or, from context and rules, we get the current condition of the object. The confirmation of assumptions is detailed below.

In one embodiment, when we look at a picture, we focus in the middle or at the main feature(s), first, as e.g. indicated by histogram or contrast map. Then, we look for other expected objects nearby, using the related objects list with associated probability and associated expected distance (relative or absolute values), which is part of Z-web. In one embodiment, once we find e.g. a face in the image, we can assume that most likely that other faces or other eyes or similar objects, if any, in that image, are in the same scale or distance or order of magnitude, which can adjust the scale or size of the basis functions, such as wavelets, to find the other eyes or faces in the image much faster, focusing or using only basis functions or filters within similar or same scale for basis functions or object size. In one embodiment, when scaling the basis functions, the lines or curves defining the basis function has the same thickness as that of the original. In one embodiment, when scaling the basis functions, the lines or curves defining the basis function get scaled linearly with respect to that of the original. In one embodiment, when scaling the basis functions, the lines or curves defining the basis function get scaled non-linearly with respect to that of the original, e.g. based on $\exp(x)$, $\log(x)$, or $x^2$.

Going Backward (and Testing or Verifying) on Assumptions:

As we get the input and build our web of relationships between objects or concepts or subjects, e.g. emotions, humans, and tables, we add reliability, truth, credibility, and consistency of the information, which can be addressed by Z-numbers or by fuzzy logic membership or other fuzzy concepts or other reliability calculations, also described in the U.S. Pat. No. 8,311,973, by Zadeh, which addresses Z-numbers and its applications, as well as other fuzzy concepts, plus the "trustworthiness of speaker", "sureness of speaker", and "statement helpfulness", with the analysis for cascaded or network of information sources ending up with a "listener", e.g. in FIGS. 43-46, 66, 68, 69, 78-80, 84-93, 104, and 120, plus other figures and corresponding text supporting the teachings, in U.S. Pat. No. 8,311,973, by Zadeh. We also address some of these issues and solutions in the current disclosure.

Now, in one embodiment, let's start with multiple assumptions, $A_1$ to $A_N$, and from there, we can get some web connections for relationships between M objects, subjects, words, and concepts, e.g. emotions, humans, policeman, teacher, dog, and car, in this relationship web, as nodes on the network. All the relationships and assumptions have reliability, truth factor, confidence level, and credibility metrics (with their corresponding membership functions or values).

Now, in one embodiment, we start from a node and continue building the network, until we get to a point that inconsistency or contradiction flag is up, in terms of property of a node which gets contradictory results from different sides or routes. Then, we backtrack and clean up the route to the original assumption(s) or node(s) that may have caused this problem, to remove or change the assumption(s). We can change the assumptions one at a time, and see the results again, until "satisfied", which is also a fuzzy concept (for the degree of "satisfaction"). Or, for N being a very large number, we can change multiple assumptions at the same time, and observe the results, to adjust the assumptions in a feedback loop manner, or based on some fuzzy rules.

In one embodiment, for conditional relationships, or multiple choices, we can continue, until we get to a dead end or conflict, and then, backtrack to eliminate or adjust one or more choices, on the chain going backward, to correct or adjust some assumptions, choices, or conditions, on the way.

In one embodiment, using assumptions on human emotions, one can do behavioral analysis on individuals, or collectively on whole society, e.g. how the people feel or react on a bad news, such as earth quake, using e.g. the sad faces in images, or text analysis on expressed or typed words such as "Disaster!" in the email or texting message on phone. The collection of nodes in a Z-web can indicate that a person is very angry or sad at a given moment.

Of course, as the mood of a human changes, the corresponding Z-web changes accordingly, with new nodes, weights, reliability factors, and the like. So, the Z-web is a dynamic structure which is potentially time-dependent, with a corresponding characteristic time period ($T_{Char}$). For example, a geographical factual Z-web with many constant facts at its nodes has a large $T_{Char}$, because we do not need to update or change that Z-web very often, as most of their values stay the same for a long time (versus some Z-web related to e.g. the stock market, with fluctuations and variations on a daily or hourly basis, which requires daily updates, and thus, has a lower $T_{Char}$ value).

Optimization of Quality of Different Aspects of Image:

Consider the line on any line drawing image. The thicker the line, or the wider the tip of the pen used to draw the line, the less features are visible from the line drawings, as the small features are dominated or lost by the thickness of the line, itself. Sometimes, for some applications or situations, we want to increase the width of the lines or boundaries, for the sake of having continuous boundaries or borders between different objects, for better object recognitions or discriminating between neighboring objects, to figure out what is in the picture or image. However, for any image with small tiny features, that increase in the width of the lines or boundaries may cause problems of wiping out or hiding or losing the small features for the borders of objects or regions in the image, if those features are important for any other analysis. So, we have to figure out at the beginning that which one is more important, to preserve one or the other, i.e., in favor of one or the other. Or, we have to figure out at the beginning that to what degree this process should be done, in favor of one aspect, before damaging the other side/aspect.

So, (i) we classify the images at the beginning, and (ii) also see what kind of interest or information or query we need or want from the image(s). These 2 parameters determine how far we should optimize the image, for which aspect, and in the expense of what other aspect of the image. The compromise factor between different aspects of the image and optimization factor for each aspect of the image are also fuzzy parameters, and can be determined using a fuzzy rules engine or a fuzzy optimizer. The fuzzy rules engine or a fuzzy optimizer are explained here in this disclosure, as also explained in U.S. Pat. No. 8,311,973, by Zadeh.

One way to avoid this analysis or compromise is to make 2 copies of the same original image, and then optimize the first aspect on the first copy, and optimize the $2^{nd}$ aspect on the second copy, and then extract information from each image or copy separately for the $1^{st}$ aspect and the $2^{nd}$ aspect, from the $1^{st}$ image or copy and the $2^{nd}$ image or copy, respectively.

Another way is to make one analysis on the first aspect from the original image (that does not need much optimization or correction on the image), and then change the image to optimize the $2^{nd}$ aspect, for analysis of the $2^{nd}$ aspect, to extract more information about the second aspect. This way, we get somewhat good information about the $1^{st}$ aspect of the image, and excellent/large amount of information about the $2^{nd}$ aspect of the image. Yet, the overhead about computation power or storage of images is not as large as the previous solution, given above. So, it is a kind of middle ground compromise solution, good for some applications, which need some accuracy, but at lower cost for computation and analysis (or shorter turn-around time for analysis and results).

Window for Examination:

When looking at one image, for one embodiment, if the window for examination of the image is too wide, and we get one signal from all of the window, then we may get the average values from all regions of image contributing to the result. Then, in those situations, we may not get some of the features from the image. For example, if the features are based on sinusoidal function (sin(x)), with half of the time negative and half positive, in 2-D space of the image, then the average for all regions, containing a lot of the periods for the function (assuming small periodicity for such sin(x) function, i.e. small T, for this example), would be zero or near zero, for the total average. Thus, the behavior of sin(x) for the feature in the image is not detected at all, in this example.

Now, if the window of examination is too narrow, and the changes are negligible for consecutive windows, in absolute values or relative values, then the process is too slow or expensive for analysis, and we may also miss detecting some of the big scale behaviors in the image. Thus, the optimum window size depends on the periodicity ($T_F$) and size ($L_F$) of the features in the image, to have both efficiency and accuracy for the image analysis. So, at the beginning, we classify the image based on those parameters ($T_F$ and $L_F$), plus its complexity ($C_F$) and concentration of features ($M_F$) that we are looking for in the image. Then, the size of the window ($S_W$) is determined from all those parameters. Note that all these parameters can be expressed by e.g. real numbers (fuzzy or crisp values) or in terms of human natural language, e.g. "large window" (fuzzy values).

For example, we have $T_F$ as 2 features per 50 pixels or 2 features per cm$^2$ or 2 features per 5×5 pixel square or 2 features per cm of boundary. For example, we have $L_F$ as 50 pixel or 5 cm or 5.2 times bigger than size of the mouse of the computer or "bigger than size of mouse of the computer" (as fuzzy value).

For example, in one embodiment, we have complexity ($C_F$) defined as the number of gray scale used (out of 256, for example) (or available) in this particular image, or defined as number of color values used for components of RGB or CMYK system in the image, or defined as the number of intensity values used (out of Q total values available) for the image, or defined as the percentage of variations, in diagonal or horizontal axis, in the middle of image or passing the center of the image, in the intensity of pixels, plus the directions of those variations in the pixel intensity (which can be large or small positive or negative numbers or percentages or relative values), or expressing any of the above per square pixels or square cm or unit of area, or similar definition as a metrics for the complexity of an image.

For example, we have concentration of features ($M_F$) as number of features (or spikes or crosses or knots or curves or small squares (as examples)) per square pixels or square cm or unit of area, as examples, or when the features are confined on a line or curve or boundary, $M_F$ may also be expressed per pixel or cm or unit of length. For example, we have the size of the window ($S_W$) as 100 by 100 pixels, or 2 cm², or twice as big as the mouse of the computer in the image, or "very very large" (as fuzzy value), or 1 percent of the whole image, or "small square".

For example, in one application or embodiment, for small $T_F$ and small $L_F$, plus high complexity ($C_F$) and high concentration of features ($M_F$), the size of the window ($S_W$) is set to be small, e.g. 3×3 pixel (square).

In general, we have a function $F_W$, defining $S_W$ as dependent on parameters:

$$S_W = F_W(T_F, L_F, C_F, M_F)$$

Figure 27:
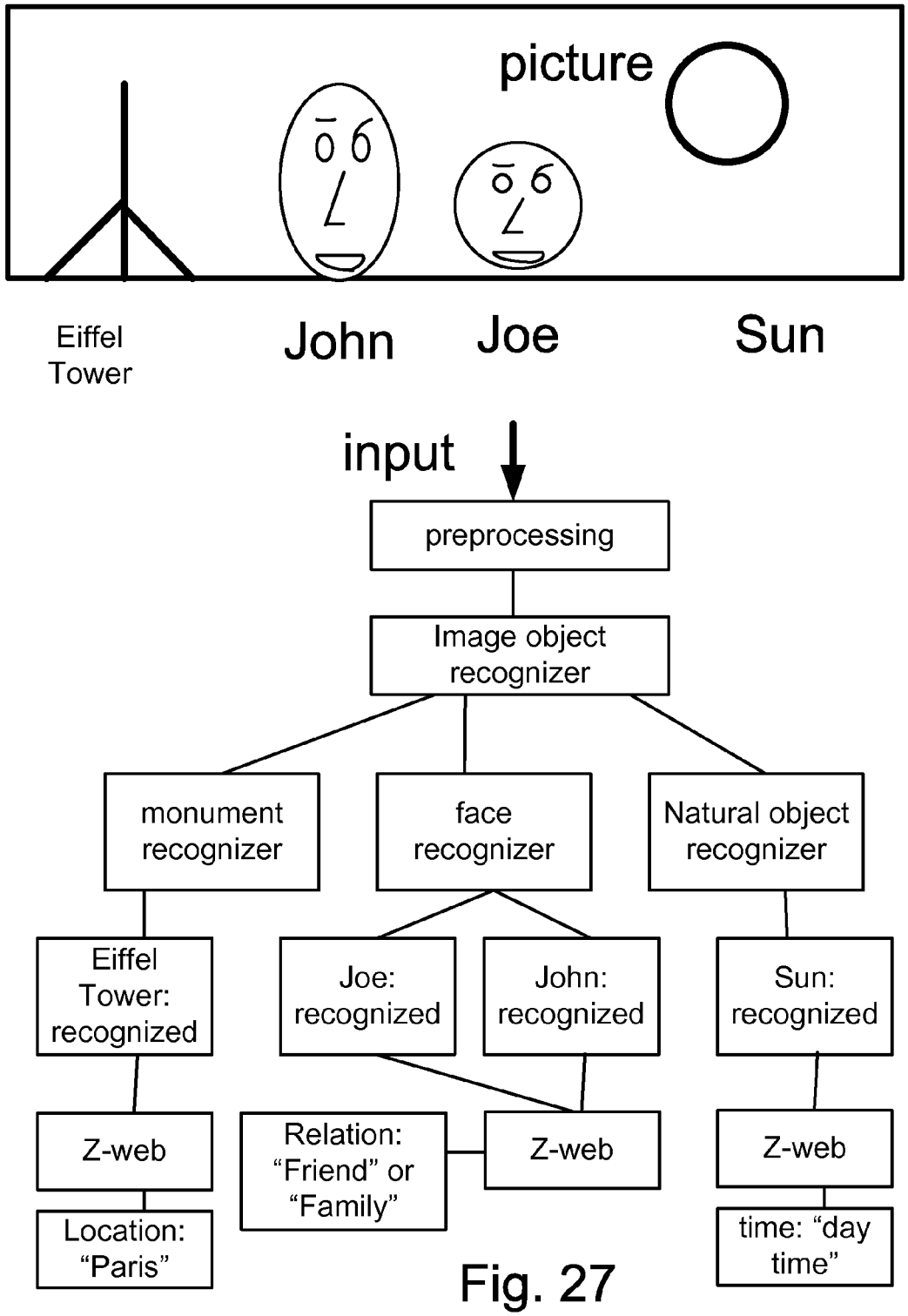
FIG. 27 shows one embodiment for feature and data extraction.

Extracting Clues and Information from Images, to Determine Relationships:

From an image, picture, video, drawing, cartoon, caricature, sketch, or painting, one can guess or estimate or find relationships or find attributes or find the degrees for relationships or find connections between objects, subjects, humans, animals, plants, furniture, emotions (which can be used to predict e.g. social behavior, purchasing behavior, voting behavior, or rating system behavior), ownership, properties, characteristics, or the like, related to, for example, the following:

The age of the subject or person or animal, ethnicity of a person, relationships between subjects (in a picture or painting or image or video frame), picture setting (e.g. at office, official, military, family gathering, class reunion, primary school student picture, graduation from college, prom dance event, black tie event, Olympics medal ceremony, Oscar Academy Awards event/night, or karate class), family membership, happiness (or misery, despair, anger, emotion, or mood), closeness (friendship, or how close the subjects are to each other), intelligence of the person, sophistication of the person, gender of the person, style of the person, location of the picture, year (in which the picture was taken), political affiliation, country (in which the picture was taken), language of the location (in which the picture was taken), time of the day (in which the picture was taken), season or month, special occasion (New Year celebration at Times Square in NY City, Christmas, wedding, or carnival), special location (Disney Land, cruise trip, on the Moon, Grand Canyon, or near Eiffel Tower), temperature of air (in which the picture was taken), humidity (in which the picture was taken), time zone (in which the picture was taken), altitude or location on the planet Earth (in which the picture was taken), height (in which the picture was taken), depth (in which the picture was taken), or environment (e.g. cloudy, rainy, war zone, or foggy), as some examples, or the like. See e.g. FIG. 27 for such a system.

The correlation between objects, subjects, and concepts, at nodes in the relationship web or network, as the web grows and gets built up, with more relationships and larger number of nodes, brings more and more objects, subjects, and concepts together, and validates or verifies estimates, guess work, and possibilities, with more accuracy and higher confidence level.

The input to the web of relationships comes from many sources, e.g.: textual information, video, music, noise, voice, still images, pictures, sound bites, expressions, moods, emotions, tags, comments, recommendations, LIKEs on a web site, customer feedback, TWITTER®, FACEBOOK® entries, emails, blogs, votes, political opinions, surveys, summary of data, medical images, weather forecasts, historical data, geographical data, mathematical, physics, and chemical facts, historical monuments, famous quotations, books, slangs, Wikipedia, encyclopedia, dictionary, thesaurus, translation books, county land records, birth certificates, lectures, novels, science fiction, documentaries, history books, magazines, picture albums, databases, private network or storages, class notes, exam answers, dating sites, ancestry web sites, social media sites, petition documents, tax returns (if available), resumes, biographies, biometrics, gene or DNA sequence, medical data, medical history, medical knowledge, chemical formulas, mathematical relationships, physical constants, physical phenomenon, abstract concepts, architecture, psychology, philosophy, proof methodology, inductive reasoning, logic, calculus, hand written notes, scripts, computer program, codes, encrypted message, sign language, alphabet, Internet, search engine, opinion of famous people, opinion of friends, friend suggestions, social media votes or suggestions or opinions, court documents, dockets, or the like.

For example, to find the age of a person in a picture, the number of or concentration of wrinkles on the face or neck or skin can be counted or detected (as the older people tend to have more wrinkles, as an example), or based on the ratio of the size of the head to the rest of the body or height (as the average ratio or ratio changes for different ages, for most people, tabulated based on millions of samples in the database), or features of the face and their dimension ratios (as is different at different ages, within some range, for normal people, stored in the databases, which can be a crisp value or fuzzy parameter), or having bi-focal eye glasses (usually for older people), or having a hearing aid (usually for much older people), or having a bald head or receding hair line (usually for adult people, and usually male subjects), or having only one earring, nose ring, or tattoo (usually for younger people), or having 2 earrings (usually for female, above 10 year old, as an example), or having a tie or bow tie (usually adults in formal settings, and usually male subjects), or having a top hat (usually adults in formal settings, and usually male subjects), or having a baseball hat (usually kids or young adults, and mostly male subjects), or having a beard or moustache (usually 12 years or above, as an example, and almost all male subjects).

Please note that if we have other information about the culture or town or country or the date of the picture, we may be able to determine the age more accurately, for example, in 1960s, a lot of college students in certain countries wear tie in college, but it is not true for college students in US in year 2000. Another example is for Scottish culture or region, we know that Scottish men wear the skirt as tradition, which may tilt the possibility and probability and confidence and reliability of the decision or recognition or classification, one way or another, based on the subject having skirt on, in the picture or image. Thus, the culture and date of the picture and context and traditions and environment may all be influential and factors in the decision making.

Some of the features or criteria or tests mentioned above also apply to gender, as described above, e.g. having a moustache or beard on a person in the image or picture. However, if we know, e.g., that the date of the picture was Halloween, located in US, then the moustache may be fake or on a Halloween mask, or if the location is Universal Studio for a movie, from scene of the movie, then the moustache may be fake. So, again, the context and date of the picture are important to tilt the values or relationship strengths or possibilities or probabilities.

Also, most of the rules stated above are fuzzy rules, for relationships, for various objects and subjects or concepts, such as: "Having hearing aid in the ear, in the picture, usually infers that the subject (the person under evaluation, in the image) is probably an old person". First of all, "old" is a fuzzy value, and then "usually" plus "probably" can be handled by the Z-number mathematics and algorithms, as explained in this disclosure. In addition, fuzzy rules engine and related algorithms, e.g. backward chaining inference engine and the forward chaining inference engine (for handling a set of fuzzy rules for the relationships that we stated above, for determining the age of the person, as an example), are also explained in this disclosure.

Now, we have more information extracted from the images. For example, the picture setting may be at an office, with indicators such as tie and jackets or formal dresses, as well as desk, round table, water cooler, copy machine, cubicles, partitions, white board, calendar, deadlines on the board, tasks on the board (read by the OCR and understood by the natural language processor, as being tasks with dates in front of them, and possibly some arrows, with time line on horizontal axis), conference room, conference phone, employee award on the wall or on the desk, "men's room" indicated by word or by a "man" symbol on the door to the bath room, rack of coats or hangers, name tags on the desk or wall, room numbers on the door or wall, or the like.

One indicator may not have a high correlation coefficient to a setting, but a combination of multiple indicators has a much stronger correlation coefficient, e.g. some of the indicators mentioned above, with respect to the "office" setting. Also, one "fax machine" may be have a different correlation coefficient or relationship factor with respect to general office, or document processing office, versus dental or doctor office. So, same object in different environments or locations or contexts have different relationship factor, e.g. in day time setting versus night time setting.

To examine a setting, for example:
for official setting, we look for jackets and ties,
for military setting, look for guns and uniforms,
for family gathering, look for kids and grand parents or people at different ages,
for class reunion, look for people of the same age and banners stating a university or high school name, plus graduating date, e.g. 1977,
for primary school student picture, look for a lot of kids of about less than 12 years old,
for graduation from college, look for graduation gown and cap,
for prom dance event, look for prom dress and limousine,
for black tie event, look for black tie dress and jacket,
for Olympics medal ceremony, look for Olympics sign and medals around the neck,
for Oscar Academy Awards event/night, look for Oscar symbol or statue,
for Karate class, look for Karate belt and outfit, and the like.

Figure 28:
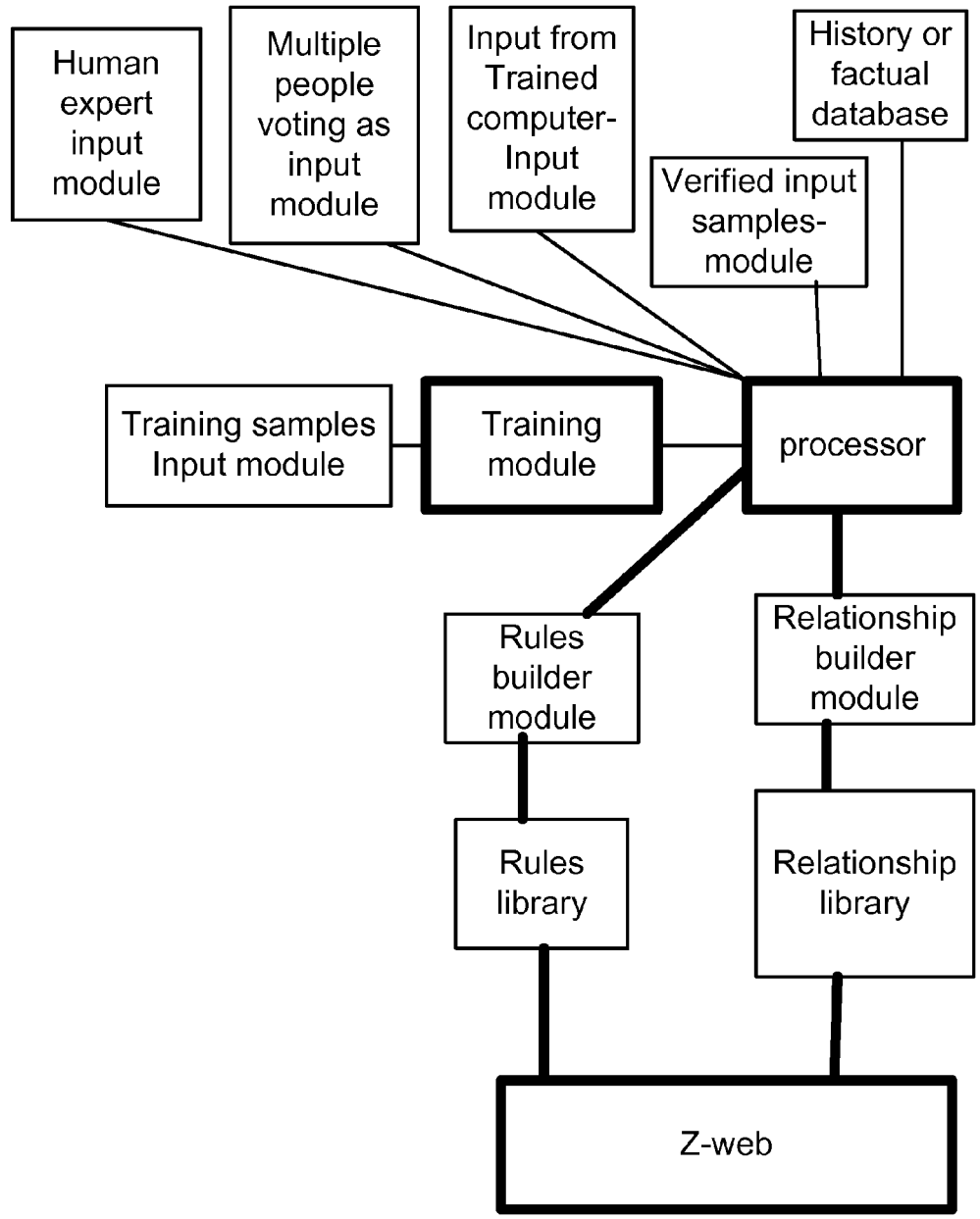
FIG. 28 shows one embodiment for Z-web processing.

These relationships come from expert humans, or many human voting or inputting, or from trained computer learning machine, or extracted from millions of relationships from a huge observation sampling or history file or database. See e.g. FIG. 28 for such a system.

Other examples are:
for family membership (look for hugging, kissing, how close people stand in a picture, smiling in a picture, casual dressing, vacation setting in the background, similar faces, similar clothing, at a dinner table at home setting),
for happiness (or misery, despair, anger, emotion, or mood) (look for the shape or expression or size or angle of mouth, face, eye brow, eye, color of face, or lines on the face, based on stick diagram defining laughing or other expressions or moods, or based on formulas defining those expressions, or based on curves defining those expressions, either analytically stored as curves or graphically stored as pixels, or based on thousands of faces stored from real people, tagged for expressions on their faces, for learning samples, as supervised learning),
for closeness (or friendship) (look for how close the subjects are to each other in the picture, as how many people are in between, or how tight they stand close to each other, or how hands hold each other and where they are located with respect to the body, which can be also trained with thousands of already tagged pictures by people or experts, as one way of doing it, or can be understood based on the relationships of objects, e.g. first person's hand ($H_1$) behind (or covered by, as function $C_B$) the second person's shoulder ($S_2$), indicating hugging, indicating closeness or friendship, or mathematically expressed as, when finding the objects and ordering of objects in the image: $C_B(H_1) \equiv S_2$) (Note that all objects in an image can be analyzed, to find which is front and which covers what, with mathematical relationships, as indicated above. Once part of the object, as expected, per our expectation (e.g. from shapes stored in a database for that name or object), is missing in the image, that is an indication (of most likely) that part of that object is behind another object, in that image.),
for intelligence of the person or sophistication of the person (look for book in hand, standing near a library or concert hall or museum, degree near his title or name in text, titles on the door or email, his friends, his/her family members, her job, her SAT score, her GPA, her resume, her publications, or degrees in the frames on the wall or on desk),
for gender of the person (look for dress or clothing, hair cut, shoe, accessories, name, size or weight or height value or ratio, habits, title behind the name (such as "Mr."), favorite video game or movie or actress, and color of choices) (Note that these are still not deterministic at all, same as other parameters and indicators mentioned above. That is, sometimes, stereotypes and generalization are very misleading. However, using combination of all data and relationships and aggregating them using our analysis on our "Z-web" increase the accuracy and reliability of the recognition.),
for style of the person (look for clothing or hair cut or shoe or glasses or wine choices or drink choices or car or watch),
for location of the picture (look for monuments or famous buildings or names or landmarks or emails indicating the locations of next vacation or tickets for airline or passport stamps),
for year (in which the picture was taken) (look for clothing style, text, objects in the background, such as cars or building, hair style, name of famous actors, name of movies on display, the president of the country, or tags or dates on the picture or image),
for political affiliation (look for tag on the car or bumper sticker or pictures on the wall or affiliations or clubs or friends or geographical area or job or title or essay in school or courses taken in college or food choices or vacation choices), for country (in which the picture was taken) (look for landmarks, names, tags, signs, street names, architecture, pictures on wall, language on signs, people's faces, stores, cars, license tags, having snow on ground, type of trees, type of foods, politician names, national hero, famous athlete, famous singer or artist, or TV programs), for language of the location (in which the picture was taken) (look for names, tags, signs, street names, architecture, language on signs, people's faces, stores, license tags, or TV programs), for time of the day (in which the picture was taken), season or month, or special occasion (New Year celebration at Times Square in NY City, Christmas, wedding, or carnival) (look for Christmas tree, decorations, snow on ground, trees with no leaves or colorful leaves, big clock on the tower, position of Sun in sky, light or darkness, frozen lake, ice fishing, or winter sports), for special location (Disney Land, cruise trip, on the Moon, Grand Canyon, or near Eiffel Tower) (look for landmarks, text, or structures), for temperature of air (in which the picture was taken) (look for steam or fog, rain, snow, ice, people with bathing suit, beach, ice skating, snow man, sweat on face, Sun reflecting on a shiny metal object, thermometer, thermocouple, or weather channel on TV), for humidity (in which the picture was taken) (look for steam or fog, rain, snow, ice, sweat on face, mold, green and dense vegetation, or rusty cars in the street), for time zone (in which the picture was taken) (look for location landmarks, country, city, names, text, clock, region, marker on the map, flag of the country, or email time record), for altitude or location on the planet Earth (in which the picture was taken), height (in which the picture was taken), or depth (in which the picture was taken). (look for landmarks, signature characteristic, perspective view, or indicators of coordinates or locations, such as cloud in sky or fish in deep sea), or for environment (e.g. cloudy, rainy, war zone, or foggy), as some examples, or the like. (look for indicators or signatures, such as fog, cloud, wet street, tanks, soldiers, and ruins in a war zone).

In one embodiment, the information on the camera phones (on its memory, processor, or controller module), or on image (as text), or tagged as a header or file or comment to the image, e.g. GPS (location), date, lens data, focus information, and the like, are used for location of the picture, e.g. specific city and monument, or date, e.g. Jul. 4, 1999, 4:30 pm, or focal length, or estimate of distances in the image, or the like. These can be used for correlation with other objects and within themselves. Thus, we can input this information into our Z-web, as new nodes and Z-factors, e.g. for recognition purposes or reliability analysis.

Figure 29:
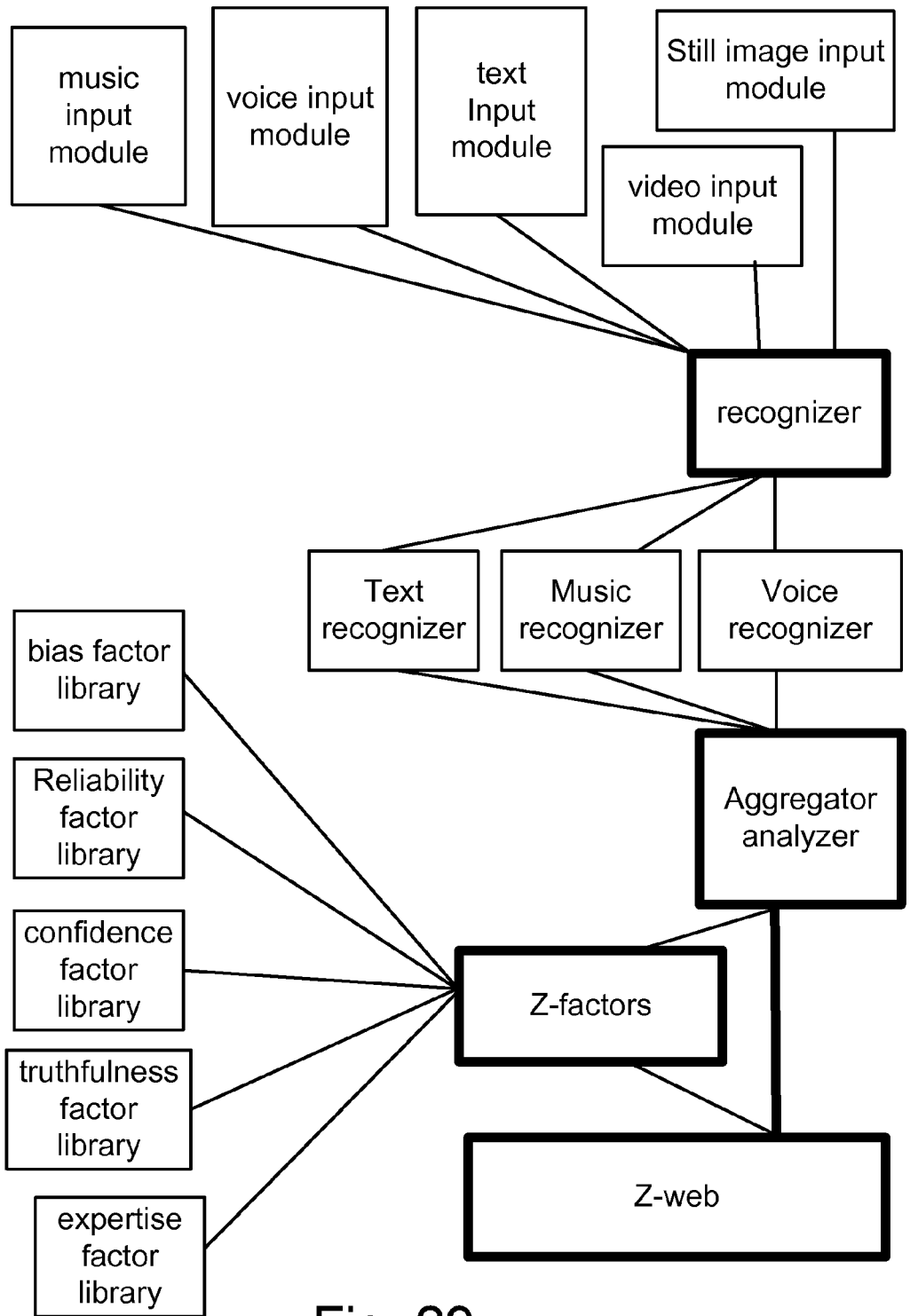
FIG. 29 shows one embodiment for Z-web and Z-factors.

Different Components of Recognizer:

The recognizer module has many sub-components, to do analysis on text, e.g. OCR, image (e.g. image recognizer), video (e.g. video analyzer), voice (e.g. voice analyzer), music, taste, numbers, patterns, texture, faces, names, records, tables, lists, "big data", and the like, as input modules, to gather, analyze, and aggregate, to find the relationships between objects and concepts, based on the reliability, confidence, truthfulness, probability, and possibility, as discussed elsewhere in this disclosure, to build the "web of relationships", which we call "Z-web", and to find or recognize or validate or confirm other or same objects or concepts or relationships. See e.g. FIG. 29 for such a system.

Figure 50:
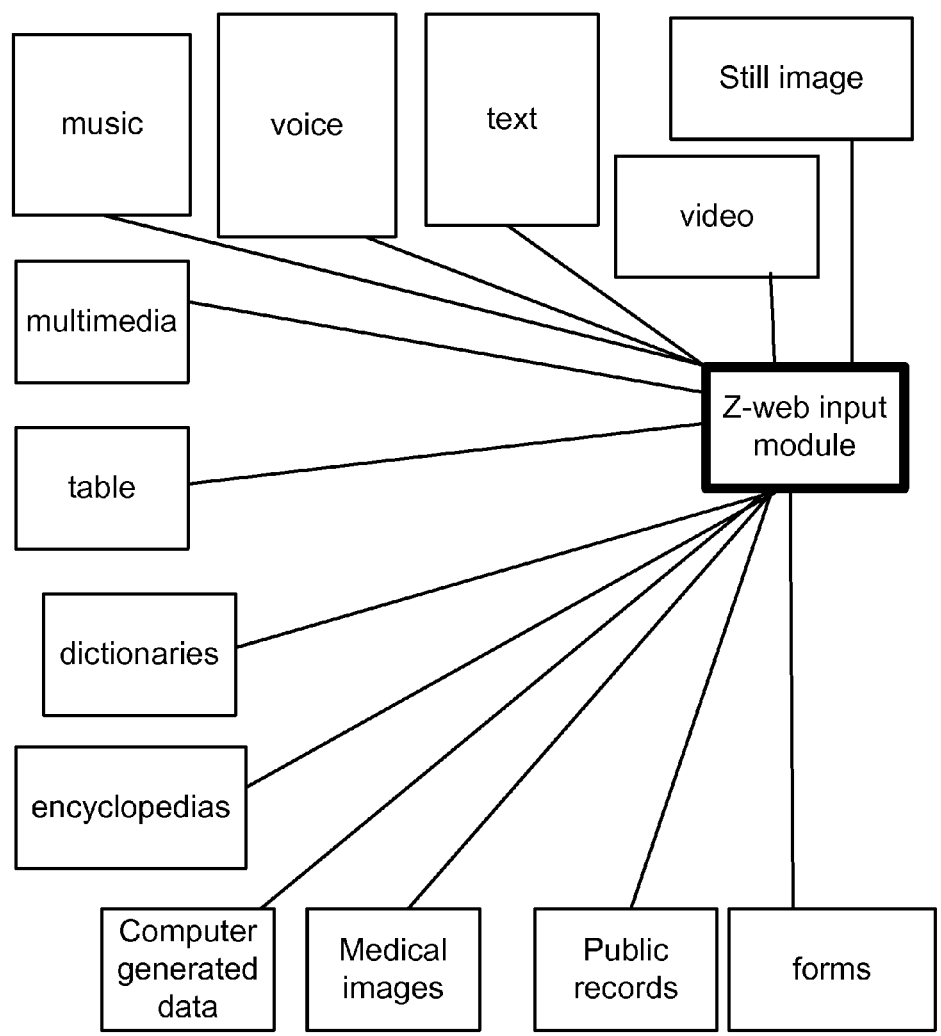
FIG. 50 shows one embodiment for a Z-web.

For constructing the Z-web, we can use various types of input, to build up relationships as described above, e.g., but not limited to: image, video, text, sound, voice, music, biometrics, table or list, tag, comment, metadata, multimedia or movie, link to information or web site, header, summary or abstract, record or database, listing, matrix, geometrical shapes, symmetrical shapes, patterns, symbols, abbreviations, encyclopedia or dictionary, personal data or preference, historical or geographical data, physical or chemical data, and/or mathematical facts, or the like. FIG. 50 is an example of such a system.

Adjusting Colors:

All colors look the same in a dark room, or in a picture with low light intensity, e.g. picture taken at night with no flash on the camera. So, in terms of recognition of a face, a normalization or adjustment is needed to convert the color or intensity of the pixels for a face in a dark image, to correct the color and intensity, toward the original normal color, toward real color, as a pre-processing, before recognizing the face, by face recognition module, to increase the accuracy of such recognition. The adjustment is based on the environment and background, so that color and intensity of pixels of the face is changed or corrected, such that the background becomes corrected to the normal or expected background, as if it were with/under enough light illumination.

Contrast Correction or Adjustment:

Let's assume that the intensity of a specific pixel $P_1$ is $I_1$. If $P_1$ is in the middle of patch of low intensity pixels $I_2$ (as the first environment), it (i.e. the apparent intensity, $I_{12}$) looks much brighter than to the average human eye, compared or with respect to the situation when $P_1$ is in the middle of patch or region of high intensity pixels $I_3$ (as the second environment), where $I_1$ looks darker, with low intensity (i.e. the apparent intensity, $I_{13}$), to the human eye. That is, the perception of intensity, for recognition, by human eye, is dependent on background or context or contrast to the surroundings. Mathematically, it means that, for intensity, for human perception:

$$I_{13} < I_{12}$$

Now, the machine (measuring the exact intensity) does not make such a mistake, and measures the exact intensity, regardless of contrast to the surroundings. So, to normalize the machine or real measurements with human perception, to adjust for such perception difference, one has to adjust for the ratio ($I_R$) of ($I_{13}/I_{12}$), between the given image in the first and the second environments (2 different environments). Thus, the number $I_R$ is our correction factor. So, starting from real intensity measurements, to go to the human domain or perception, one has to adjust the intensity by $I_R$ as our correction factor, to get the perception values or apparent values, relevant to the human perception. To go in the reverse direction, i.e. from human perception to the real intensity values or measurements, one does the correction or modification based on the inverse of value $I_R$ or ($1/I_R$). After the adjustment, or pre-processing, the face recognition or any recognition is performed, resulting in better accuracy and reliability for recognitions.

Searching and Extracting Information from the Images or Other Data, Using Z-Web:

In one embodiment, for pictures or images from the Internet, or other data, we find e.g. the web site by search bot or robot, and then extract the relevant information and tag them or put a summary of that image or web site or list the extracted information in a database or put the relationships and relevance and reliability factors (and other Z-factors mentioned above) into our Z-web or on our own server(s) or computer network or server farm (called $Q_{store}$ storage or module or computer or server). Now, a third party user can look at our Z-web, or other information mentioned above and stored on our $Q_{store}$, to use or extract or search or download those data, for a fee or for free, based on different business models, such as ad revenue on our web site.

Basically, in one embodiment, the data extracted and collected and aggregated by us for our Z-web or our $Q_{store}$, based on an image on a web site (as an example), is sitting as an extra layer on top of the web site, so that the user can access and get more information from the web site, through our Z-web or our $Q_{store}$. There are many ways to do this process. In one embodiment, the user U is at his PC (or mobile phone or device), with a browser, which goes to a web site $W_{site}$ and is interested in a data $D_{site}$ on $W_{site}$, e.g. an image or text data or tel. number. Since $W_{site}$ was previously scanned by search bot, and all the relevant information regarding $D_{site}$ was extracted, analyzed, and stored in our $Q_{store}$ (e.g. in a remote location), then the user U can manually go to $Q_{store}$ to get more information about $D_{site}$, as one embodiment. In one embodiment, the user automatically goes to $Q_{store}$ to get more information about $D_{site}$. In one embodiment, the user optionally goes to $Q_{store}$ to get more information about $D_{site}$.

In one embodiment, the information stored in $Q_{store}$ is also stored in $W_{site}$. In one embodiment, the information stored in $Q_{store}$ is instead stored in or moved to $W_{site}$, as an extra layer or shell or attachment or tag-along file. In one embodiment, the information stored in $Q_{store}$ is also stored in multiple places for easier or faster access, e.g. server farm or mirror server or backup server or redundant server, e.g. in another location. In one embodiment, the information stored in $Q_{store}$ has an expiration date, after which the information extracted from or related to $D_{site}$ is updated or re-extracted. In one embodiment, the network including $W_{site}$ is the Internet. In one embodiment, the network is a private network. In one embodiment, the user can e.g. do a search or query and look for some object on Internet, using a plug-in and a browser, to go to the web site $W_{site}$, and then from that web site, go to our database or Z-web or $Q_{store}$ to get the information extracted from the web site, automatically. Alternatively, the user can go directly to $Q_{store}$, using a plug-in and a browser, to get the information extracted from the target web site $W_{site}$.

In one embodiment, the process above is done with no plug-in. In one embodiment, the whole process is done automatically. In one embodiment, the whole process is done with the input from the user, or partially by user, or optionally chosen by user. In one embodiment, when the mouse is over an object or hover over it, the whole process is initiated automatically, e.g. a picture in a web site or name in a text is selected (e.g. by mouse or pointer or user's finger on touch screen, or on monitor or display or pad or input pad or device, or hovered over by finger or mouse without touching or touching, or by magnetic proximity or heat proximity from body, or capacitance changes or by electrical resistivity changes or pressure or piezoelectric changes, or RFID tag proximity, or image of finger recognition or fingerprint recognition or biometrics validation, or car key holder or ring proximity, or finger gesture or face gesture recognition, or finger stroke or sign recognition, or series of finger strokes pattern recognition). Then, the relevant information is obtained from $Q_{store}$ about that text or image, and automatically shown or presented to the user, which is very convenient and useful for the user on Internet or any private network.

Figure 53:
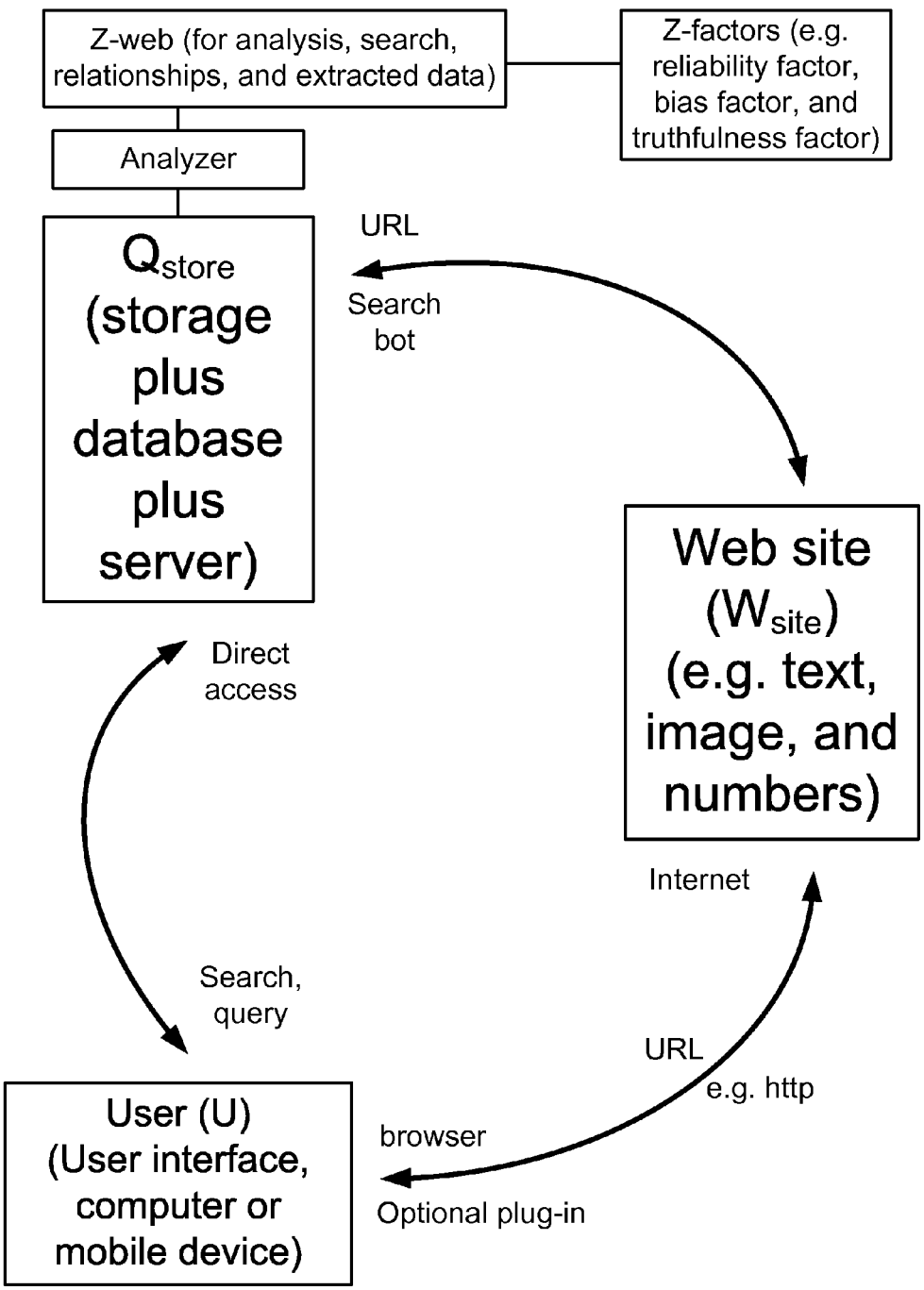
FIG. 53 shows one embodiment for a search engine.

In one embodiment, the web site $W_{site}$ can also request, generally or per usage, to have the information on $Q_{store}$ be also displayed on their web sites, or added or stored or tagged or linked or shown in their menus, based on another plug-in or code or predetermined arrangement with $Q_{store}$, for direct usage of their users or visitors. So, it would be a value added for them ($W_{site}$), for convenience of their users or visitors. Thus, it would be a source of income for the operator of the $Q_{store}$, as a service to $W_{site}$ or licensing the software or increased traffic for $W_{site}$, e.g. for ad money or income, to benefit the operator of $W_{site}$, e.g. as the client or customer for $Q_{store}$ operation, e.g. as its business model. In one embodiment, the information from $Q_{store}$ is supplied to the user directly, e.g. for mobile users or phone owners, per usage or per month or per subscription, for a separate business model or income source. In one embodiment, due to the value of the information from $Q_{store}$, the $Q_{store}$, itself, can have its own web site and direct visitors, for its own ad revenue, traffic, and referral income. In one embodiment, the web site includes text, image, tel. numbers, links, video, voice, music, and the like. See e.g. FIG. 53 for such a system, for one of the embodiments.

In one embodiment, an informational/graphical reader or renderer process (e.g., a web browser or a software application to view files or content such as a PDF reader or a word processor) runs on a device (e.g., a user device) that takes the content deliver from network (e.g., from a web server, file server, document or content server, web service, or an on-line application running on Cloud or distributed network of servers). In one embodiment, the reader/renderer process receives data (e.g., Z-web data for the annotation of an image identifying people on the image) related to a resource (e.g., the image) referenced or provided by the delivered content, based on (e.g., an automatic) query from the reader/renderer process (or a plug-in or another process running on the user device) to $Q_{store}$ related to (e.g., identifying) the resource (e.g., by its URL, identification or location within content or document, and/or metadata such as date). In one embodiment, the reader/renderer process modifies/overrides/supplements the display/play back or presentation of the resource (e.g., on the user's device), by using the received data (e.g., from $Q_{store}$) including the user interface interaction (e.g., by creating links and displaying annotations on the image). In one embodiment, further user interaction with the modified user interface based on the received data, invokes further queries to $Q_{Store}$ to fetch more data about the item selected (e.g., information about the person so annotated in the image). An embodiment makes the content (such as images) whether in web page or a document link to other knowledgebase entities by fetching the content in an automatic search (e.g., by bots or background processes), analyzing the content within a context and/or by using feature detectors/classifiers, importing the features of the content into Z-web, using the knowledgebase to automatically annotate the content and associate such annotation with the content (for a later search), e.g., via indexing.

In one embodiment, the network entity delivering the content does not include a reference to $Q_{Store}$ (e.g., resources, API, or query) embedded with its delivery content to the reader/renderer, and a query (e.g., automatic) is initiated be a process in the user's device (e.g., reader/renderer process) to fetch data related to the resources in the delivered content. In one embodiment, the network entity (e.g., a web site, $W_{site}$) has the content embedded with resources, API, query, or tags referencing $Q_{Store}$ and the renderer/reader uses such embedded resources to fetch data from $Q_{Store}$ or to display/playback the content (e.g., included the use of scripts such as Javascripts).

In one embodiment, the reader/renderer sends information to $Q_{Store}$ or a server, when for example, the user enters annotation on a resource such as a portion of the image. In one embodiment, the information is tagged with the user's ID (e.g., is logged in). In one embodiment, the sent information is queued for analyzer to incorporate into Z-web. In one embodiment, the plug-in provides the user interface to enter/edit annotations on the user's device. In one embodiment, a local service or process running on the user's device provide a local $Q_{Store}$ or Z-web on the user's device, e.g., giving local access to the user's auto-annotated photo albums, using other database (e.g., email or contact) to automatically build the relationship links between people appearing in the photos and appearing in the email to/cc lists. In one embodiment, the local $Q_{Store}$ or Z-web may be synchronized with those on the network (or Cloud). See e.g. FIG. 53 for such a system, for one of the embodiments.

Partial Matching:

In one of our embodiments, we have a partial matching on objects hidden or covered behind others, or partial understanding or recognition of patterns hidden or covered by other objects, or not fully visible for any other reason, such as bad or dirty or foggy lens on camera. We compare the partial pattern or image of the first object to the library of all possible objects in that setting or environment, for partial match, with assigned reliability, based on the estimated percentage of the visible part of the first object, to put or incorporate it in the Z-web, where the recognition is enhanced based on the multiple inputs from other sources to cross-verify and cross-recognize, as described elsewhere in this disclosure, even using partial recognitions with not full reliability, per object, or node on Z-web.

Here, we give an example for partial matching for image, but this method can be used for recognition or verification of text, sound piece, series of music notes, signature, fingerprint, face, or any other feature or object or pattern, that is partially lost, obscured, hidden, erased, or not detectable/visible.

In one example, we have the first object being partially-matching with n objects in our target library (e.g., $T_{O1}$, $T_{O2}$, ..., $T_{On}$), with different overall reliability factors, $R_{F1}$, $R_{F2}$, ..., $R_{Fn}$, respectively, for the full match. For example, part of the first object matches with part of n objects in our target library. For example, a "handle" (or an object which looks like a handle), as a part of the first object, may be a part of (a handle for) a kettle, as first target, or part of (a handle for) a bottle, as a second target. First, we determine how much the handle of the first object matches the handle of the kettle, and matches the handle of the bottle, and so on, as denoted by $M_{O1}, M_{O2}, \ldots, M_{On}$, respectively (for example, using matching or recognition confidence or score). Then, we determine the percentage of size or importance or contribution or dimension or ratio of a handle with respect to kettle, and with respect to bottle, and so on, as denoted by $P_{O1}, P_{O2}, \ldots, P_{On}$, respectively (for example, using the ratio of the sizes or dimensions or number of pixels).

Now, in one embodiment, the overall reliability factors, $R_{F1}, R_{F2}, \ldots, R_{Fn}$, for the full match, is based on $(P_{O1}M_{O1})$, $(P_{O2}M_{O2}), \ldots, (P_{On}M_{On})$, respectively. (In one embodiment, the relationship can be more general, i.e. as a function of those values ($F_f$), or written in terms of: $F_f(P_{O1}, M_{O1})$, $F_f(P_{O2}, M_{O2}), \ldots, F_f(P_{On}, M_{On})$, respectively.)

So, the maximum or optimum reliability factor corresponds to (as a Maximum function, for taking the Max values on multiple parameters):

$$\text{Max}((P_{O1}M_{O1}),(P_{O2}M_{O2}),\ldots,(P_{On}M_{On}))$$

Let's assume that the Max function above yields ($P_{Ok}M_{Ok}$), as the k-th term in the series above. That is:

$$\text{Max}((P_{O1}M_{O1}),(P_{O2}M_{O2}),\ldots,(P_{On}M_{On}))=(P_{Ok}M_{Ok})$$

Thus, the k-th object is the best target object for the full match.

Now, in addition, we can construct the relationships, to put all n objects in our target library into the Z-web, as described elsewhere in this disclosure, to find or recognize the best target object(s).

In one example, the problem is generally false positives, for recognition of target objects, but in one embodiment, with keeping track of reliability in our Z-web, we can tame that false positive rate to a reasonable quantity, making Z-web an extremely useful tool and technique for this type of situations.

Tags and Comments for Pictures and Images:

Picture annotation and caption is useful for recognition of people in the image, e.g. looking for phrases such as "from left to right", or "top row", to find location of faces or people in the image, and order them in rows or columns, and then call or label them as objects or persons $P_{R1}, P_{R2}, \ldots, P_{RN}$, as placeholders for names, and then compare them with the names coming after the flagged phrases such as "from left to right", to get names matched with placeholders $P_{R1}$, $P_{R2}, \ldots, P_{RN}$. For recognition of names and flagged or pre-designated phrases, we use OCR and then basic or full natural language processor module.

In one embodiment, we can simply look for specific words such as "left", as flagged words, and if successful, then look for specific phrases, such as "from left to right", as flagged phrases, from our library of flagged phrases and words, pre-recorded and stored, or dynamically adjusted and improved through time, without actually understanding the meaning of the full text and sentence, for fast picture analysis and matching names or tags or comments related to the pictures.

In one embodiment, we can ask the user or third party, e.g. friend or public, to tag names or objects, or as crowd-sourcing effort or by voting scheme, e.g. paid service or free, or they do it on their own, because e.g. the (assuming unbiased) people familiar with a person may be the best or most reliable people to tag the album or pictures of that person, as an example. In one embodiment, the indicators can be used for approval, confirmation, or increase of reliability factor, such as "Like" for a picture or comment on FACEBOOK®, as an indicator of approval by a friend or third party. In one embodiment, the voting or survey is used for measuring approvals. In one embodiment, the comments after a video or picture is used, e.g. as overall positive or negative, e.g. "Great picture!" indicates approval and conformation of a third party.

In one embodiment, the number of comments, number of views of a video, minutes watched for a video, length of comments, frequency of comments, date of recent comments, number of independent commentators, traffic of a web site, number of independent visitors to a site, number of followers on TWITTER® or other sites, number of connections, number of links, size of linked sites, quality of linked sites as rated by a third party, e.g. family-approved sites, number or size of advertisements or advertisers, marketing budget, income, revenue, number of cited references by other sites or parties, e.g. for a research paper or patent or case law, or the like, might be indications for approval or reliability of source e.g. news, e.g. CNN-TV channel.

In one embodiment, the system automatically tags the pictures, and in another embodiment, it asks the user for verification. In one embodiment, it searches for a person in the album and sort based on that person(s).

Images from Different Angles or Views:

For example, we take pictures of the Eiffel tower from different angles, for training purposes, and store them, e.g. from top view and side view or from underneath. Some of the views are not common, and thus, unfamiliar to average human or eye. For example, if a picture of the Eiffel tower is taken from an airplane from exactly the top, the shape from the top may look like a square inside a bigger square, which does not look the same as a regular tower at all (or our average expectation or view of the tower). Various views help the recognition of the tower or object, as they can correlate or refer to the same object, which increases the reliability factor of the recognition or the recognized object.

In one example, given a picture, which includes a square inside another bigger square, the picture may also resemble another $2^{nd}$ object, other than the Eiffel tower, in our library of the objects in the universe or at the specific location or city. Thus, other input information in the Z-web is used to increase the reliability of the data, and recognize the object, e.g. text or voice associated with the image.

In one example, given a picture, which includes a square inside another bigger square, one has to find the orientation of the image, from some templates in the library, or from thousands of training samples of many objects tagged versus direction and view by human or expert. The images in library can be real pictures or computer generated or drawn models, which compares shapes with each other, to find the best match, which indicates the view, e.g. "view from the top". Once the direction or perspective of the view is determined, we can store that information into Z-web, to integrate with the rest of the information about the tower or object.

Pixel Patterns, as Feature Vectors:

For an image, we define the square cells, e.g. 32×32 pixels or 8×8 pixels. Generally, each pixel has 8 neighbors, such as top-left, top-straight, and so on. We start from one neighbor and go around all neighbors, e.g. in the clockwise direction. We compare the center pixel with each neighbor. If the difference of the center value minus a neighbor value is above a threshold, e.g. 30 points in pixel value, or above a relative size, e.g. above 35 percent, then we put "1" for that position. Otherwise, we put "0" for that position.

In another embodiment, we can do this with bigger range of assignment, instead of assigning only 0 and 1. For example, we can use 0 to 3 (or 0 to 7 range), to classify for finer differences, for difference between the center pixel and the neighbor pixel. Of course, we have a bigger overhead in this case, for computation power needed and for storage.

In either case, we end up with a cell with a bunch of numbers assigned for each pixel. These numbers indicate the local pattern of differences between neighboring pixels. In another embodiment, we can represent those assigned numbers in binary format for easier comparisons, as comparing 0 and 1 per position in digit order is very simple, using e.g. XOR logical operation. Now, we can use a histogram for over the cell, for the frequency of each assigned number in the cell, as an indication of the frequency of that difference or pattern in the cell, and also in the whole image. In one embodiment, we can normalize the histogram, for comparison of different histograms, based on the average values or median values or based on the ratio to the maximum value, i.e. ending up with fractions less than 1 for all values, which is more computing intensive. The histogram for all cells is an indication of the pattern in the image or feature vector, e.g. bar code black and white lines, or patterns or checkered or striped shirt or tie or fabric.

Now, the support vector machine and other classification methods can be used to classify the patterns or recognize the patterns or textures, such as for face or fingerprint recognition. The face recognition, as an example, can have multiple target people for comparison in the database of faces. If the new face is matched with one of the faces in the database, nothing new is created in the database. Only, the new face is tagged along or referenced, e.g. with a pointer, with the matched face in the database, as the variation of the person's face already in the database. However, if there is no match, a new account is created for a new person. If there is no name yet available, we add it under NO NAME category, using generic names of NONAME1, NONAME2, NONAME3, and so on, until we find a name match later on, which replaces the placeholder in every instance. For example, "John Smith" replaces NONAME3 in our Z-web configuration. Placeholder is also useful in the Z-web for names with low reliability, as "John Smith" does not replace NONAME3 in our Z-web, in this example. Instead, it creates another node, as a property of NONAME3, as a new node connected to NONAME3 node, with the value of assigned "John Smith" for the new node.

In one embodiment, we classify the faces already in $N_{face}$ categories, e.g. 105 major types, based on regions of the world or shapes of faces, as a first level coarse classifier, so that the second level is a finer classifier to find a person. Or, if the number of faces in target database is huge, then we may need a third super-fine classifier, or even more levels of hierarchy for classifiers, feeding each other in multiple levels, for more efficient and faster classifications. In one embodiment, a human or expert or an already learned machine helps the training of a set.

Rule Templates Database:

In one embodiment, we have an image and we extract multiple objects from it, e.g. table and bottle, in which part of table is hidden or covered by bottle, which means table being behind bottle, referring to the positional situation of (from our position or relative location library): "bottle on the table", or in general, object A located on object B, or also, meaning that object A closer to camera position than object B, which are stored in our Z-web. Then, later on, one can search or query about the position of the objects and their relative locations, to extract these relationships. One advantage is that in Z-web, if object A is behind B, and B is behind C, then on the relational position between objects, one can conclude that A is probably behind C, for which such a template of rules are stored to support the Z-web, to help relate objects or simplify relationships, with the rule in a database of rules for Z-web, under category for positions of objects. Mathematically, the rule can be written as, where the function $B_E$ is the "Behind" function or operator:

If $[[B_E(B)=A] \& [B_E(C)=B]]$

Then $[B_E(C)=A]$

Figure 51:
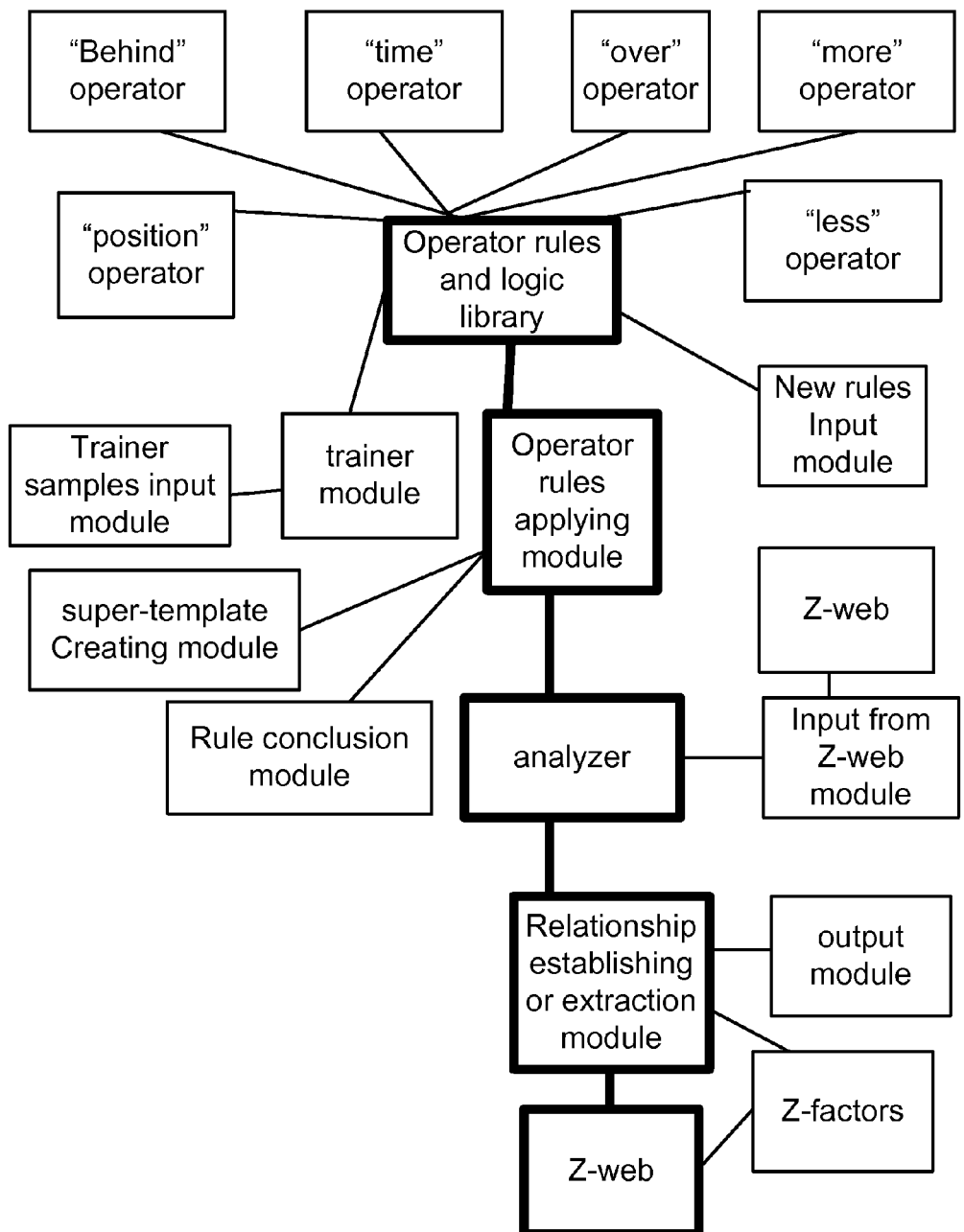
FIG. 51 shows one embodiment for a Z-web analysis.

In general, the other logical relationships can be stored the same way in Rule Database engine (library), such as for "time", or "over", or "more", or "before", or "stronger", or the like. For example, for "time" operator, if time A is before time B, and time B is before C, then A is before C. This can also be written similar to "Behind" function, in mathematical form, for template, for Rule Database. If the template is very similar for time and space, one can use a single super-template, as generic template, for both situations, to reduce the number of templates and increase efficiency, in some embodiment. See e.g. FIG. 51 for such a system.

Rule database and templates can also have their own Z-web, relating the concepts, logic, relationships, and formulas, which can simplify the templates or get rid of the contradictions or inconsistencies. As an example, if we are not sure about a formula, we can store that as a rule in rule database, as a node with low reliability, which can be fixed, modified, or eliminated later on, on the rule database Z-web, which can be handled separately from our original Z-web structure. Alternatively, the 2 Z-webs can be combined as one super-Z-web, as explained elsewhere in this disclosure, with a common node being the object under study, such as "time".

Image Analysis:

In one embodiment, architectural building signature is an indication of a region or culture, e.g. mosque arches in the Middle East, or white buildings near beach on the cliff, as Mediterranean style near Greek islands. The databases of famous people, pictures, paintings, locations, historical buildings, monuments, books, authors, architecture of cities and locations, and the like are incorporated with our analytics engine. In one embodiment, using OCR, we can extract the name of the book on the bookshelf in the picture from the library or book store, or name of the store, or name of the street, or name of the person on the door, or name on the business card, to find the person, address, business, or taste, or correlate them together, as some examples.

Figure 30:
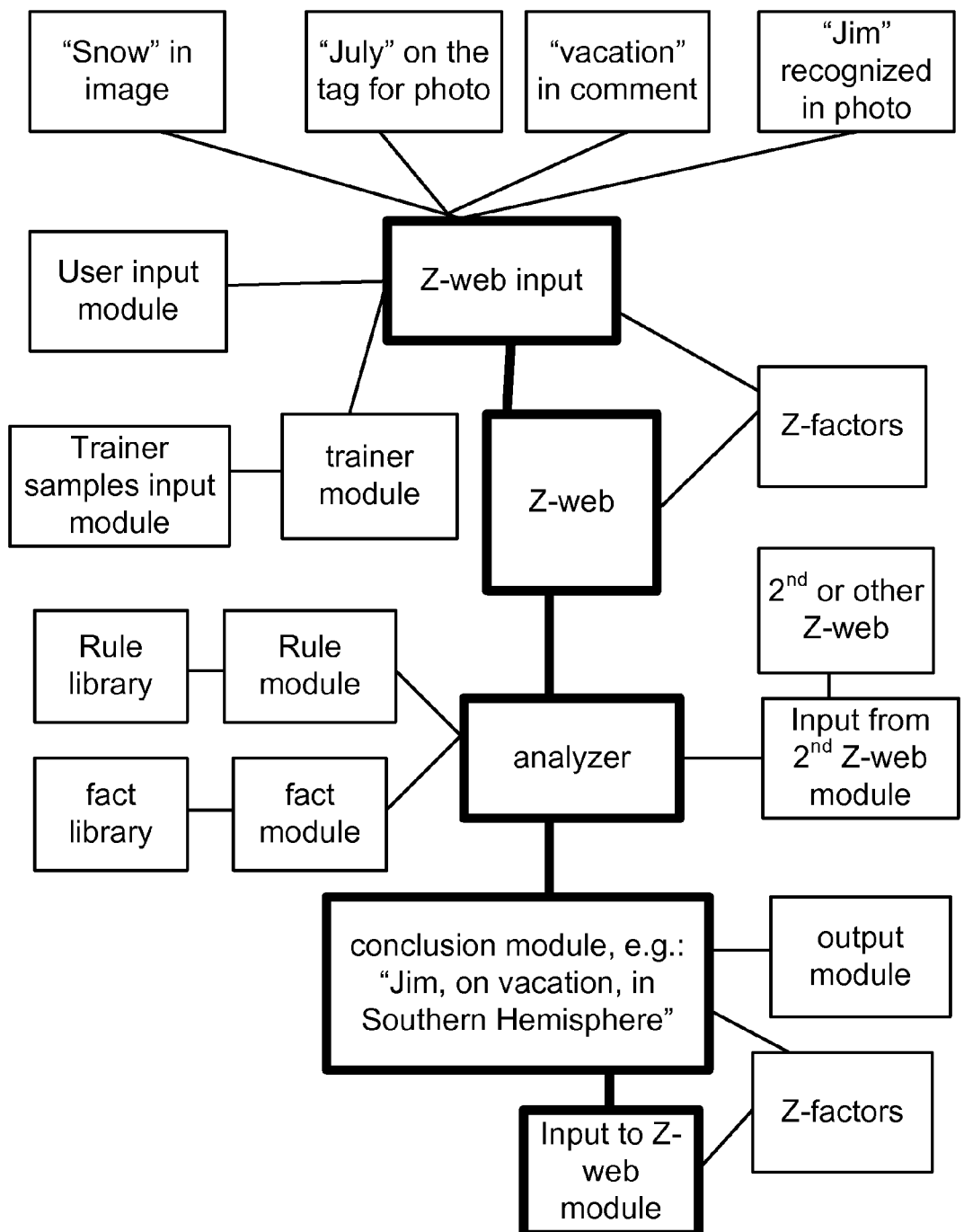
FIG. 30 shows one embodiment for Z-web analysis.

In one embodiment, the facts may dictate some limitations in the universe of possibilities. For example, the "snow" in "July" may indicate that we are in the Southern Hemisphere (of planet Earth), or the picture was taken from such a location, limiting all possible locations on the planet for candidate for picture location. See e.g. FIG. 30 for such a system.

In one embodiment, travel guide is a good source of data for geography or history or facts. In one embodiment, the picture of an article either relates to the author or the subject of article. So, the face or person or author's name from caption or article or title or footnote should be extracted for comparison and classification or recognition of the picture or image. In one embodiment, the picture of an article in a web site is just an advertisement, i.e., nothing to do with the article itself. In that case, we have to figure out that it is an advertisement, from the caption or from subject matter or title or position on the web page or frequency of updates or functionality of the image. So, we have to partition the web page accordingly. In one embodiment, the GPS data or location data or time data or metadata, associated with a picture in a phone or camera, are used for data for Z-web for that picture.

In one embodiment, wax museum or movie setting is an indication of non-real people, even if the person looks like a famous people in the database. In one embodiment, a picture in a picture is analyzed, e.g. a picture in a movie or video frame, whereas the movie frame represents live humans in 3-D, but the picture frame on the table in the movie represents a 2-D image of a picture of a person, not a real person in the movie or video. Because to analyze the video, the 2-D image and the 3-D image may have different consequences and interpretations, e.g. as to who is related to who in the video. The 2-D picture frame on the table has specific signatures, e.g. it does not move around with respect to the other objects in the video, and has a constant coordinate.

In one embodiment, we have a database of famous people or US Presidents, e.g. George Washington, and database of famous places, e.g. Mount Vernon Estate, relating the two subjects or objects, as one being home of the other object. So, if we get a recognition of one object, automatically, the system looks for the other object in the vicinity, in terms of text or location or time or related objects or concepts, as expectation for other object(s) to be around. That also helps confirmation of validity of the recognition. That also helps building up reliability factors for the Z-web structure, and expanding the Z-web.

Street Scanners:

In one embodiment, we have satellite or aerial images from buildings and streets, and if a new building is shown in a new image from this year, compared to last year's photo, then we send the "street car 3-D photographer street scanner" back in that street, to scan the new building and scene, as an update (using multiple cameras from different angles and views, on the car, plus scanner, on a rotating table, with GPS or location determination module, plus calibration images or data, to adjust for coordinates and views, with redundancies on images or data, to glue pictures together seamlessly, and to correct the fringes in images or corners, or to correct mistakes in images or coordinates or 3D views). If no new feature or building is detected, no new update on street level for street view is needed for the city map on the computer or web site. So, we are looking for features or deltas or differences, with respect to last year's or previous picture(s). Thus, we compute the difference between 2 images, from this year compared to last year, e.g. using simple difference or subtraction of values, pixel by pixel.

In one embodiment, from the amount of the differences in images, the system determines how often or when next time the street scan is needed or proper, to be dispatched or scheduled, based on importance of the city map for the users, and being up-to-date as much as possible or to what degree, in terms of financial value for the users or advertisers or local businesses or city hall or tourists or residents. If they have a fleet of those scanning cars, then the schedule is set to optimize the usage of those cars in different neighborhoods or cities, so that they get the best value for the users, based on differences in images in terms of amount and its frequency, user base and value per city or neighborhood, cost of operation of those scanning cars, and distances between the neighborhoods, to get most coverage and value, with minimum cost or mileage on the cars, or smaller number of scanning cars used.

Camera Corrections:

In one embodiment, the lens of the camera is scratched or dirty (e.g. with dust on the lens or oily lens, diffracting the light) or defocused or otherwise foggy and degraded (e.g. as if the transformation of $F_{image}$ (x) is applied to each pixel). Then, the picture does not come out very well, and the recognition of murky objects in the image is very difficult and with a high error rate. So, we filter the image, first, as a pre-process, to focus the image, as the reverse of the lens problem, as a reverse transformation on the image, or $F_{image}^{-1}$ (x), applied to each pixel, to produce the corrected image. Then, we perform the recognition step, on the sharper or clearer objects or images, for improved recognition rate.

In one embodiment, for a camera taking pictures of an object, we have a family of transformations of $F_{image}$ (x) on the image or pixels, separately designed for each of these situations, to mimic the situation or effect on pixels or image: e.g. camera shaking, camera tripod shaking, object shaking, object moving in linear fashion, object rotating, blurred lens, dirty lens, scratched lens, oily lens, defocused lens (e.g. too far or too short for focal length), off-axis lens (e.g. astigmatism or refractive error of the lens), dust on the lens of camera, and the like, which are the common reasons for blurry or degraded or defocused pictures by a camera. All the family of transformations $F_{image}$ (x) are stored in a library or database, for future access. The transformations $F_{image}$ (x) are designed or derived based on the optics or physics of the lens or theoretical formulation or analytical or pure experimental or simulation or optics model or physical model or pure curve or pure listing or table or closed form formulation or equation or combination of the above or the like.

Then, for each of these transformations $F_{image}$ (x), we derive reverse transformation on the image, or $F_{image}^{-1}$ (x), applied to each pixel or image, analytically, experimentally, theoretically, in-closed-form, by mapping numbers, by table of numbers, by simulation, or the like. Since we may not know the cause of the problem, or even if there is any problem in the first place, in a given image, we try all or some of the family of reverse transformation ($F_{image}^{-1}$ (x)) on all images, or on blurry images with bad recognition rate, or only on one or few sample images, to see if the recognition (e.g. recognition rate or reliability, e.g. on some samples) is improved or the blurring is reduced (e.g. based on sharpness of lines or borders). If so, then we know what the problem was for the camera, and we use that specific reverse transformation for all images from that specific camera or lens. If there are 2 or more problems e.g. with the camera, then we need 2 or more (e.g. N) corresponding reverse transformations ($F_{1image}^{-1}$ (x), $F_{2image}^{-1}$ (x), $F_{3image}^{-1}$ (x), ..., $F_{Nimage}^{-1}$ (x)) on the images, applied to the images in the reverse order, to compensate for the problems e.g. with lens or camera. After the images are corrected, then the recognition steps are done, which yield improved results.

If we already know or guess what the problem(s) is, then we just try that corresponding specific reverse transformation $F_{Mimage}^{-1}$ (x), first. For the improvements, on recognition or blurring, we can have a threshold or rule or criteria or fuzzy rule or rule engine, to stop the process at that point, if we reach the threshold. The threshold can be fuzzy value, or crisp number, or percentage, or relative value or ratio, or absolute number, or the like, as the criteria for optimization.

Let's look at one example. For a defocused image with a defocused lens, we have a situation that e.g. the proper image is not formed on the plane of the film or photosensitive detector. Let's assume that the proper image would have been formed on an imaginary plane behind the current actual plane for the film or photosensitive detector or sensor. Let's also assume, from the geometry of the imaginary plane and the actual plane, the distance between those 2 planes produces e.g. approximately 2 pixel shift, on the actual data, for the current actual plane, because the optical beams or rays or photons hit the actual plane sooner than they should have, due to the defocusing effect of the lens. Thus, in this example, for a pixel (i, j) on the actual plane, to get the corrected value for the pixel, $V_C$ (i, j), based on the original pixel values, V (i, j), we have approximately the following relationship, based on the neighboring pixel values, from 2 pixel away, e.g. in one embodiment, on each of the 4 directions, e.g. up, down, left, and right sides, having 4 component contributions, as the sum of all 4 contributions:

$$V_C(i,j) = V((i+2),(j+2)) + V((i+2),(j-2)) + V((i-2),(j+2)) + V((i-2),(j-2))$$

To normalize, we get the average of 4 contributors above, by dividing by 4:

$$V_C(i,j) = [V((i+2),(j+2)) + V((i+2),(j-2)) + V((i-2),(j+2)) + V((i-2),(j-2))]/4$$

Or, in another embodiment, we use 8 directions, including the diagonal directions, for neighboring pixels, with 8 component contributions. The method above for calculating the values can be applied to the intensity values, or each color component values, or each property value of pixel, e.g. RGB values or YMCK values or grayscale values. Now, we have the corrected values for pixels which correspond to the inverse transformation mentioned above.

The formulation above applies to all pixels in rows and columns, for all values of i and j. So, we have to scan the image. However, for pixels near the corner or boundaries, which do not have e.g. any neighboring pixel to the top or left, then we repeat the same value again for missing pixels, so that the formula above is still applicable. In summary, at the end, we can correct the image, to reduce or eliminate the defocusing effect, and then apply the recognition module on the corrected image for better recognition.

In one embodiment, we use convolution with a radial function, e.g. Gaussian function, with the variance of e.g. 2-4 pixels (or more), and move it around, to scan the whole image, to get the same effect as above.

Geometrical Analysis:

In one embodiment, homography and projective transformation can be used to compute camera rotation or translation, to account for a new point of view for a person or object, e.g. to match 2 views of the same face, from front and side, from 2 pictures, to match faces or recognize them.

In one embodiment, using filters for sharpening the edges as preprocessing, and then using contrast analyzer, between values of neighboring pixels, as their absolute or relative difference, versus a threshold or percentage, one can find the boundaries of objects (or using any other boundary analyzer). From the boundaries, one can find the corners of the objects, as their intersection of 2 boundary lines, or as the points in which the derivatives or slopes of boundary lines or curves change too much or abruptly or above some threshold. Corner points or boundaries are categorized as interesting points for the purpose of the feature extraction form the image, which collectively make up a feature vector in our feature space. Also, having all the corner points, the shape of the object can be found or named, from the geometrical shapes in the database.

Sorting & Analyzing Data:

In one embodiment, having "big data" coming in as input, we distinguish images in the first cut, very coarsely, e.g. text, medical images, satellite images, human faces, numbers, tables, computer codes, and the like, from their respective signatures and features, in training schemes or against databases already tagged. One example is text in different languages, as a sub-category, in later filtering or narrowing the class further, or typical street maps, which can be trained or learned using millions of samples, from that class or subclass. The learning machine generally works better with more training samples, as long as the samples are reliable (e.g. with high reliability factor, which can be extracted from their corresponding Z-web values).

In one embodiment, when analyzing a Big Data, the system comes up with or extracts some patterns or relationships at the beginning. Then, we store the patterns or relationships as templates for future use. As the time passes, the number of generated templates increases, increasing the value of the library of templates, and increasing the choices and possibilities for templates to fit in. Thus, at the end, we have some templates, from history, as educated guesses. For example, we can offer this as a service on the cloud, with all the templates generated so far, to analyze the data. In one embodiment, we export the templates from another system, into the first system, to add value to the template library. In one embodiment, our system buys or sells the templates from/to another system or source or entity. In one embodiment, the system uses the templates to analyze the data or extract information or data mine the data.

The examples of Big Data or data analytics are on the following data types: unstructured data, structured data, machine generated data, tables, listings, databases, collections, records, financial history, employment history, resume, business process logs, audit logs (file or database), packet data, industrial control system data, network state or status data, web proxy logs, system events, applications logs, click information (e.g. on Internet, web pages, buttons, menus, objects, figures, and the like), database logs, logging API, operating system status, information obtained from sensors or meters or detectors or cameras, web access or network access logs, texting records, SMS records, call records, TWITTER® records, configuration files, management API, message queue, operating system performances, data from control and data acquisition module, satellite images, input from airport cameras, movie scans, music scans, speech scans, text scans, medical images, library scans, database scans, or the like.

The analysis of the above data e.g. can be used for predicting customer behavior, finding correlations among sources, forecasting sales, catching fraud, finding computer security risks, processing sensor data, social network analysis, feedback analysis, emotion analysis, web click streams analysis, or the like.

Recognizing Objects for Various Applications:

In one embodiment, we identify people in the picture in album or by camera or video recorder, and automatically as default (unless chosen otherwise from the menu), email to all people involved or recognized through the album or from camera or from each picture, from their contact list, if desired, or to all in the event, or share through link or FACEBOOK®. The scope of distribution is set beforehand, for list of recipients. For example, if three people are in one picture, namely John, Amy, and Fred, then that picture is emailed to those 3 people, only. However, the next picture has e.g. 4 people in it, namely, Ted, John, Amy, and Fred, and the next picture goes to all 4 people, including Ted, and so on. The preferences are chosen beforehand for templates or single picture or batch processing, for all or subset of pictures or data or video.

Figure 31:
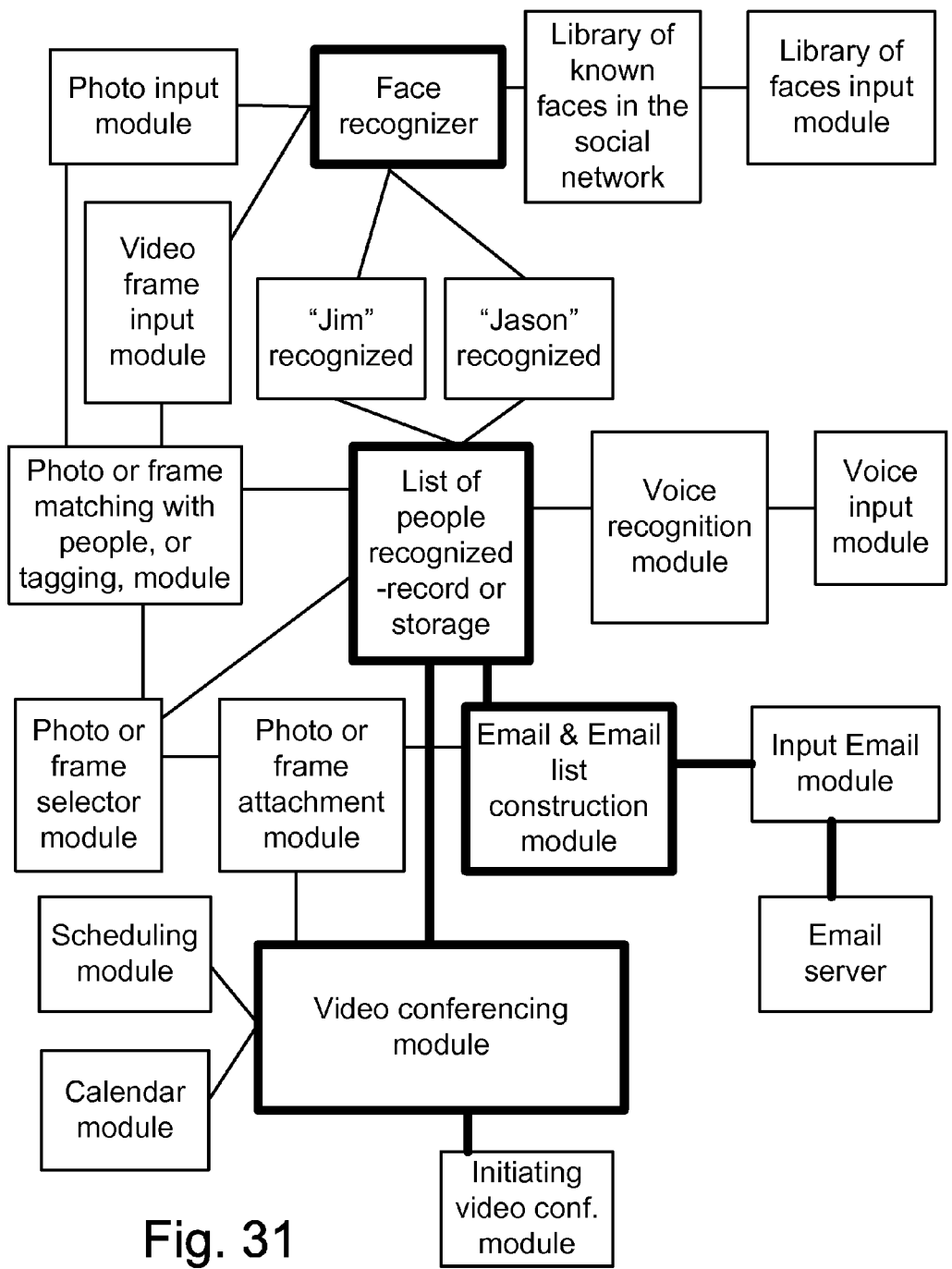
FIG. 31 shows one embodiment for face recognition integrated with email and video conferencing systems.

For example, there are 2 people recognized, out of 10 people in the video, from our library. The other 8 people were not in our library or recognition was not successful. Then, a copy or link or track or frame number or pointer or position of the video or web site or storage for the video or specified frame of video is sent to the 2 friends that are recognized from the searched video. That can help for social networking sites and professional settings for a conference call between some coworkers, automating distribution of relevant data, including voice, text, video, or image, that include the name of specific people or image of the person or any related object to that person, found in that text or sound piece or video or image, to be sent to that person automatically. See e.g. FIG. 31 for such a system.

This can be used for example for copyright or trademark protections, in which the image including a person's copyright or trademark is sent automatically to the person for review, out of millions of web site pages scanned on the Internet, to find infringers or verify licensee payments, if any. Or, one can send the list of web sites using a specific logo or trademark or patent to a comparison module, to verify against the list of legitimate or paid or permitted licensees in its database, automatically, to approve or warn the related people, by email, pre-recorded voice message, texting, SMS, mail, vibration warning on the phone (e.g. specific vibration or cycle or sequence or variable magnitude or variable frequency), any communication means, or the like. So, it is a useful tool for sending information to relevant people, automatically, by email or tel. (via text, voice, or image) or any other communication means, once the object is recognized in the content under review, and the object is linked to an entity that subscribes to our services, such as friends or corporate legal department, for fee or for free, depending on the business model or purpose of the service.

For example, if I am interested in movies by director A, then any new or old movies found for her name can be automatically sent to me, even if the mention was on text or verbal (sound/voice) at the end of the movie, with no tags or comments. Of course, any tag or comment on the movie regarding that information makes it easier for such a process. Alternatively, those tags and comments can be verified based on the other data extracted from the video directly by Z-web engine, e.g. text or sound naming the director at the end of the movie. For those, we use OCR or voice recognition modules to recognize and convert information for comparisons.

The picture or sound albums or videos can be classified and archived this way, in a cross classification way, using a relational database, for relating e.g. objects, videos, and people together, in a final Z-web structure, and to be searched by the user later on, as a query, or question, about any subject, starting from one node and going to other nodes, even if the user does not know that the second node is related to the first node at the beginning. This is also a powerful search engine and archive, which is expandable by its knowledge base through expanding Z-web size and making more reliable and consistent and truthful branches and relationships on the Z-web, increasing the total value of the Z-web. For example, the same picture or video or voice speech may be referenced in multiple places for multiple reasons for multiple objects or nodes or branches, which can be queried or searched independently, through Z-web.

In one embodiment, we identify objects in the video or images for advertisement purposes, or for consumer purposes, to send ad notices or notify the potential buyers or notify new consumers or notify about new products or requested types of products or products of interest. The object in video, for example, has some relationship with the recipient of the email or communication or texting or notice or telephone call or fax or ring tone or the like, as a way of notification. For example, the relationship came from the Z-web, or the object was chosen by the user, or the class of objects was chosen by the user or third party or randomly by computer, through the menu or the user interface or GUI or tablet screen or tel. screen or by voice recognition command. So, the extracted object can be the subject of an ad, or suggested product, or put into a cart for purchase on web site, or sent to a reviewer, or stored in a database, or broadcasted to many people, or the like.

One can also search using a query for the album, e.g. using a text, to find an object. One example is to find out that, for the identified person in video, what kind of food or drink does he like? Those could be found through the other objects in frames (nearby) in video, e.g. on or near the person's desk or in his hand, holding the drink or bottle. Or, if somebody enters a textual or voice question for the system, as what kind of food or drink he likes? Then, we can use OCR or voice recognition or analysis to get the question, and then use word search or natural language processing or specific flags for key words, to get the meaning of the question, or approximate meaning of that. Then, we apply the method mentioned above, to answer the question(s) or find an approximate answer.

Figure 32:
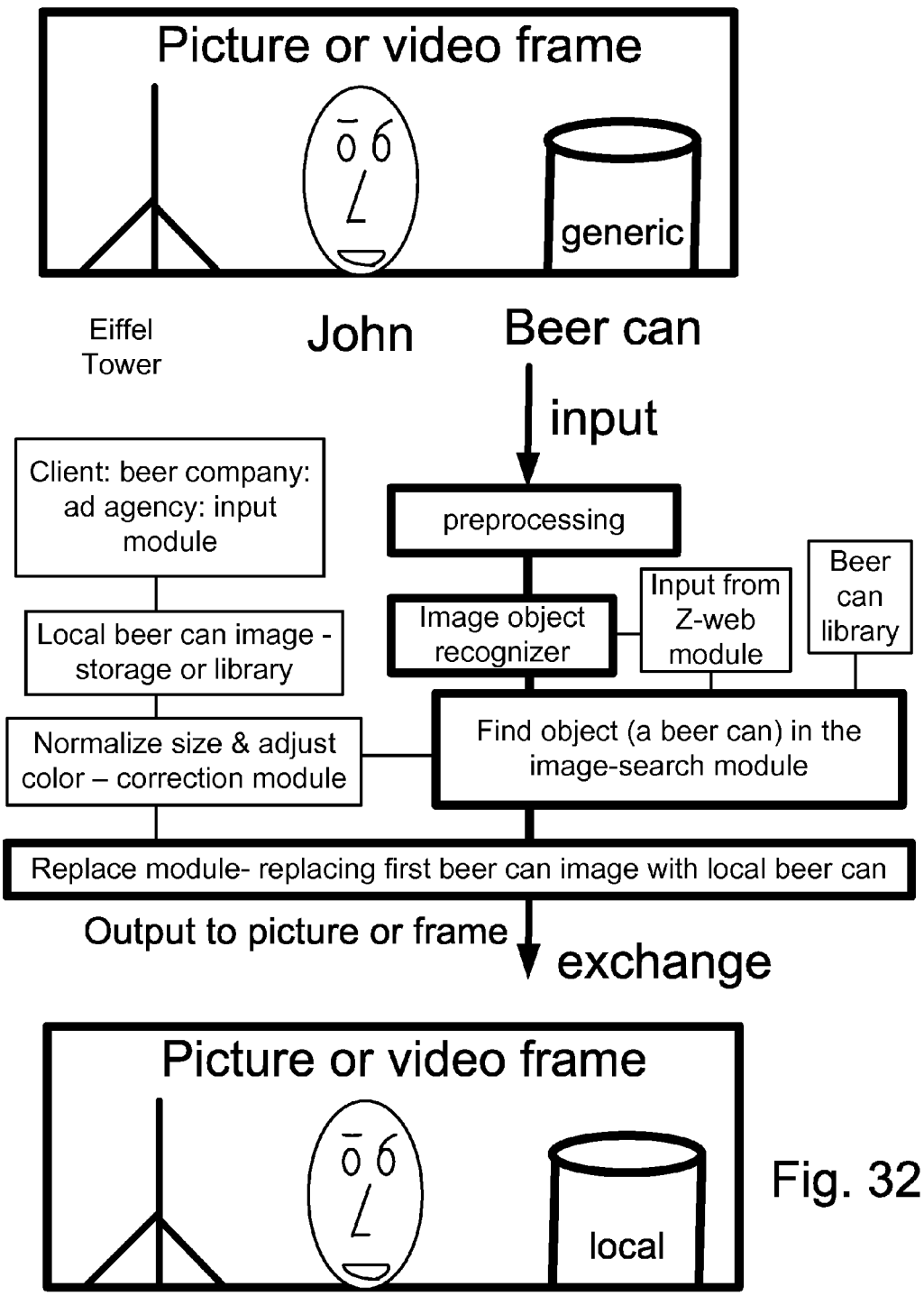
FIG. 32 shows one embodiment for editing image for advertising.

In one embodiment, we identify an object in the video or images, then we remove or edit it, or replace it with another object, e.g. for advertisement or localization purpose. For example, in different countries, different beer (local beer) is used in pictures or movies or ads, for better acceptance as a local favorite or for marketing and higher sales, by replacing one object on the table with another one from library for local objects, e.g. beer bottle, to be put on table, seamlessly and automatically. See e.g. FIG. 32 for such a system. However, we may need some adjustment on the background color and texture, if the size and shape of the beer bottles are not exactly the same, for the gaps that have no overlap between the 2 beer bottles. One correction is blurring or averaging or filtering the neighboring pixels around the gaps, or using the neighboring pixel color and texture, to extend inside the gap region(s), to cover the gaps with more or less same or similar color and texture nearby, as extrapolation and interpolation methods.

In one embodiment, we recognize a partial object ($1^{st}$ object), which is behind another object ($2^{nd}$ object), and for editing purposes, in the image or for movie (for all frames including that object), we bring the full image of the $1^{st}$ object in front of the $2^{nd}$ object, to block the $2^{nd}$ object partially, by the $1^{st}$ object, in effect reversing the order of the objects in the still image or video frames, in any order we wish. The image of the $1^{st}$ object is in our library of objects, which can be obtained from there. Then, the size or color or intensity is normalized to the one in the image, so that we do not feel any abrupt change in size or color or intensity, based on the ratio to the values in the neighboring pixels, or average in a region, or value of pixels near border lines or boundaries. For the perspective, if the $1^{st}$ object is tilted, then either we use the tilted version of the $1^{st}$ object from library (if available), or we morph the image of the $1^{st}$ object in the library slightly, based on translation, rotation, lens, or similar image transformation matrix, to look similar to the tilted image of the $1^{st}$ object, to be replaced, for editing purposes.

In one embodiment, we recognize faces in an album, and find the incorrect tagged ones, or edit and correct them automatically, with or without the user's or owner's permission or review, as multiple options in the software.

In one embodiment, we recognize faces in the album and insert it automatically in the phone display or screen, when the person calls in, to be displayed, with a specific ring-tone, or mentioning the person's name, in voice or text, to inform the receiver regarding the identity of the caller. In addition, the mute vibration mode can have different frequency of vibrations, set for different users or callers, so that they can be recognized by a mix of vibrations at single or multiple frequencies, or using notes or music style beats or vibrations, or using modulated waveforms as vibrations lasting a few seconds, for example.

In one embodiment, we recognize faces in the album and insert it automatically in the email, for sender or receiver, so that it would be easier to recognize the people in the email list, and fewer mistakes will happen for sending an email to unwanted or unintended people. The reverse can also be done. That is, we select pictures from the album, and the email list is generated automatically, from person's identity, which relates to the person's contact information, e.g. email addresses or telephone or fax numbers, which all can be part of the person's Z-web, as the related information to the person's node, represented by neighboring nodes.

Data Extraction, Including Emotions and Taste:

In one embodiment, the signature of the cell phone or ID number for camera relates the picture to the person who took the pictures or owner of the camera, which relates the picture to the friends of owner, which relates the picture to possible targets for people in the picture(s), for recognition. In one embodiment, the pictures from nature or mountain or cities relates to the taste or preference of the owner of the camera or cell phone camera, which relates her to the possible destinations for the next trip, which is helpful for marketing for travel agencies or local ads for products or services for those destinations, such as local rental car companies. In one embodiment, the pictures from a house in camera are used for extracting the taste of the owner of the camera, for the house setting and environment, such as in suburb or wooded area, for future house hunting for the new home buyer (camera owner), which is helpful to the real estate agents, for the preferences of the home buyer, for marketing or efficient house hunting.

Figure 33:
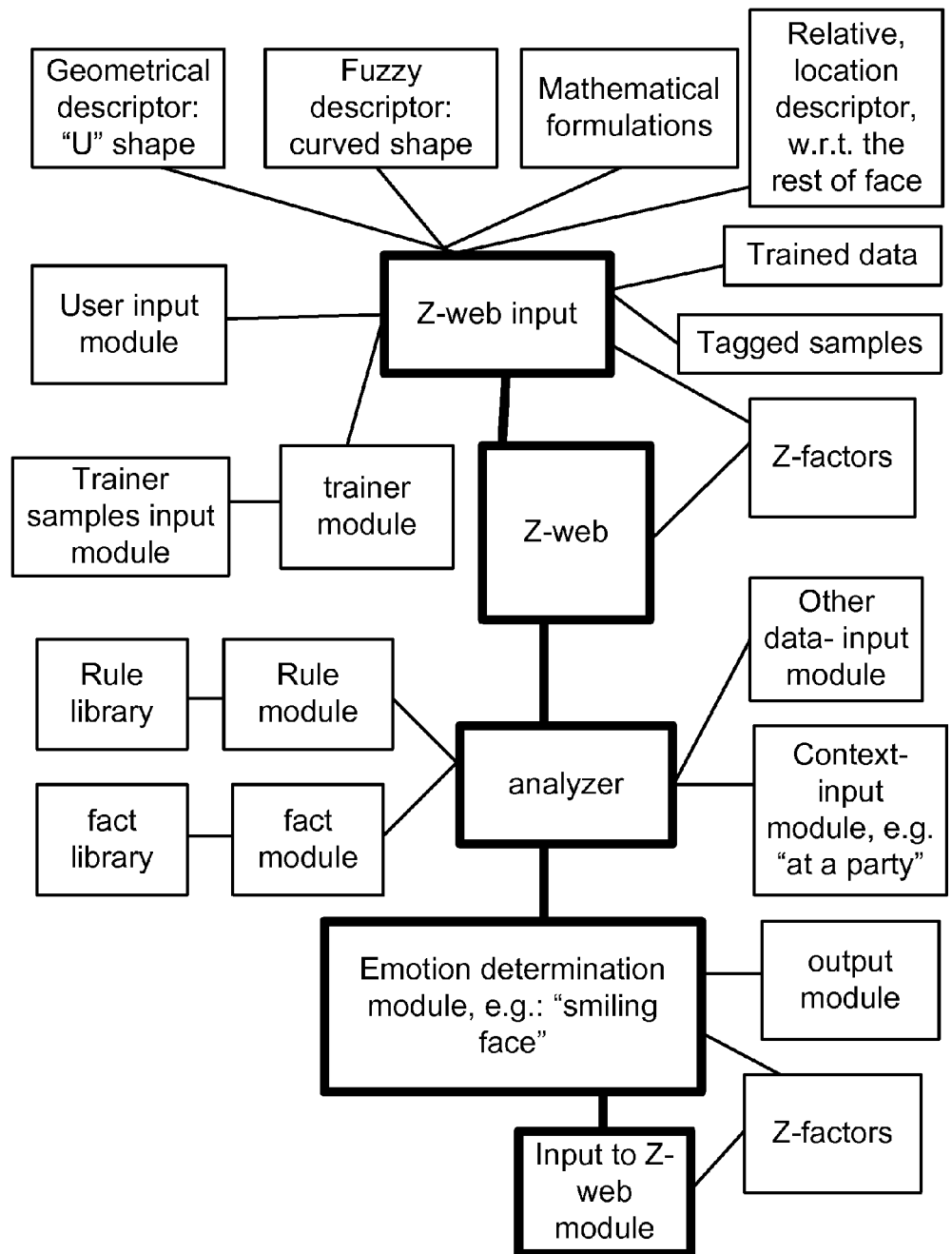
FIG. 33 shows one embodiment for Z-web and emotion determination.

In one embodiment, "smiling" in a picture is used to find emotions for the people in the picture or the situation in the image, such as celebration and birthday ceremony, as opposed to sad situations such as funerals. In one embodiment, smiling is recognized using the big library of smiling pictures of real people for comparison or training samples. In one embodiment, smiling is recognized as a symbolic (caricature) basic shape of the mouth versus the general shape of the face, in relation (or with respect) to each other. For example, smiling is defined as a curved mouth with both ends going upward, or a strike similar to a "U". That is, as long as we can distinguish such a relationship for the mouth with respect to the face, or such a general shape for the mouth, we can tag that as a smiling picture or person. This can be done for any emotions, such as angry, crying, shouting, and the like, for various contexts, for example, a sad situation, for example, for funeral, to relate the black dress and sad situation to family members in the picture or scene, for common loss of a family member, who is possibly the one of the few people missing in the scene or pictures, as extracted from the family tree or family album or family names tagged in the album or FACEBOOK® or similar social web sites, for all names in the whole family. See e.g. FIG. 33 for such a system. Thus, missing people in the picture has some significance, as well, when the universe of all people in the family is known, as a complete set. In one embodiment, we have a crisp set with well-defined boundaries and members, and in another embodiment, we have a fuzzy set, with fuzzy boundaries and fuzzy memberships and fuzzy members.

In one embodiment, the emotion is related to the character of the person, mood, intention, future action, state of mind, or psychology, e.g. one person being angry at some event may indicate his sad mood or his intention to spoil the event. These can be modeled through Z-web and Z-nodes.

Another example is when we have e.g. a total of 5 friends in the album for the trip or vacation to Miami Beach in 1995, which means that the universe of all buddies in that trip is 5 people, which is extracted as our system reviews all the pictures from that trip, with maximum 5 distinct faces recognized there, at the end of the evaluations. So, e.g., some pictures have 2 people and some have 4 people in them. For example, the missing person in a picture with e.g. 4 people in it might be the person who took that picture, and he might be the camera owner, as well, if most of the pictures are like that (i.e. him being missing from all or most of those pictures, in that camera).

In one embodiment, we find all objects in a picture and summarize them as data, templates, tags, comments, numbers, and the like, which can also be used for trainings for signatures or features of other images for future. In one example, we have about 5000 different objects in our library, for most often used objects in everyday life, such as shoe and door, which can be sub-classified for fast search and retrieval, such as office furniture. These objects are also represented in a Z-web, as related objects, e.g. computer and mouse.

In one embodiment, the type of beverage, wine, suit, car, fruit, clothing, cigar, and the like are also some examples of taste of a person. In one embodiment, when get some value for an object, then we instantiate all instants of the object with that value, e.g. object in a satellite image is a tank, or in a medical image is a cancer cell or tissue. Meanwhile, we can put a placeholder name for that object, until it is recognized.

In one embodiment, we do multiple steps hierarchy recognition, to get many images and analyze coarsely to put them in the right bins or classes (e.g. picture of people), as preprocessing, and then, go finer and finer analysis or filtering, to get into specific data, e.g. find or locate faces, and then face recognition. Another example is for recognition in different levels, e.g. starting from finding all radiology x-rays, then bone in image, then foot as the subject of the image, then broken foot as the property of the foot, or age or sex of the subject, from the parameters of the image, based on expected values in the medical databases, e.g. for our prior samples or training samples for neural networks.

In one embodiment, we have a face recognition based on the chunks or pieces of face, e.g. recognizing nose or lips, individually and with respect to each other, to confirm that they constitute a face, e.g. with respect to relative position or size. The parameters are all fuzzy parameters, in one embodiment. The relationship and relative position or size can be expressed through our Z-web, as a method of recognition of an object, with all its components, to first see that it is actually a face, and if so, whose face it belongs to, i.e. recognize the person in the next step. The shape and size of the components of a face or object are expressed in fuzzy relationships or fuzzy rules, in one embodiment. Or, it can be stored as a target object or training sample in a database or library or storage, for recognition, training, and comparison purposes.

Figure 34:
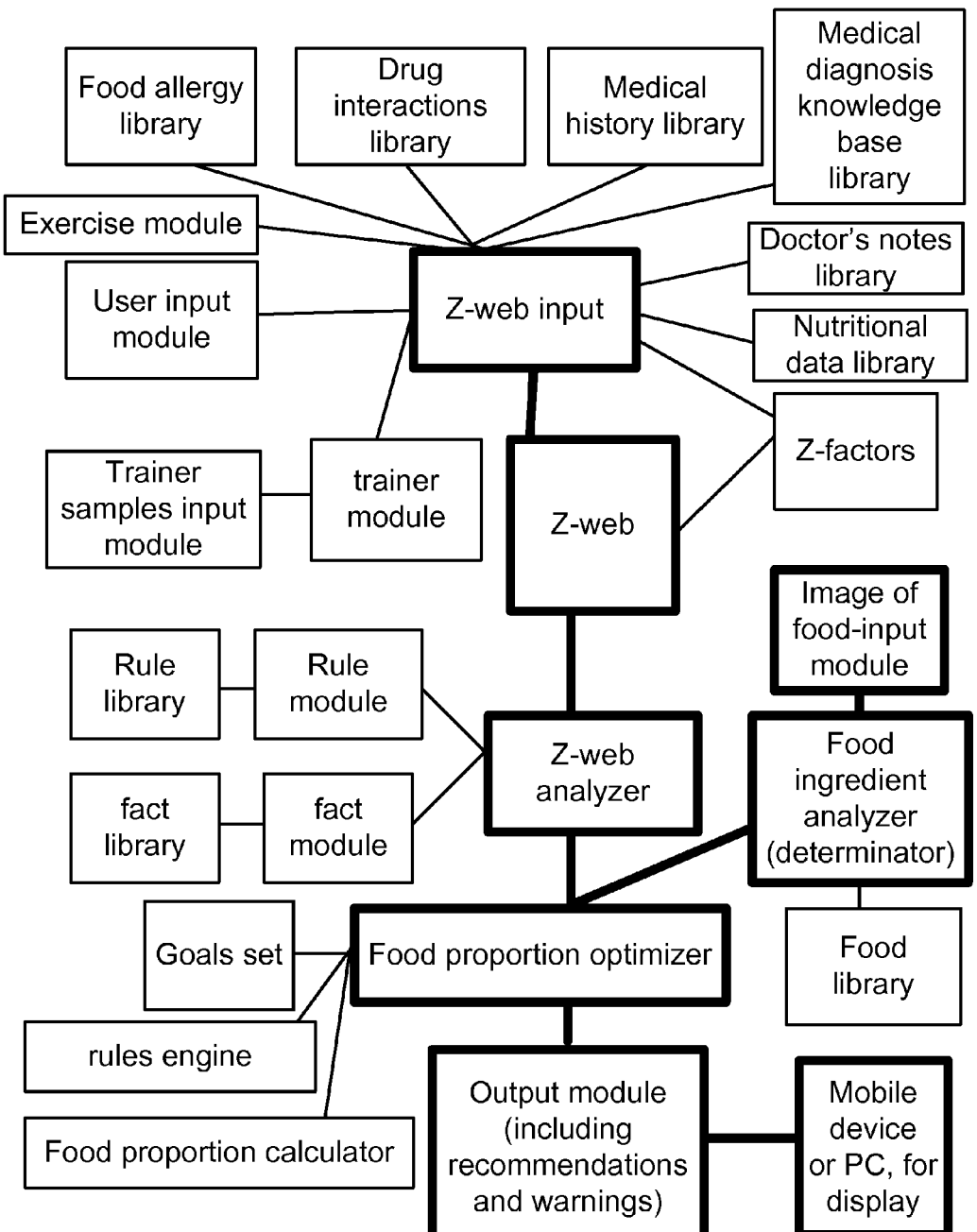
FIG. 34 shows one embodiment for Z-web and food or health analyzer.

In one embodiment, from a picture of food plate, the system extracts the objects and recognizes them, e.g. peanut, and from the library, the system gets all the nutritional facts, for proper diet for the user, per day, as accumulated and compared with the special or recommended regimen, for general or for a specific person or patient, to limit or warn the user or to recommend or remind a user, e.g. for deficiency of calcium or for allergy to an ingredient or for conflict between foods and drugs, stored in library for general knowledge and also on a separate database for a specific person, as customized, on her laptop or smart phone or mobile device. In one embodiment, such information is integrated into the routine for exercise for the same user, for scheduling and count and statistics and progress report. See e.g. FIG. 34 for such a system.

In one embodiment, for any picture that does not come out right (e.g. no smile, rotated head, or closed eyes), the system tags the pictures for review by the user, or in one embodiment, optionally, the system automatically deletes them from the photo album or frames, or exchanges them with the approved ones or good pictures or neighboring pictures or similar pictures, or leaves them as blank.

Cost of Search:

The cost of search in terms of computational power and delay time is a factor, as how far we want to go deep to get to other related nodes to find other related objects for more complete search, in our Z-web. For example, as one detects a computer mouse, then the system looks for a computer nearby, within the expected radius of proximity between 2 given objects, which is stored in a database or in a Z-web, as a parameter shared between computer and mouse nodes, as explained elsewhere in this disclosure. Thus, for a given computing power and time, one can estimate how deep and wide the search for related nodes is, and what and how many related objects can be obtained or analyzed.

The search or traversing the nodes can be directional or biased intentionally, for example, for one embodiment, for a geographical issue, one may expect more geographical or location related nodes. So, we follow the nodes that are more inclined or related to locations, such as "restaurant" or "coordinate values of a location on GPS or planet Earth". The selection of branch can be optimized, to go deeper in one branch versus another one, in a Z-web structure, to find related objects or nodes. With a parallel processor, the selection of multiple branches can be done simultaneously.

Another Way of Calculating "Z-Factors", Including Reliability Factor:

Please note the reliability factor can be calculated based on the other methods mentioned in this disclosure. This can be also calculated and addressed by Z-numbers or by fuzzy logic membership or other fuzzy concepts or other concepts, such as the "trustworthiness of speaker", "sureness of speaker", and "statement helpfulness", which deal with the source of information, where the information propagates through one or more sources to get to the listener or user, as the final destination, to analyze the information and its quality, including reliability factor, confidence factor, truth factor, bias factor, expertise factor, validity factor, expiration date (if any, to declare the information void after a certain date and time, such as stock market quotation), and the like (collectively called Z-factors, for factors used in Z-web).

For example, for reliability factor analysis, in another embodiment, we have e.g. for 3 nodes $N_1$, $N_2$, and $N_3$, where the information is moved from $N_1$, to $N_2$, and then to $N_3$, with reliability factors $R_{F1}$, $R_{F2}$, and $R_{F3}$, respectively. For example, assuming all being normalized to maximum the value of 1, then all $R_{F1}$, $R_{F2}$, and $R_{F3}$ are less than or equal to 1 (or it can be done in the percentage scale to the maximum value of 100). So, in one embodiment, we will have the total reliability factor $R_{FTotal}$ as the multiplication of all factors in the series of nodes:

$$R_{FTotal} = R_{F1} R_{F2} R_{F3}$$

In one embodiment, we will have the total reliability factor $R_{FTotal}$ as the intersection of all reliability factors in the series of nodes, or minimum of those values:

$$R_{FTotal} = \text{Min}(R_{F1}, R_{F2}, R_{F3})$$

In embodiment, we will have each reliability factor is compared to a threshold, in the first case as being larger than a threshold to get a value of 1, and in the second case as being smaller than another threshold to get a value of 0, which makes the calculations simpler for calculations of formulas above for large number of nodes, because we end up with lots of 0 and 1 in the node factor assignments.

For parallel nodes situation (as opposed to series), we will have the corresponding formulation for the total reliability factor $R_{FTotal}$, for example, for 3 nodes ($N_1$, $N_2$, and $N_3$), going to a final $4^{th}$ node, $N_4$, as parallel inputs. If the information coming from all 3 nodes ($N_1$, $N_2$, and $N_3$) are not related, then they have no impact on each other in terms of reliability. However, if they are related to the same subject, then we will have, in one embodiment:

$$R_{FTotal} = R_{F1} + R_{F2} + R_{F3}$$

In one embodiment, we will have the total reliability factor $R_{FTotal}$ as the union of all reliability factors in the parallel configuration of nodes, or maximum of those values:

$$R_{FTotal} = \text{Max}(R_{F1}, R_{F2}, R_{F3})$$

Again, in one embodiment, we will have each reliability factor is compared to a threshold, in the first case as being larger than a threshold to get a value of 1, and in the second case as being smaller than another threshold to get a value of 0, which makes the calculations simpler for calculations of formulas above for large number of nodes, because we end up with lots of 0 and 1 in the node factor assignments.

If we are dealing with fuzzy numbers, then we can use the operators max, MAX, min, MIN, and sup, as commonly known in Fuzzy Logic, and e.g. as defined and shown by Fig. 4.6 and pages 111-112 of the book by Klir et al., "Fuzzy sets and fuzzy logic", published in 1995, by Prentice Hall. These are more general versions of Max and Min operations we mentioned above. Thus, the reliability factor will also be in Fuzzy domain and as a Fuzzy parameter, as an example.

All of these methods in this disclosure can also apply to other factors mentioned elsewhere in this disclosure, e.g. confidence factor, truth factor, bias factor, expertise factor, trust factor, validity factor, "trustworthiness of speaker", "sureness of speaker", "statement helpfulness", "expertise of speaker", "speaker's truthfulness", "perception of speaker (or source of information)", "apparent confidence of speaker", or "broadness of statement". The mathematics and vehicle to apply to Z-web nodes (also called "Z-node") or objects are the same for each of those factors (collectively called "Z-factors", for factors used in "Z-web"). The collection or aggregation of Z-web with all the associated factors mentioned above makes it the most reliable and most powerful search engine tool in the market, for data analytics or analysis of images, "big data", text, voice, moods, facial expressions, emotions, personality, character, characteristics, concepts, and the like. Of course, the bigger Z-web gets, the more valuable it becomes, with more nodes and factors and branches and other parameters, as mentioned above.

In one embodiment, "trustworthiness of speaker" ($A_{trust}$) depends on (as a function of, or Function(x)) at least 4 other factors (variables): "apparent confidence of speaker" ($A_{confidence}$) "speaker's truthfulness" ($A_{truth}$), "expertise of speaker" ($A_{expertise}$), and "perception of speaker (or source of information)" ($A_{perception}$) with each can be both fuzzy and crisp values, in different examples. In one embodiment, the "trustworthiness of speaker" is "high", only if all of its 4 factors are "high". So, mathematically, we have:

$$A_{trust} = \text{Function}(A_{confidence}, A_{truth}, A_{expertise}, A_{perception})$$

If we assign the value of 1 to "high" and 0 to "low", in one embodiment, then we can write this in a short form as, based on AND logical operation:

$$A_{trust} = (A_{confidence} \text{ AND } A_{truth} \text{ AND } A_{expertise} \text{ AND } A_{perception})$$

Or, in another presentation, in one embodiment, we can write it as, using intersection operator (^):

$$A_{trust} = (A_{confidence} \wedge A_{truth} \wedge A_{expertise} \wedge A_{perception})$$

Or, in another presentation, in one embodiment, we can write it as, using minimum operators (e.g. min or MIN, as commonly known in Fuzzy Logic, and e.g. as defined and shown by Fig. 4.6 and pages 111-112 of the book by Klir et al., "Fuzzy sets and fuzzy logic", published in 1995, by Prentice Hall):

$$A_{trust} = \min(A_{confidence}, A_{truth}, A_{expertise}, A_{perception})$$

or $$A_{trust} = \text{MIN}(A_{confidence}, A_{truth}, A_{expertise}, A_{perception})$$

So, we can calculate or obtain $A_{trust}$ from its components or variables, based on fuzzy rules, set rules, logical operations, Venn diagram, or the like, for their respective domains of analysis.

Note that for any intersection operator or logical or fuzzy operations, mentioned here, we can use different logic domains and operations, e.g. Lukasiewicz logics, Bochvar logics, Kleene logics, Heyting logics, Reichenbach logics, or the like (see e.g. Table 8.4 of Klir et al. (on page 218 of the book mentioned above)). In addition, for the Generalized Modus Ponens, Generalized Modus Tollens, and Generalized Hypothetical Syllogisms, we can use the following conventions, as an example: Early Zadeh, Gaines-Rescher, Godel, Goguen, Kleene-Dienes, Lukasiewicz, Reichenbach, Willmott, Wu, or the like (see e.g. Tables 11.2, 11.3, and 11.4 of Klir et al. (on pages 315-317 of the book mentioned above)). In one embodiment, to be consistent, once we are using one logical domain, we have to stay in that domain for all operations.

In one embodiment, "sureness of speaker" ($A_{sureness}$) depends on at least 4 other factors: "apparent confidence of speaker", "speaker's truthfulness", "expertise of speaker", and "perception of speaker (or source of information)", with each can be both fuzzy and crisp values, in different examples. In one embodiment, the "sureness of speaker" is "high", only if "speaker's truthfulness" is either "high" or "low", and the other 3 factors are "high". So, mathematically, we have $A_{sureness}$ as a function of:

$$A_{sureness} = \text{Function}(A_{confidence}, A_{truth}, A_{expertise}, A_{perception})$$

If we assign the value of 1 to "high" and 0 to "low", in one embodiment, then we can write this in a short form as, based on AND and OR logical operations:

$$A_{sureness} = A_{confidence} \text{ AND } A_{expertise} \text{ AND } A_{perception} \text{ AND } (A_{truth} \text{ OR } \tilde{A}_{truth})$$

Wherein $\tilde{A}_{truth}$ is a logical complement to $A_{truth}$. In fuzzy logic, please note that, due to overlapping membership functions, ($A_{truth}$ OR $\tilde{A}_{truth}$) is not equivalent to 1.

Or, in another presentation, in one embodiment, we can write it as, using intersection operator (^) and union operator (V):

$$A_{sureness} = A_{confidence} \wedge A_{expertise} \wedge A_{perception} \wedge (A_{truth} \vee \tilde{A}_{truth})$$

Or, in another presentation, in one embodiment, we can write it as, using minimum and maximum operators (e.g. max, MAX, min, MIN, and sup):

$$A_{sureness} = \min(A_{confidence}, A_{expertise}, A_{perception}, (\max(A_{truth}, \tilde{A}_{truth})))$$

or $$A_{sureness} = \text{MIN}(A_{confidence}, A_{expertise}, A_{perception}, (\text{MAX}(A_{truth}, \tilde{A}_{truth})))$$

Or, we can use any of the combinations of the similar operators, listed above. So, we can calculate or obtain $A_{sureness}$ from its components or variables, based on fuzzy rules, set rules, logical operations, Venn diagram, or the like, for their respective domains of analysis.

In one embodiment, "statement helpfulness" ($A_{helpfulness}$) depends on at least 2 other factors: "sureness of speaker" ($A_{sureness}$) and "broadness of statement" ($A_{broadness}$), with each can be both fuzzy and crisp values, in different examples. In one embodiment, the "statement helpfulness" is "high", only if "sureness of speaker" is "high" and "broadness of statement" is "low". In one embodiment, "statement helpfulness" indicates the parameter that is very useful for analysis of many pieces of data from multiple sources, such as Big Data or Internet. So, mathematically, we have $A_{helpfulness}$ as a function of:

$$A_{helpfulness} = \text{Function}(A_{sureness}, A_{broadness})$$

If we assign the value of 1 to "high" and 0 to "low", in one embodiment, then we can write this in a short form as, based on AND logical operation:

$$A_{helpfulness} = A_{sureness} \text{ AND } \tilde{A}_{broadness}$$

Wherein $\tilde{A}_{broadness}$ is a logical complement to $A_{broadness}$. In fuzzy logic, please note that, due to overlapping membership functions, ($A_{broadness}$ OR $\tilde{A}_{broadness}$) is not equivalent to 1.

Or, in another presentation, in one embodiment, we can write it as, using intersection operator (^):

$$A_{helpfulness} A_{sureness} \char`\^ A_{broadness}$$

Or, in another presentation, in one embodiment, we can write it as, using minimum and maximum operators (e.g. max, MAX, min, MIN, and sup):

$$A_{helpfulness} = \min(A_{sureness}, \tilde{A}_{broadness})$$

Or $$A_{helpfulness} = \text{MIN}(A_{sureness}, \tilde{A}_{broadness})$$

So, we can calculate or obtain $A_{helpfulness}$ from its components or variables, based on fuzzy rules, set rules, logical operations, Venn diagram, or the like, for their respective domains of analysis.

In one embodiment, the information comes from multiple sources or speakers (or originator or gatherer or reporter) and goes through more sources, and may get modified in there, based on the same parameters described above. Then, the information may get merged, edited, combined, aggregated, or modified by some sources, or otherwise, just goes through an intermediate source with no modifications, just as a conduit, with no effect on the data. Finally, one or more pieces of data reach a listener (or receiver or evaluator or user or computer or collector or public or third party entity), through those many possible routes (from one or more original sources of information). Then, the listener should gather all data, with all the factors mentioned above, from all sources and routes, and digest and evaluate, to make a conclusion from all of the above. Here, the Z-web is applied, because the whole propagation of data through all the nodes or sources can be modeled with the Z-web, from one part of the Z-web to another part or section or node of the Z-web, with all the reliability factors and other factors included in the Z-web. This is a very powerful tool for analytics e.g. for Big Data or Internet, with many sources of information, and many intermediate nodes, each having its own reliability, truthfulness, bias, expertise, addition, edit, and similar factors, e.g. as mentioned above, on the original data.

Of course, when we have a complex node structure for Z-web, we will have a multiple parallel and series situations, broken down as imaginary smaller units, which we can use the methods above or as explained elsewhere in this disclosure, to analyze for the Z-web. In addition to the above formulations, any similar formulations and combinations can also work in different embodiments. For example, the Z-factors can be based on tables, curves, formulas, analytical relationships, equations, Fuzzy rules, rules engine, conditional statements, or the like.

Processing & Mathematical Methods:

In one embodiment, root-mean-square error (RMSE) or ArcTan function (an inverse trigonometric function) can be used to reduce the effect of the large errors or dampen the big variations, because of their behaviors at large numbers.

In one embodiment, for optimization, the method of Lagrange multipliers is used for finding the local maxima and minima of a function subject to some constraints, which is equivalent to finding some optimum point on a surface, subject to a cross section of that surface, which is equivalent to tangent vectors of the 2 corresponding contour lines being parallel, which is equivalent to gradients of 2 functions (e.g. $f(x,y)$ and $g(x,y)$) being parallel, subject to a constraint for $g(x,y)$, e.g. being a constant value. So, we will have the following relationship for the gradients of the 2 functions (with the gradient being taken with respect to x and y (the 2 coordinate axes), and k representing a coefficient of proportionality):

$$\nabla f = -k \nabla g$$

We use this for any optimization, e.g. in our image processing method or recognition routines or image enhancements or optimization of one Z-factor in Z-web, subject to another Z-factor (as a constraint), e.g. reliability factor.

In one embodiment, for fuzzy system reasoning, for aggregation and implication techniques, e.g. we use Min/Max Aggregation method, in which we get the membership value from the $1^{st}$ curve or membership function, and trim the top of the $2^{nd}$ membership function or curve (as flat cut-off) with the first membership value (as the maximum value allowed on that $2^{nd}$ membership function or curve). In one embodiment, we use Additive Aggregation method, in which we get the membership value from the $1^{st}$ curve or membership function, and scale or normalize the $2^{nd}$ membership function or curve (usually reduce the peak height of the curve) based on the first membership value (as the maximum value or peak allowed on that $2^{nd}$ membership function or curve).

In one embodiment, for aggregating the correlated fuzzy sets, for the additive aggregation method, we can get the final membership value, $\mu_{final}$, based on the individual membership values, $\mu_1$ and $\mu_2$, as (where index i runs from 0 to n):

$$\mu_{final} = \forall_i \min((\mu_1 + \mu_2), 1)$$

In one embodiment, for aggregating the correlated fuzzy sets, for the Min-Max aggregation method, we can get the final membership value, $\mu_{final}$, based on the individual membership values, $\mu_1$ and $\mu_2$, as (where index i runs from 0 to n):

$$\mu_{final} = \forall_i \max(\mu_1, \mu_2)$$

Thus, we can aggregate and find the resultant membership functions. Then, if we have to defuzzify at one point, to get a crisp number for some applications, e.g. acting or not acting on some function, e.g. turn off the light, as a binary decision or output, then for that case, we get the center of mass coordinate, or the coordinate of where the membership curve bends (going down from its maximum value or plateau or flat region on the top), or the coordinate of the center of the highest plateau or flat region of the membership curve (if any), or any averaging or weighted averaging or the final membership curve, or any computation for the area under the membership curve to find a compromise value or middle point or median point or coordinate, or the like. However, if the crisp value is not needed, we keep the values as fuzzy values, stored or sent to the next step of the process, because when we defuzzify, e.g. to get a point or crisp value, we usually lose some information stored in the membership curve. So, we want to avoid that, if possible, or as much as possible.

Figure 35:
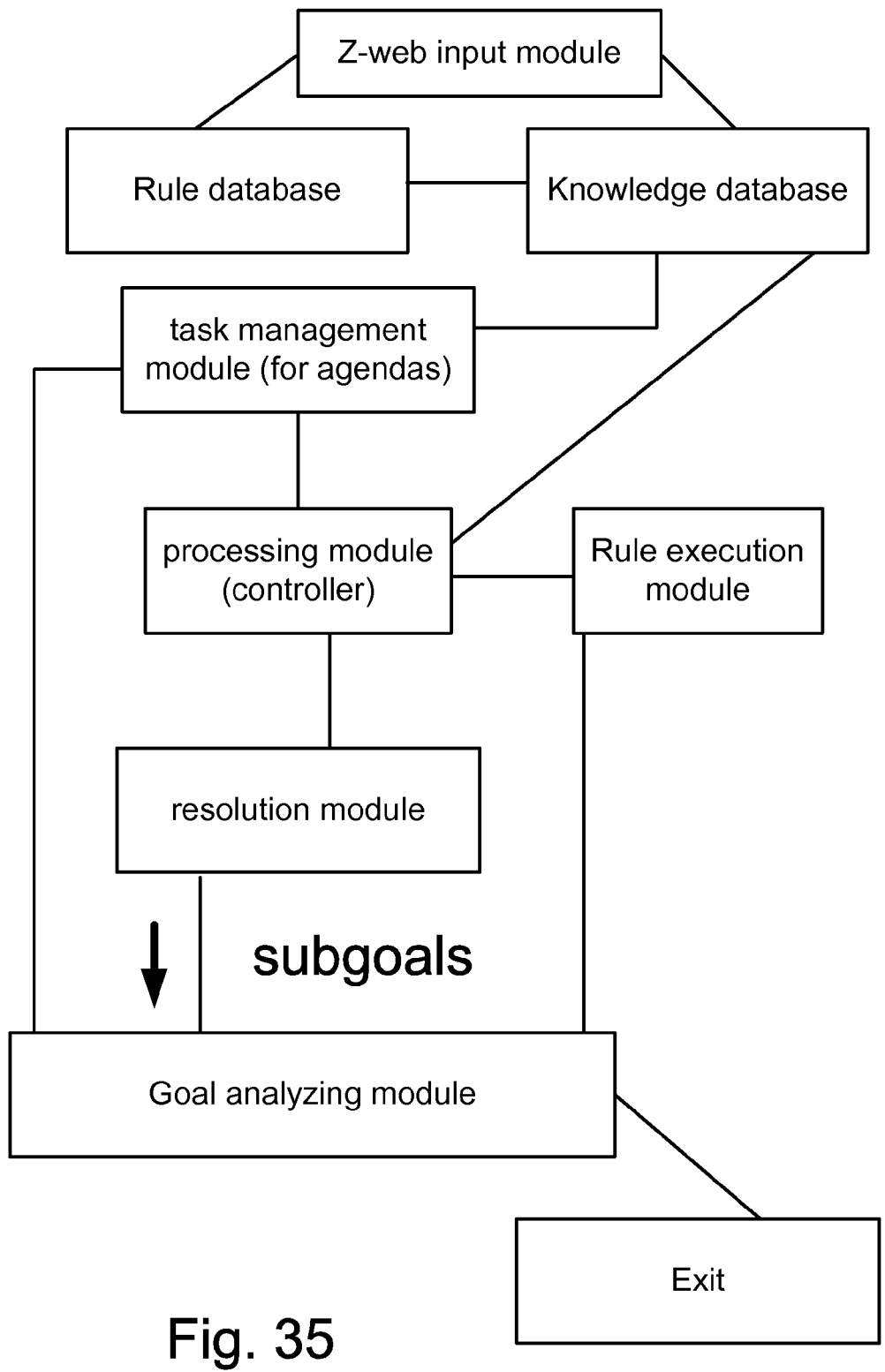
FIG. 35 shows one embodiment for a backward chaining inference engine.
Figure 36:
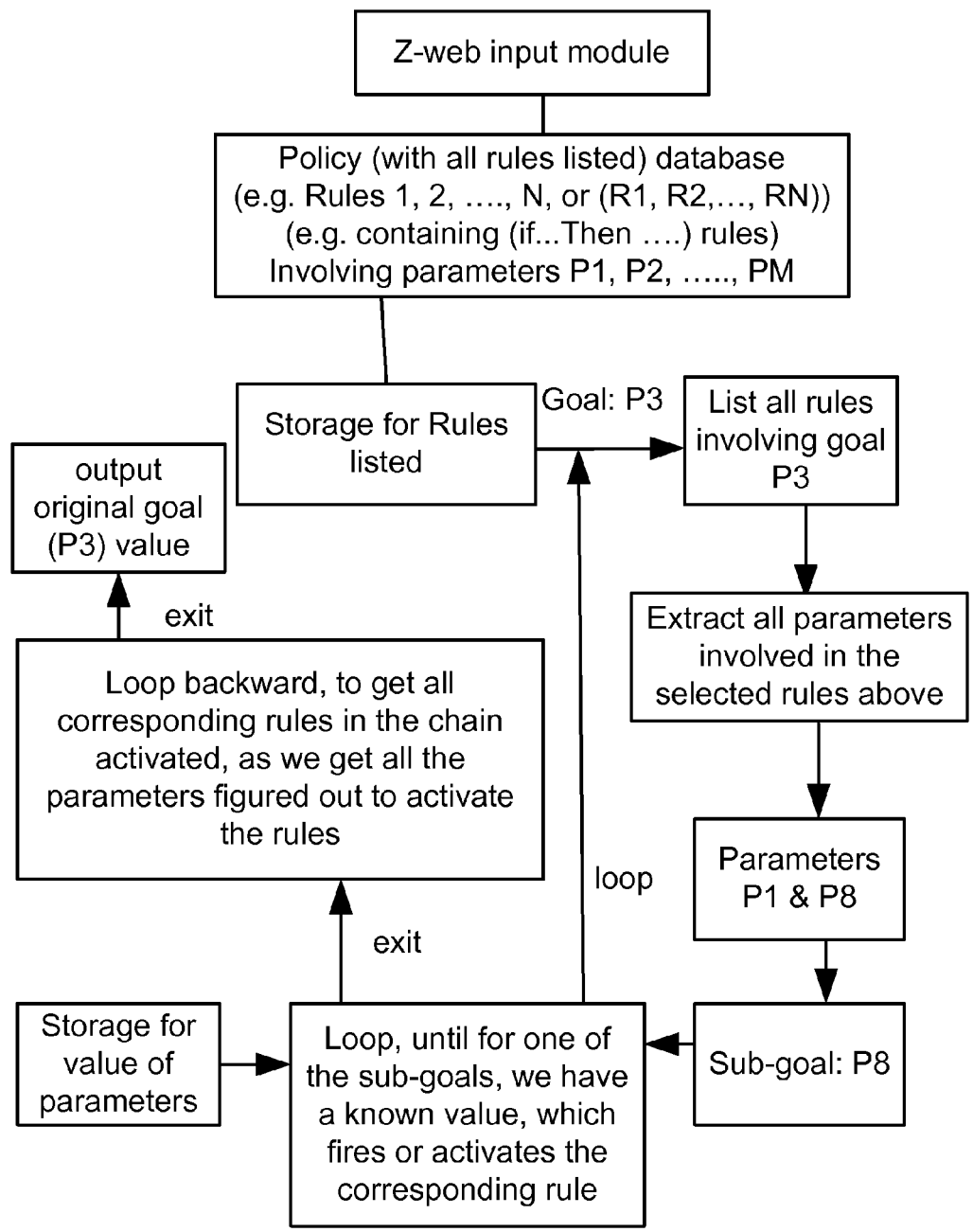
FIG. 36 shows one embodiment for a backward chaining flow chart.

In one embodiment, for fuzzy rules, e.g. rules engine, e.g. for control system applications, e.g. when we have a bunch of rules in terms of e.g. IF-THEN rules, or conditional statements, then we can apply the rules or policies based on fuzzy backward chaining, to resolve the rules backward, to fire or activate the rule(s), in our inference engine. Here, we start from a goal, and then find out which rules have that goal as output, and from those extracted rules, we find out what input parameter values we need to know to evaluate those extracted rules. Those input parameter value(s) now become our sub-goal(s), which is (are) similar to our goal above, which we repeat the same routine above again, recursively, until we get to an input value that we already know the value for, and we can plug in the value for that corresponding rule, as the input, to get the output (of that IF-THEN rule). Then, recursively, we use that output that we just got as the input of the previous rule(s), concerning that parameter, in our chain, to get the result or output of the previous rule(s). Then, we continue this recursively, until we get to our first goal at the top of the chain, in the beginning. FIG. 35 shows a backward chaining inference engine. FIG. 36 shows a backward chaining flow chart.

Figure 37:
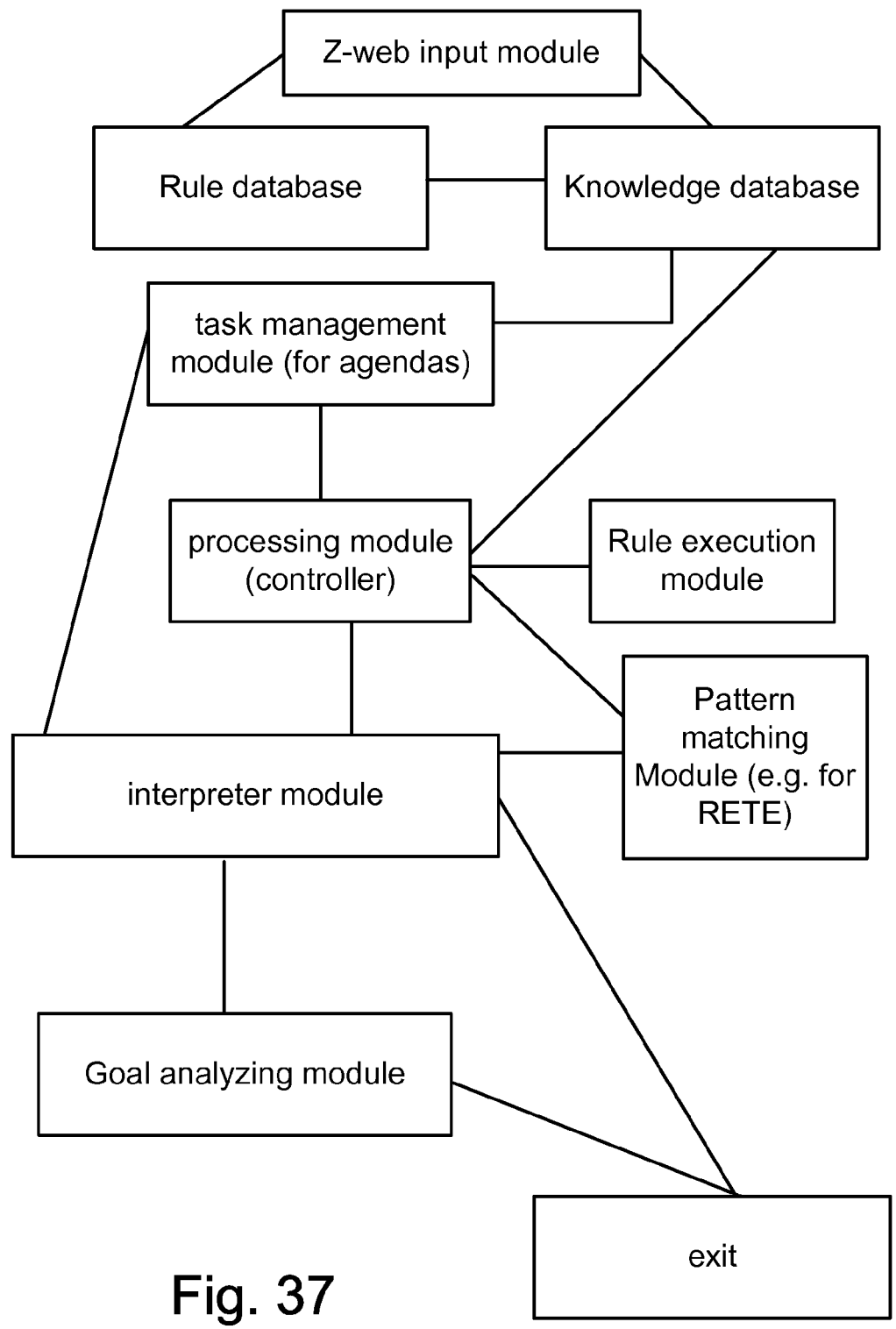
FIG. 37 shows one embodiment for a forward chaining inference engine.

In one embodiment, for fuzzy rules, we use forward chaining inference engine, to fire the rules in forward manner, as the input part of the rule has some available value, to trigger that rule, and instantiate some variables. So, we go through all rules that can be fired, until the list is exhausted. So, here, we do not require a goal. FIG. 37 shows a forward chaining inference engine. In one embodiment, we add a RETE algorithm to our method above, for better performance.

Figure 38:
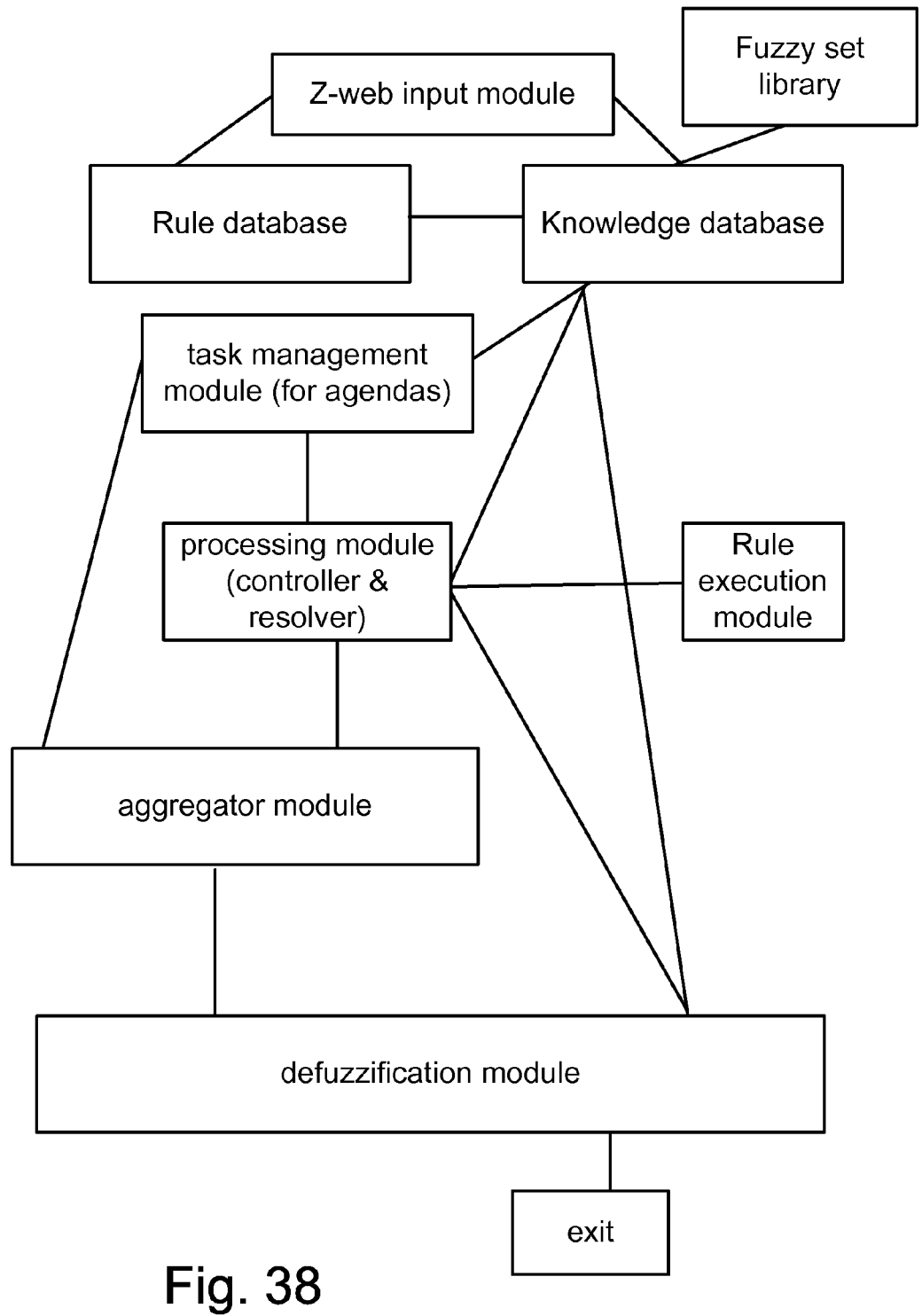
FIG. 38 shows one embodiment for a fuzzy reasoning inference engine.

In one embodiment, based on both approaches mentioned above, to take advantage of our gathered knowledge in each step, we combine both methods, as an opportunistic forward firing, added to our backward chaining engine, for better performance. FIG. 38 shows a fuzzy reasoning inference engine. In one embodiment, all of the above are used as methods of handling data for our Z-web, with its corresponding Z-factors.

In one embodiment, we (i.e. our system or computer or processor or microprocessor or CPU or computing unit or the like) perform parallel processing for each signature for each object in the picture, to get the result faster, to extract and distinguish all objects in the image.

In one embodiment, we can combine our method with Adaptive Boosting, as a machine learning algorithm, designed by Yoav Freund and Robert Schapire, to improve the performance (AdaBoost algorithm). The subsequent classifiers are adjusted in favor of those instances misclassified by previous classifiers. In one embodiment, it is sensitive to noisy data and outliers. In one embodiment, it is less susceptible to the "overfitting" problem (which is a well-known problem in machine learning). The system generates and calls a new weak classifier in each cycle, with updated weights, based on the importance of examples in the data set. Then, repeatedly, the weights of incorrectly classified examples are increased, and those of correctly classified examples are decreased, to zoom in to the missed examples.

In one embodiment, we can combine our method with the following method, for classification, such as face recognition, to consider both the error and time for the final decision, based on sequential decision-making. When the false positive and false negative error rates are given to us, then we want the shortest average time to decision (number of measurements). We use a method called Wald's sequential probability ratio test (SPRT), or WaldBoost. We use both a priori ordered measurements and known joint probability density functions, for time and error rate trade-off, with the joint probability density estimation using the optimal SPRT decision strategy, which has a good detection rate in a reasonable amount of time.

In one embodiment, we can combine our method with the c-means clustering algorithm, which produces input pattern groups with corresponding cluster centers. To learn fuzzy functions, one can use adaptive vector quantization (AVQ) (using unsupervised AVQ competitive learning) to estimate the local centroids (and covariance matrices) of clusters in the input-output space. From the resulting ellipsoid, one can derive the fuzzy rules (and fuzzy patches). In one embodiment, one can use the Kohonen self-organizing map (SOM), with unsupervised learning algorithm, to change weight vectors for a network (for modeling the features in training samples).

In one embodiment, for thresholding in image processing, we use a statistical decision theory, using statistical decision rules. In one embodiment, we use Otsu's thresholding technique, which uses discriminant analysis, which maximizes the class separation. In one embodiment, we use fuzzy threshold algorithm, using fuzzy membership functions (by the method suggested by Huang and Wang). In one embodiment, the selection is made using a fuzzy parameter, with entropy measure as the criteria function, to get the threshold for the optimal image. In one embodiment, we introduce a cost function. In one embodiment, we apply the multi-level thresholding. In one embodiment, we apply a model fitting method. In one embodiment, we apply the above to segment the document images, face, text, or the like. In one embodiment, we use the grey level histogram for thresholding and segmentation purpose. The histogram (and its peaks or its transition phases) is a good indicator of the multiple classes or clusters involved in the samples.

In one embodiment, we use a fuzzy rule based system to find the background in the image. For example, we have the following IF-THEN rule(s), using Z-numbers:

If, for a given pixel, the pixel's neighbors have small contrast and small variance with respect to the pixel, then the pixel is probably in the background of the image.

Otherwise, the pixel is the foreground, representing one or more objects in the image.

In one embodiment, for learning from samples or examples, we have the following steps: First, we fuzzify the input space. Then, using data, we produce fuzzy rules. Then, for each rule, we assign a degree, followed by the creation of the combined rule library. Finally, we use defuzzification to set the mapping.

Figure 39:
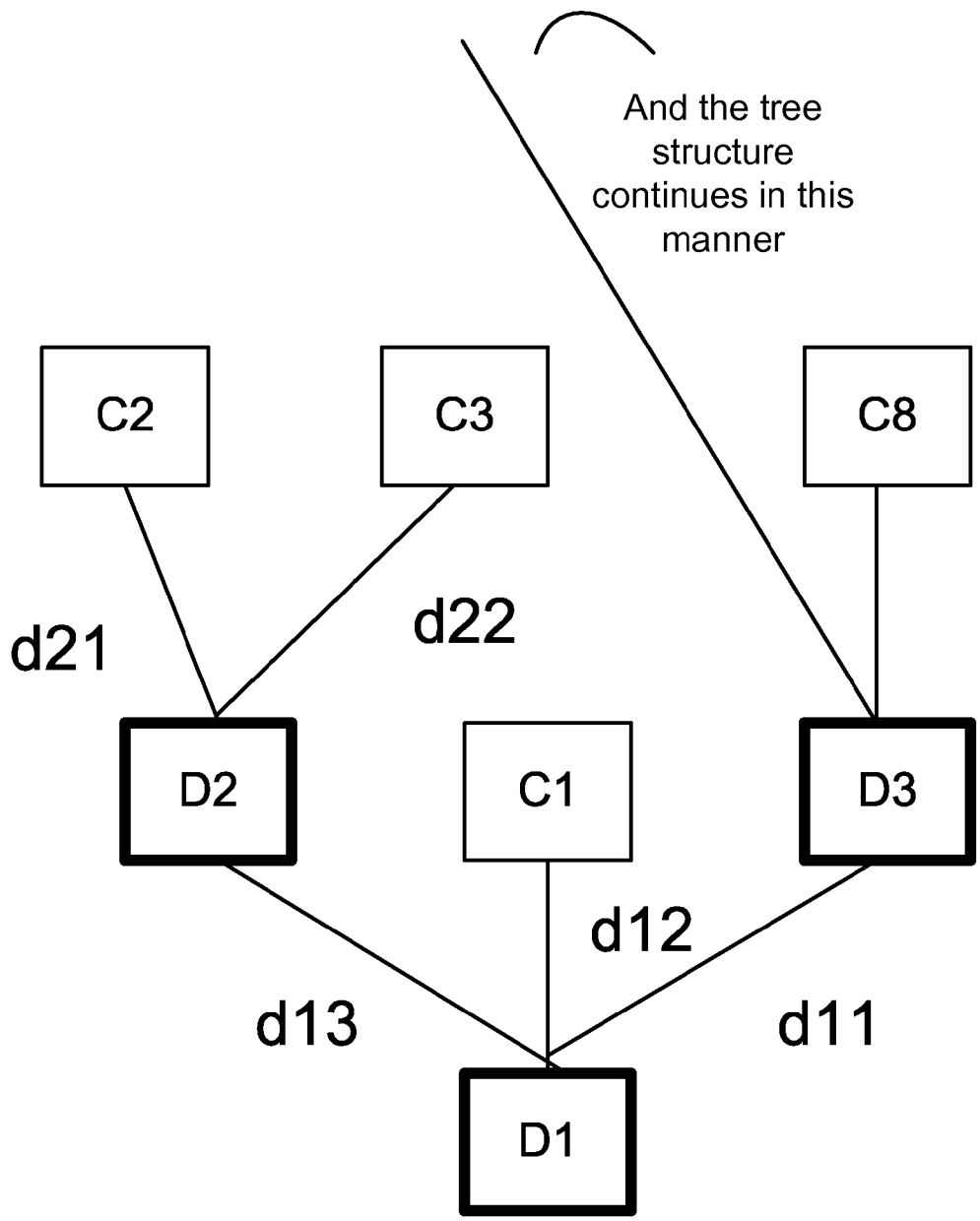
FIG. 39 shows one embodiment for a decision tree method or system.

In one embodiment, for recognition, we use decision tree method, with nodes and branches which can represent the rules. For example, we have: "If $D_1$ has a value of $d_{13}$, and $D_2$ has a value of $d_{21}$ (on the second level of branching out), then the class is $C_2$", as shown in FIG. 39. Note that "$D_j$" stands for a decision making node, and "$d_{jn}$" is one of the choices for that node (the n-th choice). "$C_i$" is the resulting class at the end of the last branch on that section of the tree, which classifies the object based on the rules stated on the decision tree, e.g. IF-THEN rule stated above, or a collection of such rules and branches and classes. By the way, the example above can be stated in another format, as well:

If $D_1(d_{13})$ is TRUE, and $D_2(d_{21})$ is TRUE,

Then the class is $C_2$.

In one embodiment, we assume the decision tree classifies the objects with the same proportion as the samples in our universe of objects, i.e. with the same probability. In one embodiment, if we look at the decision as a source of message, then we can relate that to the entropy formulation for the information (I) (with summation running on variable "j", and P denoting the probability):

$$I = -\Sigma_j P(a_j) \log(P(a_j))$$

In one embodiment, we use fuzzified decision rules based on membership functions, which have values between 0 and 1, which is sometimes modeled based on a linear slope or transition or line segment from 1 to 0, or vice versa.

In one embodiment, we use neural network on our Fuzzy system, in multiple different ways, e.g. using neural network to get the rules, or using neural network to do fuzzy logic inference, or using neural network to find and edit the membership functions or values for an object, or using neural network to construct a node combination structure based on fuzzy set connectives, e.g. union, intersection, and compensative connectives. In one embodiment, we use different aggregation operators to integrate membership values.

In one embodiment, we minimize the number of fuzzy rules, for efficiency, e.g. using rule pruning, rule combination, or rule elimination. In one embodiment, we eliminate the rules with low number of training samples or low reliability. In one embodiment, we use Karnaugh map to simplify the logic, including fuzzy rules. In one embodiment, we use data clustering to minimize fuzzy rules. In one embodiment, we use optimal defuzzification methods, e.g. using 2-layer neural network, or maximum matching, or centroid defuzzification, or maximum accumulated matching. These can be used e.g. for analyzing or recognition of maps, text, or handwriting.

In one embodiment, for learning machines, we use linear regression, least square, ridge regression, Widrow-Hoff algorithm, Support Vector Machines (SVM), Gaussian processes, Generalization technique (bounds on luckiness), or Kernel functions (to have a more general function for classification or cluster analysis), with SVM (and Kernel functions) at the center of our technique. Basically, in one embodiment, for the hyperplane separating the classes or clusters in the N-dimensional feature space, we want the largest distance from all neighboring points to the hyperplane, in average, as much as possible, as an optimization constraint. Or, in one embodiment, the separating hyperplane is defined as the plane that fits in between the growing neighboring points, as the growing neighboring points (from different clusters or classes) grow gradually in size or radius, as a point or sphere in the N-dimensional feature space, until there is no more room for their growth (and the growth stops at that point), with the separating hyperplane fitted in between the already-grown neighboring points (e.g. from the opposite clusters on two sides of the separating hyperplane).

In one embodiment, we use Vapnik's support vector machines (SVM) to classify the data or recognize the object. In one embodiment, in addition, we use kernels (e.g. using Gaussian processes or models) to be able to handle any shape of data distribution with respect to feature space, to transfer the space in such a way that the separation of classes or clusters becomes easier. In one embodiment, we use sparse kernel machines, maximum margin classifiers, multiclass SVMs, logistic regression method, multivariate linear regression, or relevance vector machines (RVM) (which is a variation of SVM with less limitations), for classification or recognition.

In one embodiment, for machine learning, the system starts with experiment generator describing the problem in hand. Then, the performance system (based on the history) feeds an analyzer, which provides the training examples to a generalizer module, which produces hypothesis for experiment generator, to complete the loop. In one embodiment, for machine learning, we use unsupervised learning or supervised learning or in combination, for different aspects of components of some data, e.g. in an image, with many objects in it, for each object recognition, using different technique.

In one embodiment, for designing the learning program, the system first determines the type of training experience, followed by identification of target function, followed by determination of representation of learned function, and followed by learning algorithm, to complete the design.

In one embodiment, based on "Occam's razor" statement, we prefer the simplest hypothesis that fits the data. For example, a 10 node decision tree that fits the data completely is preferred over a 1000 node decision tree that fits the data completely, as well (due to the fact that it is less statistical coincidence, and more chance to fit or generalize correctly to future data).

In one embodiment, for machine learning, we use neural networks, perceptrons, including gradient descent and delta rule, back propagation algorithm (including convergence and local minima problem), feedforward networks, hypothesis space search and inductive bias, with "Generalization" and "Overfitting" considerations, Q learning algorithm, or reinforcement learning, which all can be combined with our methods in this disclosure, as a complementary method, for improving the performance or efficiency.

In one embodiment, for classification, we may not be looking at enough dimensions for our feature space. So, randomly or based on historical data, the system guesses at the possible one or more extra dimensions to be added as new dimension(s) of feature space, and then tries to classify based on the new dimensions. If the result is better, based on separability of the clusters (or from their overlaps (which is generally an indication of not a good separation)), then we continue on that basis. Otherwise, we drop the new dimension from our space, and optionally, try another new dimension possibility, later on.

In one embodiment, for learning application, we use social collaborative filtering or adaptive lenses, to benefit from other people's experience, and to adapt to fluid language use for human language processing, which can be very dynamic these days, as new words or slangs or abbreviations enter a language in a fast pace, every year.

In one embodiment, for data fitting, we input data to adaptive system, which feeds into cost analysis module, with desired or goals input to cost analysis module, as well. Then, the cost analysis module feeds the error to training algorithm module, which feeds the changed parameters back to the adaptive system again, as a complete loop. In one embodiment, for linear models, we search for the performance surface with steepest descent, using gradients and LMS (least mean square) algorithm.

In one embodiment, for pattern recognition, we use multilayer perceptrons with sigmoidal nonlinearities (functions), e.g. in $(\tan h(x))$ or $(1/(1+\exp(-x)))$ forms. In one embodiment, for training networks, we use backpropagation method, to go backward to get the weights set, from the last layer, based on desired response and error backward. In one embodiment, to optimize, we derive energy function and surface, with attractor point on the minima of the surface, to analyze system state with respect to the attractor, which can be local or global minima (which we prefer to get into the global minima).

In one embodiment, to model the activity of a person in a computer, and learn from it for future simulation, based on learning from the actual real human action or activity measurements, we use cameras or sensors, e.g. attached to a person, to track the coordinates of parts of the person doing those activities, e.g. dancing (for doing different tasks, in real life). To get the 3D coordinates of those points, for the person, we put the sensors at her joints or major points on the body, e.g. position of knee, for a total of about e.g. 30-50 points on her body, to track all movements, based on the anchor points, and then interpolate the other points in between the anchor points. So, all the movements and series of movements are stored and fed into a learning machine, along with the tags naming the activities, for the machine learning those activities, to be able to generate those later, on its own, or mix the activities together. The mixing can be based on percentage or crisp number, or based on fuzzy parameter, e.g. "slightly" dancing (activity). Once the machine learns the specific activity or activities, it can be used for recognition of video, later on, for a person's activity in different frames.

Figure 52:
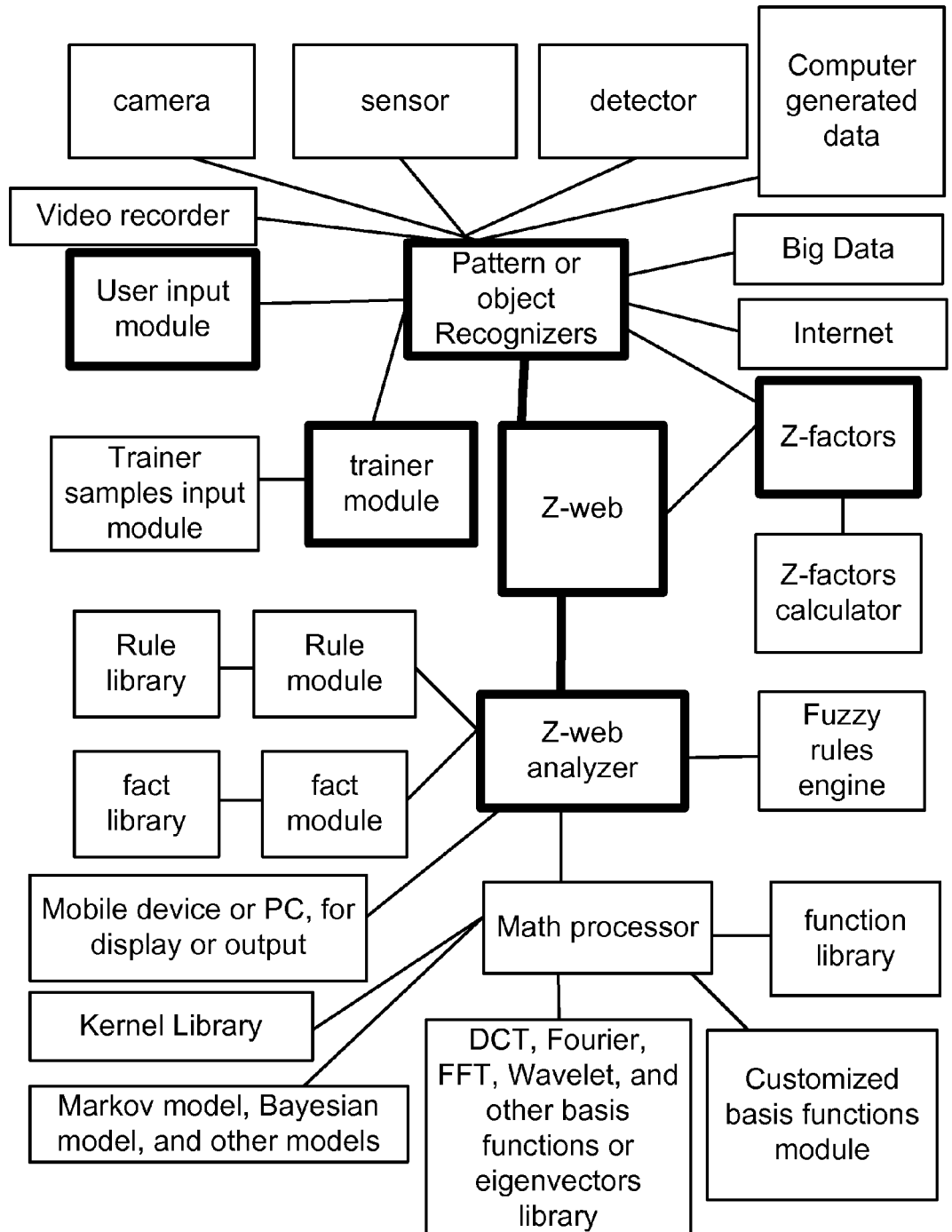
FIG. 52 shows one embodiment for a Z-web analysis.

In one embodiment, we use cameras, sensors, detectors, scanners, CPU, processor, color processor, color adjusting module, transformation image module, translation image module, rotation image module, tilting image module, memory units, storages, RAM, ROM, cloud computing, distributed storage, server farm, PC, user interface, GUI, FFT processor, DCT processor, Fourier analyzer, matrix manipulation processor, convolution operator processor, filters, comparators, subtractors, integration modules, neural nets, training sets, voice-to-text convertors, text-to-voice convertors, OCR, email system, fuzzifier, defuzzifier, center of mass determination module, rules engine, fuzzy rules engine, relational database, RETE, and the like, to implement the system and methods taught here in this disclosure. See e.g. FIG. 52 for such a system.

With our invention, as discussed in this disclosure, in one embodiment, we can use in or with any learning paradigms, e.g. supervised learning (which is very powerful and useful), unsupervised learning, semi-supervised learning, reinforcement learning (e.g. telling the machine if it is in the right track or not, using punishment or rewards, so that it can adjust based on an algorithm), active supervised learning (in which we query about the data, actively), active reinforcement learning, or online learning (in which we get the dataset in small chunks, due to storage or computation limitations, and process them gradually, as in Big Data or in Internet, with limited computing power or memory).

It also can be used in or with any learning theory, e.g. VC theory (including VC dimension and VC bound), Bias-Variance theory (for learning curve analysis), Complexity theory (for computational complexity, with asymptotic results, e.g. if we can do the task in polynomial time), or Bayesian theory (in terms of probability distribution and joint distribution, e.g. in handwriting or voice recognition).

It also can be used in or with any learning techniques, which are separated as models and methods. For models, we have algorithm, hypothesis, and test, e.g. linear transform (which is simple and at low cost), neural networks, SVM (e.g. with Kernel), nearest neighbors (which categorizes according to the nearest neighbors), RBF (or "radial basis function", which is a real-valued function, which depends on the distance from the origin, e.g. Gaussian form or multi-quadratic form), Gaussian processes (which is similar to Bayesian, with full probability distribution, related to random process, random function, and probability distribution over different functions, with distribution being jointly Gaussian), SVD (or "singular value decomposition", which e.g. matches 2 things, as a 2 set of factors, using 2 matrices), or graphical model (with target joint probability distribution, related to computation, graph algorithm, and simplifying the graph, to model the joint probability distribution).

For methods, we have high level entity that is superimposed on anything we use. For example, we have the regularization method, the validation method, the aggregation method, or the input processing method (e.g. for real data and practical considerations, e.g. to normalize or decorrelate).

For the aggregation method (also called ensemble learning, or boosting, or mixture of experts), we have a learning which tries to replicate the function independently (not jointly), and then combine and put them together later, e.g. combining different solutions, e.g. detecting eye and detecting nose, so that in combination, we can reliably detect the face later, which is useful for reliable computer vision applications with fast or real-time results. For the aggregation method, for regression or real number cases, we take an average or weighted average, and for classification or binary cases, we take a vote or weighted vote. For the aggregation method, we have 2 types: (a) After-the-fact situation (where we already have the solutions, and then we combine them), and (b) Before-the-fact situation (where we get solutions, with the view or intention or assumption to blend or combine them together later). For the aggregation method, as one example, we have the Boosting method, where we enforce the decorrelation (not by chance), e.g. by building one hypothesis at a time, for a good mixture, sequentially.

Fuzzy Database and Controller:

In one embodiment, for fuzzy databases or information retrieval, for COMPLEMENT, UNION, INTERSECTION, and JOIN, we use the operators commonly defined in fuzzy logic (e.g. see Klir et al. book, mentioned elsewhere in this disclosure, Table 8.3 page 215, Table 8.4 page 218, Formulas 8.3 pages 218-219, m(X) relationships defined on page 273, Tables on pages 309, 315-317, and Fig. 11.3 page 319), e.g. for the following operations (for the regular operations on the databases):

$\tilde{A}$ for COMPLEMENT $(A \vee B)$ for UNION $(A \wedge B)$ for INTERSECTION $(A \vee B)$ for JOIN For example, for combining the indexes after multiple scanning the database based on multiple criteria, we can use the operation JOIN on the index lists from multiple scans. For example, for search, we can have the following for house hunting or purchase for a buyer, based on the criteria of the houses in the market, in the real estate database:

Houses: [location: "Washington D.C.";
  number of bedrooms: "usually preferred" "between 3 to 5";
  price range: from "about 200,000" to "about 250000" US$;
  structural quality: "at least good"]

The criteria for the statements above are based on fuzzy values, e.g. "from about 200,000 to about 250000" or "at least good". The criteria also include "usually preferred between 3 to 5", which is a Z-number. Thus, the search and query include fuzzy values and Z-numbers. Therefore, the fuzzy search in database is based on membership values between 0 and 1, e.g. for indexing the database based on any of the criteria with a fuzzy threshold, which produces fuzzy ranges (or index listing with fuzzy edges or boundaries). So, for example, if a house is found with a structural quality rated as "good", then it would satisfy that criteria (i.e. "at least good") with a membership value of e.g. 0.95 (which is a "high" membership value).

In one embodiment, we put a threshold for the membership values, e.g. a minimum low threshold to get rid of very low membership values as zero, or a high threshold to e.g. set very high values (such as 0.99) to 1, for ease of calculations. In one embodiment, we keep the membership values as real numbers, e.g. 0.95 and 0.3, e.g. limited to 1 or 2 decimal points. In one embodiment, we keep the membership values as fuzzy values, e.g. "high" membership value, in our index listings, which in some applications, is a preferred method, due to the higher speed of processing and low storage requirements, as the fuzzy classes for indexes can be manipulated faster (in some applications), compared to those of real numbers.

In one embodiment, we use the relevant documents (or relevancy factor for document, R), as a fuzzy parameter (which is also a Z-factor in our Z-web), for information retrieval. For example, for a given index terms X (which includes $x_i$) and relevant documents Y (which includes $y_i$), we define a fuzzy relationship G (also called Fuzzy Thesaurus) which expresses the degree of association of $x_i$ and $x_j$ (both belonging to X). We also have the grade of relevance for index term x, in the document $y_j$, or $R(x_i, y_j)$, as a membership value, set between 0 and 1.

In one embodiment, we find the membership value objectively or subjectively or both, for example, using author's tagging or commenting or indexing or summarizing or putting keywords or putting title, or using user or community for tagging, or using machine learned expert for tagging, or using algorithms (e.g. giving less weights to older documents, as less relevant), or using number of occurrences of a word, or finding and using the type of article or document, or the like, or all or any of the above in combinations.

Then for a fuzzy set for inquiry $S_{Inquiry}$, we define the "augmented inquiry" (augmented by associated index terms), $S_{AugInquiry}$, as (based on operator "o"):

$$S_{AugInquiry} = S_{Inquiry} \, o \, G$$

Which the operator "o" is defined as "max-min" composition, or:

$$S_{AugInquiry}(x_j) = \max \min_{xi} [S_{Inquiry}(x_i), G(x_i, x_j)]$$

Then, for the fuzzy set W for retrieved documents, we will have:

$$W = S_{AugInquiry} \, o \, R$$

Or, based on "max-min" composition:

$$W = \max \min [S_{AugInquiry}, R]$$

So, we have obtained the fuzzy set W for retrieved documents. Now, in one embodiment, all of these, including the retrieved documents and reliability factors and relevance factors and other Z-factors, are put into our Z-web. Please note that for fuzzy sets, each member of the set has a membership value or function.

In one embodiment, we use the same concept about fuzzy values and Z-numbers mentioned above on conditional statements or rules engine, e.g. for control systems or controllers to launch a spaceship based on multiple fuzzy rules. For example, for house buying, we have:

If for a house: [price range: from "about 200,000" to "about 250000" US$;
And structural quality: "at least good"]
Then Action:
"buy" the house In one embodiment, we join the rules and results as an aggregate. In one embodiment, we use the conventional fuzzy rules engine. In one embodiment, if the result of THEN is an ACTION which is binary, then we have to defuzzify the result (to do the action or not to do the action). In one embodiment, if the result of THEN is a value, we can still remain in fuzzy domain, especially if the result of THEN feeds another system as an input (which can be a fuzzy value). The rules can be generated by expert human, or expert machine (with similar knowledge base or rules, or searching for exact answers in the universe or on Internet), or training neural network based on history or training samples.

Figure 40:
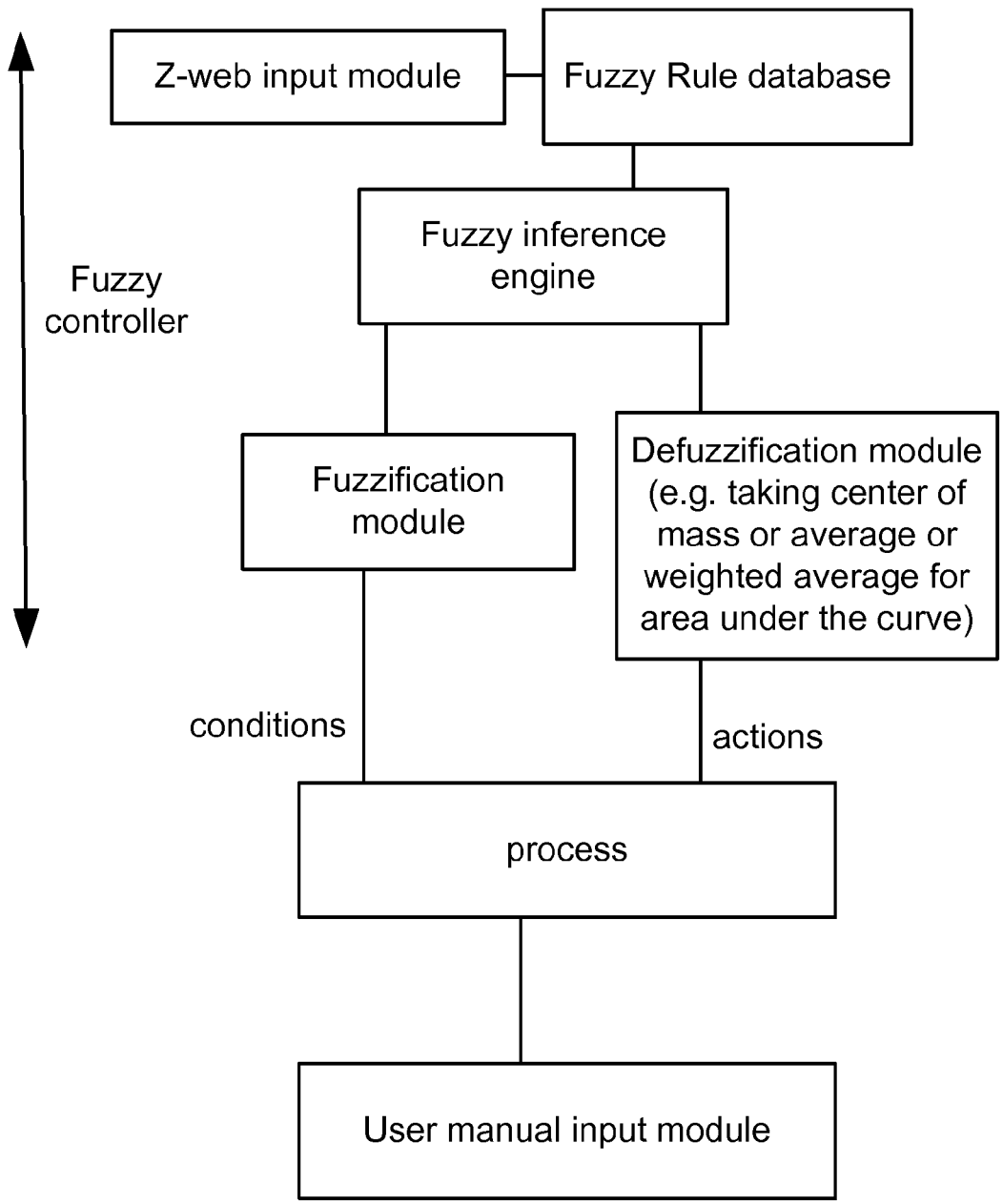
FIG. 40 shows one embodiment for a fuzzy controller.
Figure 41:
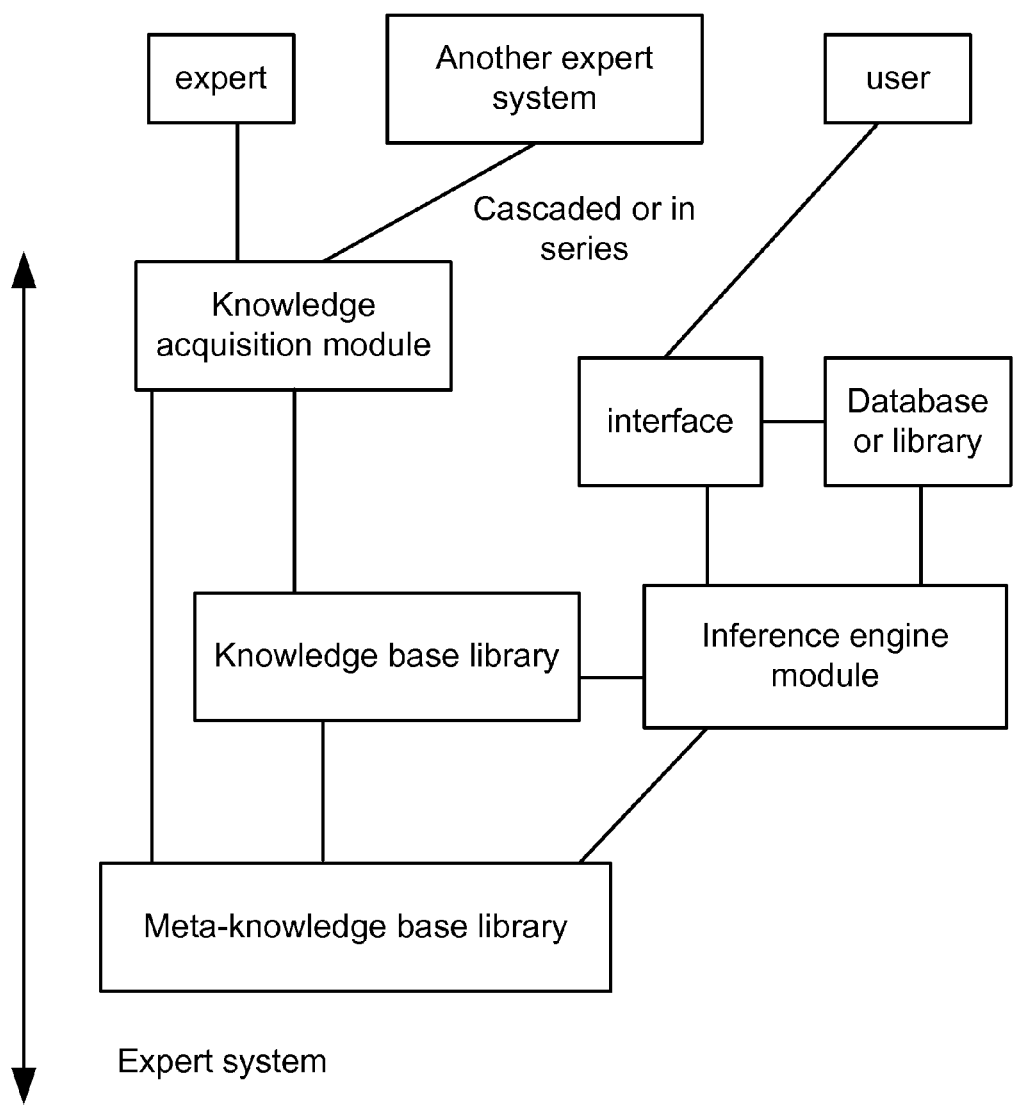
FIG. 41 shows one embodiment for an expert system.

FIG. 40 shows a typical fuzzy controller, and FIG. 41 shows a typical fuzzy expert system. In one embodiment, we have multiple experts, each for a separate task. In one embodiment, we have hierarchical experts to go more in depth in one task or analysis. In one embodiment, we associate each expert's result to a Z-factor in the Z-web, as the expertise factor, or also involving the reliability factor. In one embodiment, we have expert from a trained machine or neural network. In one embodiment, we have a human expert entering input in the system, through a user interface. In one embodiment, the expert systems are in parallel. In one embodiment, the expert systems are in series or cascaded or feeding each other. In one embodiment, the expert systems vote together for a decision. In one embodiment, the expert systems have different weights or veto power for voting for a decision. In one embodiment, the expert systems ORed (or ANDed or XORed or other logical operators) together for a decision.

Ordering or Processing Data, Files, and Z-Web:

In one embodiment, the system orders or processes our data, files, and Z-web, including updating the parameters and weights, including reliability factors for nodes, and also taking care of the queues, during low computation time periods or low loads or idle modes, to be more efficient. However, in one embodiment, instead of spending H hours in every P hours of time interval, to order or process our data, files, and Z-web, the system spends (H/n) hours, in every (P/n) hours of time interval. Thus, still, the ratio of ordering or processing period to the total period remains the same, as (H/P), but ordering or processing happens more often, with shorter periods or intervals. This way (i.e. more often, with shorter periods), the ordering or processing or updating the data, files, directories, queues, and Z-web becomes more efficient. So, the idle time or sleep time or slow time or recovery time or reboot time (for computer, processor, electronic device, tel., CPU, instruction processor, database arranging device, library ordering device, queue processor, waiting scheduler module for any processor or process, or any memory management module) is shorter, but more often, for higher efficiency of the process and more accuracy, in this example.

A Note about Bayesian Approach:

For situations and applications mentioned in this disclosure, one can also use or add Bayesian probability, Bayesian theory, and Bayesian inference (including prior and posterior discussions). However, one must be aware of the following important point and discussion.

In machine learning, we have a method of putting the brakes on fitting the noise (e.g. using hard and soft constraints), which is called "Regularization" method, which is well-known in the art.

Now, if we use the Bayesian approach, then we are actually applying a Regularization method to the system. There are at least 2 reasons for that: The first reason is that, by using the Bayesian approach, we assume that the summation of all probabilities is one, but for all samples in our situation may not be covering all situations, and thus, the total probability may be less than 1. The second reason is that, by using the Bayesian approach, we assume that we have related probabilities, which may not be true. Therefore, the Bayesian approach is actually a method of Regularization for the system. So, if one applies the Bayesian approach to the system, one has to be aware of the applied Regularization to the system.

More on Z-Web:

In one embodiment, we define unusual properties and usual properties for a given object, with associated probabilities and possibilities. In one embodiment, we define superclass, subclass, and class for a given object. In one embodiment, we define first order properties, 2nd order properties, . . . , and n-th order properties for a given object, e.g. height of a person as a first order, nose shape as a second order, and color of the eyes as the 3rd order. In one embodiment, we define default properties for a given object, so that they are applicable in the absence of any other data. In one embodiment, we define general knowledge and contextual knowledge, for specific situations. In one embodiment, having a large knowledge base and large training samples are very helpful for learning and recognition purposes.

In one embodiment, in Z-web, we find and isolate the irrelevant information, as the data with long period of no usage, or no or weak links to other nodes, to reduce the size of the Z-web, for efficiency. In one embodiment, in Z-web, we have a knowledge structure hierarchy, with nested information.

In one embodiment, in Z-web, to model a rich language, e.g. Persian, which has lots of poems and slangs with many philosophical or multiple or reversed meanings (or sarcastic language or idioms or proverbs or abbreviations or catch phrases), for natural language processing, to understand the meaning of the sentence or voice recording or text statement, one needs more dimensions and nodes with more branches and connections. So, translating from English to Persian, for word-by-word mapping, per node, we need much more branches and nodes connecting to each other. Thus, we need more complex Z-web constructed, after translation to Persian, to accommodate the extra complexity and various meanings of the translated language.

In one embodiment, Z-web also helps us understand the meaning of the proverbs and sarcastic language, as they refer to the related objects, in different contexts, based on different regions of the Z-web, initiating from the same node, with multiple meanings or interpretations. So, each region of the Z-web represents a context or environment, for a given node, in common. Thus, Z-web is a useful tool for natural language processing, as text or voice or any other form of communications. By the way, human natural language is generally based on Fuzzy logic and Fuzzy parameters, e.g. "big" or "usually" or "maybe" or "truth" or "relatively" or "soon".

In one embodiment, the fact that a specific person is uploading the picture, or tagging the picture, or owns the picture or album, is an indication that that person has some familiarity to the subjects or objects in the pictures, including the monuments and people. That assumption for relationship produces a link or branch between the nodes for those two objects in Z-web, which helps reliability and recognition of the faces, people, or objects, in those pictures or albums.

In one embodiment, to reconstruct an object or an event from memory, one object triggers another one or a chain of objects, which constructs the environment that happened before, using the Z-web nodes and branches, to follow the links. For example, I went to a gas station last Thursday, which was my birthday, and there was a gasoline leak and gasoline smell in the gas station. So, we input those data in the Z-web, as related objects, defining an event, as a memory unit for recollection of past events. Now, I smell some gasoline one week later in my garage. The trigger event is "smelling gasoline", which brings up the node "smelling gasoline" in my Z-web, which was populated before. Then, it links to other nodes, e.g., "gasoline leak", "gas station", "last Thursday", and "my birthday", in that order, to remember that I had a birthday last Thursday or recently. Then, it can branch out further to other nodes and past events.

Now, in one embodiment, if we remember an event from memory or Z-web, the weights for reliability for those nodes are increased, as reinforcement of the memory for a recent recall. In one embodiment, this increase in reliability values is a percentage of the original values (e.g. 10 percent increase), or an absolute value added to all original values. This way, the recalled events are getting stronger in reliability in the Z-web.

In one embodiment, we have other notes or data added for reminders to the past event, as extra nodes and connections added to the original Z-web (i.e. before recall or recollection). For example, we may add another related node that "last Thursday was also a Federal holiday". So, we connect that "last Thursday" node to the node "Federal Holiday", as an extra information or data (such as image, which can add a lot of other nodes from its own connections to the original Z-web), for future reference, to make the Z-web more complete and expansive and useful.

In one embodiment, we have a bunch of objects in the image or in an environment, and we are looking for an odd or surprising object, e.g. in a picture, in an airplane setting, there is a big snake in the airplane, which is very unusual in that setting. Now, we look at the Z-web corresponding to the "airplane", and all related objects around that node, but "snake" is not in any of them. So, we can conclude that having snake in an airplane is odd (or out of place or surprising or unexpected). Thus, Z-web can help us finding odd objects, with respect to other objects. That also indicates the probability of existence or position of an object, with respect to other objects, in one setting or environment. Having an unusual object in an environment is a feature by itself in that environment. For example, noticing a gun at the airport (with no uniform on the person holding the gun), in an image or video frame, in a security camera, is a red flag or feature, for further investigation, as it is an unusual object in that setting. So, it is a useful tool for analytics for counterterrorism and security purposes, or for analytics for "big data".

In one embodiment, we have a document, text, or object, and it is related to multiple other objects, with some reliability factor, truth factor, confidence factor, expertise factor, or the like (as described in details in this disclosure, and collectively called "Z-factors"). The Z-factors can be fuzzy or crisp values. The Z-factors are properties or characteristics of Z-nodes and Z-branches in the Z-web. The values of Z-factors can get propagated or calculated from one node to another in the Z-web, to evaluate the overall relationship between 2 nodes. When using the Fuzzy parameters in the Z-web, we can use the membership function or value to express the Z-factors. In addition, to express the context(s) for a node, we can use the membership function or value, to express how much the node belongs to that context or multiple contexts. Using the Z-web, we can classify the object, such as text or book or image, based on the related objects and Z-factors.

In one embodiment, when comparing 2 Z-webs, we can coincide the common nodes, if any, and then see how many related nodes connected to common node(s) are the same. For example, based on the percentages of matches, we can have a metrics for similarity of those Z-webs, with respect to one or more of the common nodes.

In one embodiment, the Z-web is used for finding a preference of a person, based on food, music, type of face he likes, and the like, through related nodes, so that it can be used for finding friends or dates or people of similar interest, or matching people or suggesting people, e.g. in the same area or store or street or neighborhood or school, by mobile phone or computer based software or a web site. The whole social network can also be mapped on to a Z-web, with friends on the nodes, connected together.

In one embodiment, since Z-number and Z-web deal with fuzzy and natural language (e.g. "about 4 pm" or "heavy traffic") and its reliability and other Z-factors (e.g. "usually", "maybe", or "not sure"), they can be used for the trip-planner and meeting schedule module or software, to optimize the schedule and resolve or minimize the conflicts. Each node can represent an event, where 2 nodes cannot have the same exact time, which means that the branches with conflicting time are broken or are weak branches, in the Z-web.

In one embodiment, crowd searching or group searching by multiple users helps improving the search results, and also builds up the Z-web at a faster pace, for the group, with respect to that of one individual user alone. In one embodiment, genealogy and ancestry type information are modeled on the Z-web, connecting people or families or objects together. In one embodiment, Z-web handles the vagueness in information, context, language, and logic, through application of Z-factors.

In one embodiment, while we gather information from a source, we keep track of the pieces, so that collectively the pieces can form a specific context at one point, which would be useful information for all pieces to have, at a later time. The pieces can get mapped to nodes of a Z-web, for storage and relationship presentation between the nodes. Thus, Z-web inherently can keep track of such context, as it evolves further in time.

In one embodiment, the Z-factors include factors for uncertainty, ambiguity, non-specificity, and discord, which can be associated with the Z-nodes or objects in the Z-web structure. In one embodiment, for linear regression or classification, the reliability factor of input values comes in, which is a Z-factor in our Z-web. In one embodiment, both the stochastic noise and deterministic noise are the properties of each node in Z-web. In one embodiment, exaggeration or bias or lie is a part of Z-factors, e.g. bias factor, which is associated with each node in Z-web. In one embodiment, all the properties of Z-web and Z-factors are expressed in terms of fuzzy parameters, or mix of fuzzy parameters and crisp parameters. In one embodiment, they are all crisp numbers or ranges or values.

In one embodiment, we have multiple documents, and from them, we get summary or abstract or title or key words or tag words or word phrases, which relate to topics, which relate to the context, using Z-web. In one embodiment, we use membership and fuzzy values for relationship between words to topics, and from topics to context. In one embodiment, we use tables or mapping tables to correspond the words to topics, and from topics to context.

In one embodiment, when training a learning machine, we may know a specific training sample is not good quality or good version or representative of the class or subclass, e.g. from an outside source, or another training machine, or from a human or machine expert, or from the samples being at the boundaries of the cluster for that class (i.e. neighboring and close by another cluster or class). In that case, we may give them less weight, or enter the other (good) training samples multiple times (to have more relative weight as training sample), or assign a separate value to the training samples for this extra information, e.g. reliability factor for training samples, which is a Z-factor, which is a part of the Z-web for training samples universe or domain.

Search for Text or Concept, Based on Fuzzy Memberships and Boundaries:

In one embodiment, to search through some articles or text, we have 3 types/levels of categorization or steps for search: (1) abstract/title/tag/keyword, then (2) summary, and then (3) specification or body of article (e.g. for a patent search engine). The owner of the article can do the first 2 steps above, beforehand, and store them along the main article or file. In one embodiment, to search for a word, we have multiple levels/steps: Level 1: pure word, extracted as a list; Level 2: connection of similar or related words; and Level 3: context of words. These methods can be done using crisp logic, or Fuzzy logic, or combination of both.

In one embodiment, to search for a topic or concept, since most concepts and natural language is Fuzzy in nature, we use the search based on Fuzzy sets and boundaries, with the topic belongs to or related to a class or another topic based on membership functions and membership values. So, the first item is related to the $2^{nd}$ item, with a membership value describing their relationship. To limit the computation to relevant results, one can set a lower bound for threshold, say, e.g. 0.1 for membership value, below which we can set the value to zero, effectively ignoring those values, as being practically non-contributing or non-relevant. For example, 0.05 value is set to zero, to reduce the amount of calculations or memory needed, for membership values and their manipulations.

In one embodiment, to search for a topic or concept, we use Fuzzy questions or queries, based on Fuzzy terms and language, and look into Z-web, based on Fuzzy parameters, to get a node and follow that node on different branches to get the related concepts or objects or answers. For example, a node is CAR, and the related nodes are PRICE, WHEELS, and HOOD. Another example is a node for AGE, and the related nodes are PERSON, STONE, and BUILDING. For example, the value of PRICE is "high", and the value of AGE is "old", which are all Fuzzy values.

In one embodiment, the system uses the queries or type of queries as a method of feedback to modify the weight or importance of the original data or the training samples in hand. That is, the queries indicate e.g. what majority of users are interested in or what is a hot topic today, which, by itself, is a feedback to the system, to adjust itself accordingly, as a collected, aggregated, statistical distribution, median, or average opinion or feedback or vote from the society, users, concerned citizens, or social network.

In one embodiment, we have a fuzzy database, in which we index and order the data or numbers, based on fuzzy values and thresholds, e.g. "small" or "big", rather than 2 and 200, as crisp values. For query, we have fuzzy query, which looks for entries based on fuzzy indexes or criteria, such as "much bigger than 100", to order the entries and filter or select entries or rows of data. For fuzzy criteria, we can use the membership functions and values of the objects. To speed up the calculations, we can use centroid or center-of-mass of the regions under the curve, for expected values. Fuzzy query is the most natural way to access or relate to the humans, human thinking, human language, human reasoning, majority of Internet data, and natural language processing, e.g. one asks "What is the best company to invest in?", in which "the best" is a fuzzy concept and parameter, and "being good or best" is a contextual concept (depends on the context or environment) which can be handled with Z-webs, with originating 2 or more branches from the same node, each representing one context, as explained in this disclosure.

In one embodiment, for ambiguous context, the system asks the user, with extra questions to figure out the context or limit the context, e.g. if an abbreviation may refer to medical field and also to IT field, as context, then the system directly asks the user if she is interested in medical field or IT field context or discussion, to limit the context, from start.

In one embodiment, the relevance for a search engine is determined based on: term relationship, probability, proximity, vector space, user or link popularity, domain or server information, or the like. In one embodiment, we use the fuzzy searching, using the operators AND, OR, XOR, and the like, in fuzzy domain, to relate the words in the query together in the search, based on their respective membership functions and values, through the logical operators, e.g. search for: (image OR picture), as a search term.

In one embodiment, the information included and extracted from email (or texting or text or TWITTER® or SMS or the like) provides an indication of emotions for people, used for sentiment analysis and behavioral predictions, e.g. for fashion or political opinion or voting.

In one embodiment, the hierarchical model is used in fuzzy domain, using flexible hierarchical relationships, with no rigid structure, using the membership function and value to express the hierarchy relationship between 2 objects A and B in the structure, which has value between 0 and 1. In one embodiment, the hierarchical model is used for the ancestry relationships or family tree.

Editing Still Pictures or Frames in Video:

In one embodiment, multiple pictures of camera or an album on a web site are scanned for face recognition, and if during the scan, having focused on eye and eye brow and mouth and face, it turns out that the person in the picture is blinking or not smiling or closed eyes or otherwise having not a good gesture for the picture or tagged for any other reasons, then the system or controller removes that picture or frame of video from the video, album, or collection, automatically, as a default.

Figure 42:
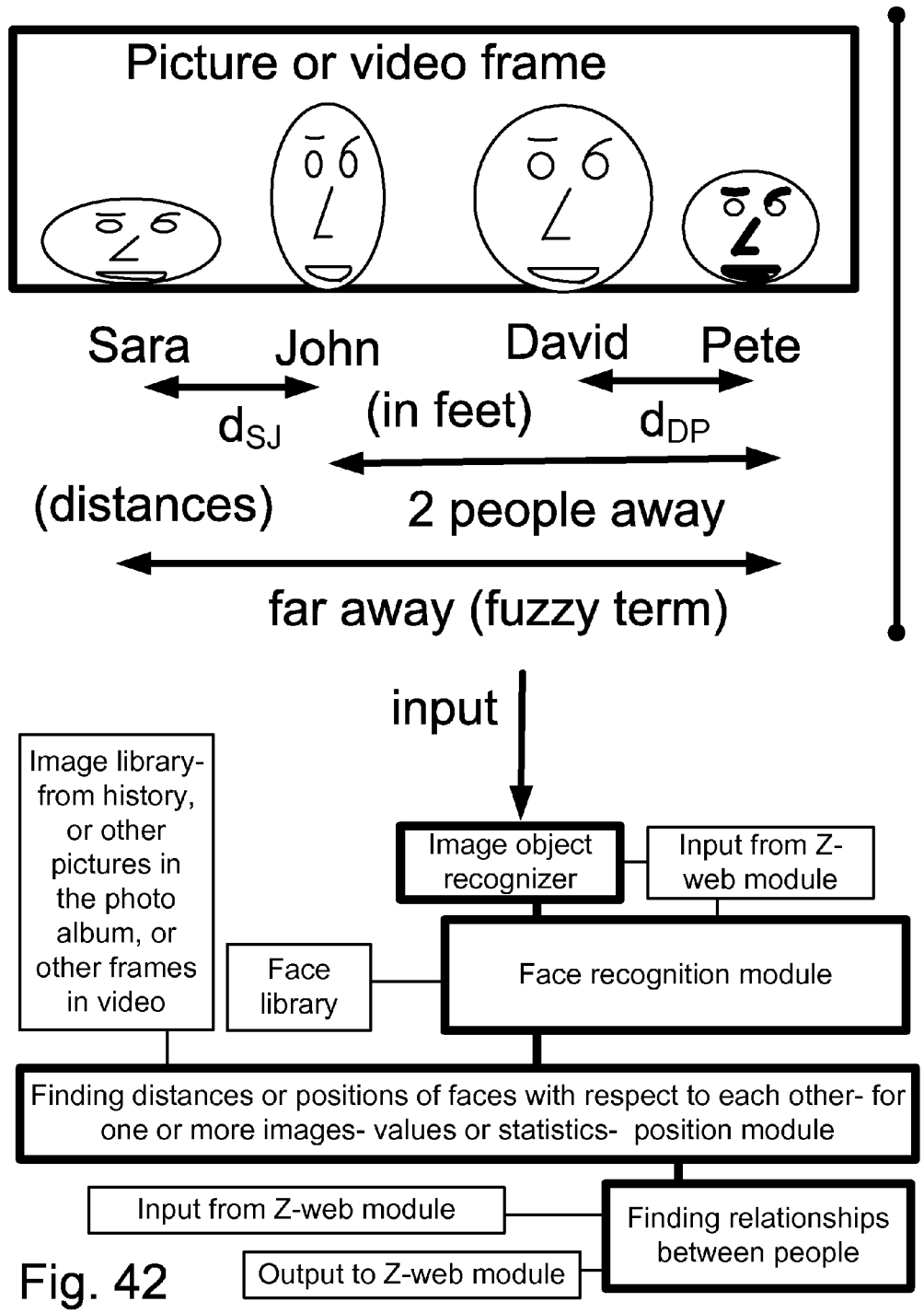
FIG. 42 shows one embodiment for determining relationship and distances in images.
Figure 43:
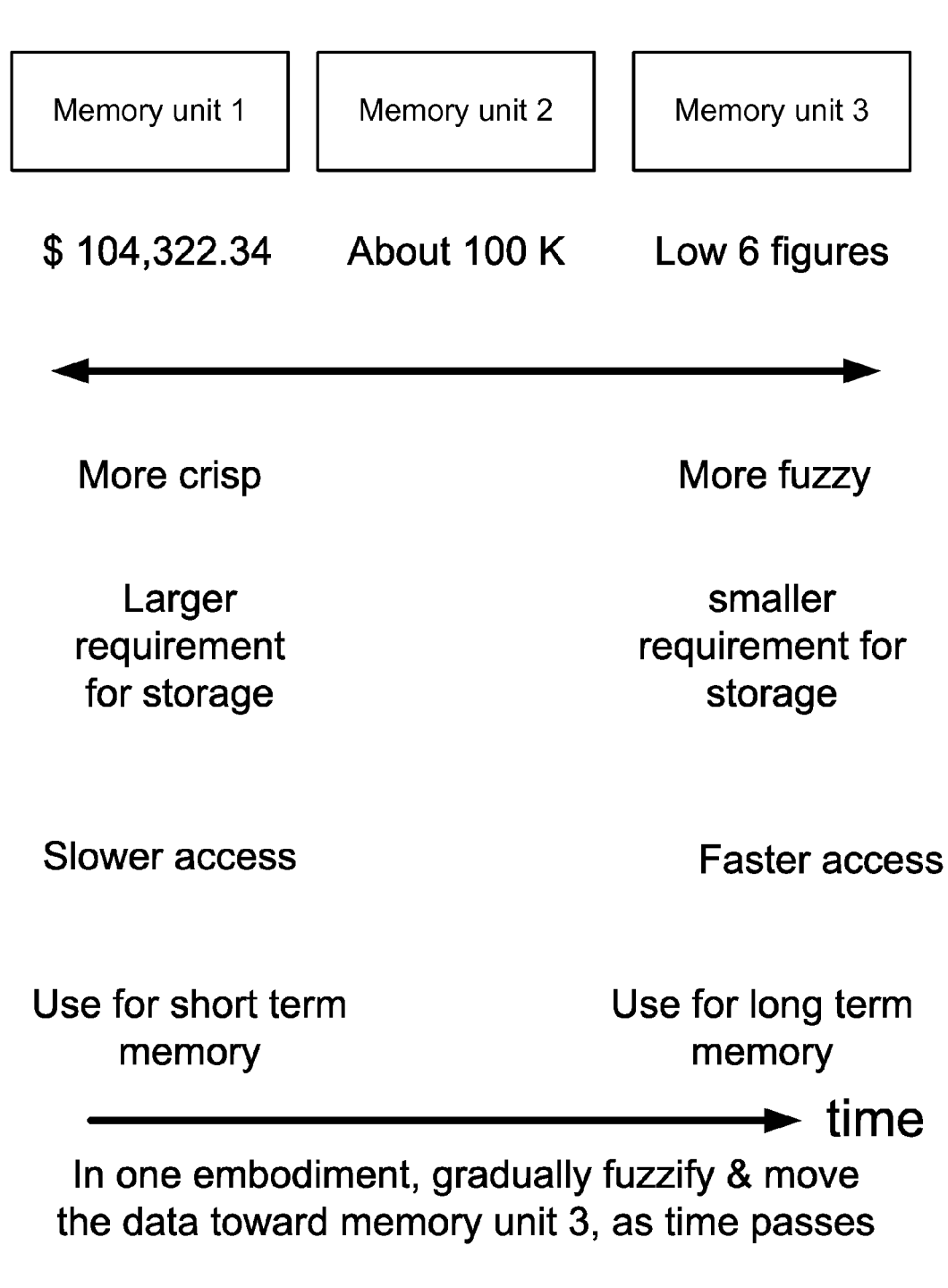
FIG. 43 shows one embodiment for multiple memory unit storage.
Figure 44:
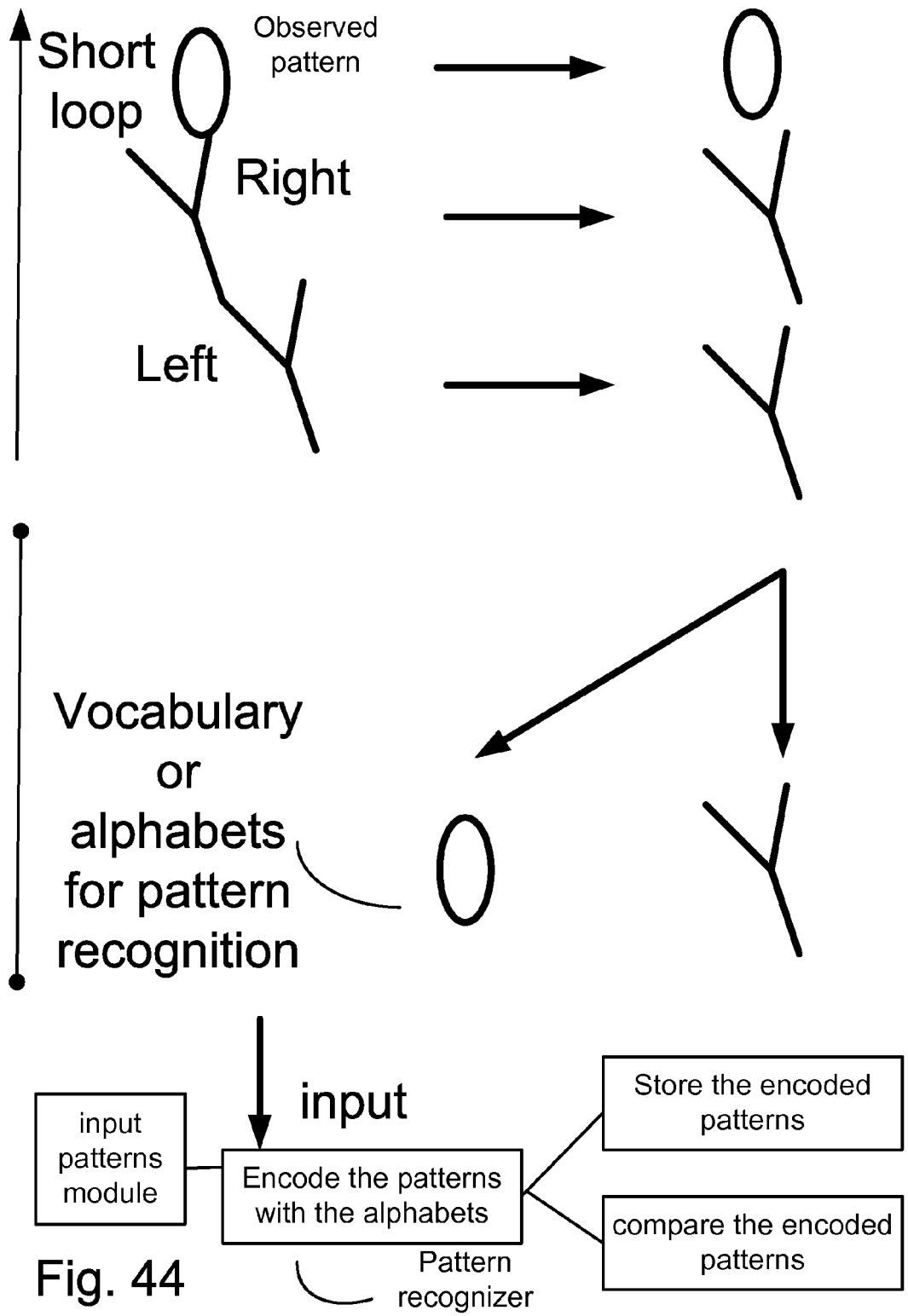
FIG. 44 shows one embodiment for pattern recognition.
Figure 45:
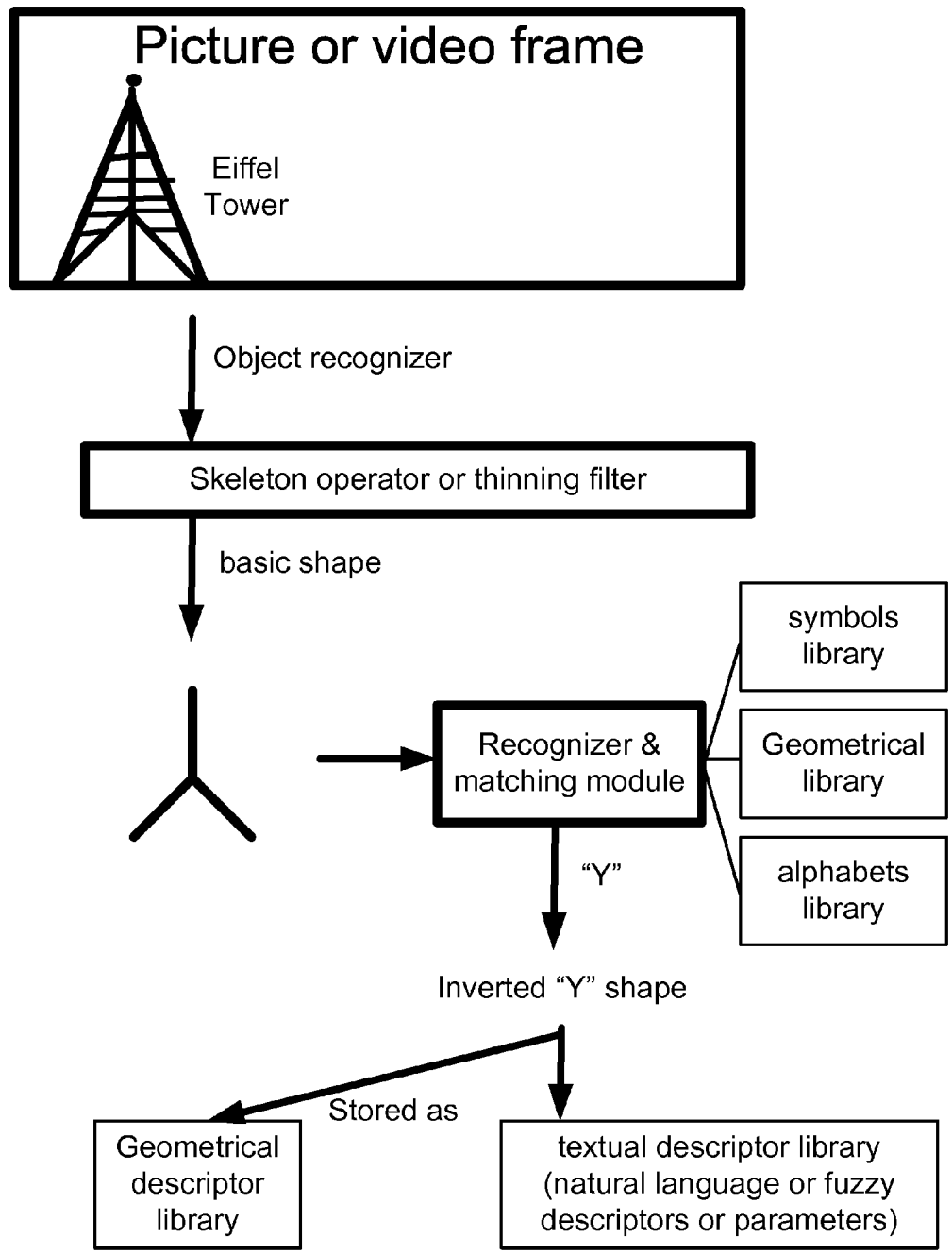
FIG. 45 shows one embodiment for recognition and storage.

In one embodiment, the system asks from the user if the system should or the user desires to do so, or what to do, or gives an option to move away from set default, or gives an option to set default, or default set by service provider, or default set by manufacturer, or set by camera owner, e.g. using a menu of choices on screen or GUI or user-interface, e.g. to eliminate the picture or frame, or keep them as-is, or correct them with an exchange or substitute picture as supplied by the user, or as supplied by the system automatically from the rest of the album or collection, randomly, or based on similarity with the original picture, e.g. based on the people in the picture, e.g. using or replacing with another picture with the same exact same e.g. 4 people in the picture, or at least e.g. 3 out of 4 people (as a maximum number of matched people available in the album, if another 4-people combination picture is not available in the album), or same 4 people standing in the same order as the original picture e.g. from left to right, in terms of position in space or relative position in picture or relative to an object, such as waterfall, in the background, or relative to another person in the picture, e.g. 2 persons away from Fred, or on the left side of Fred, or about 5 ft away from Fred, or far away from Fred (which is a Fuzzy term, as a natural language spoken or thought by humans everyday). See e.g. FIG. 42 for such a system.

In one embodiment, for video situation or movie or multimedia case, the frame of videos are replaced or exchanged by simply interpolation or extrapolation from neighboring frames, or just simply replaced with one of the neighbors, or just simply replaced with the closest neighbor in terms of similarities of the 2 frames, e.g. in terms of motion vectors as a metrics for comparison, or in terms of object tracking as to how much it has changed from the last frame.

In one example, in one embodiment, for video situation, for video compression scheme, we have video I-frame (Intra-coded picture, fully specified, like a single static image), P-frames (predicted picture, or delta or difference to previous frame), and B-frames (Bi-predictive picture, or bi-directional from past and future, or differences from both sides/frames). Then, we use I, P, and B frames to get the missing frame, to be the best in terms of continuity to the human eyes or perception, or in one embodiment, just simply skip the frame, as it may not do much to the quality of the video anyway, or in one embodiment, blur or average or un-sharpen filter the pixels of the region of the frame that has the problem, e.g. the blinking eyes blurred out, so that it is not visible anymore.

Objects in Video or Movies:

Let's assume we have a series of frames in sequence. As soon as we find a big change in the scene (e.g. by comparing to the previous one, as percentage of changes in the new frame, or using motion vectors), we mark that frame as major delta or change, as a marker in the sequence. Then, for a sequence between 2 major deltas or changes or differences, we look for and extract all objects in the frames. For example, we find a red shirt in many of the frames of the $1^{st}$ sequence. In a couple of frames, we see and extract a logo or name brand, e.g. POLO written on the shirt. So, in those frames, we associate RED and POLO to the "shirt". So, we conclude that the red shirt is a POLO brand, for all sequence 1, even though we do not see or extract the brand or cannot verify that in all frames. The other neighboring sequences may also contain a red shirt, in which case, we can guess that it is also a POLO shirt, with a high probability or as one of the possibilities to investigate further.

In one embodiment, one can use a brand for ads or marketing, by editing, changing, or adding a brand or name or logo on a blank object, such as a shirt, in a sequence of frames, as explained elsewhere in this disclosure. In one embodiment, the system can select some of the frames or some of the directions of the view of the shirt, e.g. for adding the logo. Or, it can be done by a human user or expert. For example, the logo is appropriate to be added to the front of the shirt, as it is set in the library, not on the side or back of the shirt, for this particular brand. So, those frontal shirt views are selected and distinguished as a separate object, and the frames containing those frontal views are marked or flagged for addition of logo, later on, e.g. on the upper part of the shirt, as is described or specified in the library, by the manufacturer or expert or user. So, the proper frames are flagged, and only the shirts in those frames are edited, according to the library or rule collection or specifications.

Finding a brand or branding or re-branding has a lot of marketing and sales benefits. In addition, it will find the potential infringers or fake brand names, which copy or attach the brand name without permission or licensing, through image analysis on pictures or albums or on Internet web sites, using web search robots. One can use API (application programming interface), software development kit (SDK), metadata, tag, comment, or the like, for user interface or GUI or programming or specification of the objects.

For ads, once the user clicks on some object on screen, which is traceable, as an input device (such as screen of APPLE® IPHONE), the system can find what object is chosen by the user, based on extracted objects or based on the coordinate of the objects on screen, and send or connect or refer the user to the right or preferred or paid dealer or merchant(s), by email, web browser, give link, hyperlink, jump to address, fax, tel., mail, text message, or the like, with any communication means, to connect or inform or persuade or encourage the user to buy or at least learn about the object on the screen or image or video, for more sales, and to collect finder's fee, ad income, ad sharing, percentage income or revenue, partnership percentage, fees per click, traffic from ads, fees per links, fees per visit, fees per minute, fees per unique visitor, fees for actual purchases or transactions, fees for recommendations or feedback, fees for referrals, or the like, as a business model, to generate income for our system or web site.

In an embodiment, if the user puts the mouse or selector or menu option selection on an object on screen image or frame of a video, the system will understand what the user wants to select from its screen coordinate and location of the objects, and then the system gives all info, docs, specs, links, web sites, history, dictionary, encyclopedia, merchants, manufacturers, agents, characteristics, related objects, suggested objects, suggested similar or replacement or complementary objects by other users or bought by other users or reviewed or viewed by other users, from its library or databases or through its knowledge base or through its Z-web knowledge, starting from a node. In an embodiment, the user can automatically (using the system) send a TWITTER® or email or text or comment or SMS or vote or feedback or ask for opinion from all or close friends in her list or ask information about the object or express "LIKE" about the object or service or concept, based on the keywords or extracted descriptions of the object, e.g. car or TOYOTA.

In an embodiment, if the user selects an object, in an image (or frame), or the system selects an object for the user randomly, or from the list of the objects ordered in some fashion or reason (in the ordered list), then the system compares that object to the library, to figure out what type it is, e.g. tel. set, and then dig in more from other objects or attributes extracted from the image, e.g. brand name written or placed on the phone set as text or logo, e.g. APPLE, or the model number from its shape or size, versus rules and library information and Z-web, to figure out more details about that object, and build up Z-web even more.

In an embodiment, for marketing or sales purposes, the system uses sponsoring merchant's real or virtual store fronts on screen, to show 2D or 3D images of shelves and objects or services for sale or offer, for user to visit and select or review, to increase traffic and sales. This can be combined with the map of the city, for a virtual man walking in the 3D space of the city, visiting store-by-store, asking questions from store owner, robot, or other users, about the quality or spec of the object or service (on-line, by email, texting, SMS, IM, through dialog window, tel., or the like), meeting other people on-line in virtual store or street (e.g. setting a date or appointment to meet others on-line, for chat or common shopping experience or social networking or any other gathering), or the like.

In an embodiment, for marketing or sales purposes, at the store front, the objects or merchandise is shown in cartoonish or drawing format, or based on real pictures, on the screen, and the recognition or classification of the objects are done based on the teachings mentioned in this disclosure, through Z-web.

In an embodiment, for example, once we recognize a person with a red shirt in a video frame or in a vacation photo album for a specific date, then for any other person in that neighborhood of search in other frames or other photos, we can assume a person with the red shirt or same property is the same person, without checking his/her face, or minimally checking the face, for verification only. That speeds up the recognition process. In an embodiment, for example, we can assign a lower reliability factor value to the no-checking or minimally-checking face, mentioned above, which is a Z-factor in our Z-web, which can be improved by other neighboring nodes in our Z-web.

In an embodiment, for example, we can empirically or experimentally get the reliability factor value or other Z-factors for a set of recognition on e.g. some pictures, using a human or machine expert, to verify some or all of the samples e.g. after the recognition process, with the percentages recognized correctly, or membership values in fuzzy domain, as the metrics for the reliability factor values or parameters (or as scaling or normalization ratios for them). In an embodiment, for example, the same thing can be done for the bias factor or expertise factor, as other Z-factors, using people to tag or give opinion on the test samples, to show the bias or expertise and their degrees or values or fuzzy parameters, e.g. "highly expert" designation, e.g. for a human or machine.

Face Locating Module:

In one embodiment, we want to track, find, locate, or recognize faces in videos or frames or images. For a given type or class of face, we can get the histogram of colors of the face, obtained from our library, e.g. for faces or for histograms. Then, for a given picture, we define a window of examination, which can be scanned and shifted throughout the image, from one side or corner to the other side/corner, e.g. to the other diagonal side corner. In one example, the size of the window is 2×2, or 4×4, or 8×8, or 32×32, or 64×64, or the like (pixels). As the window moves and scans the image, we calculate the probability of the pixels belonging to histogram, for each instance of the window, per pixel within the window. Then, from the total probability per instance of window, we conclude which the most likely position or coordinate of a face in the image is, which corresponds to that specific window(s). In one embodiment, the total probability is defined as the sum of all probability values added, for pixels in that window. In one embodiment, the total probability is defined as the average or normalized value or median of all probabilities for pixels in that window. We compare the total probability versus some threshold, for such a determination, with binary decision or probability decision, as outcome.

In one embodiment, the threshold depends on the size of the window. In one embodiment, the threshold is obtained after scanning thousands or millions of faces, within some known or tagged training images or samples, with known histograms, for our basis or for comparison. In one embodiment, the threshold values are also stored in our libraries or databases, for various faces, images, and window sizes, beforehand. In one embodiment, the training is done by a neural network. In one embodiment, the threshold(s) is a Fuzzy parameter, and determination of a face is a Fuzzy determination, based on a Fuzzy set of faces. In one embodiment, the size of the window is chosen or set comparable with a typical size of a face in that scale in the image, or with respect to the average or estimated or expected size of the face of people in that scale of image. In one embodiment, from histograms and windows the potential for one or more positions or centers or regions for faces are obtained, which indicates how many faces are in the picture (and where in the picture, in terms of position or coordinate in the picture, e.g. in pixel values, in 2-D space, for picture frame axes).

In one embodiment, the threshold and histogram spectrum depend on the type of the faces, and so, the determination of existence of a face in an image depends on the type of the faces under examination. For example, if we are looking for a Chinese face signature, the signature is different with respect to that of a Middle Eastern face type or class signature, coming out of or extracted from the millions of samples from that type of face, beforehand, for calibration or learning or statistical analysis.

In one embodiment, the threshold and histogram are obtained from the size and direction of the faces, e.g. from millions of faces. The size of the face can be based on rectangle of (N×M) pixels. The direction of a face is e.g. frontal view, side view, half-way side view, and the like, which have different signatures, e.g. in terms of histogram shape and peaks. So, from this analysis, the size of the face and angle of view of the face are also determined.

In one embodiment, various histograms are generated and analyzed, e.g. for color (e.g. based on RGB or YMCK components), intensity, grey scale, frequency of any periodic function in image, wavelength of color, pattern in image, or the like. Of course, in general, the more histograms (including the data related to its general shape, position of peaks, and relative size of peaks), the better analysis for the image and better recognition or locating the face.

In one embodiment, various histograms are generated and analyzed for other kinds of images, such as sea or ocean pictures, or forest images, or outer space images, which have their own signatures and characteristics, e.g. to recognize forest images. Furthermore, the forest also has some subcomponents, e.g. trees or birds, with their own signatures and histograms, for locating or recognition purposes, e.g. to recognize trees (in the picture or painting or frame or video or image). Thus, generally, the method mentioned here can be used to find the types of images in a big scale, such as "big data" analysis, classification, or filtering, and also, it can be further used for a deeper analysis, to find objects in the images, such as trees or birds or animals in a forest setting. Therefore, face recognition is just an example, and the method is more comprehensive (and applicable to other objects, as well).

In one embodiment, for edge linking or boundary detection, we use local area processing, with magnitude and direction of the gradient vector, with respect to a threshold. In one embodiment, we use a global approach, using Hough Transform, by changing the parameter space, e.g. for a line equation, and then quantize the parameter plane (with a counter or accumulator), from which the edge linking for pixels is obtained. In one embodiment, we use region splitting and merging to connect and match similar regions, for segmentation purposes. In one embodiment, we use a chain code or vectors to express the boundaries. In one embodiment, we use histograms and similarity between its peaks and valleys (or its curve signatures or features), to classify the histograms, classify the objects, give a degree of similarity, or recognize the types or objects. In one embodiment, we use operations on regions of pixels, as sets (e.g. union or intersection or XOR), to merge or separate regions e.g. for continuity analysis for regions, e.g. for object recognition. In one embodiment, we use morphology operations, e.g. opening or closing operations or filters, for continuity analysis for regions or boundaries, e.g. for object recognition.

In one embodiment, we use pose, structural components, facial expression, image condition, or image orientation for the properties of an image of a face. In one embodiment, we use knowledge based (e.g. top-down method), template matching (e.g. predefined face templates or deformable templates), feature invariant (e.g. facial features, texture, skin color, or combination of multiple features, e.g. using color coordinates or histograms), feature based (e.g. bottom-up method), inductive learning (e.g. using decision trees, with positive and negative examples for face patterns), or appearance based technique (e.g. eigenface, distribution based, neural network, Bayes classifier (e.g. to estimate the joint probability of e.g. local appearance and position of patterns), Markov model (HMM, which relates to and depends on the probability of the prior state, for the chain of related events or objects, such as components of a face, e.g. eyes and nose, as related objects, with known or expected relationships or distances), SVM, or relative information), to recognize a face.

In one embodiment, we use knowledge based for human knowledge or rules e.g. for intensity distribution or difference values for regions of the face. In one embodiment, we use knowledge of the peaks in the profiles of horizontal and vertical scans e.g. for intensity or color values, to find a face. In one embodiment, we model a face as a plane with multiple oriented facial features, e.g. eyes and nose, using pairs of edges or short curves (as our basis or basic elements to build a face), starting with detecting interest points, then detecting boundaries or edges and linking them, and then testing the results with a statistical model, to verify.

In one embodiment, we use face and non-face clusters for estimation of density functions (using Gaussian functions) for patterns for face and non-face situations. In one embodiment, we use distribution based, with patterns grouped in multiple face and nonface clusters, with each cluster represented by a multidimensional Gaussian function (with a mean image and covariance matrix). In one embodiment, we use one of the distance metrics, e.g. Euclidean distance between 2 points in N-dimensional feature space, to find the distances between the input image and the prototype in library (in cluster), or use Mahalanobis distance between test pattern and cluster centroid or center of mass or average value (which includes the correlation of the data set (also related to Hotelling Transform used for multivariate statistical testing)). In one embodiment, we use Kohonen Self Organizing Map (SOM), e.g. for eigenfaces, with each prototype representing a center of a cluster. In one embodiment, we use information approach, with spatial property of the face and contextual constraints.

In one embodiment, we have a method for recognition of faces from a still image or video frame, in which the system receives a still image or video frame through an input interface. Then, it preprocesses the still image or video frame. Then, it recognizes a first class of image for the still image or video frame. Then, if the first class of image for the still image or video frame comprises face or human, then it sends the still image or video frame to a face recognizer module. The face recognizer module accesses a first basis function from a first library of basis functions, stored in a first basis function storage, corresponding to a first component of face, e.g. eyes. The face recognizer module accesses a second basis function from a second library of basis functions, stored in a second basis function storage, corresponding to a second component of face, e.g. nose. A computing processor applies the first basis function across the still image or video frame to detect the first component of face. The computing processor applies the second basis function across the still image or video frame to detect the second component of face. The computing processor accesses a relationship between the first component of face and the second component of face. Then, the system assigns a first Z-node and a second Z-node on a Z-web to represent the first component of face and the second component of face, respectively. Then, it assigns a first branch connecting the first node and the second node on the Z-web to represent the relationship between the first component of face and the second component of face.

Then, it assigns a Z-factor as a mathematical set of factors related to reliability, confidence, truth, expertise, bias, knowledge, usefulness, and relevance, or the like, for those objects. Then, it assigns a first Z-factor, a second Z-factor, and a third Z-factor to the first node, the second node, and the first branch, respectively. Then, the computing processor analyzes the first Z-factor, the second Z-factor, the said third Z-factor for the first node, the second node, and the first branch. Then, the computing processor detects one or more faces in the still image or video frame, with a fourth Z-factor, based on the above analysis step. Then, the computing processor compares the detected one or more faces with the fourth Z-factor against a library of faces, each with its own Z-factor, stored in a first face storage. If the detected one or more faces matches or corresponds to a first face in the library of faces, then it outputs the identity or identification number of the first face, as identification for the detected one or more faces from the still image or video frame, along with a fifth Z-factor corresponding to the matching or correspondence to the first face.

In one embodiment, in addition, it (i.e. the system) determines one or more contexts for the still image or video frame. In one embodiment, it (i.e. the system) determines a partial matching of an object. In one embodiment, it (i.e. the system) determines a match of an object partially shown in the still image or video frame. In one embodiment, it (i.e. the system) looks for a related object in vicinity of the first object in the still image or video frame, or in other related images or video frames, or looks for an expected object from a list of expected objects within a radius of search of the first object, looks for an expected object from the Z-web, with its corresponding nodes and Z-factors, with respect to a third node representing the first object. In one embodiment, it (i.e. the system) applies a rule for recognition, or a rule template for recognition. In one embodiment, it (i.e. the system) emails or communicates a file or data or recognized image or video to all or subset of people recognized in the still image or video frame, or video conferences among all people recognized in the still image or video frame, or coordinates calendar or meeting time among all people recognized in the still image or video frame, or sends notification or warning to all people recognized in the still image or video frame. In one embodiment, it (i.e. the system) edits, replaces, erases, covers, or exchanges one, some, or all people recognized in the still image or video frame. In one embodiment, it (i.e. the system) warns or notifies an authority or police about one, some, or all people recognized in the still image or video frame.

Compressing Text or Voice:

Sometimes, we have some text or voice recordings, e.g. some words, that rhyme together, e.g. "bank", "tank", and "sank", e.g. in a poem or in a sentence. Then, due to the pattern existing in the rhyme, one can reduce or compress the size of final data, and take advantage of redundancies or patterns existing in poems or rhymed phrases or sentences. For example, one can describe the pattern for the example given above as (which is a compressed version of the data, for more efficient storage or faster retrieval):

$$\{"b","t","s"\}+"ank"$$

The same thing can be done with notes, voices, music, or other modes of communications or data, which may have inherent patterns, to use redundancies for compression of data, to increase efficiency for storage or retrieval. The recognition of the pattern or comparison of data or building up the library or using training sets can also be done more efficiently, using the patterns or redundancies in data, in different levels, e.g. at word-level or at letter-level or at sentence-level, for the text. The redundancy or pattern also relates to the entropy of data (measure of disorder and unpredictability), which relates to the amount of information, and also, relates to the minimum storage needed to store the data.

Data Type:

Let's look at one example: Let's assume that we have two integer numbers: 86886668 and 86868668. The only difference between these series or combinations of digits is the position exchange of the following 2 digits: 86886668 versus 86868668. However, since the other digits located at the left side or right side of the difference digits are very similar to the difference digits (consisting of digits 8 and 6, only), the difference is not very visible to the human eye or perception. Thus, if the difference or feature is very similar to the background or environment, then the difference or feature is lost (for recognition or classification purposes). This may not be a big problem for a color photograph or picture from a family vacation in Italy, as the neighboring pixels or patterns or data can be mixed or exchanged or averaged, with not much problem for overall analysis or recognition of objects. However, this may be a major problem for cases dealing with numbers, such as integers, as the numbers may be very different in values, just e.g. by exchanging two digits, as shown in the example above.

Thus, depending on the data, as is the case with integers in this example, we may want to be more careful on the position and ordering of the pieces of data, such as position of digits in an integer value or data. Therefore, as the first filter or scan or pre-process, we want to separate the data in their format or usage or header or type, e.g. image, photograph, text, number, table, list of numbers, and the like, to treat the data accordingly in the next steps, e.g. separately and optimally, depending on its type. In this example, for integers, the window of examination for digits should be small, with focus on each digit, so that we do not miss or overlook or mix any digits, in the image under study.

Text Templates:

In one embodiment, we get statements or questions or sentences as inputs, and then we process them with respect to the templates in our library, based on grammar or other rules in language, to find the meaning of the sentence, or break it down or parse it to pieces for understanding the words and ultimately the sentence. For example, we have "Jim is 20 years old." as input. Then, we compare it with the template: [NAME+VERB+NUMBER+"years old"]. Of course, it may match multiple templates in our library, and all give the same meaning at the end to the user. The templates may have their own Z-web, so that we can get related templates for comparison and natural language processing. In one embodiment, the Z-web is based on Fuzzy nodes and Fuzzy reliabilities and Fuzzy boundaries and Fuzzy relationships and Fuzzy templates and Fuzzy definitions and Fuzzy sets and other Fuzzy parameters, including branch strength, length, and the like.

Since the system finds that VERB is a "to be" verb, namely, "is", the template is simplified as: [NAME+NUMBER+AGE], or [name/age/number], or [Jim/age/20]. The age attribute of Jim is stored in Z-web, next to JIM node, as a new node, or as an attribute or property of the original node, i.e. JIM node.

In one embodiment, many different inputs give the same result, namely, [Jim/age/20], at the end of analysis. For example, other inputs (with the same conclusion or result) are (using other similar templates):

Jim is a 20 year old kid.
Jim was born 20 years ago.
Age of Jim is 20 years old.
Jim is 20.
Jim is 20 years of age.
Jim is 20 years young.
Jim is twenty years old.

In one embodiment, the system instantiate the meaning based on the template. For example, at the time of the statement (e.g. year 2010), we set the age of Jim as being at 20 (as the set age for Jim), or in template form, we have e.g.: [2010/Jim/age/20], adding the time of the statement to the format of presentation of data, for completeness. Then, after 2 years, after the statement date, i.e. 2012, we add 2 years to the set age, namely, (20+2) or 22, as the current age for Jim, or in the template format: [(2010+x)/Jim/age/(20+x)], with (x=2), or [2012/Jim/age/22], wherein x represents the delta or difference in years. Also, see other parts of the current spec, for other methods for natural language processing and text parsing and understanding or converting sentences into templates or easy-process data formats.

Feature Space:

In one embodiment, when we have a "big data", we can define e.g. a few hundred parameters, $N_D$, for dimensions of the space characterizing such a data (related to components of such data). For example, for face recognition, for images containing faces, the parameters can be the length of the nose, width of the nose, ratio of the width to the length of the nose, and angle of the nose (with respect to the vertical plane in front of the face). As long as $N_D$ is large enough and comprehensive enough, we can analyze, sort, classify, or recognize such data, using $N_D$-dimensional feature space. Each instance of data is a point in the $N_D$-dimensional feature space. So, we can define the Cartesian distance between 2 points, in that space, as the measure of similarity (with each point representing a vector of $N_D$ dimensions). The closer the points, the more similar they are to each other. We can define the distance between points 1 and 2 as the conventional distance between 2 points in space, namely, the square root of the summation of square of all of the differences in coordinates of 2 points in different dimensions, or (wherein i (index) runs from 1 to $N_D$):

$$\sqrt{\Sigma_i (x_{i2} - x_{i1})^2}$$

Any other mathematical distance metrics used in the industry can be used for this analysis. We can also cluster similar points into same class or subclass in that space. Now, we can compare different instances of data very easily. For example, we can say one image is very similar to the $2^{nd}$ image, without even knowing what is in the image, per se, or what is in the text, specifically. The longer the data or document, the better statistical analysis one can do on the data, for classification.

In one embodiment, furthermore, for example, to cross between English and French textual data, for comparison, we can normalize one language to be comparable to the other language. For example, after normalization, a NOVEL or HISTORICAL or SCIENCE-FICTION category for books, as a class of textual data or books, from English language, has similar coordinates as those of the French language, making the comparison or classification between multiple languages possible. So, even if we do not know what the French book contains, we still can say it is a HISTORICAL book, by just looking at the normalized coordinates of the book, compared to those in English language, as being located in the same cluster or class in the feature space. This method is useful e.g. for email or image analysis, which is useful for security, summarization, e-discovery, medical data, marketing, prediction, pattern analysis, or the like.

Storage and Retrieval:

In one embodiment, for storage or retrieval of a data, we can use different versions of that data. For example, let's assume that somebody's (Jim's) salary is 104,322.34 US$ per year. Then, we can store that as "104,322.34", as a real number in the $1^{st}$ memory unit or module or storage or region or section, or as "about 100 K" in a $2^{nd}$ memory (as we classify that coarsely, or quantize that more coarsely, or fuzzify that value, or classify them in bigger bins or buckets, or classify them in less number of classes or types, or define bigger clusters to include multiple clusters), or as "low 6 figures" in a $3^{rd}$ memory, or as "average high salary" in the $4^{th}$ memory. The first memory is more accurate, but it has larger requirement for storage and slower retrieval time and slower search and query time. The $4^{th}$ memory, on the other extreme or spectrum, has smaller requirement for storage size and faster retrieval time and faster search and query time. The other memory units fall in between these two extremes or opposite performances (in the spectrum of performances or requirements or cost or constraints or usage or applications). Of course, we can expand the concept for n-th memory unit, as well, e.g. n=20 or 40. See e.g. FIG. 43 for such a system.

In one embodiment, based on the discussion above, the $4^{th}$ memory is better for long term storage or memory, and the $1^{st}$ memory is better for short term storage or memory, which can be erased and updated more often, e.g. when we are out of space or when we want to keep the size of the first memory low, for retrieval purposes, to focus on more urgent matters or data. So, the more fuzzified data is stored in the longer term memory. So, if the degree of fuzzification is shown as $F_{Fuzzy}$ and the degree of long term memory is expressed as $T_{memory}$, which both of them can be both fuzzy and crisp parameters, then, in one embodiment, we can say that $F_{Fuzzy}$ monotonically increases or decreases, as $T_{memory}$ increases or decreases, respectively. In one embodiment, we have $T_{memory}$ as a function of $F_{Fuzzy}$. In one embodiment, we can have those two parameters (values or degrees) as roughly proportional (linearly), or (with $K_{memory}$ as the coefficient of proportionality) (just as an example, and not limiting at all):

$$T_{memory} = K_{memory} F_{Fuzzy}$$

In one embodiment, we store the data in all 4 memory units. In one embodiment, we store the data in memory units 1-3, but not 4. In one embodiment, we store the data in memory units 2-4, but not 1. In one embodiment, we store the data in memory units 2-3, but not 1 and 4. In one embodiment, we store the data in one of the memory units, only. In one embodiment, we store the data in 2 of the memory units, only. In one embodiment, we store the data in 3 of the memory units, only, and so on. In one embodiment, we store the data in some (N) of the memory units, only, out of M total available. In one embodiment, the N units are sequential units, one after another. In one embodiment, the N units are not sequentially ordered units, i.e. not one after another, e.g. skipping every other units (e.g. starting from one of the units, going in one or both directions, until N is exhausted), or e.g. skipping every other 2 units, or e.g. N units randomly or semi-randomly or pseudo-randomly distributed between M units, or e.g. distributed between M units within or by any pattern or rule of distribution. Thus, e.g. based on the usage or need or requirements, one chooses one of the schemes above for the storage of the data, some of which have some partial redundancy for storage of data.

In one embodiment, as the time passes, the shorter term storages are erased more often, thus, reducing the redundancies gradually. Even the longer term storages can be erased or edited or updated, as the system becomes aware of the bad data or expired data. In one embodiment, for search and retrieval of Jim's salary or data, we start from the unit K-th memory, and go in one or both directions, toward $1^{st}$ and M-th memory units, until the system finds one or more values for Jim's salary, from one or more of the memory units. In one embodiment, for search, we can skip some of the units, randomly or in order or in a pattern, very similar to any of the variations of methods described above for the storage of data. So, basically, the search can be in any order we wish.

However, in one embodiment, we may already know that we have only stored these kinds of data in the long term memory, or only long term memory unit(s) has a substantial probability of having any information, if any at all, then we limit ourselves in those units or regions or range of units, for search, e.g. only look at units 3 and 4. So, in those situations, we just go directly to those units, to save time and resources, for efficiency. In one embodiment, we are looking for one value, only, and thus, we stop the search, once one value is found for Jim's salary. In one embodiment, we are looking for R separate values, and thus, we stop the search, once R values are found for Jim's salary, or until N is exhausted, or until the search pattern is exhausted. In one embodiment, we know the storage rules and patterns, so we can optimize the retrieval, e.g. in reverse of the storage rules and patterns.

In one embodiment, we have an indexing table between the memory units for mapping the data between those units. These search, retrieval, storage, query, and fuzzification or quantization methods, explained above, are very efficient techniques for large amount of data and analytics, and for long term storages, which are expensive or impossible for all data in our universe or set, e.g. Internet or Big Data.

One Example for Adjusting the Ranking:

In an Internet search engine, in one embodiment, when it presents the data or links to a user and the user goes to e.g. $5^{th}$ page on her screen and clicks on a link there, as the hit number 46 (ranked 46 for display to the user, or $N_{rank}=46$), skipping the first 4 pages or first 45 hits or links or web sites on display, that indicates that that selected link is very relevant to the user's search, as a feedback to the system, to adjust the weights or results for future similar searches, to reorder or re-rank or replace or exchange the list or items or importance or weights, based on a correction factor. Note that normally, most people would not go more than few pages or few hit lists in the ranking, if they cannot find good result soon (which is an inherent bias in the system). They would rather re-write their search query, instead. So, in one embodiment, the probability of selected items from bottom of the list goes down e.g. exponentially, as we go further down the list or ranking. So, in one embodiment, we can model that with an exponential function, as an example. So, e.g. if an item selected from the bottom, that indicates that the search engine was very off, and the error was high, and the correction is a major correction ($C_{rank}$). So, in one embodiment, we can write the correction ($C_{rank}$) based on a function of ($N_{rank}-1$), as:

$$C_{rank}=F_{rank}(N_{rank}-1)$$

Note that in one embodiment, for ($N_{rank}=1$), there is no correction needed (or correction is zero), and the difference ($N_{rank}-1$) is the parameter that we are interested in, as the distance to the first hit or link. In one embodiment, we have the exponential relationship, with the normalization or adjustment factor $K_{rank}$:

$$C_{rank}=K_{rank}[\exp(N_{rank}-1)-1]$$

Then, we use $C_{rank}$ to adjust the list or ranking, as a feedback to the system (which, in one embodiment, generally is not a linear function of or proportional to $C_{rank}$ at all). Of course, in one embodiment, this function grows very fast, and to dampen its growth, in one embodiment, we can add a denominator, $D_{Damp}$, to make it more manageable for our system and normalize the exponential function. So, in one embodiment, we will have:

$$C_{rank}=K_{rank}[\exp((N_{rank}-1)/D_{Damp})-1]$$

Of course, this is not the only way to make any adjustment on the system and ranking, and based on the purpose, other similar methods or corrections can be used, as well (like the ones currently used in industry, e.g. GOOGLE®'s PageRank algorithm). For example, in another embodiment, we have multiple pages of ranking for search on Internet web sites, and the system randomly selects a hit number from lower ranking, to highlight and bring up to show to the user, to see if the user selects that, as a feedback, which means that if selected by the user, the criteria should be changed to favor that randomly selected hit number, to come up in ranking for future searches. So, that would be our training sample or adjustment sample for scoring, relevance, or ranking. The scoring, relevance, or ranking can also be handled using Z-web, to build up or adjust, as time passes.

Fingerprints:

In one embodiment, for fingerprint recognition (or other similar biometrics or pattern recognition situations), we look for the features such as cusps (where 2 curves meet), grooves, curves, curvatures, angles, slopes, or fingerprint minutiae (e.g. splits, loops, "Y"-shapes, short curves, or the like). Then, we define multiple basic building blocks from which (or combination thereof) we can get all the features above in any fingerprint in our library. Then, we codify or symbolize the curves, cusps, fingerprint minutiae, or other features, based on those basic building blocks (or basic alphabets). For example, we have a shorthand notation, with the following grammar or rule:

| Y [left] | Y [right] | SHORTLOOP |
|---|---|---|

For example, for the above notation, we have a split curve, in the shape of "Y", which on the left branch of split, ends up with another split, in the shape of "Y", which on the right branch of split, ends up with a short loop (or circle or closed curve or oval). For example, the short loop is defined in our library, as a range or fuzzy parameter or crisp values or thresholds or sample training shapes from actual fingerprints. The qualifier or characteristic or adjective "Short", by itself, is a fuzzy parameter or value, as well. See e.g. FIG. 44 for such a system, for a general pattern recognition situation.

Now, in one embodiment, if we want to express the other side of the first split (the "right" side, in this example), we can it write as:

| Y [left] | Y [right] | SHORTLOOP |
|---|---|---|
| [right] | LONGLOOP | |

In this example, the right side ends up with a "long loop" feature, as defined in our library. The other splits and branches are also written in the same way, with the same grammar. Alternatively, we can write the same notation above this way, with a slightly different grammar:

| Y1 [left] | Y2 [right] | SHORTLOOP1 |
|---|---|---|
| Y1 [right] | LONGLOOP3 | |

Here, we labeled the Y-shapes and other features, such as the SHORTLOOP, with an added counter or integer, attached to the name, so that we can keep track of which one we are following, e.g. when we have hundreds of them in our notation, describing a complete set of fingerprints from a person. Other useful descriptors for fingerprints are, e.g.: SHORTLINE, SHORTCURVE, SHARPANGLE, WIDEANGLE, and the like.

Once we map or codify our fingerprints in one of the grammar notations, we can store or compare them with others very easily, from library or database, for recognition or percentage or probability of match or verification of a person. This method can be used for iris recognition and the like, with components of iris or eye described this way, with its own vocabulary or building blocks and corresponding grammar to connect them together, in a compact way, for storage, comparison, training for neural networks, retrieval from database, matching, and scoring.

Note that curves, cusps, or Y-shapes can also be modeled with Z-nodes and Z-branches, as a Z-web, for storage, comparison, or manipulation, plus reliability factor and other Z-factors, when e.g. some of the curves are not very visible or erased partially or not available, which can be handled or modeled with reliability factor and other Z-factors.

Skeletons:

In one embodiment, we can use the skeletons method for the objects. For example, the Eiffel Tower can be simplified using the operator skeletons on the object or pixels, which is a well-known operator for image processing. For example, see page 545, of book Gonzalez et al., "Digital image processing", published 1993, by Addison-Wesley. Then, we can compare the skeleton of the unknown object with skeleton of the known objects or classes in the library, in a very fast and efficient way, to first find that the object is generally a "tower". Then, once we know it is a tower, then we can compare the full version of the object with those in the library or our knowledge base, in the "tower" category, which is a very limited class with limited number of members, which means more efficient search and faster search results, which is good for Big Data analytics or Internet, e.g. to find famous objects, figures, people, cities, or monuments.

The skeleton of an object can be described by mathematical formulation, simple geometrical figures (e.g. inverted "Y" shape, for the tower), or textual description (e.g. "inverted 'Y' shape"), as some examples. In one embodiment, we can describe the skeleton as a fuzzy parameter or description, which takes less space in memory and also may make the search narrower much faster, in a multiple step process for search. See e.g. FIG. 45 for such a system.

In one embodiment, we use fuzzification, or use low resolution version, or use small version (in size), such as thumbnail version of image, or use one of the components of its wavelet expansion, or use one of the components of its Fourier expansion, or use one of its filtered version, e.g. based on frequency filtering or spatial filtering, or use one of its averaged versions on neighboring pixels in image (instead of skeleton operator, method, or filter, above).

Music Recognition:

In one embodiment, for music recognition, or for sound, or voice, or lectures, or humming or whistling or beating sound (e.g. from mouth or by tapping on a desk by hand), or series of notes or harmonics or modulated waveforms or sinusoidal functions, we can identify the music or the notes or the like, using the sound bites or pieces, extracted from the original piece (e.g. from sound waveform, broken down to pieces when there is a relative silence or low intensity in the waveform, or we can do it in frequency domain, based on frequency analysis, as frequency components and their weights, e.g. by Fourier analysis), as its building blocks, to compare to the pattern or series of notes in the library, to match or find the right one. If other data, such as artist or singer is known, the Z-web can find that song easier or faster.

The patterns of sound can be represented by beating sounds or regular music notes, e.g. to mimic a famous song or music, e.g. "BEE-BEE-BEEM-BAM-BOOM----BEE-BEE-BEEM-BAM-BOOM", where symbol "-" denotes the unit of time for pause between sound pieces, which can be e.g. a fraction of a second. Then, the unit blocks used here for our dictionary of our basic sound pieces are: BEE, BEEM, BAM, and BOOM. Then, for all of our library of songs or music, we generate these pieces, to harmonize or normalize, to gather all possible basic sound pieces, to complete our dictionary of our basic sound pieces. The recognition for these series of codes or notes are done very similarly by other pattern recognition methods we mentioned in this disclosure.

That is an efficient way of generation, classification, recognition, and retrieval of original songs or music, from library or database, through these converted patterns, with relatively simple dictionary. The connection or series of these patterns can be mapped to a Z-web, as well, for recognition purposes. One application of this is for higher sales, encouraging more sales, introducing to friends, introducing similar songs, finding copyright infringers or trademark infringers on similar songs automatically on the web, or matching friends, which are all good for movie and music recording industries (e.g. choosing or finding specific ring tones for tel. sets).

Eigenvectors for Recognition:

In one embodiment, to learn the samples more efficiently for a learning machine, we want to use low dimensionality (reduce degrees of freedom for original data), using a transformation technique, e.g. using histograms, Ritz approximation or example-based presentation, Independent-Component Analysis, Gabor type filters, Karhunen-Loeve or Principal Component Analysis (PCA), Wavelets, or the like, to get a subspace of the original space.

Figure 46:
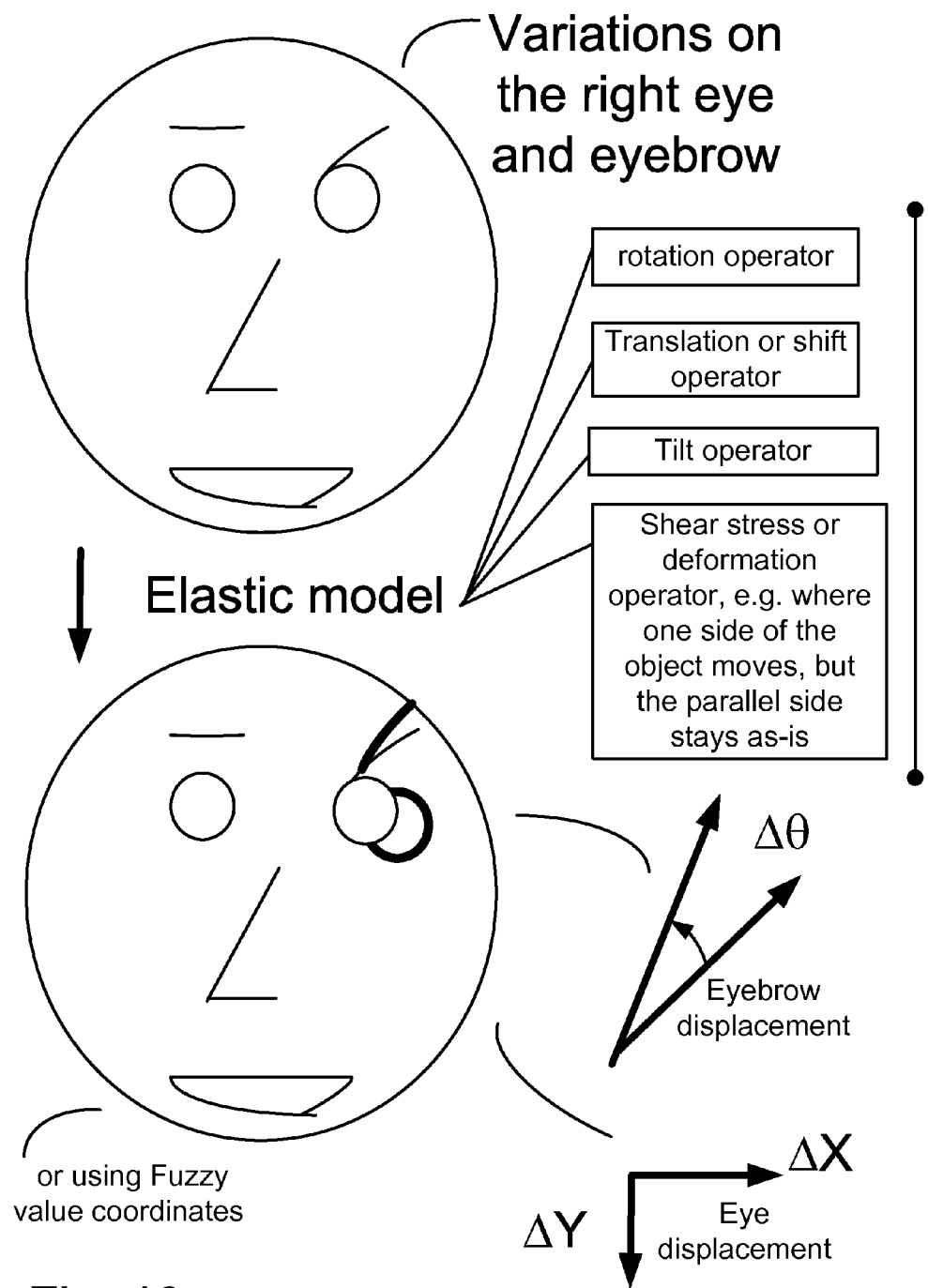
FIG. 46 shows one embodiment for elastic model.
Figure 55:
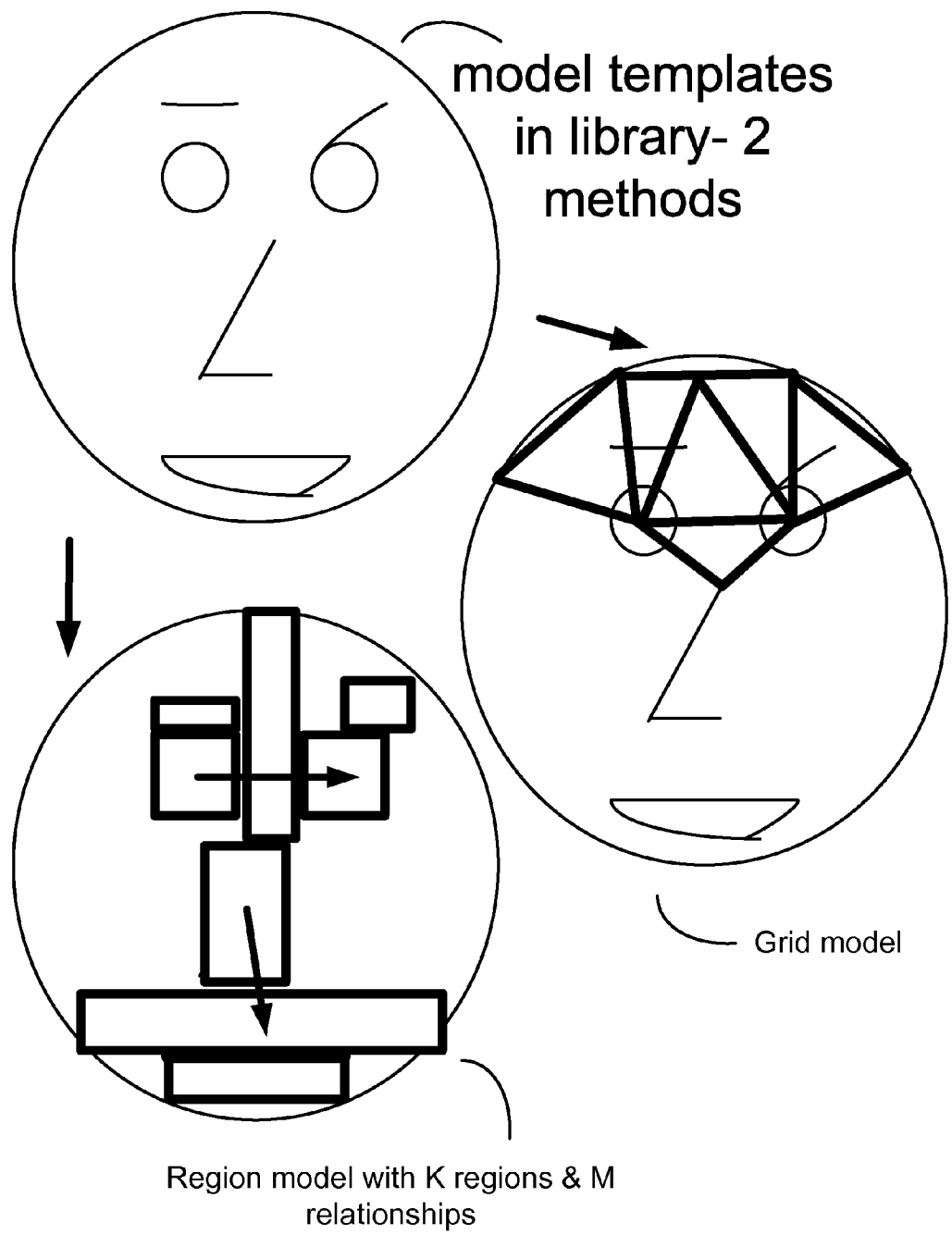
FIG. 55 shows one embodiment for 2 face models for analysis or storage.

For an object, e.g. a face or head, we have N number of models in library, with grid presentation, connecting multiple points with lines in-between, and the positions of the points are variable, or have fuzzy coordinate values, or are elastic, as shown in FIG. 46 and FIG. 55. In FIG. 55, we have shown 2 models: grid model (using feature points, such as eyes, as anchor points or corners or edges, for tessellation or tiling or covering the whole face) and region block model (or region model), which has $K_{RM}$ regions (e.g. 12) and $M_{RM}$ relationships (e.g. 26) between regions, shown by arrows or vectors, for relative positions or orientations between regions, e.g. their coordinates, their corners, their boundaries, their edges, their centers of mass, their nearest points or edges, or their geometrical centers. (Please note that for FIG. 55, we drew the 2 models partially on the faces, to make the point.) In one embodiment, the tiling can be done by user, expert human, computer trained machine, or a model based computer. In one embodiment, using those N models and the fuzzy parameters for coordinates of reference points, we can fit any given face or head. Now, we store the data in the database. Then, for future, we can compare and find the best match, based on those N classes, to narrow down the search, at the beginning.

In one embodiment, we use the autocorrelation matrix. In one embodiment, normalized aligned meshes or grids with the fuzzy parameters for coordinates of reference points. In one embodiment, we use the neural networks for learning machine. In one embodiment, we use the age progression on faces to modify the face or morph the face based on age transformation model. In one embodiment, we use the lighting adjustment, to normalize or transform the pixels accordingly, for better comparisons between images. In one embodiment, we use the face recognition against the mood or emotion of face model templates in the library, to find the mood or emotion, to conclude the psychology or intention of the subject, e.g. for marketing purposes.

In one embodiment, we use the model shown e.g. in FIG. 46 to morph the components of the object or face, based on the parameters and small changes on those parameters, e.g. in a chain sequence, e.g. for $\Delta X$, $\Delta Y$, and $\Delta \theta$ perturbations, e.g. for small distances and angles, e.g. for components, e.g. for eyes and nose. In one embodiment, the perturbations can be on pixel level, or on component level, such as eye, or on curves defining the edges and boundaries of components, e.g. eye. In one embodiment, the perturbations are on tiling, or on edge of tiling, or on corners of tiling, or on such coordinates, or on region model or rectangles or triangles, as shown e.g. in any of 2 models shown in FIG. 55.

Figure 47:
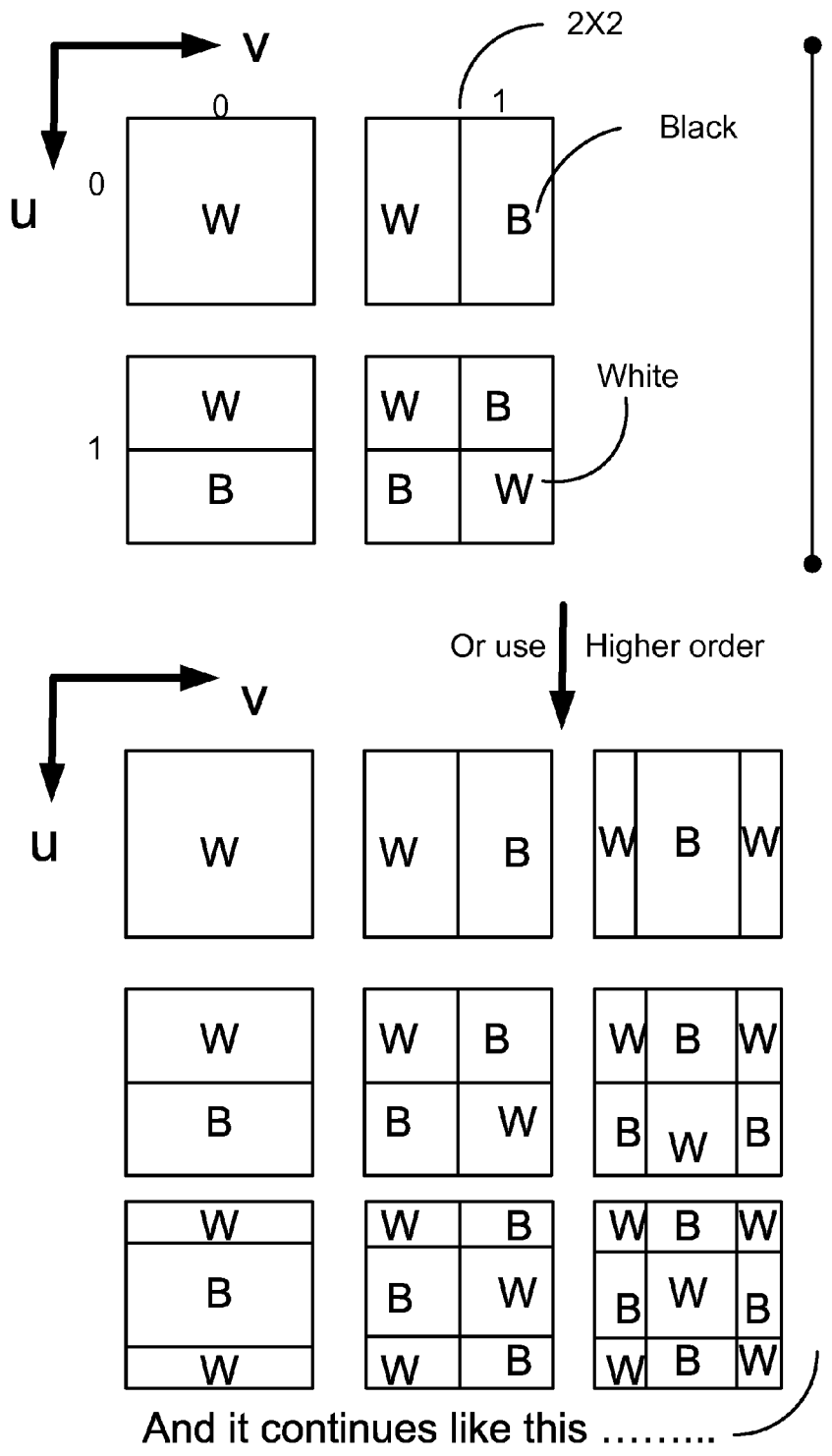
FIG. 47 shows one embodiment for set of basis functions or filters or eigenvectors.
Figure 48:
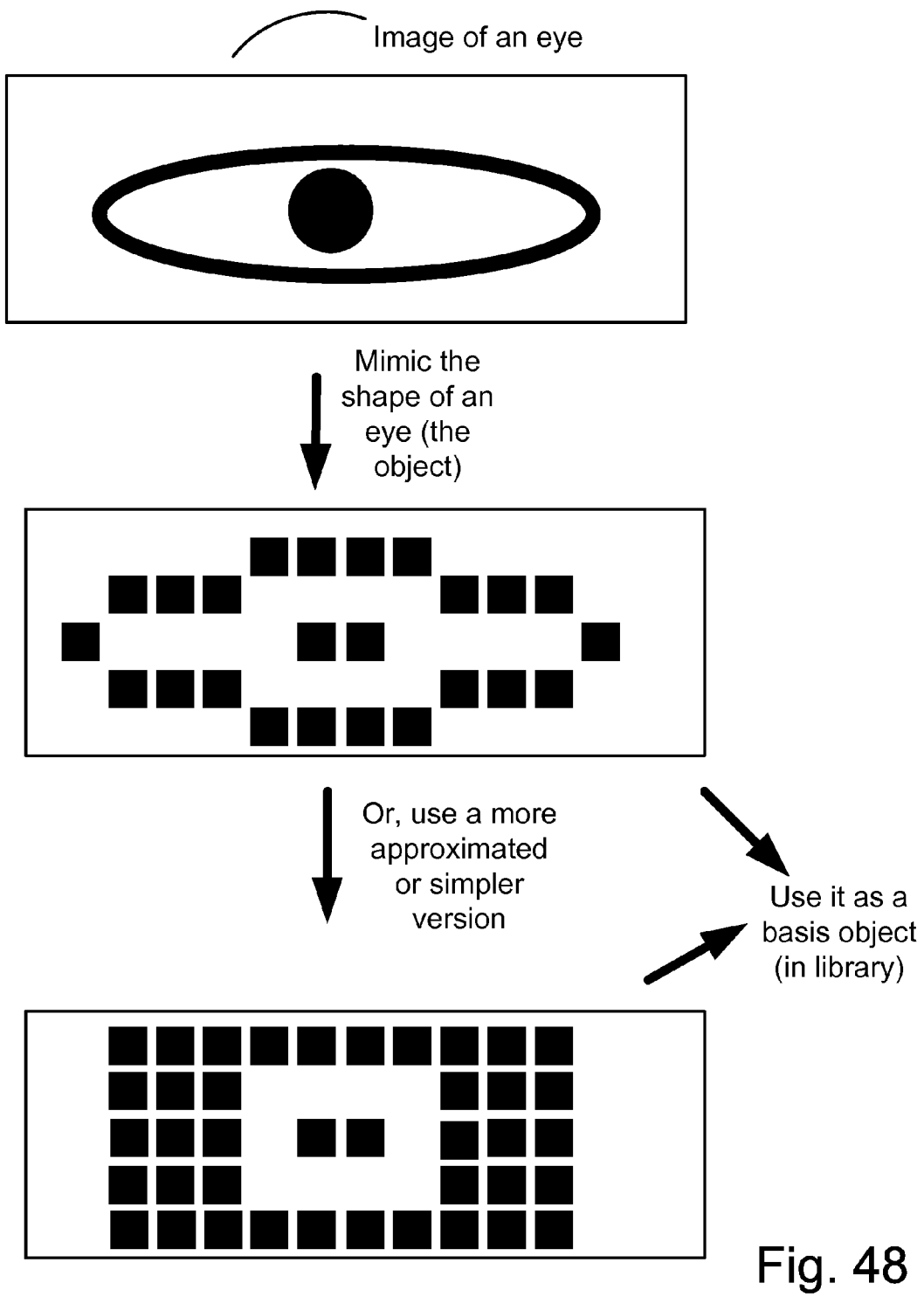
FIG. 48 shows one embodiment for an eye model for basis object.
Figure 56:
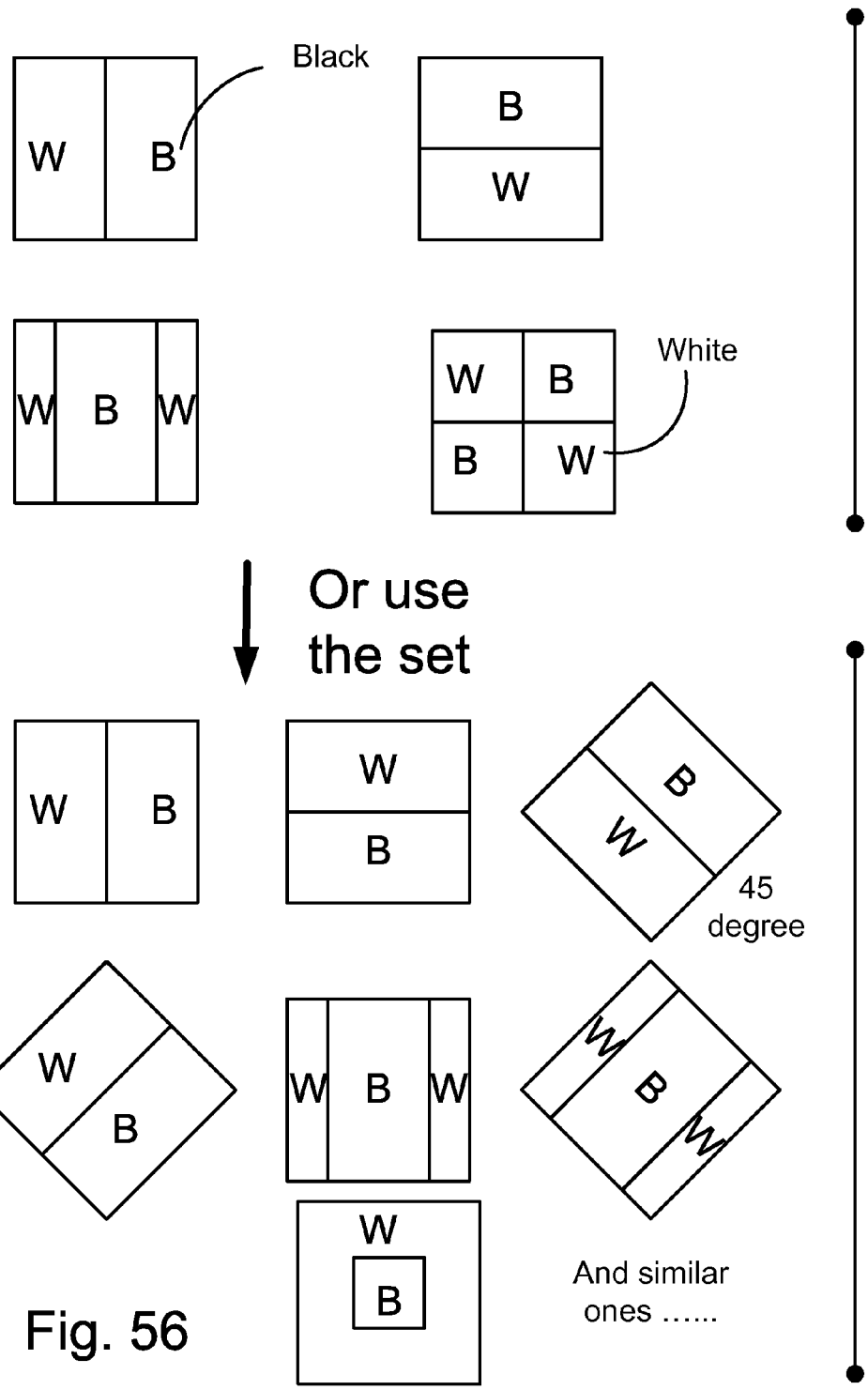
FIG. 56 shows one embodiment for set of basis functions.

In one embodiment, we use the eigenvectors for the face or head for recognition, with the object (e.g. face or head) as the linear combination of the eigenvectors or basis functions (e.g. 100-200 of them in the library), e.g. as shown in FIG. 47 or FIG. 48 or FIG. 56. In one embodiment, these are simplified face types or component of face types, e.g. nose or eye (e.g. see FIG. 48), or are similar to basis functions for Hadamard Transform or Discrete Cosine Transform (DCT), for images (e.g. see FIG. 47 or FIG. 56).

In one embodiment, we use the distance between them, as the measure of similarity, or to find the person. In one embodiment, we can generate the eigenvectors or basis functions using thousands of images of faces (as training samples), or get the common denominators for those images by comparing them (or get the difference or delta and subtract the difference from the original image), or filter those images to intentionally blur them with different filtering schemes or steps (to generate those different eigenvectors, e.g. using averaging filter on neighboring pixels, e.g. for 8 neighboring pixels). Mathematically, we can write e.g. for a given face, $F_{face}$, in terms of $N_{eigenvector}$ eigenvectors or basis functions, $V_{i-eigen}$, as their linear combination, with the coefficients $A_{i-eigen}$:

$$F_{face} = \Sigma_i A_{i-eigen} V_{i-eigen}$$

Wherein i=1, 2, ..., $N_{eigenvector}$, and the summation runs on variable i.

In one embodiment, we use the local feature analysis, for features on the face, e.g. mouth, nose, eyebrow, eye, ear, and the like, as can be represented as a superimposed image of separate images for different parts of the face, e.g. mouth, eye, and nose.

In one embodiment, if we have different basis functions or basis objects for recognition of different parts of the main object, e.g. for face, recognizing e.g. eye and mouth, as components of the face, then we look for similar basis functions or basis objects, e.g. for eye and mouth, to factor them together, in case they are the same or very similar, based on some fuzzy or crisp threshold or percentage or relative size or absolute size. Then, we save on the storage and calculation period, as the total number of basis functions or basis objects for all objects in our universe or set is reduced, making the process much faster. In addition, in one embodiment, we can do the parallel processing, because for most parts of the e.g. face, this can be processed at the same time for the same or common basis function. This is a huge advantage, in terms of processing time, e.g. in real-time or on-spot recognition, e.g. face recognition, e.g. at the airport.

In one embodiment, wavelets or Haar orthonormal or Fourier basis functions are used as simple black/white region rectangles or squares, or as resembling components of an object, or as resembling simple patterns, for face or object or pattern recognition, as we scan the image. In one embodiment, the wavelets or basis functions are used at different resolutions to scan the image to find all instances of such object in the image. In one embodiment, the wavelets or basis functions used at different resolutions are scanned simultaneously in parallel for faster search. In one embodiment, the wavelets or basis functions that look the same or similar for different objects at different resolutions are scanned or processed simultaneously in parallel for faster search.

In one embodiment, when we dot product the image with any given eigenvector or basis function (assuming orthogonal or orthonormal basis), then we get the coefficient corresponding for that eigenvector, for the linear combination formula mentioned above.

Feature Detection, Using Basis Objects or Basis Windows:

To find a face or other objects, one can use windows or filters that resemble their basis objects, as much as it is practical. The basis objects are the components of the object. For example, for the object of "face", we have basis objects as eye, mouth, nose, and the like. So, we design a window or filter that looks like a mouth or eye, or resemble them roughly, as shown in FIG. 48. Then, we use them as our basis windows. In one embodiment, the basis windows are rectangular or square, which are simpler to handle. In one embodiment, the basis windows are in free form shape. The examples are rectangles or squares of size 2×2 pixels, 2×4 pixels, 4×2 pixels, 3×6 pixels, 4×8 pixels, 32×32 pixels, and so on. The basis windows are divided into two sections, e.g.: black section and white section. For example, the black section resembles the eye or nose. In one embodiment, having black section and white section in fuzzy domain, we assign values between 0 and 1 to the black section and white section, as membership values. In one embodiment, having black section and white section in crisp domain, we assign values between 1 and 0 to the black section and white section, respectively, as an example.

In one embodiment, for the basis windows, the black section does not resemble any basis object at all, but it looks like an ordered geometrical basis function, in black/white or in grayscale or in color components, similar to Walsh basis functions (for example, see page 136 of book Gonzalez et al., "Digital image processing", published 1993, by Addison-Wesley), or similar to ordered Hadamard basis functions or Discrete Cosine Transform basis functions (for example, see pages 143 and 145 of book Gonzalez et al., "Digital image processing", published 1993, by Addison-Wesley), as shown in our FIG. 47 or FIG. 56, above.

In one embodiment, now, we express the image base on these basis windows, same as basis function representation. Or, in one embodiment, we can use the dot product of each of the basis windows with the image, to get the projection of the image on that basis window, which is similar to the component of the image on that basis window coordinate space. In one embodiment, the dot product is defined as the sum of multiplication of values of each pixel from image to that of the basis windows, as they overlap, within the basis window, and as the basis window moves across (or scans or traverses) the image.

In one embodiment, once we get the component of the image in those basis windows, we can store that in our database or compare that to those of the prior data or objects for comparison, match, and recognition, which can be a fuzzy recognition, based on fuzzy boundaries and membership functions and values, or can be crisp recognition based on e.g. a conventional threshold. The comparison can be based on degree of similarities or closeness between the coefficients of basis windows.

In one embodiment, we use the difference between the pixel values (e.g. color components values in RGB system or YMCK system, or intensity of pixels, or grayscale values of pixels) under black section and those under white section (which is an indication of contrast between the 2 sections) (e.g. see FIG. 47 or FIG. 56), for our metrics, for comparison purposes, for detection or recognition, when scanning the basis window across the image. In one embodiment, for multiple basis windows, we use the aggregate of all contributions or average values or summation or max or MAX or sup (as commonly known in Fuzzy Logic) or union or the like, from all the contributions from all basis windows. In one embodiment, we use the sum all pixel values under black section and/or those under white section.

In one embodiment, we use Kalman filters or motion vectors (e.g. for motion detection and prediction of moving object) for video frames, for objects in the frames, such as a human. In one embodiment, we use multiple frames in a video to find the frontal view of the person, as optimum position for face recognition, with higher accuracy rate. In one embodiment, we first find the face, roughly, and then find components of the object or face, e.g. eyes, and then get the relationship between components found, e.g. eyes and mouth, and then verify it is a real face, based on the found relationships, and then if it is a real face, then find who it is, based on the face library for all population or our universe or set (and other data or clues or hunches or tags or comments for the picture or person), e.g. using Z-web, to correlate them.

In one embodiment, we use Haar filters for recognition of the face. In one embodiment, we use Viola-Jones method for recognition of the face or object or components of the face, e.g. eyes. In one embodiment, we define an "integral image" as follows: For a given pixel position in the original image (i, j), we set the value for that position (or image coordinate (i, j)) as the sum of the all pixels (or pixel values) which are located to the left and top of the given pixel. See e.g. FIG. 57, the top figure. For pixel at point 4, that would define a region defined by the highlighted rectangle, between points 4 and 5, at the diagonal positions, in FIG. 57. Now, for our notation, for the sum of pixels for the 4 rectangles defined by points 1, 2, 3, and 4 (as diagonal points, with respect to point 5, at the top left corner), we will have: $S_{15}$, $S_{25}$, $S_{35}$, and $S_{45}$, respectively. Also, for the area of the rectangle defined between points 1, 2, 3, and 4, in FIG. 57 at top figure, for the sum of all pixels covered there, we will have the notation: $S_{goal}$. Then, we can write $S_{goal}$, in terms of other sums:

$$S_{goal} = S_{45} - S_{35} - S_{25} + S_{15}$$

Figure 57:
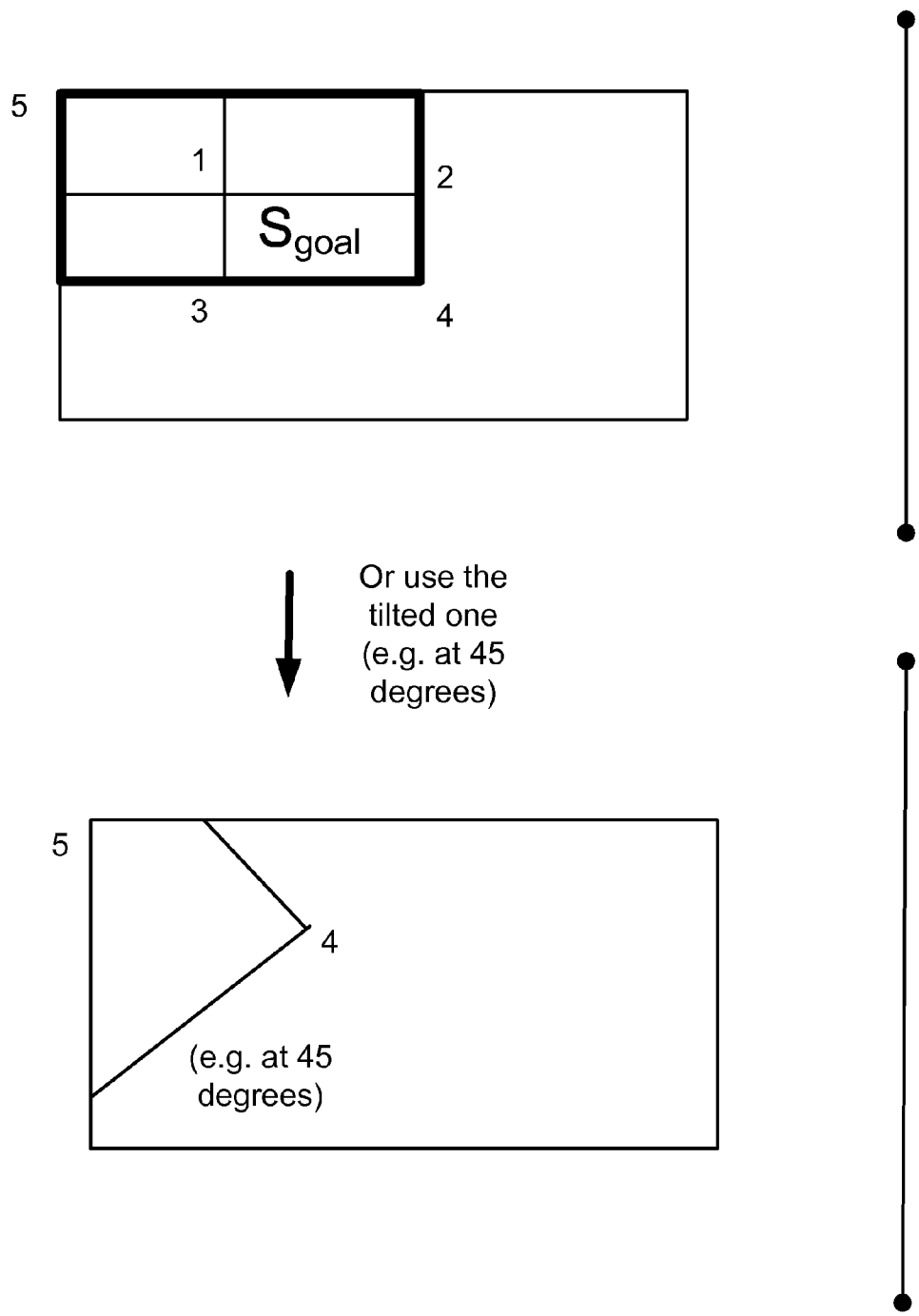
FIG. 57 shows one embodiment for windows for calculation of "integral image", for sum of pixels, for any given initial image, as an intermediate step for our process.

In one embodiment, we use $S_{goal}$ for feature detection, e.g. for face, along with the sets shown in e.g. FIG. 56, top set or bottom set, to use the inherent contrast between eyes and nose and lips and other components or regions of the face. In one embodiment, we can define the integral image in a region of pixels with tilted boundaries, as shown at the bottom of FIG. 57, with lines at 45 degrees, with the corner point, point 4, in this case. In one embodiment, this can be used for frontal face detection. In one embodiment, we use AdaBoost or other similar methods to select a small number of critical features (out of a large set), for higher efficiency. In one embodiment, we add more complex classifiers, as cascade, for focusing more on important regions of the image (and ignoring the background), as focusing attention on features, and doing the process in multiple steps, for efficiency. In one embodiment, a series of classifiers are applied to every sub-window, for detection cascade, with first classifiers eliminating a large percentage of negative examples with relatively low processing power, in each step. In one embodiment, a multilayer cascaded classifier is trained with a set of face and non-face samples, using e.g. human tagged images or machine-tagged images. In one embodiment, the images are normalized for different light conditions. In one embodiment, multiple detectors are integrated or aggregated. In one embodiment, a majority voting scheme is applied for detectors.

In one embodiment, we use different sets for black-white regions as shown on top or bottom of FIG. 56, with rotated units in the bottom figure, or as shown in FIG. 47, on top or bottom figures. In one embodiment, the total pixel values for Black and White regions are calculated, separately. In one embodiment, we get the difference or delta between the total or summation of pixel values for Black and White regions (e.g. see FIG. 56 for the 2 sets, and their units), as the assigned value for that unit, for that image processing step. In one embodiment, we use the same basis functions for different parts of the face, but at different weights. So, we can factor them out for calculations or scans or storage, for efficiency.

Information Retrieval:

In one embodiment, for information retrieval or search engines, we use term frequency (TF) and inverse document frequency (IDF), as a term weighting method (or TF-IDF), including e.g. Zipf's law or its variations, and normalized for document length. In one embodiment, we use a vector matching representation (for possible partial matching), using non-binary weights to index terms in documents or queries (for degree of similarity). Thus, the cosine of angle between 2 given vectors is an indication of similarity of the 2 vectors, which can be obtained by a probability ranking principle, or ranking based on relevant and non-relevant information. In one embodiment, the feedback information comes from local analysis (which includes clustering of results and modified user query) and global analysis (which includes external thesaurus, interdocument similarities, and modified user query). In one embodiment, the TF, the IDF, ranking, and the weights are all fuzzy values and parameters, with fuzzy boundaries and thresholding for the indexes for searches or databases. This makes the search more flexible and powerful.

In one embodiment, for information retrieval, we look at eye tracking data and relevance of information at hand. There are 4 types of eye behavior: gazing on an object or part of the scene for more than a fraction of second for information acquisition and processing, scan path for eye, pupil dilation indicating interest on the object by human, and fast movement of the eye to locate interesting parts of the scene. These give indication of the interest and relevance on a given object or subject by a user. In one embodiment, clicks (including clicks in a query chain) are used as the user's behavior analysis and metrics of user preference.

In one embodiment, a user access through user interface or GUI to query engine, which gets index from indexer, which is connected to the crawler, which is connected to the web. In one embodiment, we have a cluster-based architecture for the search module, with each cluster containing an index of the whole collection, with the index partitioned among M servers, with N clusters making N replicas of the whole index. The user interacts with the frontend servers (i.e. queries and answers), which is connected to document servers and answer cache servers, as well as broker network, which is connected to its own load-balancing server, which is connected to its own cluster. Each of the N clusters contains M combinations of "index cache plus search cluster". In one embodiment, we have a distributed and parallel search engine, with a data parallel strategy and task parallel strategy.

In one embodiment, we have multiple indexes as hierarchical indexes, as improvement for performance, with the first one as small and fast index for most frequent queries, and the last one is the larger and slower index for not-most frequent queries. In one embodiment, we have distributed architecture, such as multisite architecture, due to limitation of the size of a single data center, e.g. due to cooling challenge and power requirements.

In one embodiment, we have a harvest architecture, with a user connected to the broker and also to object cache (which is connected to web site). The broker is connected to replication manager and other brokers, as well as gatherers (which gather information from anywhere, including the web site). In one embodiment, we have harvest architecture more efficient than conventional architecture.

In one embodiment, for ranking, we use domain names as an indication of confidence on quality of content, e.g. .GOV or .EDU. In one embodiment, for ranking, we use content parameter, structural parameter (e.g. for textual data, using a text anchor, for search or query, as a proxy text of the web page), link-based parameter (e.g. number of in-links and out-links to or from a page), web usage parameter (as a feedback from the user(s), e.g. extracted from clicks, number, frequency, how long, purchases, dollar amount, traffic, comments, tags, "favorite", LIKE flag, email to others, recommend to others, forward to others, text to others, or how often), or user parameter (e.g. user's IP address, language, geography, operating system, browser, or history (cookies)). In one embodiment, for ranking, we use Hypertext Induced Topic Search or PageRank (designed by GOOGLE®), which simulates a user navigating randomly on the web, which has problems for self-links and dead-end links, and which can be computed with an iterative algorithm. In one embodiment, we use machine learning to learn to rank, by training samples. In one embodiment, search engine ranking with our model of Z-web, including reliability factor and other Z-factors, becomes much improved.

Crawlers:

In one embodiment, for crawlers, we focus on one of the following goals: quality, volume, or being up-to-date. We can focus on one or two goals, or compromise on all three, as our final goal. In one embodiment, for crawlers, we have static and dynamic data, some private and some public, some indexable and some hidden, some reachable by links and some reachable by forms, only. In one embodiment, for crawlers, we have downloader connected to the web, and downloads pages and puts it in storage, from which a metadata is extracted and is given to the scheduler, which sends the URL to the downloader, for the scheduled download from the web, at a later time.

In one embodiment, for crawlers, we have downloader connected to the web, and the downloader contains short term scheduler and multi-threaded fetchers. The "multi-threaded fetchers" downloads pages and puts it in storage, which contains metadata, links, and rich text. From storage, the data goes to the long-term scheduler, which supplies the downloader, through short term scheduler. The short term scheduler feeds multi-threaded fetchers, which is connected to the web, to complete our loop, to get the data from the web, based on the schedule designed earlier. In one embodiment, for crawlers, we have parallel crawlers, for improving efficiency. In one embodiment, for crawlers, we have revisit policy, for creations, updates, and deletions. In one embodiment, for crawlers, we have multiple policies, to combine together.

Analysis on Various Types of Data:

In one embodiment, we get multimedia data, as input, which is then segmented, compressed, and stored. In addition, after segmentation step or after storage step, we summarize the data. Furthermore, after segmentation step, we extract the features and then index it, based on retrieval models in our library. In addition, after storage step and after indexing step, we display the result(s) to the user, e.g. on monitor of computer or smart phone or tablet, e.g. using user interface or GUI or browser or query engine or module or software. In one embodiment, usually, as we go from simple to more complex form of data (e.g. from text to image to video to music), we have more semantic gap between our knowledge and the meaning of the multimedia data. In one embodiment, we analyze the machine generated data, e.g. tables or lists or computer logs, for behavioral analysis for consumers for marketing purposes. In one embodiment, the retrieval is based on color, texture, or distinct points in the image (regardless of the image scale, e.g. corner of objects in the image).

In one embodiment, the speech recognition is based on Hidden-Markov Model (HMM), based on a word model with phonemes for the word, based on an acoustic phoneme model, based on e.g. state sequence diagram with self-loop feature (to construct or model the pronunciation of the word), e.g. with the probability of a specific Mel-Frequency Cesptral Coefficients (MFCC) vector (as an example), which transforms the broad shape for our spectrogram into a vector with low dimensionality, which can be accomplished with a DCT (Discrete Cosine Transform) with 10 to 20 coefficients.

In one embodiment, in video application, we get an abstract or summarization based on identification of the key-frames, based on the frames in video with the largest changes or deltas or differences between consecutive frames, e.g. based on motion vectors. Summaries and abstracts can be searched more efficiently than the original data. In one embodiment, in video application, the sequence of the key frames gives a general summary of the whole video (or storyline). In one embodiment, in face recognition, we use eigenfaces (i.e. eigenvectors and its summations or linear combinations), to store, reconstruct, summarize, compare, or recognize images or faces, very efficiently. The eigenfaces are stored in our library in advance, based on thousands of training sample images on a neural network, or based on filtering thousands of training sample images (based on different filters to get those eigenfaces).

In one embodiment, we combine or merge the models or results e.g. for audio-visual speech recognition, e.g. to combine acoustic data from speech with e.g. the facial expression of the speaker, to recognize the multimedia data. For example, if the shape of mouth (or face) looks like "smiling" face (based on templates, or based on real faces, or based on face formulations, or based on face grids, in our library, for comparison and determination), indicating happiness or mood of the speaker, then if the speech or sound is not clear and noisy, and the speech recognition is vague with respect to identification of e.g. one word, but with 2 choices, e.g. "sad" and "pad", then the system probably chooses "pad", as the better choice for recognition, because the word "sad" is the opposite of the mood of the speaker (i.e. happiness, in this example), making it the worst choice for recognition (for such a speech).

In one embodiment, first, we combine or merge audio and visual data together, and then we apply HMM on it, for analysis and recognition. In one embodiment, first, we apply HMM on each individual data component (e.g. audio and visual data), and then we combine them together at the end. In one embodiment, we segment the video, e.g. into mixed sound tracks (which is divided into speech, music, and sound effects) and video frames (which is divided into scenes or frames, and then divided into shots). In one embodiment, speech is recognized based on phoneme list in its corresponding library, sound effects are recognized based on known sound effects stored in its library or database, and music is recognized based on MIDI, tempo, score, notes, or any codes or instructions or symbols for expressing the music, stored in its library.

In one embodiment, for video segmentation, we use color information for transition frames or fading frames, using its peaks and valleys on the color component curves, plus pixel intensity curves, using its peaks and valleys, to find or mark the transition or important points in time or corresponding frames, and mark them accordingly, for segmentation and further analysis. In one embodiment, we segment the data of any type, including video, sound, and multimedia, based on sudden change in the sequence (or big delta or difference), e.g. based on an assumption or model, starting from time zero, and go on in time, until the assumption is broken drastically, which means that this is a good place to segment the sequence, and mark it accordingly (assuming that the noise level is low, for this case, and the sudden change is not due to the random noise, itself). In one embodiment, we use Bayesian model, for both sides of the potential boundary between segments, with 2 different model parameters, to fit the 2 sides better, to examine the potential boundary for segmentation, e.g. for speech.

Speech & Language Recognition:

For speech or language recognition, in one embodiment, we use anchors (as special characters that anchor regular expressions to particular places in a string), disjunction operator (or "pipe") (to search e.g. for "A OR B"), grouping, and parenthesis operator (e.g. to enclose a pattern), based on the operator precedence hierarchy (in the absence of parenthesis), e.g. in this order, from highest to lowest precedence, for one embodiment: parenthesis, counters, sequences & anchors, and disjunction.

In one embodiment, we use finite-state automation (FSA), with states, including start state and final state, with transitions, represented by arcs in the graph. The arcs are generally from one state to the next state or to same original state. The FSA can be deterministic or non-deterministic. In one embodiment, for a language, for strings, we have the following operations: intersection, difference, complementation, and reversal. In one embodiment, for morphological parser, we use lexicon, morphotactics, and orthographic rules (such as spelling rules). In one embodiment, we use finite-state lexicon or finite-state transducers or transducers and orthographic rules. In one embodiment, we use lexicon-free FST (or finite-state transducer) (the Porter stemming algorithm). In one embodiment, we use word and sentence tokenization, related to word segmentation and sentence segmentation.

In one embodiment, we use string distance or minimum edit distance, e.g. for spelling correction. In one embodiment, we use N-gram models, language models, word prediction, chain rule of probability, and Markov models, e.g. for speech recognition, handwriting recognition, and machine translation. In one embodiment, we use word counting in corpora (a computer readable collection of text or speech), with probabilities based on counting items.

In one embodiment, we use maximum likelihood estimation (MLE), normalization, N-gram probability, and relative frequency. In one embodiment, we use training and test sets or training corpus. In one embodiment, we use part-of-speech tagging (word classes, morphological classes, or lexical tags). In one embodiment, we use rule based tagging (e.g. hand written rules), HMM (Hidden Markov Model) and maximum entropy tagging (statistical techniques), memory based tagging, or transformation based tagging. In one embodiment, we use contextual spelling error correction. In one embodiment, e.g. to find the probability of the next letter in a sequence, we use HMM, maximum entropy Markov model (a sequence classifier or sequence labeler), weighted finite state automaton, or Markov chain. In one embodiment, we use the forward-backward algorithm for HMM training.

In one embodiment, we use phonetics for speech recognition, speech synthesis, and text-to-speech conversion. In one embodiment, we use phonological categories and variations of pronunciation. In one embodiment, we use waveform, Fourier analysis, sound spectrum, phonetically annotated corpus, or pronunciation dictionaries. In one embodiment, we use text normalization or sentence tokenization. In one embodiment, we use context-free grammar. In one embodiment, we use a treebank search, e.g. for a specific grammar. In one embodiment, we use dynamic programming parsing technique, Cocke-Kasami-Younger (CKY) algorithm (based on Chomsky normal form (CNF)), Earley method, or chart parsing.

In one embodiment, for a conversational agent, we have a speech recognition module, which feeds the natural language analysis or understanding module, which feeds a dialogue manager module, which is connected a task manager module. The dialogue manager module is also connected to natural language generation module, which is connected to a text-to-speech synthesis module.

In one embodiment, we have recursive phrase structure expansion, as in tree structure format, to segment the sentence and tag the components, e.g. for the sentence "The people sat.", we have, e.g.:

| S | NP | AT  | "The"    |
| S | NP | NNS | "people" |
| S | VP | VBD | "sat"    |

So, in the example above, we start from S on the top. Then, S splits into two branches NP and VP. Then, NP splits into 2 branches AT ("The") and NNS ("people"). However, VP has only one branch going out, as VBD ("sat"). Thus, this scans the whole sentence, based on its components and grammar, based on templates and tags, in our library, pre-defined, for matching. We can show this in tree structure, with arrows, as well. In this example, we have S for the original sentence, NP for noun phrase, VP for verb phrase, AT for articles, NNS for plural nouns, and VBD for the verb for the past tense. Of course, this is just an example, and any other set of notations would work, as well. Since some of the tags can be nested themselves, within itself, the tagging process above is recursive. In one embodiment, we use Penn Treebank, for our system.

In one embodiment, for machine translation, we use alignment lines between corresponding words and phrases, sometimes in different order in the sentence. In one embodiment, for machine translation, we use a pyramid (called Vauquois Triangle), starting from base as source language text, as input, and ending at other end at the base of pyramid, as output, as target language text. For the first level, we have words to words, direct translation. Then, on the $2^{nd}$ level, for synthetic structure, we have synthetic transfer. Then, on the $3^{rd}$ level, for semantic structure, we have semantic transfer. Then, on the top, at peak, we have interlingua. So, starting from input base on the bottom of the pyramid or triangle, going up between each level to the peak, we have morphological analysis input to the first level (words), which feeds parsing to the second level (synthetic structure), which feeds shallow synthetic analysis to the $3^{rd}$ level (semantic structure), which feeds conceptual analysis to the peak (interlingua), which feeds back down from the top, conceptual generation to lower level (semantic structure), which feeds semantic generation to the lower level (synthetic structure), which feeds synthetic generation to the lower level (words), which outputs morphological generation for target language text, at the bottom of the pyramid, at the other side. Therefore, now, we have a complete machine translation method and system here.

In one embodiment, for machine translation, we use statistical alignment lines, or we use offset alignment lines, using signal processing methods, e.g. on bit text maps, to correspond the matching text together in different languages. In one embodiment, for text categorization, we use decision trees, using conditional probability and training sets. In one embodiment, for ranking or recognition, we use the frequency and distribution of some keywords. In one embodiment, the keywords can be obtained from the related nodes in Z-web.

Learning Machines:

In one embodiment, for fitting the data points, the "over-fitting" problem may cause that we use lower order curve fitting, even if they actually have higher order curve in reality in behavior. In one embodiment, for training, for more reliable data points, we set more weights, or increase the copies of that data point with the same ratio, as new training samples. In one embodiment, for the gradient descent method, if going stochastically, one data point at a time, we go toward the optimum point with the step size proportional to the reliability of that data, e.g. the higher the reliability factor (which is a part of the Z-factor), the higher the step size. In one embodiment, for learning machines, instead of using a single weight for a data point, we have a function of the weight, or a function of combination of the weight and the data point itself, as the new applied weight. In one embodiment, for learning machines, the expert knowledge or world knowledge determines the form of the formula or function or other requirements, down the road, for the learning process.

In one embodiment, e.g. for credit score for loan or risk analysis, if it turns out that e.g. the age is not a big factor, then the impact factor for age parameter is determined to be low (for loan determination goal or task). Then, for information regarding the age of the loan applicant, the age information does not have to be very reliable. For example, the age information with reliability factor of 75 percent is enough for our loan application, which is part of our Z-web for the loan applicant (person), as one of the Z-factors. That is, for low relevance factor or low impact factor (also part of Z-factors), we can relax the reliability factor of the data (reduce the min. threshold needed for the reliability factor of the data). In one embodiment, for low relevance factor or low impact factor, e.g. for age information, instead of using age as a value in linear models, we use square root of age (or log(x), or the like), in linear models, to de-emphasize or reduce the significance of the value of age in the analysis.

In one embodiment, e.g. for loan analysis, if there is a rule forbidding anybody less than 18 to get a loan, then instead of linear regression, we can use a non-linear function in there, or use a second order term for the cut-off age, or use the moment terms of the $2^{nd}$ order, to mimic the effect of the cut-off age. In one embodiment, e.g. for loan analysis, if it turns out that the age bracket is important, e.g. bracket or range of age between e.g. "low 40 to mid 50", then we have fuzzy range and parameters, rather than crisp number(s). In one embodiment, for stochastic gradient descent, we use more than one data points, e.g. get an average (or aggregate or median or weighted average) for 5 or 10 points for each step, to get a better result.

In one embodiment, for constructing kernels (K) for SVM, we can use basis functions (B) based on polynomials, Gaussians, or logistic sigmoids family of functions:

$$K(x,\dot{x})=B(x)^T B(\dot{x})=\Sigma_i B_i(x) B_i(\dot{x})$$

Wherein i runs from 1 to p, and T denotes the transpose of the matrix.

In one embodiment, for classification, e.g. for one million data points, we choose one thousand points only, randomly or uniformly, if possible (i.e. a subset), and find the support vector machines for the subset (derived SVM), which is much faster than that of the original data set, and then try the remaining data points (999,000 points, in this example) against the resulting the support vector machines and the support vectors, to adjust, if needed. Since, in average, for most cases, most of the original 1 million data points are far from the support vectors, and thus, not contributing to the support vectors, the adjustment is usually limited to (or required for) a small fraction of those remaining 999,000 points. This increases the efficiency of the calculation of the SVM.

In one embodiment, for adjusting the derived SVM result for 1000 points, we can find all the data points close to (or within) the region defined by (or surrounded by) the support vectors (points) of our derived SVM (or within union of those regions), out of those remaining 999,000 points. Let's assume there are M points like that, in that region, out of those remaining 999,000 points. Then, we can combine the M points with our original (1000) points, and calculate the SVM for the resulting (M+1000) points, again, which would be our final SVM result.

In one embodiment, for adjusting the derived SVM result for 1000 points, we can find all the data points close to (or within) the region defined by (or surrounded by) the support vectors of our derived SVM (or within union of those regions), out of those remaining 999,000 points. Let's assume there are M points like that, in that region, out of those remaining 999,000 points. Let's assume that those M points constitute an imaginary band (or imaginary rectangle covering those M points or band). Then, the band, when it is skeletonized (with image processing skeleton or thinning operator), becomes a single line, in the middle of the band, with a specific equation. Then, to adjust our derived SVM, to get the final SVM, we have multiple techniques, from any one of the following:

Based on width and/or length of the band
Based on width and/or length of the rectangle covering the band
Based on equation of the skeleton line representing the band
From the point where the derived SVM intersects the skeleton line, rotate the derived SVM toward the skeleton line, half way (or rotate with an angle somewhere in between)
Match the skeleton line, or introduce the skeleton line, as our final SVM
Shift, rotate, twist, and/or translate the derived SVM, toward the skeleton line
Shift, rotate, twist, and/or translate the derived SVM, toward the band
Shift, rotate, twist, and/or translate the derived SVM, toward the rectangle around the band
For small changes, do not change the derived SVM at all, based on some thresholds
Or any combination of the above In another version, we do the same method as above for 2 or more different subsets of original 1 million data points, e.g. N subsets. Then, we generate multiple (N) SVMs, one for each subset. Then, we get the average of those N SVMs, or a line in between of all of those N SVMs, or a line in between of all of those N SVMs with minimum total distance (or square of distance) to all of those N SVMs, or with minimum total angle with all of those N SVMs (when crossing them at one point), or choose a line or hyperplane for separation of clusters with coefficients in the equation of the line or hyperplane derived as the average (or median or the like) of those corresponding coefficients in those multiple N SVMs, or choose a combination of the above methods. So, from the above, we get a semi-final SVM result. Then, from the remaining data points, we adjust the semi-final SVM result, to get to the final SVM result, for all 1 million data points, with one of the methods mentioned above. This increases the efficiency of the calculation of the SVM result.

In one embodiment, we have lots of data coming in real time, as input. First, we calculate our first SVM for the first e.g. 1000 data points, and store the result in the library. Then, we adjust the first SVM result, based on the coming data (millions of points) in real time, as they come in, based on the methods shown above, as an approximation (similar to running average of data points coming in, in real time). Thus, we can handle large amount of data, in real time, to get the SVM, for classification, recognition, and verification purposes (or the like).

In one embodiment, to find a cluster, we start from a small region in N-dimensional feature space, with points in close proximity, as our original cluster. Then, we expand with circles (or hyperspheres) of small radius (or squares (hypercubes) of small dimensions), going beyond the boundary of the original region or cluster. If the small circles include enough points or have enough point density (above a threshold), then the circle is a part of the original region, and they get UNION-ed together, as sets or regions or points, as our new cluster region, and this continues, until the next expansion circles are empty or almost empty, which means that we get to a region between the clusters, and we stop in that direction. Once all directions and all around the boundary of the original region are exhausted, and after the growth of the region is stopped (in all directions), then that would be the final shape of our cluster. So, we found one complete cluster. Continuing on this, we find other clusters, and eventually, find all clusters available. Then, we can use them for the classification.

In the conventional SVM, we get a penalty, if we cross or get into the margin of the line separating the clusters, e.g. with a new data point. However, in one embodiment, we do not get penalized for crossing a new data point in that marginal band or region around the separation line (or hypersurface or plane), as long as that new point belongs to a cluster.

For learning machines, the minimum description length (MDL) principle (similar to Occam's Razor) states that the best hypothesis (for a given set of data) is the one that leads to the best compression of the data, or fewer bits to describe the data. Similarly, given two hypotheses that can explain the behavior of a given data, we prefer to choose the simpler (or less complex) hypothesis or model or assumption. Note that this is related to the Kolmogorov complexity (or algorithmic entropy, descriptive complexity, Kolmogorov-Chaitin complexity, or program-size complexity) for an object (e.g. a piece of text), which measures the computational resources needed to specify the object, e.g. the length of the shortest possible description of the object (in some description language or grammar). (Note that the Kolmogorov complexity is also related to polynomial-time computable problem.)

Please note that for learning machines, the VC dimension (Vapnik-Chervonenkis dimension) is a measure of the capacity of a statistical classification algorithm (e.g. the cardinality of the largest set of points that the algorithm can shatter (e.g. with the model making no errors, when evaluating that set of data points)).

For learning machines, the Falsifiability factor relates to the data that shows an assumption (or statement, hypothesis, or theory) is wrong. This is also part of the Z-factors in our Z-web. The Falsifiability factor depends on the size of data. For example, to show some function is (or is not) linear, we need more than 2 points to prove (or disprove) such a statement, because one can pass a straight line through any 2 points.

In one embodiment, for fuzzy SVM, we have sets with fuzzy boundaries, and the members with membership values between 0 and 1. Thus, the margin of the line separating the clusters (or hyperplane, in general), with respect to the support vectors (designated points), are all fuzzy, and all correspond to their respective membership values (including the support vectors, themselves). So, for fuzzy SVM technique, the margin or band around our separating line is wider and "fuzzier" or "cloudier".

A Note on Zadeh's Z-Numbers and $Z^+$ Extension Principle:

In one embodiment, we use restricted-centered theory of reasoning and computation in an environment of uncertainty and imprecision (also called RRC), to enhance capability of reasoning and computation in an environment of uncertainty, imprecision and partiality of truth. The point of departure in RRC is a basic premise. In the real world, such environment is the norm, rather than exception. For example, for the question of "How long does it take to go from home to office?", we may have the answer, e.g. "Normally, about 45 minutes". These types of answers are RRC type (with restriction). The restriction by itself is a carrier of information. The restriction can be possibilistic (e.g. "X is large."). The restriction can be probabilistic (e.g. "X has a uniform probability distribution."). Or, the restriction can be both possibilistic and probabilistic (e.g. "Usually, X is large." or "It is very likely that there is a large decrease in the price of gold in the short term."), which can be expressed by Z-numbers.

In one embodiment, Z-numbers can be used e.g. for scheduling for adding the time periods together e.g. to find out the final arrival time to destination, which involves the addition of restrictions, e.g. going from A to B takes "about 5 hours, normally", and from B to C, it takes "roughly 3 hours, usually". So, we have 2 Z-numbers here. To get the final time, for going from A to C, we add them up, in Z-number domain, in the form of (A, B):

$$Z_{final} = Z_1 + Z_2 = (\text{About 5, Normally}) + (\text{Roughly 3, Usually})$$

We have shown the Z-number arithmetic elsewhere in this disclosure. So, using Z-number domain, we can find answers to everyday problems and process natural language information by humans, which would not be possible before (without Z-number domain).

For a given conventional theorem, we can add fuzzy logic generalization, to generalize the theory in the fuzzy domain, using fuzzy sets and fuzzy parameters. The structure of modes of reasoning and computation can be mathematical (which can be Type 1 or Type 2) and non-mathematical (which is Type 3, unprecisiated perceptions, related to f-valaidity). Type 1 is for measurements, related to p-validity, and Type 2 is for measurements plus percisiated perceptions. The restriction can be expressed as:

$$R(X): X \in A$$

The restrictions can be hard or soft. The restrictions can be direct or indirect. In one embodiment, the restriction can be a possibilistic restriction, e.g.:

$$R(X): X \text{ is } A(\text{with}(r=\text{blank}))$$

In one embodiment, the restriction is Z-restriction, wherein X is a real-valued random variable. Then, we have Z-restriction (r=z, s is suppressed) being expressed as:

$$R(X): X \text{ iz } Z$$

where Z is a combination of possibilistic and probabilistic restrictions defined as:

$$Z: \text{Prob}(X \text{ is } A) \text{ is } B$$

Where A and B are fuzzy sets, e.g. from natural language processing. The ordered pair of (A, B) is Z-number, which we explained elsewhere in this disclosure. For example, the fuzzy number, B, is a possibilistic restriction on the certainty (probability) that X is A. Now, we have $Z^+$-restriction (r=$z^+$, s is suppressed) being expressed as:

$$R(X): X \text{ iz}^+ Z^+$$

$$Z^+ = (\text{Poss}(X), \text{Prob}(X))$$

Wherein $Z^+$ is an ordered pair, (Poss(X), Prob(X)), in which Poss(X) and Prob(X) are, respectively, the possibility and probability distributions of X. Note that $Z^+$ is more informative than Z. So, if (Z=(A, B)) and p is the underlying probability density function of X, then $$Z^+ = (A, p)$$

If Z is (A, B) and $Z^+$ is (A, p), then B is an indirect possibilistic restriction on $(\mu_A \cdot p)$. p is explicit in $Z^+$ and implicit in Z. The ordered pair (A, p) is referred to as a $Z^+$-number. Now, we have Z-valuation as an ordered triple of the form (X,A,B), where X is a real-valued variable and (A,B) is a Z-number. Equivalently, a Z-valuation, (X,A,B), is a Z-restriction on X:

$$(X,A,B) \rightarrow X \, iz(A,B)$$

For example, we have:
(length of car, short, very likely)
(stock value next July, sharp increase, extremely unlikely)

So, we can process and evaluate a lot of situations in our life, which is naturally expressed in our language in the Z-number domain (in contrast to crisp values, e.g. 3.1557 dollars). Then, we have Z-rule as a conditional restriction in which the antecedent and consequent are Z-valuations:

$$\text{If}(X, A_1, B_1) \text{ then } (Y, A_2, B_2)$$

For example:
If (consumer confidence, low, usually) then (unemployment, high, usually)

So, we can input these conditions or rules into our rule engine, or use it for prediction, control system, forecasting (economy, elections, and other events), social behavioral analysis, consumer behavioral analysis, predicting revolutions or unrest, detecting frauds, detecting unusual behaviors, detecting unusual patterns, finding liars or contradictions, resolving contradictions, and the like. In our daily life setting, much of the information in an environment of uncertainty and imprecision is represented as a collection of Z-valuations and Z-rules, which we call Z-information, as a whole. Any interpolation based on Z-numbers is called Z-interpolation, which is very important for our fuzzy control systems. In one embodiment, we model a piece of information as a restriction. In one embodiment, we model the meaning as a restriction. All of the above is foundations for computing with words (CWW), which is natural to the natural language processing or human understanding of a language.

In one embodiment, we use extension principles to compute the result, e.g. for probabilistic extension principle with a possibilistic restriction, we have:

$$Y = f(p)$$

$$\frac{R(p): g(p) \text{ is } A}{R(Y)(f(A)): \mu_Y(q) = \sup_p \mu_A(g(p))}$$

subject to: $q = f(p)$ wherein p is a probability density function in R, and A is a fuzzy set in the space of probability density functions. For $Z^+$-extension principle, we have the restriction on X as a $Z^+$-restriction.

$$Y = f(X)$$

$$\frac{R(X): X \, iz^+(A, p)}{R(Y)(f(A, p)): R(Y)iz^+(f(A), f(p))}$$

where A is a fuzzy set which defines the possibility distribution of X, and p is the underlying probability density function of X. For Z-extension principle, we have the restriction on X as a Z-number:

$$Y = f(X)$$

$$\frac{R(X): X \, iz \, (A, B)}{R(Y)(f(A, B)): Y \, iz \, (f(A), C)}$$

where C is the certainty of f(A). Computation of C involves an application of the $Z^+$-extension principle, followed by an application of the probabilistic extension principle with a probabilistic restriction, $(p \cdot A \text{ is B})$. For example, sum of two Z-numbers is done by this method. For example, let's look at the steps for method to find the sum of two Z-numbers:

Let $X=(A_X, B_X)$ and $Y=(A_Y, B_Y)$. The sum of X and Y is a Z-number, $Z=(A_Z, B_Z)$. The sum of $(A_X, B_X)$ and $(A_Y, B_Y)$ is defined as:

$$(A_X, B_X) + (A_Y, B_Y) = (A_X + A_Y, B_Z)$$

where $(A_X + A_Y)$ is the sum of fuzzy numbers $A_X$ and $A_Y$ computed through the use of fuzzy arithmetic. Then, we compute $B_Z$. Let $p_X$ and $p_Y$ be the underlying probability density functions in the Z-valuations $(X, A_X, B_X)$ and $(Y, A_Y, B_Y)$, respectively. If $p_X$ and $p_Y$ were known, the underlying probability density function in Z is the convolution of $p_X$ and $p_Y$, $(p_Z = p_X \, O \, p_Y)$, which is expressed as (where R is real):

$$p_{X+Y}(v) = \int_R p_X(u) p_Y(v-u) du$$

We do not know $p_X$ and $p_Y$, but we know the restrictions on $p_X$ and $p_Y$, which are:

$$(\int_R \mu_{AX}(u) p_X(u) du) \text{ is } B_X$$

$$(\int_R \mu_{AY}(u) p_Y(u) du) \text{ is } B_Y$$

Using extension principle, for restriction on $p_Z$, we have:

$$\mu_{pZ}(p_Z) = \sup_{p_X, p_Y} (\mu_{BX}(\int_R \mu_{AX}(u) p_X(u) du) \char`\^ \mu_{BY}(\int_R \mu_{AY}(u) p_Y(u) du))$$

subject to: $(p_Z = p_X O p_Y)$ $$(\int_R p_X(u) du) = 1$$

$$(\int_R p_Y(u) du) = 1$$

If we know $p_Z$, then we have:

$$B_Z = (\int_R \mu_{AZ}(u) p_Z(u) du)$$

Where:

$$\mu_{AZ}(u) = \sup_v (\mu_{AX}(v) \char`\^ \mu_{AY}(u-v))$$

Now, we apply extension principle, to get restriction on $B_Z$:

$$\mu_{BZ}(w) = \sup_{p_Z} (\mu_{p_Z}(p_Z))$$

subject to:

$$w = (\int_R \mu_{AZ}(u) p_Z(u) du)$$

We already got $(\mu_{pZ}(p_Z))$. Thus, the sum of Z-numbers is completed now.

Another important transformation is f-transformation, in the context of f-geometry, which we draw the geometrical shapes with fuzzy boundaries, or with thick non-sharp cloudy boundaries, as if it is drawn by hand with a spray pen. Then, we will have the following f-concepts in f-geometry: f-point, f-triangle, f-line, f-parallel, f-circle, f-bisector, f-tangent, f-proof, f-perpendicular, f-median, f-altitude, f-definition, f-theorem, and the like.

In summary, Z-number domain is a powerful domain and tool for processing natural language data or our daily way of life, to better understand and process the information (efficiently and correctly).

Technical Notes:

In one embodiment, we use two learning machines which get trained by two images from binocular vision, or stereoscopic vision, or binocular disparity, or parallax, or as if they are a set of two eyes on somebody's head, e.g. for depth perception or binocular fusion, for a machine which can find the depth or perspective, based on its training, which is very valuable e.g. for a replacement for a human in a robotic vision or target detection or space missions (for automatic landing).

FIG. 6 shows some of the applications or modules, using the analyzer or processor taught in this invention, applying the methods taught in this invention, for various uses, with analyzer feeding data to or receiving data from the components, for various tasks. In one embodiment, the Big Data analytics is used for marketing, geolocation information, mobile users, fraud prevention, investing, and mortgage analysis.

In one embodiment, to do the data mining from Z-web, we can use "extract, transformation, and load" procedure, to our data warehouse, and then report it in various formats to the user, from the data warehouse, e.g. for batch reports and decision support systems reports, which can be multi-dimensional, rational, or hybrid, with queries based on natural language in free human language format, or based on templates. In one embodiment, the calculations are all done in the warehouse. In one embodiment, the calculations are done outside the warehouse in a multi-dimensional database. The reporting can be done on CRM, e-business intelligence, web traffic analysis, and click stream analysis, for customer taste, complementary merchandise, gift suggestions, customer profile, marketing and sales, and the like. In one embodiment, for frequently asked questions or those with high probability, for retrieval or calculations, to avoid double work for retrieval or calculations very often, the system stores the results in the intermediate storages for quick access by other users, without double calculations, e.g. calculating the average salary of all teachers in all school districts in US once, and only once.

In one embodiment, we add hashing, compression of data, partitioning the data, clustering, and parallel processing to the data mining module. In one embodiment, we use Z-webs for prediction engines, using the data mining from Z-web, to e.g. predict what the user will buy for next year, e.g. in terms of fashion, color, and the like. From the prediction engines for human behaviors and emotion variables, one can predict social unrests and revolutions, or on an individual basis, the problems with a specific person, which helps predicting policing for crime prevention.

In one embodiment, we have learning machines with multiple search options: logic-based, cultural-related, or evolutionary or genetics search. For genetic algorithm or programming, we have to determine the set of terminals and functions, as well as the fitness measure and parameters for the run, e.g. number of generations and population size, plus the method for getting the result and how to terminate the run, based on some criteria. The genetic algorithm can be combined with our method of our invention for learning machines. In addition, for the way that nodes of Z-web evolve, we can use a genetic algorithm, to progressively improve the Z-web node values and Z-factors.

In one embodiment, we have a large set of facts, e.g. encyclopedia, and a set of formulas or relationships, e.g. for conversion of currency or length or weight or the like, e.g. between US Dollar and Euro, and a set of presentation tools, such as graphs or 2-D Cartesian drawings (for Y versus X axis) or tables, to present the raw facts in a presentable format or modified format, as required per query or search by user. For example, if the user wants to know "the population of US in 2000 according to US Census Bureau", in addition to the simple answer as an integer, the system presents all the available data for population, e.g. from 1900 to now, by a plot or graph in 2D on display for the user, as an extra information.

In one embodiment, a search engine can be customized for a user, based on her specific developed Z-web, with her preferences embedded in there. That also helps to find the right context e.g. for a word search with multiple meanings, to find the intention of the user automatically, from the Z-web. In one embodiment, the browsing habits or history or purchases or web sites or clicks are part of the customized feedback for the user, to modify her Z-web for future.

General Notes:

For all the systems taught here, one can use a microprocessor, processor, computer, computing device, controller, CPU, central processing module, processing unit, or controlling unit, to calculate, analyze, convert, and process the data, and it can store the information on a disk, hard drive, memory unit, storage unit, ROM, RAM, optical disc, magnetic unit, memory module, database, flash drive, removable drive, server, PC, RAID, tape, or the like. The information can be processed serially or in parallel. The communication between different units, devices, or modules are done by wire, cable, fiber optics, wirelessly, WiFi, Bluetooth, through network, Internet, copper interconnect, antenna, satellite dish, or the like.

In general, for all teachings of this disclosure, including the above sections, the changes or rules or commands or corrections can be in crisp values, e.g. 10 percent change or threshold or difference, or in one other embodiment, in Fuzzy domain, e.g. Fuzzy rules, commands, and corrections, e.g. large difference or large change, or can be expressed in combination of both Fuzzy and crisp rules and parameters. The Fuzzy rules and sets and their treatments are explained elsewhere in this disclosure.

Note that throughout this disclosure, "we" or "it" means "our system" or "our controller" or "processor" or "CPU" or "our computer" or "our system of invention or embodiment" or "one of our embodiments" or "our method of invention" or "system of invention" or "microprocessor" or "processing unit of our system" or "our device" or "server" or "our teaching based on our method or system or device", which is (or related to) a machine or device or hardware, and not referring to a human at all. We also (sometimes) use the words "we" or "our" as our teaching entity or "teacher" for our disclosure, which again means that we are talking about "our system" or "details of our system" or "our method" or "details of our method" or "how it works, based on components of our system or steps of our method" (and not referring to a human at all).

Any other teachings similar to above or variations of the above are also meant to be included for protection under the current invention disclosure. All embodiments and examples are independent for teaching purposes, and they are not limiting the scope of the invention at all. However, they can be combined for or in our system, in any combination possible, with no limitation intended.

The invention claimed is:

1. A method for recognition of faces from a still image or video frame, said method comprising:

receiving a still image or video frame through an input interface;

preprocessing said still image or video frame;

recognizing a first class of image for said still image or video frame;

if said first class of image for said still image or video frame comprises face or human, then sending said still image or video frame to a face recognizer module;

said face recognizer module accessing a first basis function from a first library of basis functions, stored in a first basis function storage, corresponding to a first component of face;

said face recognizer module accessing a second basis function from a second library of basis functions, stored in a second basis function storage, corresponding to a second component of face;

a computing processor applying said first basis function across said still image or video frame to detect said first component of face;

said computing processor applying said second basis function across said still image or video frame to detect said second component of face;

said computing processor accessing a relationship between said first component of face and said second component of face;

assigning a first node and a second node on a relational web to represent said first component of face and said second component of face, respectively;

assigning a first branch connecting said first node and said second node on said relational web to represent said relationship between said first component of face and said second component of face;

assigning a first Z-factor, a second Z-factor, and a third Z-factor to said first node, said second node, and said first branch, respectively;

wherein Z-factor is a mathematical set of factors comprising one or more of reliability factor, confidence factor, truth factor, expertise factor, bias factor, knowledge factor, usefulness factor, and relevance factor;

said computing processor analyzing said first Z-factor, said second Z-factor, and said third Z-factor for said first node, said second node, and said first branch;

said computing processor detecting one or more faces in said still image or video frame, with a fourth Z-factor, based on said analysis step;

said computing processor comparing said detected one or more faces with said fourth Z-factor against a library of faces, each with its own said Z-factor, stored in a first face storage;

if said detected one or more faces match or correspond to a first face in said library of faces, then outputting identity or identification number of said first face, as identification for said detected one or more faces from said still image or video frame, along with a fifth Z-factor corresponding to said matching or correspondence to said first face.

2. The method for recognition of faces from a still image or video frame as recited in claim 1, said method comprising: determining a context for said still image or video frame.

3. The method for recognition of faces from a still image or video frame as recited in claim 1, said method comprising: determining multiple contexts for said still image or video frame.

4. The method for recognition of faces from a still image or video frame as recited in claim 1, said method comprising: determining a partial matching of an object in said still image or video frame.

5. The method for recognition of faces from a still image or video frame as recited in claim 1, said method comprising: determining a match of an object partially shown in said still image or video frame.

6. The method for recognition of faces from a still image or video frame as recited in claim 1, said method comprising: for a given recognized first object, looking for a related object in vicinity of said first object in said still image or video frame.

7. The method for recognition of faces from a still image or video frame as recited in claim 1, said method comprising: for a given recognized first object, looking for a related object in vicinity of said first object in other related images or video frames.

8. The method for recognition of faces from a still image or video frame as recited in claim 1, said method comprising: for a given recognized first object, looking for an expected object from a list of expected objects within a radius of search of said first object.

9. The method for recognition of faces from a still image or video frame as recited in claim 1, said method comprising: for a given recognized first object, looking for an expected object from said relational web, with its corresponding nodes and Z-factors, with respect to a third node representing said first object.

10. The method for recognition of faces from a still image or video frame as recited in claim 1, said method comprising: applying a rule for recognition.

11. The method for recognition of faces from a still image or video frame as recited in claim 1, said method comprising: applying a rule template for recognition.

12. The method for recognition of faces from a still image or video frame as recited in claim 1, said method comprising: emailing a file or data to all people recognized in said still image or video frame.

13. The method for recognition of faces from a still image or video frame as recited in claim 1, said method comprising: emailing a file or data to a subset of people recognized in said still image or video frame.

14. The method for recognition of faces from a still image or video frame as recited in claim 1, said method comprising: communicating a file or data to all people recognized in said still image or video frame.

15. The method for recognition of faces from a still image or video frame as recited in claim 1, said method comprising: emailing said still image or video frame to all people recognized in said still image or video frame.

16. The method for recognition of faces from a still image or video frame as recited in claim 1, said method comprising: video conferencing among all people recognized in said still image or video frame.

17. The method for recognition of faces from a still image or video frame as recited in claim 1, said method comprising: coordinating calendar or meeting time among all people recognized in said still image or video frame.

18. The method for recognition of faces from a still image or video frame as recited in claim 1, said method comprising: sending notification or warning to all people recognized in said still image or video frame.

19. The method for recognition of faces from a still image or video frame as recited in claim 1, said method comprising: editing, replacing, erasing, covering, or exchanging one, some, or all people recognized in said still image or video frame.

20. The method for recognition of faces from a still image or video frame as recited in claim 1, said method comprising:

warning or notifying an authority or police about one, some, or all people recognized in said still image or video frame.

* * * * *